US012321589B2

(12) United States Patent
Jon et al.

(10) Patent No.: US 12,321,589 B2
(45) Date of Patent: Jun. 3, 2025

(54) DEVICE, METHOD, AND GRAPHICAL USER INTERFACE FOR ANNOTATING CONTENT

(71) Applicant: Apple Inc., Cupertino, CA (US)

(72) Inventors: Tiffany S. Jon, Cupertino, CA (US); Jennifer P. Chen, San Francisco, CA (US); Christopher Matthews, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/946,374

(22) Filed: Sep. 16, 2022

(65) Prior Publication Data

US 2023/0017201 A1 Jan. 19, 2023

Related U.S. Application Data

(63) Continuation of application No. 15/978,125, filed on May 12, 2018, now Pat. No. 11,481,107.

(Continued)

(51) Int. Cl.

*G06F 3/04883* (2022.01)
*G06F 3/0482* (2013.01)

(Continued)

(52) U.S. Cl.

CPC ........ *G06F 3/04883* (2013.01); *G06F 3/0482* (2013.01); *G06F 3/0488* (2013.01);

(Continued)

(58) Field of Classification Search

CPC .. G06F 3/04883; G06F 3/0482; G06F 3/0488; G06T 11/60; G06T 11/203; G06T 2200/24

See application file for complete search history.

(56) References Cited

U.S. PATENT DOCUMENTS

| | | | |
|---|---|---|---|
| 5,155,813 | A | 10/1992 | Donoghue et al. |
| 5,367,353 | A | 11/1994 | Amanuma et al. |

(Continued)

FOREIGN PATENT DOCUMENTS

| | | | |
|---|---|---|---|
| CN | 101667100 | A | 3/2010 |
| CN | 103135915 | A | 6/2013 |

(Continued)

OTHER PUBLICATIONS

PCT International Search Report and Written Opinion dated Jul. 23, 2018, International Search Report PCT/ JS2018/23484, pp. 1-18.

(Continued)

*Primary Examiner* — Jennifer N Welch
*Assistant Examiner* — Parmanand D Patel
(74) *Attorney, Agent, or Firm* — Kubota & Basol LLP

(57) ABSTRACT

A method includes displaying, on a display, first content and a representation of second content associated with the first content. The method includes detecting, via one or more input devices, a user input at a location of the representation of the second content. The method includes, in response to detecting the user input at the location of the representation of the second content, in accordance with a determination that the user input includes a stylus contact, displaying, on the display, a drawing user interface including the second content and a toolbar region with a plurality of drawing tool selection affordances. The method includes, in response to detecting the user input at the location of the representation of the second content, in accordance with a determination that the user input does not include a stylus contact, forgoing display of the drawing user interface.

21 Claims, 139 Drawing Sheets

Related U.S. Application Data

(60) Provisional application No. 62/514,206, filed on Jun. 2, 2017.

(51) Int. Cl.
*G06F 3/0488* (2022.01)
*G06T 11/60* (2006.01)
*G06T 11/20* (2006.01)

(52) U.S. Cl.
CPC ............. *G06T 11/60* (2013.01); *G06T 11/203* (2013.01); *G06T 2200/24* (2013.01)

(56) References Cited

U.S. PATENT DOCUMENTS 5,367,453 A 11/1994 Capps et al.
5,483,261 A 1/1996 Yasutake
5,488,204 A 1/1996 Mead et al.
5,591,945 A 1/1997 Kent
5,825,352 A 10/1998 Bisset et al.
5,835,079 A 11/1998 Shieh
5,880,411 A 3/1999 Gillespie et al.
5,956,020 A 9/1999 D'Amico et al.
6,188,391 B1 2/2001 Seely et al.
6,310,610 B1 10/2001 Beaton et al.
6,323,846 B1 11/2001 Westerman et al.
6,327,011 B2 12/2001 Kim
6,570,557 B1 5/2003 Westerman et al.
6,611,258 B1 8/2003 Tanaka et al.
6,677,932 B1 1/2004 Westerman
6,690,387 B2 2/2004 Zimmerman et al.
6,856,259 B1 2/2005 Sharp
7,015,894 B2 3/2006 Morohoshi
7,028,253 B1 * 4/2006 Lieberman ............. G06F 16/58 707/E17.026
7,079,118 B2 7/2006 Benard et al.
7,184,064 B2 2/2007 Zimmerman et al.
7,218,040 B2 5/2007 Toda
7,259,752 B1 8/2007 Simmons
7,489,306 B2 2/2009 Kolmykov-Zotov et al.
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,131,026 B2 3/2012 Benkley et al.
8,159,501 B2 4/2012 Rao
8,239,784 B2 8/2012 Hotelling et al.
8,279,180 B2 10/2012 Hotelling et al.
8,379,047 B1 2/2013 Diverdi
8,381,135 B2 2/2013 Hotelling et al.
8,479,122 B2 7/2013 Hotelling et al.
8,493,340 B2 7/2013 Tremblay
8,587,526 B2 11/2013 Engelhardt et al.
8,638,320 B2 1/2014 Harley et al.
8,638,385 B2 1/2014 Bhogal
8,736,575 B2 5/2014 Kasahara et al.
8,743,091 B2 6/2014 Bernstein
8,847,983 B1 9/2014 Ranganathan
8,910,253 B2 * 12/2014 Johnson ................... G06F 3/01 726/4
8,928,635 B2 1/2015 Harley et al.
8,963,890 B2 2/2015 Raif et al.
8,994,698 B2 3/2015 Diverdi et al.
9,058,595 B2 6/2015 Coffman et al.
9,063,563 B1 6/2015 Gray et al.
9,075,464 B2 7/2015 Mankowski et al.
9,223,464 B2 12/2015 Mandre
9,268,997 B2 2/2016 Sheth et al.
9,348,458 B2 5/2016 Hotelling et al.
9,354,728 B2 5/2016 Yilmaz et al.
9,430,141 B1 8/2016 Lu et al.
9,557,833 B2 1/2017 Sundara-Rajan et al.
9,753,556 B2 9/2017 Bernstein et al.
9,933,937 B2 4/2018 Lemay et al.
9,959,037 B2 5/2018 Chaudhri et al.
10,079,786 B2 9/2018 Yamakawa et al.
10,120,561 B2 11/2018 Stewart et al.
10,126,877 B1 11/2018 Lynn et al.
10,168,899 B1 1/2019 Feiszli et al.
10,209,821 B2 2/2019 Roberts-Hoffman et al.
10,241,627 B2 3/2019 Yoon
10,338,783 B2 7/2019 Barrus et al.
10,338,793 B2 7/2019 Fisher
10,445,703 B1 10/2019 Atkins et al.
10,664,070 B2 5/2020 Lipman et al.
10,860,788 B2 12/2020 Foss et al.
10,969,873 B2 4/2021 Tan et al.
11,042,230 B2 6/2021 Kochura et al.
11,287,917 B2 3/2022 Dahl et al.
11,422,669 B1 8/2022 Ravasz et al.
11,429,274 B2 8/2022 Missig et al.
11,775,168 B1 10/2023 Vignau
2001/0003452 A1 6/2001 Linge
2002/0015024 A1 2/2002 Westerman et al.
2002/0048404 A1 4/2002 Fahraeus et al.
2002/0059350 A1 5/2002 Iwema et al.
2002/0107885 A1 8/2002 Brooks et al.
2003/0071850 A1 4/2003 Geidl
2003/0214539 A1 11/2003 Iwema et al.
2004/0070573 A1 4/2004 Graham
2004/0085301 A1 5/2004 Furukawa et al.
2004/0252888 A1 12/2004 Bargeron et al.
2005/0156915 A1 7/2005 Fisher
2005/0183005 A1 8/2005 Denoue et al.
2005/0190059 A1 9/2005 Wehrenberg
2005/0262164 A1 11/2005 Guiheneuf et al.
2006/0010396 A1 1/2006 Beezer et al.
2006/0017692 A1 1/2006 Wehrenberg et al.
2006/0033724 A1 2/2006 Chaudhri et al.
2006/0071910 A1 4/2006 Kim et al.
2006/0092138 A1 5/2006 Kim et al.
2006/0197753 A1 9/2006 Hotelling
2006/0200759 A1 9/2006 Agrawala et al.
2006/0267967 A1 11/2006 Hinckley et al.
2007/0011651 A1 1/2007 Wagner
2007/0097421 A1 * 5/2007 Sorensen ................ G06F 16/58 707/E17.031
2007/0157076 A1 7/2007 Lin et al.
2007/0214407 A1 9/2007 Bargeron et al.
2008/0042978 A1 2/2008 Perez-Noguera
2008/0094369 A1 * 4/2008 Ganatra .............. G06F 3/04883 345/173
2008/0100998 A1 5/2008 Sansom et al.
2008/0114251 A1 5/2008 Weymer et al.
2008/0201438 A1 8/2008 Mandre
2008/0225007 A1 9/2008 Nakadaira et al.
2008/0228007 A1 9/2008 Hoshino et al.
2008/0259090 A1 10/2008 Rao
2009/0073144 A1 3/2009 Chen et al.
2009/0161958 A1 6/2009 Markiewicz et al.
2009/0167728 A1 7/2009 Geaghan et al.
2009/0187860 A1 7/2009 Fleck et al.
2010/0020036 A1 1/2010 Hui et al.
2010/0095205 A1 * 4/2010 Kinoshita ........... G06F 3/04886 715/702
2010/0107099 A1 4/2010 Frazier et al.
2010/0181121 A1 7/2010 Tremblay
2010/0293460 A1 11/2010 Budelli
2010/0306705 A1 12/2010 Nilsson
2011/0012856 A1 1/2011 Maxwell et al.
2011/0050601 A1 3/2011 Son et al.
2011/0096036 A1 4/2011 Mcintosh et al.
2011/0140847 A1 6/2011 Schafer et al.
2011/0164376 A1 7/2011 Tabasso et al.
2011/0239146 A1 9/2011 Dutta et al.
2011/0254806 A1 10/2011 Jung et al.
2012/0032925 A1 2/2012 Sekiya
2012/0036927 A1 2/2012 Sanders et al.
2012/0068941 A1 3/2012 Arrasvuori et al.
2012/0169646 A1 7/2012 Berkes et al.

(56) References Cited

U.S. PATENT DOCUMENTS

| | | | | |
|---|---|---|---|---|
| 2012/0182271 | A1 | 7/2012 | Wu et al. | |
| 2012/0206330 | A1 | 8/2012 | Cao et al. | |
| 2012/0216150 | A1 | 8/2012 | Wernecke | |
| 2012/0229471 | A1 | 9/2012 | Takai | |
| 2012/0233270 | A1 | 9/2012 | Lee et al. | |
| 2012/0242603 | A1 | 9/2012 | Engelhardt et al. | |
| 2012/0262407 | A1 | 10/2012 | Hinckley et al. | |
| 2012/0263381 | A1 | 10/2012 | Yoshida | |
| 2012/0306778 | A1 | 12/2012 | Weeldreyer et al. | |
| 2012/0306927 | A1 | 12/2012 | Lee et al. | |
| 2012/0311422 | A1 | 12/2012 | Weeldreyer et al. | |
| 2012/0311499 | A1 | 12/2012 | Dellinger et al. | |
| 2013/0019208 | A1 | 1/2013 | Kotler et al. | |
| 2013/0046544 | A1 | 2/2013 | Kay et al. | |
| 2013/0088465 | A1 | 4/2013 | Geller et al. | |
| 2013/0106731 | A1 | 5/2013 | Yilmaz et al. | |
| 2013/0106766 | A1 | 5/2013 | Yilmaz et al. | |
| 2013/0127757 | A1 | 5/2013 | Mann et al. | |
| 2013/0136377 | A1 | 5/2013 | Luo et al. | |
| 2013/0167086 | A1 | 6/2013 | Kim et al. | |
| 2013/0229390 | A1 | 9/2013 | Diverdi | |
| 2013/0229391 | A1 | 9/2013 | Diverdi | |
| 2013/0242708 | A1 | 9/2013 | Cadiz et al. | |
| 2013/0257777 | A1 | 10/2013 | Benko et al. | |
| 2013/0263027 | A1 | 10/2013 | Petschnigg et al. | |
| 2013/0300719 | A1 | 11/2013 | Wang | |
| 2013/0314337 | A1 | 11/2013 | Asano | |
| 2013/0326582 | A1 | 12/2013 | Kruzeniski et al. | |
| 2013/0328810 | A1 | 12/2013 | Li et al. | |
| 2013/0342729 | A1* | 12/2013 | Kim | H04N 9/8233 348/231.3 |
| 2014/0019855 | A1 | 1/2014 | Kim et al. | |
| 2014/0022193 | A1 | 1/2014 | Kim et al. | |
| 2014/0028634 | A1 | 1/2014 | Krah et al. | |
| 2014/0035845 | A1 | 2/2014 | Kameyama | |
| 2014/0055427 | A1 | 2/2014 | Kim et al. | |
| 2014/0059487 | A1 | 2/2014 | Baumann et al. | |
| 2014/0067965 | A1 | 3/2014 | Yamakawa et al. | |
| 2014/0068493 | A1 | 3/2014 | Moon et al. | |
| 2014/0068504 | A1 | 3/2014 | Sun et al. | |
| 2014/0081610 | A1 | 3/2014 | Diverdi et al. | |
| 2014/0108004 | A1 | 4/2014 | Sternby et al. | |
| 2014/0108976 | A1 | 4/2014 | Steiner et al. | |
| 2014/0108979 | A1 | 4/2014 | Davidson et al. | |
| 2014/0108989 | A1 | 4/2014 | Bi et al. | |
| 2014/0152589 | A1 | 6/2014 | Komoda et al. | |
| 2014/0187318 | A1 | 7/2014 | Gallizzi et al. | |
| 2014/0194162 | A1 | 7/2014 | Tsudik | |
| 2014/0210097 | A1 | 7/2014 | Chen et al. | |
| 2014/0210730 | A1 | 7/2014 | Mankowski et al. | |
| 2014/0210744 | A1 | 7/2014 | Song et al. | |
| 2014/0210797 | A1 | 7/2014 | Kreek et al. | |
| 2014/0210979 | A1 | 7/2014 | Richter et al. | |
| 2014/0219564 | A1 | 8/2014 | Demiya | |
| 2014/0245139 | A1 | 8/2014 | Lee et al. | |
| 2014/0253462 | A1 | 9/2014 | Hicks | |
| 2014/0253465 | A1 | 9/2014 | Hicks et al. | |
| 2014/0253521 | A1 | 9/2014 | Hicks | |
| 2014/0253522 | A1 | 9/2014 | Cueto | |
| 2014/0267064 | A1* | 9/2014 | Lu | G06F 3/0488 345/173 |
| 2014/0267078 | A1 | 9/2014 | Kukulski et al. | |
| 2014/0267184 | A1 | 9/2014 | Bathiche et al. | |
| 2014/0280603 | A1 | 9/2014 | Rideout et al. | |
| 2014/0331187 | A1 | 11/2014 | Hicks et al. | |
| 2014/0334732 | A1 | 11/2014 | Jung et al. | |
| 2014/0337705 | A1 | 11/2014 | Glover et al. | |
| 2014/0340318 | A1 | 11/2014 | Stringer | |
| 2014/0354553 | A1 | 12/2014 | Dai et al. | |
| 2014/0354555 | A1 | 12/2014 | Shahparnia et al. | |
| 2014/0359410 | A1 | 12/2014 | Lee | |
| 2015/0007061 | A1 | 1/2015 | Mandre | |
| 2015/0009155 | A1 | 1/2015 | Tsao et al. | |
| 2015/0029162 | A1 | 1/2015 | Harris et al. | |
| 2015/0058718 | A1 | 2/2015 | Kim et al. | |
| 2015/0058789 | A1 | 2/2015 | Namgung et al. | |
| 2015/0067469 | A1 | 3/2015 | Shuto | |
| 2015/0067483 | A1 | 3/2015 | Demiya et al. | |
| 2015/0069204 | A1 | 3/2015 | Daniels et al. | |
| 2015/0082217 | A1 | 3/2015 | Tumwattana | |
| 2015/0089389 | A1 | 3/2015 | Cohen-Zur et al. | |
| 2015/0106714 | A1 | 4/2015 | Jeong et al. | |
| 2015/0109257 | A1 | 4/2015 | Jalali | |
| 2015/0127403 | A1 | 5/2015 | Petty | |
| 2015/0138127 | A1 | 5/2015 | Kurita | |
| 2015/0169069 | A1 | 6/2015 | Lo et al. | |
| 2015/0186348 | A1 | 7/2015 | Hicks et al. | |
| 2015/0205398 | A1 | 7/2015 | Le | |
| 2015/0212692 | A1 | 7/2015 | Hyun et al. | |
| 2015/0221106 | A1 | 8/2015 | Winnemoeller et al. | |
| 2015/0248235 | A1 | 9/2015 | Offenberg et al. | |
| 2015/0293687 | A1 | 10/2015 | Seong | |
| 2015/0338949 | A1 | 11/2015 | Westerman | |
| 2015/0347987 | A1 | 12/2015 | Ali | |
| 2015/0363035 | A1 | 12/2015 | Hinckley et al. | |
| 2015/0365306 | A1 | 12/2015 | Chaudhri et al. | |
| 2015/0370350 | A1 | 12/2015 | Hunt et al. | |
| 2016/0070686 | A1 | 3/2016 | Yu et al. | |
| 2016/0070688 | A1 | 3/2016 | Yao et al. | |
| 2016/0098186 | A1 | 4/2016 | Sugiura | |
| 2016/0162048 | A1 | 6/2016 | David | |
| 2016/0170505 | A1 | 6/2016 | Jordan | |
| 2016/0179222 | A1 | 6/2016 | Chang | |
| 2016/0188017 | A1 | 6/2016 | Bell | |
| 2016/0259766 | A1* | 9/2016 | Ivanov | G06F 40/171 |
| 2016/0299585 | A1 | 10/2016 | Lee et al. | |
| 2016/0349897 | A1 | 12/2016 | Ishikawa | |
| 2016/0364025 | A1 | 12/2016 | Bernstein et al. | |
| 2016/0364026 | A1 | 12/2016 | Bernstein et al. | |
| 2016/0364027 | A1 | 12/2016 | Bernstein et al. | |
| 2016/0364091 | A1 | 12/2016 | Bernstein et al. | |
| 2017/0024178 | A1 | 1/2017 | Jeong et al. | |
| 2017/0091153 | A1 | 3/2017 | Thimbleby | |
| 2017/0097746 | A1 | 4/2017 | Doray et al. | |
| 2017/0109032 | A1 | 4/2017 | MÈlinand et al. | |
| 2018/0050592 | A1 | 2/2018 | Bouaziz et al. | |
| 2018/0081536 | A1 | 3/2018 | Ueno et al. | |
| 2018/0121074 | A1 | 5/2018 | Peron et al. | |
| 2018/0129391 | A1 | 5/2018 | Files et al. | |
| 2018/0239444 | A1 | 8/2018 | Siddiqui et al. | |
| 2018/0284946 | A1 | 10/2018 | Yousefpor et al. | |
| 2018/0329589 | A1* | 11/2018 | Sonnino | G06F 1/1616 |
| 2018/0335932 | A1* | 11/2018 | Ta | G06F 3/04883 |
| 2018/0349020 | A1 | 12/2018 | Jon et al. | |
| 2019/0212809 | A1 | 7/2019 | Tzou et al. | |
| 2019/0220109 | A1 | 7/2019 | Bernstein et al. | |
| 2019/0220507 | A1 | 7/2019 | Foss et al. | |
| 2019/0324562 | A1 | 10/2019 | Mn et al. | |
| 2019/0339795 | A1 | 11/2019 | Rebeschi et al. | |
| 2019/0354205 | A1 | 11/2019 | Rakshit et al. | |
| 2019/0369754 | A1 | 12/2019 | Roper et al. | |
| 2019/0369755 | A1 | 12/2019 | Roper et al. | |
| 2020/0293125 | A1 | 9/2020 | Bernstein et al. | |
| 2020/0356254 | A1 | 11/2020 | Missig et al. | |
| 2020/0371629 | A1 | 11/2020 | Hauenstein et al. | |
| 2020/0401796 | A1 | 12/2020 | Chateigner | |
| 2021/0049321 | A1 | 2/2021 | Foss et al. | |
| 2021/0132787 | A1 | 5/2021 | Jung | |
| 2021/0271338 | A1 | 9/2021 | Dahl et al. | |
| 2021/0349606 | A1 | 11/2021 | Chang et al. | |
| 2021/0349627 | A1 | 11/2021 | Chang et al. | |
| 2022/0197493 | A1 | 6/2022 | Missig et al. | |
| 2024/0004532 | A1 | 1/2024 | Soli et al. | |
| 2024/0103654 | A1 | 3/2024 | Owens et al. | |
| 2024/0329757 | A1 | 10/2024 | Bernstein et al. | |
| 2024/0393941 | A1 | 11/2024 | Missig et al. | |

FOREIGN PATENT DOCUMENTS

| | | | |
|---|---|---|---|
| CN | 103164158 | A | 6/2013 |
| CN | 103853491 | A | 6/2014 |
| CN | 103870028 | A | 6/2014 |
| CN | 104142782 | A | 11/2014 |
| CN | 104298551 | A | 1/2015 |

(56) References Cited

FOREIGN PATENT DOCUMENTS

| | | | |
|---|---|---|---|
| CN | 104423820 | A | 3/2015 |
| CN | 104487928 | A | 4/2015 |
| CN | 104487929 | A | 4/2015 |
| CN | 104679379 | A | 6/2015 |
| CN | 108845757 | A | 11/2018 |
| CN | 109791465 | A | 5/2019 |
| EP | 2071436 | A1 | 6/2009 |
| EP | 2325804 | A2 | 5/2011 |
| EP | 2385446 | A1 | 11/2011 |
| EP | 2530561 | A2 | 12/2012 |
| EP | 2704408 | A1 | 3/2014 |
| EP | 2778864 | A1 | 9/2014 |
| EP | 2818998 | A1 | 12/2014 |
| EP | 2843917 | A1 | 3/2015 |
| EP | 2912540 | A1 | 9/2015 |
| JP | H09-171378 | A | 6/1997 |
| JP | H09-305306 | A | 11/1997 |
| JP | H11-110119 | A | 4/1999 |
| JP | 2000-163031 | A | 6/2000 |
| JP | 2002-342033 | A | 11/2002 |
| JP | 2003-296029 | A | 10/2003 |
| JP | 2007-520005 | A | 7/2007 |
| JP | 2008-027082 | A | 2/2008 |
| JP | 2008-70994 | A | 3/2008 |
| JP | 2010-183447 | A | 8/2010 |
| JP | 2012-18644 | A | 1/2012 |
| JP | 2012-238295 | A | 12/2012 |
| JP | 2013-232033 | A | 11/2013 |
| JP | 2014-153865 | A | 8/2014 |
| JP | 2015-049901 | A | 3/2015 |
| JP | 2015-056154 | A | 3/2015 |
| JP | 2015-64882 | A | 4/2015 |
| JP | 2015-88006 | A | 5/2015 |
| JP | 2016177589 | A | 10/2016 |
| KR | 10-2009-0100248 | A | 9/2009 |
| KR | 10-2010-0059343 | A | 6/2010 |
| KR | 10-2011-0088594 | A | 8/2011 |
| KR | 10-2012-0092036 | A | 8/2012 |
| KR | 10-2014-0053554 | A | 5/2014 |
| KR | 10-2014-0073225 | A | 6/2014 |
| KR | 10-2014-0124788 | A | 10/2014 |
| KR | 10-2015-0022527 | A | 3/2015 |
| KR | 10-2015-0026022 | A | 3/2015 |
| KR | 10-2015-0026615 | A | 3/2015 |
| KR | 10-2017-0139141 | A | 12/2017 |
| TW | 201112040 | A | 4/2011 |
| WO | 2005/103872 | A2 | 11/2005 |
| WO | 2005/103872 | A3 | 4/2006 |
| WO | 2010/119603 | A1 | 10/2010 |
| WO | 2013/169300 | A1 | 11/2013 |
| WO | 2013/169849 | A2 | 11/2013 |
| WO | 2014/034049 | A1 | 3/2014 |
| WO | 2014/105276 | A1 | 7/2014 |
| WO | 2014/147724 | A1 | 9/2014 |
| WO | 2016/200586 | A1 | 12/2016 |
| WO | 2020/227445 | A1 | 11/2020 |

OTHER PUBLICATIONS

Communication pursuant to Rule 164(2)(b) and Article 94(3) EPC dated Sep. 4, 2020, EP Application No. 18716461.1, pp. 1-9.
International Preliminary Report on Patentability for PCT/US2018/023484 mailed Dec. 3, 2019.
European Search Report received for European Patent Application No. 18716461.1, mailed on Sep. 4, 2020, 5 pages.
Examiner's Answer to Appeal Brief received for U.S. Appl. No. 17/031,844, mailed on Dec. 18, 2023, 14 pages.
Final Office Action received for U.S. Appl. No. 15/978,125, mailed on Mar. 26, 2020, 13 pages.
Final Office Action received for U.S. Appl. No. 15/978,125, mailed on May 13, 2021, 19 pages.
Final Office Action received for U.S. Appl. No. 16/982,532, mailed on Jul. 27, 2023, 20 pages.
Final Office Action received for U.S. Appl. No. 17/031,678, mailed on Jan. 10, 2022, 30 pages.
Final Office Action received for U.S. Appl. No. 17/031,844, mailed on Aug. 8, 2022, 33 pages.
International Search Report received for PCT Application No. PCT/US2023/021718, mailed on Nov. 3, 2023, 7 pages.
International Search Report received for PCT Patent Application No. PCT/US2020/031727, mailed on Oct. 8, 2020, 10 pages.
International Search Report received for PCT Patent Application No. PCT/US2021/031866, mailed on Nov. 8, 2021, 7 pages.
Non-Final Office Action received for U.S. Appl. No. 15/978,125, mailed on Dec. 12, 2019, 11 pages.
Non-Final Office Action received for U.S. Appl. No. 15/978,125, mailed on Jul. 5, 2019, 9 pages.
Non-Final Office Action received for U.S. Appl. No. 15/978,125, mailed on Nov. 3, 2020, 16 pages.
Non-Final Office Action received for U.S. Appl. No. 16/868,449, mailed on May 26, 2021, 30 pages.
Non-Final Office Action received for U.S. Appl. No. 16/982,532, mailed on Jan. 4, 2023, 21 pages.
Non-Final Office Action received for U.S. Appl. No. 17/031,678, mailed on Jul. 8, 2021, 26 pages.
Non-Final Office Action received for U.S. Appl. No. 17/031,844, mailed on Dec. 3, 2021, 29 pages.
Non-Final Office Action received for U.S. Appl. No. 18/315,251, mailed on Mar. 7, 2024, 28 pages.
Notice of Allowance received for U.S. Appl. No. 15/978,125, mailed on Aug. 9, 2022, 6 pages.
Notice of Allowance received for U.S. Appl. No. 16/868,449, mailed on Apr. 14, 2022, 8 pages.
Notice of Allowance received for U.S. Appl. No. 16/868,449, mailed on Nov. 3, 2021, 8 pages.
Notice of Allowance received for U.S. Appl. No. 16/982,532, mailed on Jan. 24, 2024, 8 pages.
Notice of Allowance received for U.S. Appl. No. 16/982,532, mailed on May 8, 2024, 5 pages.
Notice of Allowance received for U.S. Appl. No. 17/031,678, mailed on Sep. 15, 2022, 10 pages.
Notice of Allowance received for U.S. Appl. No. 17/031,678, mailed on Feb. 1, 2023, 8 pages.
Adak et al., "Extraction of Doodles and Drawings from Manuscripts", ICIAP, 17th International Conference, Naples, Italy, Dec. 10, 2013, pp. 515-520.
Fosseide et al., "Character Recognition in the Presence of Occluding Clutter", Proceedings of SPIE, vol. 7247, Retrieved on Aug. 10, 2021, Jan. 18, 2009, 13 pages.
Hou et al., "An Algorithm of Calligraphy Beautification Based on Improved Velocity and Width Model", Computer Engineering and Social Media (CSCESM), 2015 Second International Conference on Computer Science, 2015, pp. 124-127.
Matsushita et al., "Effect of Text/Non-text Classification for Ink Search Employing String Recognition", IEEE, 2012 10th IAPR International Workshop on Document Analysis Systems, May 7, 2012, pp. 230-234.
Tianxiao, Liu, "Overview of Handwriting Input Technology", CNKI, China Invention and Patent, vol. 12, [retrieved on Jul. 31, 2024], 2016, 5 pages (1 page of English Abstract and 4 pages of Official).
Toshiba Corporation, "Microsoft Windows for Pen Computing users Guide", Version A1, Nov. 9, 1994, pp. 23-27, 70-77. See attached Communication 37 CFR § 1.98(a)(3).
Corrected Notice of Allowability received for U.S. Appl. No. 18/315,251 , mailed on Sep. 23, 2024, 2 Pages.
Notice of Allowance received for U.S. Appl. No. 18/315,251, mailed on Sep. 11, 2024, 19 Pages.
Applicant Initiated Interview Summary received for U.S. Appl. No. 14/862,085, mailed on Mar. 30, 2018, 3 pages.
Corrected Notice of Allowability received for U.S. Appl. No. 17/085,779, mailed on Aug. 5, 2024, 2 pages.
European Search Report received for European Patent Application No. 16727905.8, mailed on May 8, 2019, 4 pages.
European Search Report received for European Patent Application No. 19731090.7, mailed on Oct. 14, 2022, 4 pages.

(56) References Cited

OTHER PUBLICATIONS

Examiner's Answer to Appeal Brief received for U.S. Appl. No. 16/417,025, mailed on Sep. 6, 2022, 10 pages.
Extended European Search Report received for European Patent Application No. 24152367.9, mailed on Apr. 30, 2024, 15 pages.
Final Office Action received for U.S. Appl. No. 14/862,085, mailed on Sep. 10, 2018, 14 pages.
Final Office Action received for U.S. Appl. No. 16/417,025, mailed on Jan. 21, 2022, 18 pages.
Final Office Action received for U.S. Appl. No. 16/417,025, mailed on May 18, 2021, 16 pages.
Final Office Action received for U.S. Appl. No. 16/417,025, mailed on Oct. 8, 2020, 16 pages.
Final Office Action received for U.S. Appl. No. 16/886,643, mailed on Feb. 6, 2023, 16 pages.
Final Office Action received for U.S. Appl. No. 16/886,643, mailed on Jan. 27, 2022, 14 pages.
Final Office Action received for U.S. Appl. No. 17/085,779, mailed on Apr. 9, 2024, 25 pages.
Final Office Action received for U.S. Appl. No. 17/085,779, mailed on Aug. 7, 2023, 18 pages.
International Search Report received for PCT Patent Application No. PCT/US2016/033588, mailed on Oct. 4, 2016, 6 pages.
International Search Report received for PCT Patent Application No. PCT/US2017/053172, mailed on Mar. 14, 2018, 7 pages.
International Search Report received for PCT Patent Application No. PCT/US2019/034524, mailed on Nov. 18, 2019, 8 pages.
Non-Final Office Action received for U.S. Appl. No. 14/860,320, mailed on Jul. 19, 2016, 10 pages.
Non-Final Office Action received for U.S. Appl. No. 14/862,073, mailed on Oct. 19, 2016, 13 pages.
Non-Final Office Action received for U.S. Appl. No. 14/862,080, mailed on Jun. 22, 2016, 13 pages.
Non-Final Office Action received for U.S. Appl. No. 14/862,085, mailed on Mar. 19, 2018, 12 pages.
Non-Final Office Action received for U.S. Appl. No. 15/923,967, mailed on Aug. 12, 2019, 7 pages.
Non-Final Office Action received for U.S. Appl. No. 16/333,103, mailed on Mar. 16, 2020, 20 pages.
Non-Final Office Action received for U.S. Appl. No. 16/359,906, mailed on Aug. 21, 2019, 11 pages.
Non-Final Office Action received for U.S. Appl. No. 16/417,025, mailed on Feb. 5, 2021, 15 pages.
Non-Final Office Action received for U.S. Appl. No. 16/417,025, mailed on Jun. 29, 2020, 13 pages.
Non-Final Office Action received for U.S. Appl. No. 16/417,025, mailed on Sep. 2, 2021, 15 pages.
Non-Final Office Action received for U.S. Appl. No. 16/417,214, mailed on Aug. 6, 2020, 26 pages.
Non-Final Office Action received for U.S. Appl. No. 16/886,643, mailed on Aug. 16, 2022, 18 pages.
Non-Final Office Action received for U.S. Appl. No. 16/886,643, mailed on May 24, 2021, 13 pages.
Non-Final Office Action received for U.S. Appl. No. 17/085,779, mailed on Dec. 28, 2022, 7 pages.
Non-Final Office Action received for U.S. Appl. No. 17/085,779, mailed on Nov. 20, 2023, 25 pages.
Non-Final Office Action received for U.S. Appl. No. 18/424,684, mailed on Aug. 14, 2024, 7 pages.
Notice of Allowance received for U.S. Appl. No. 16/333,103, mailed on Aug. 19, 2020, 10 pages.
Notice of Allowance received for U.S. Appl. No. 16/417,214, mailed on Feb. 25, 2021, 10 pages.
Notice of Allowance received for U.S. Appl. No. 14/860,320, mailed on Dec. 16, 2016, 8 pages.
Notice of Allowance received for U.S. Appl. No. 14/860,320, mailed on Mar. 7, 2016, 10 pages.
Notice of Allowance received for U.S. Appl. No. 14/862,073, mailed on Mar. 6, 2017, 10 pages.
Notice of Allowance received for U.S. Appl. No. 14/862,080, mailed on Dec. 27, 2016, 9 pages.
Notice of Allowance received for U.S. Appl. No. 14/862,085, mailed on Apr. 23, 2019, 5 pages.
Notice of Allowance received for U.S. Appl. No. 14/862,085, mailed on Jan. 9, 2019, 8 pages.
Notice of Allowance received for U.S. Appl. No. 15/923,967, mailed on Nov. 20, 2019, 8 pages.
Notice of Allowance received for U.S. Appl. No. 16/359,906, mailed on Feb. 20, 2020, 8 pages.
Notice of Allowance received for U.S. Appl. No. 16/359,906, mailed on Jan. 6, 2020, 8 pages.
Notice of Allowance received for U.S. Appl. No. 16/359,906, mailed on Mar. 26, 2020, 9 pages.
Notice of Allowance received for U.S. Appl. No. 16/417,025, mailed on Aug. 14, 2024, 5 pages.
Notice of Allowance received for U.S. Appl. No. 16/886,643, mailed on Jun. 29, 2023, 8 pages.
Notice of Allowance received for U.S. Appl. No. 16/886,643, mailed on Oct. 12, 2023, 10 pages.
Notice of Allowance received for U.S. Appl. No. 17/085,779, mailed on Jul. 17, 2024, 12 pages.
Notice of Allowance received for U.S. Appl. No. 18/315,251, mailed on Nov. 27, 2024, 19 pages.
Notice of Allowance received for U.S. Appl. No. 18/461,395, mailed on Jul. 16, 2024, 9 pages.
Notice of Allowance received for U.S. Appl. No. 18/461,395, mailed on Nov. 12, 2024, 7 pages.
Patent Board Decision received for U.S. Appl. No. 16/417,025, mailed on May 7, 2024, 9 pages.
Android and Me, "Samsung Galaxy Note 3 Review", Available Online at: <http://androidandme.com/2013/10-reviews/samsung-galaxy-note-3 review/>, 2013, 14 pages.
Anonymous, "How to Re-map the S-pen Button and Insert/remove to Do Anything on the Device", Available Online at: <https://www.reddit.com/r/galaxynote4/comments/4ju5lh/how_to_remap_the_spen_button_and_insertremove_to/>, [retrieved on 2024-12-12], May 28, 2016, 8 pages.
Bargeron et al., "Reflowing Digital Ink Annotations", Proceedings of the SIGCHI Conference on Human Factors in Computing Systems, 2003,.
Basu Abhiroop, "Samsung Launches Cross-Platform Instant Messaging Service 'ChatON", Available Online at: <https://www.androidpolice.com/2011/08/29/samsung-launches-cross-platform-instant-messaging-service-chaton/>, Aug. 29, 2011, 5 pages.
Christopher W, "ScribMaster Draw and Paint - with Instant Messenger", Available Online at: <http://www.androidpit.com/scribmaster-draw-and-paint>, Oct. 8, 2013, 9 pages.
Color Hunter, "Create and Find Color Palettes Made From Images", Available Online at: <http://www.colorhunter.com>, 2016, 3 pages.
Conroy Kevin, "Digital Document Annotation and Reflow", Theses and Dissertations, University of Maryland at College Park, 2004,.
Css Drive, "Colors Pallete Generator", Available Online at: <http:www.cssdrive.com/imgaepalette/>, 2011, 2 pages.
Eichner, "Ios Sensors & Core Motion", Available Online at: <http://wwwbruegge.in.turn.de/lehrstuhl_1/home/98-teaching/tutorials/505-sgd-ws13-tutorial-core-motion>, 2016, 12 pages.
Farley, "Make Swatches from Photos in Photoshop", Available Online at: <http://www.sitepoint.com/makeswatches-from-photos-in-photoshop/>, 5 pages.
Google, "Loklok", Available Online at: < http://loklok.co>, 2015, 2 pages.
Hayakawa, "Galaxy Note 3 Perfect Manual", vol. 1, Sotechsha Co. Ltd, Junichi Yanagisawa, May 12, 2015, 9 pages.
Itunes Preview, "Draw Calendar-Fun Scheduling and Events", Fishington Studios, Available Online at: <https://itunes.apple.com/us/app/calendoodle-pen-ink-whiteboard/id815370160?mt=8>, 2014, 3 pages.
Jain, "Samsung Galaxy Note 3 Neo Review: Hidden Goodness", Available Online at: <https://www.mobigyaan.com/samsung-galaxy-not-3-neo-review-2>, Apr. 17, 2014, 48 pages.

(56) References Cited

OTHER PUBLICATIONS

Kazmucha, "How to Send Someone a Sketch with Apple Works", Available Online at: <https:/web.archive.org/web/20150525204929/http:ww.www.imore.com/how-sendsome-sketch-apple-watch>, May 7, 2015, 8 pages.
Lee et al., "A Multi-Touch Three Dimensional Touch-Sensitive Tablet", CHI'85 Proceedings, Apr. 1985, pp. 21-25.
Lee et al., "PhantomPen: Virtualization of Pen Head for Digitial Drawing Free from Hen Occlusion & Visual Parallax", IDEA Lab, Department of Industrial Design, KAIST, Republic of Korea, Oct. 7-10, 2012, 10 pages.
Lee et al., "PhantomPen: Virtualization of Pen Head for Digitial Drawing Free from Pen Occlusion & Visual Parallax", YouTube video, Oct. 22, 2012, 2 pages.
Locke Ricky, "Kindle App Tips for iPad", www.slideshare.net, Available online at: <https://www.slideshare.net/RickyLocke/kindle-app-tips-for-ipad>, [Retrieved from Internet on Dec. 6, 2017], Jun. 30, 2013, pp. 1-5.
Locke Ricky, "Kindle App Tips for IPad (Slides)", www.slideshare.net, Available online at: <https://www.slideshare.net/RickyLocke/kindle-app-tips-for-ipad>, [Retrieved from Internet on Dec. 6, 2017], Jun. 30, 2013, pp. 1-57.
Mailchimp Email Marketing, "Pictaculous, A Color Palette Generator", Available Online at: < http://www.pictaculous.com>, 2016, 1 page.
Millward, "LiiHo IM App: A New Way to Chat as You Draw Something and Doodle with Friends", Available Online at: <http://www.techinasia.com/liiho-im-doodling-app/>, Apr. 5, 2012, 6 pages.
Notes Plus, "5th Anniversary", Available Online at: < http://notesplusapp.com>, Apr. 4, 2013, 7 pages.
Perez, "Five Amazing Color Palette Generators", Available Online at: <http://readwrite.com/2008/08/01/five_amazing_color_palette_generators>, Aug. 1, 2008, 3 pages.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Rudling, "Erik Rudling - Intreprenur and Consulltannt in Speling", Available Online at: <http://erikrudling.com/taking-digital-notes-notes-plus-ipad-app-review/>, Jan. 6, 2015, 14 pages.
Schwaller et al., "Improving In-game Gesture Learning with Visual Feedback", ARXIV.ORG, Jun. 22-27, 2014, pp. 643-653.
Seiji et al., "Galaxy Note 3 Perfect Manual", vol. 1, Sotechsha Co. Ltd., Junichi, Yanagisawa, May 12, 2015, 9 pages.
Sutherland et al., "Freeform Digital Ink Annotations in Electronic Documents: a Systematic Mapping Study", Computers & Graphics, vol. 55, No. 2016, 2016, pp. 1-20.
Sutherland et al., "Who Changed My Annotation? An Investigation Into Refitting Freeform Ink Annotations", IEEE Symposium on Visual Languages and Human-Centric Computing (VL/HCC), 2016,.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Wikipedia, "Calendar (application)", Available Online at: <https://en.wikipedia.org/wiki/Calendar_(application)>, Sep. 10, 2002, 5 pages.
Wikipedia, "Comparison of Instant Messaging Clients", Available Online at: <http://en.wikipedia.org/wiki/Comparison_of_instant_messaging_clients>, Mar. 1, 2016, 16 pages.
Windows, "Use A Pen to Draw, Write, or Highlight, Text on A Windows Tablet,", Available Online at: <https://support.office.com/en-US/article/Use-a-pen-to-draw-write-or-highlight-text-on-a-Windows-tablet-6d76c674-7f4b-414d-b67f-b3ffef6ccf53>, 2016, 8 pages.
Corrected Notice of Allowance received for U.S. Appl. No. 17/085,779, mailed on Dec. 20, 2024, 5 pages.
Notice of Allowance received for U.S. Appl. No. 16/417,025, mailed on Jan. 28, 2025, 10 pages.
Notice of Allowance received for U.S. Appl. No. 17/085,779, mailed on Dec. 18, 2024, 11 pages.

* cited by examiner

DEVICE, METHOD, AND GRAPHICAL USER INTERFACE FOR ANNOTATING CONTENT

RELATED APPLICATIONS

This application is a continuation of U.S. Nonprovisional patent application Ser. No. 15/978,125, filed on May 12, 2018, which claims priority to U.S. Provisional Patent Application No. 62/514,206, filed on Jun. 2, 2017, both of which are herein incorporated by reference.

TECHNICAL FIELD

The present disclosure relates generally to electronic devices with touch-sensitive surfaces, including but not limited to electronic devices with touch-sensitive surfaces that allow a user to annotate content.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display. Such manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, California), an image management application (e.g., Aperture, iPhoto, Photos from Apple Inc. of Cupertino, California), a digital content (e.g., videos and music) management application (e.g., iTunes from Apple Inc. of Cupertino, California), a drawing application, a presentation application (e.g., Keynote from Apple Inc. of Cupertino, California), a word processing application (e.g., Pages from Apple Inc. of Cupertino, California), a website creation application (e.g., iWeb from Apple Inc. of Cupertino, California), a disk authoring application (e.g., iDVD from Apple Inc. of Cupertino, California), or a spreadsheet application (e.g., Numbers from Apple Inc. of Cupertino, California).

Some user interfaces display content and allow a user to annotate the content, e.g., to add drawings or hand-written text to portions of the content. However, methods for adding annotations to the content are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for annotating content. Such methods and interfaces optionally complement or replace conventional methods for annotating content. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and an input device. The method includes displaying, on the display, a drawing user interface including a plurality of drawing objects. While a drawing tool that is associated with a predefined operation is selected, the method includes detecting, via the one or more input devices, a user input moving to define a path within the drawing user interface. In response to detecting the user input moving to define the path within the drawing user interface, the method includes performing the predefined operation with respect to two or more of the plurality of drawing objects that intersect the path.

In accordance with some embodiments, a method is performed at a device with one or more processors, non-transitory memory, a display, and an input device. The method includes displaying, on the display, first content and a representation of second content associated with the first content. The method includes detecting, via the one or more input devices, a user input at a location of the representation of the second content. In response to detecting the user input at the location of the representation of the second content and in accordance with a determination that the user input includes a stylus contact, the method includes displaying, on the display, a drawing user interface including the second content and a toolbar region with a plurality of drawing tool selection affordances. In response to detecting the user input at the location of the representation of the second content and in accordance with a determination that the user input does not include a stylus contact, the method includes forgoing display of the drawing user interface.

In accordance with some embodiments, a method is performed at a device with one or more processors, non-transitory memory, and a touch-sensitive display. The method includes displaying, on the touch-sensitive display, a content creation region that includes typed text and one or more blank areas that do not include content. The method includes detecting a user input on the touch-sensitive display that includes movement of a contact in the content creation region. In response to detecting the user input and in accordance with a determination that the user input includes movement of a stylus contact in a respective blank area, the method includes drawing a mark based on movement of the stylus contact during the user input. In response to detecting the user input and in accordance with a determination that the user input includes movement of a finger contact in the respective blank area, the method includes scrolling the content creation region based on movement of the finger contact during the user input.

In accordance with some embodiments, a method is performed at a device with one or more processors, non-transitory memory, and a touch-sensitive display. The method includes displaying, on the touch-sensitive display, a content creation region. While displaying the content creation region, the method includes detecting one or more typed inputs. In response to detecting the one or more typed inputs, the method includes editing content in the content creation region to create a blank area that does not include visible content and is a text insertion region. While displaying the content creation region with the text insertion region, the method includes detecting a contact on the touch-sensitive display in the text insertion region. In response to detecting the contact on the touch-sensitive display in the text insertion region and in accordance with a determination that the contact is a stylus contact, the method includes converting at least a portion of the text insertion region into a drawing insertion region including a mark based the stylus contact. In response to detecting the contact on the touch-sensitive display in the text insertion region and in accordance with a determination that the contact is a finger contact, the method includes converting at least a portion of the text insertion region into a blank drawing insertion region.

In accordance with some embodiments, an electronic device includes a display one or more input devices, and one or more processors. The one or more processors are configured to display, on the display, a drawing user interface including a plurality of drawing objects. While a drawing tool that is associated with a predefined operation is selected, the one or more processors are configured to detect, via the one or more input devices, a user input moving to define a path within the drawing user interface. In response to detecting the user input moving to define the path within the drawing user interface, the one or more processors are configured to perform the predefined operation with respect to two or more of the plurality of drawing objects that intersect the path.

In accordance with some embodiments, an electronic device includes a display, one or more input devices, and one or more processors. The one or more processors are configured to display, on the display, first content and a representation of second content associated with the first content. The one or more processors are configured to detect, via the one or more input devices, a user input at a location of the representation of the second content. In response to detecting the user input at the location of the representation of the second content and in accordance with a determination that the user input includes a stylus contact, the one or more processors are configured to display, on the display, a drawing user interface including the second content and a toolbar region with a plurality of drawing tool selection affordances. In response to detecting the user input at the location of the representation of the second content and in accordance with a determination that the user input does not include a stylus contact, the one or more processors are configured to forgo display of the drawing user interface.

In accordance with some embodiments, an electronic device includes a touch-sensitive display and one or more processors. The one or more processors are configured to display, on the touch-sensitive display, a content creation region that includes typed text and one or more blank areas that do not include content. The one or more processors are configured to detect a user input on the touch-sensitive display that includes movement of a contact in the content creation region. In response to detecting the user input and in accordance with a determination that the user input includes movement of a stylus contact in a respective blank area, the one or more processors are configured to draw a mark based on movement of the stylus contact during the user input. In response to detecting the user input and in accordance with a determination that the user input includes movement of a finger contact in the respective blank area, the one or more processors are configured to scroll the content creation region based on movement of the finger contact during the user input.

In accordance with some embodiments, an electronic device includes a touch-sensitive display and one or more processors. The one or more processors are configured to display, on the touch-sensitive display, a content creation region. While displaying the content creation region, the one or more processors are configured to detect one or more typed inputs. In response to detecting the one or more typed inputs, the one or more processors are configured to edit content in the content creation region to create a blank area that does not include visible content and is a text insertion region. While displaying the content creation region with the text insertion region, the one or more processors are configured to detect a contact on the touch-sensitive display in the text insertion region. In response to detecting the contact on the touch-sensitive display in the text insertion region and in accordance with a determination that the contact is a stylus contact, the one or more processors are configured to convert at least a portion of the text insertion region into a drawing insertion region including a mark based the stylus contact. In response to detecting the contact on the touch-sensitive display in the text insertion region and in accordance with a determination that the contact is a finger contact, the one or more processors are configured to convert at least a portion of the text insertion region into a blank drawing insertion region.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for annotating content, thereby increasing the effectiveness, efficiency, and user satisfaction with such devices. Such methods and interfaces may complement or replace conventional methods for annotating content.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Many electronic devices have graphical user interfaces that display content, such as an image or text. Some applications allow a user to add or otherwise manipulate annotations associated with content. In embodiments described below, an application allows a user to manipulate hand-drawn annotations associated with content. For example, in some embodiments, when a tool is selected, a predefined operation associated with that tool is performed on annotations intersecting a drawn path. As another example, when a user input upon displayed content is provided with a stylus (as opposed to a finger), a drawing user interface is provided for annotating the content (as opposed to a viewing user interface for viewing the content). As another example, when a user input within a blank space of content is provided with a stylus (as opposed to a finger), an annotation is added to the content (as opposed to scrolling the content). As another example, when a user input within a blank text insertion region of content is provided with a stylus (as opposed to a finger), an annotation is added to the content (as opposed to providing a drawing insertion region for the addition of an annotation by subsequent user input).

Figure 6A:
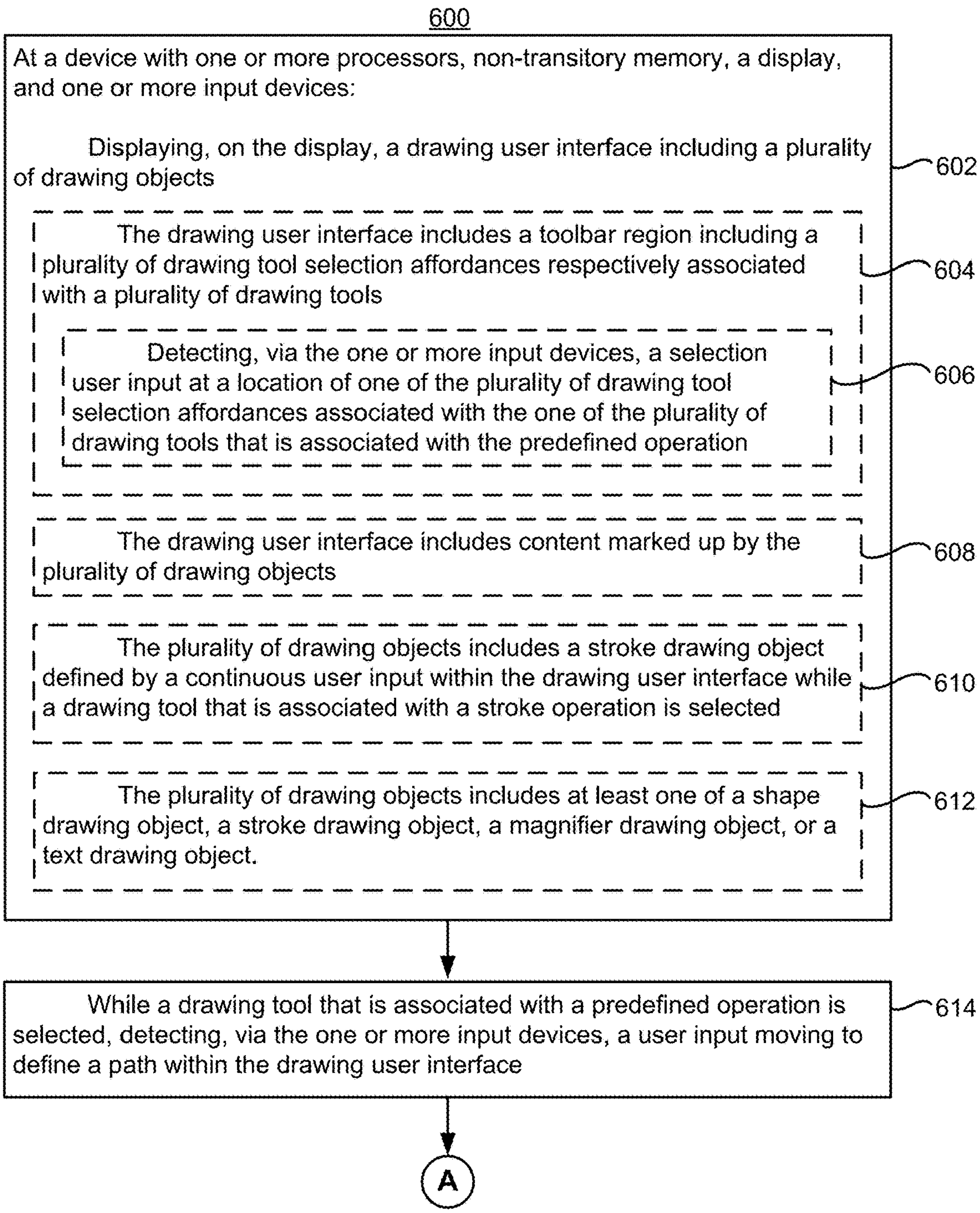
FIGS. 6A-6C are flow diagrams illustrating a method of manipulating drawing objects in accordance with some embodiments.
Figure 6B:
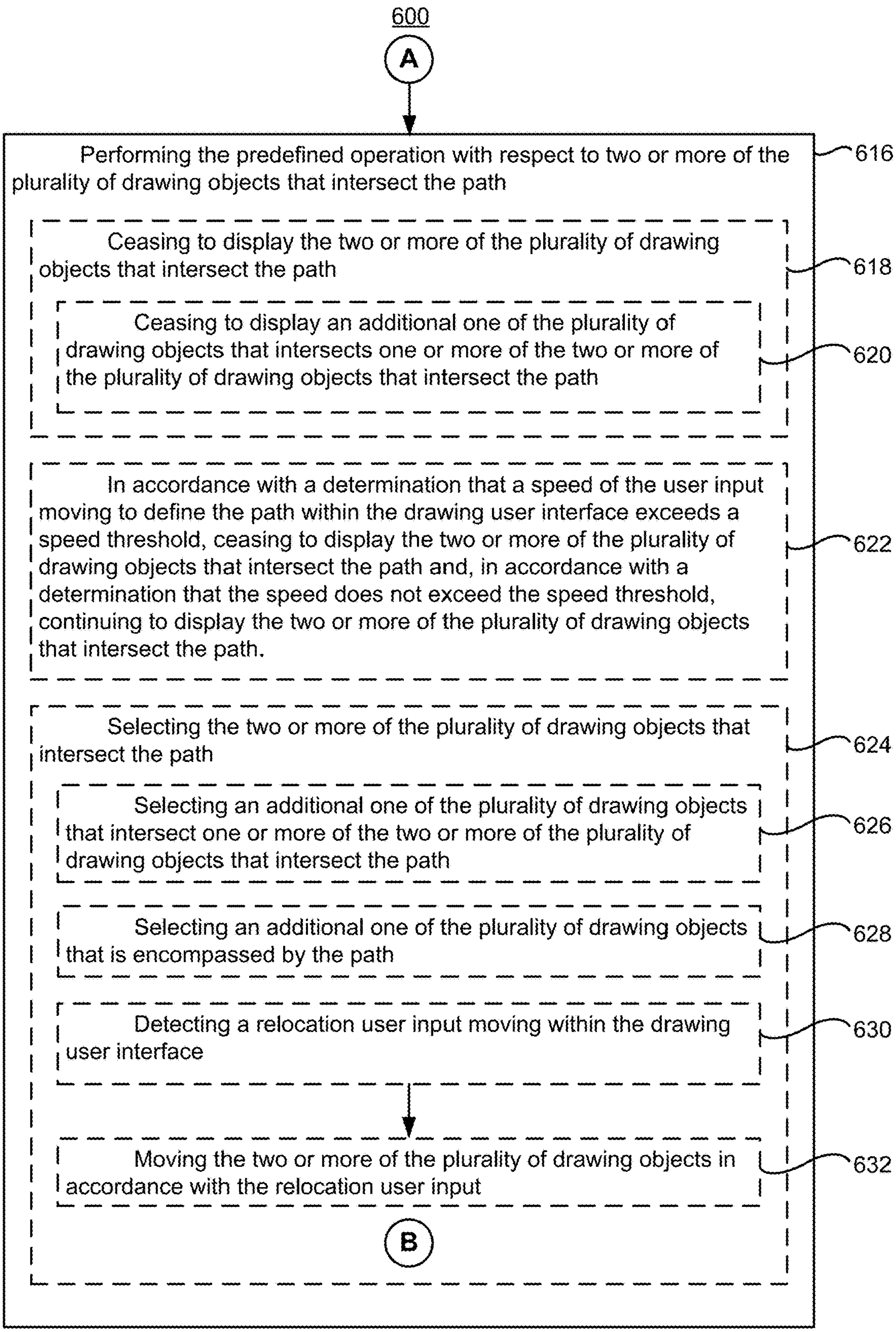
Figure 6C:
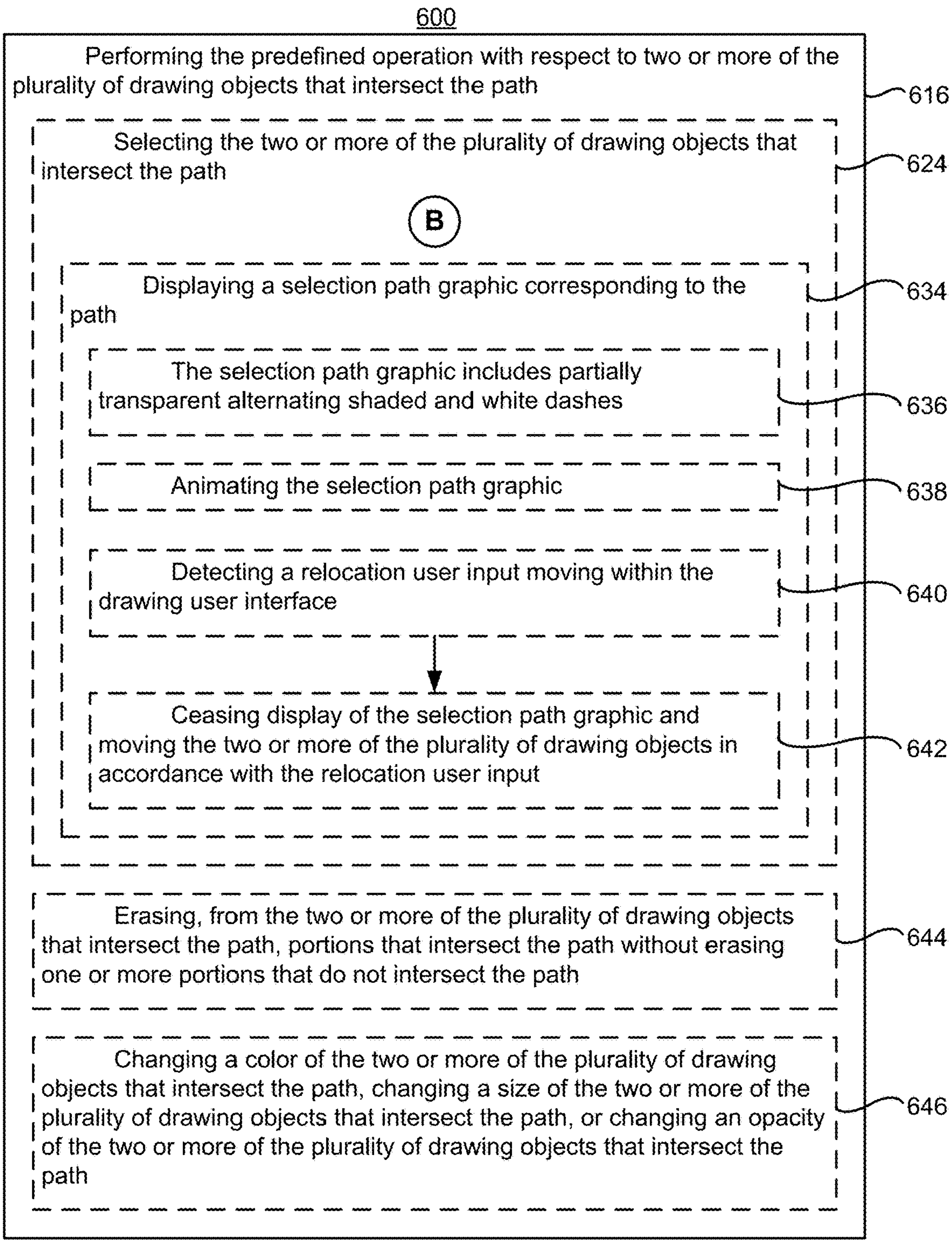
Figure 7A:
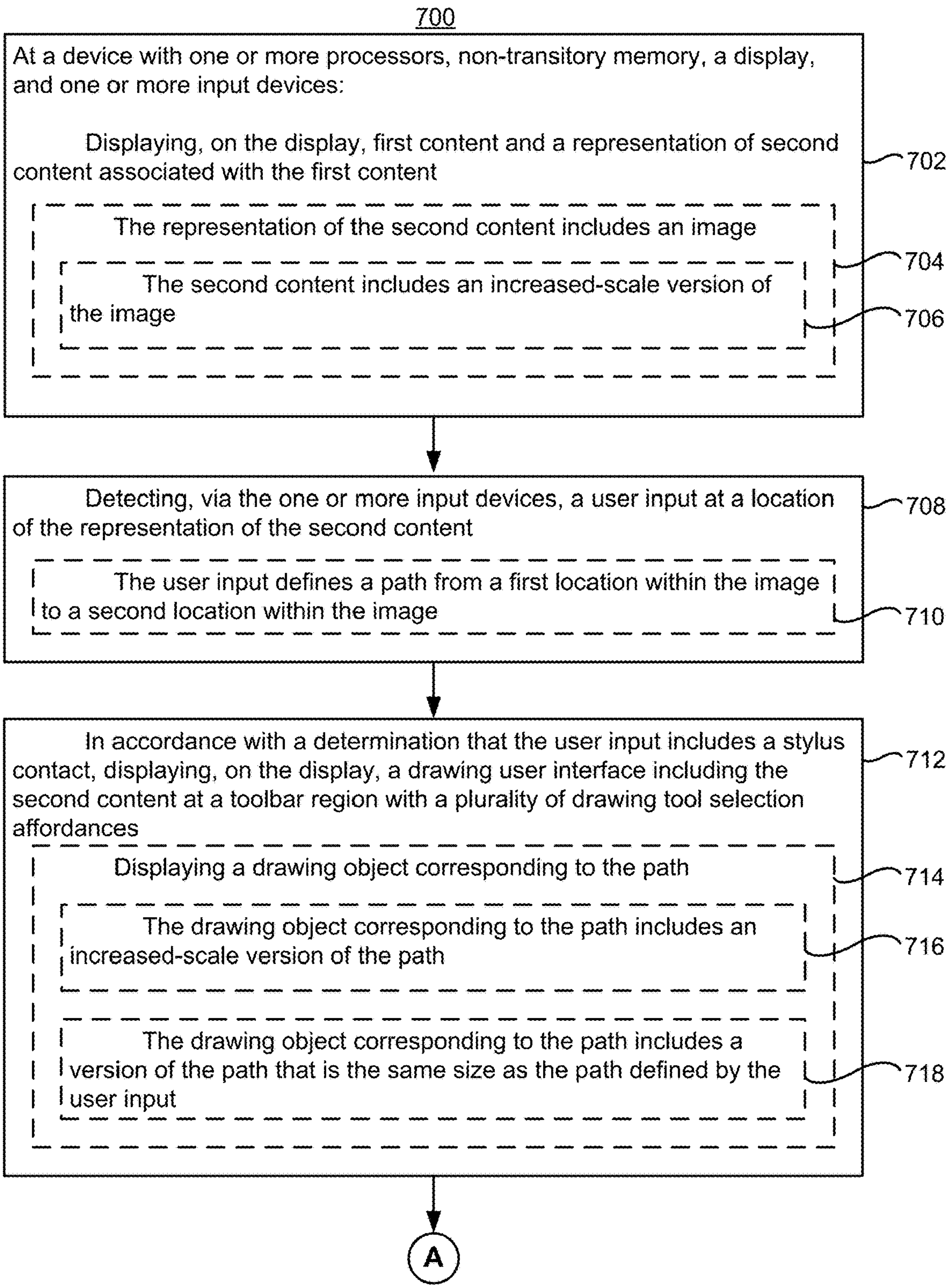
FIGS. 7A-7B are flow diagrams illustrating a method of marking up content in accordance with some embodiments.
Figure 7B:
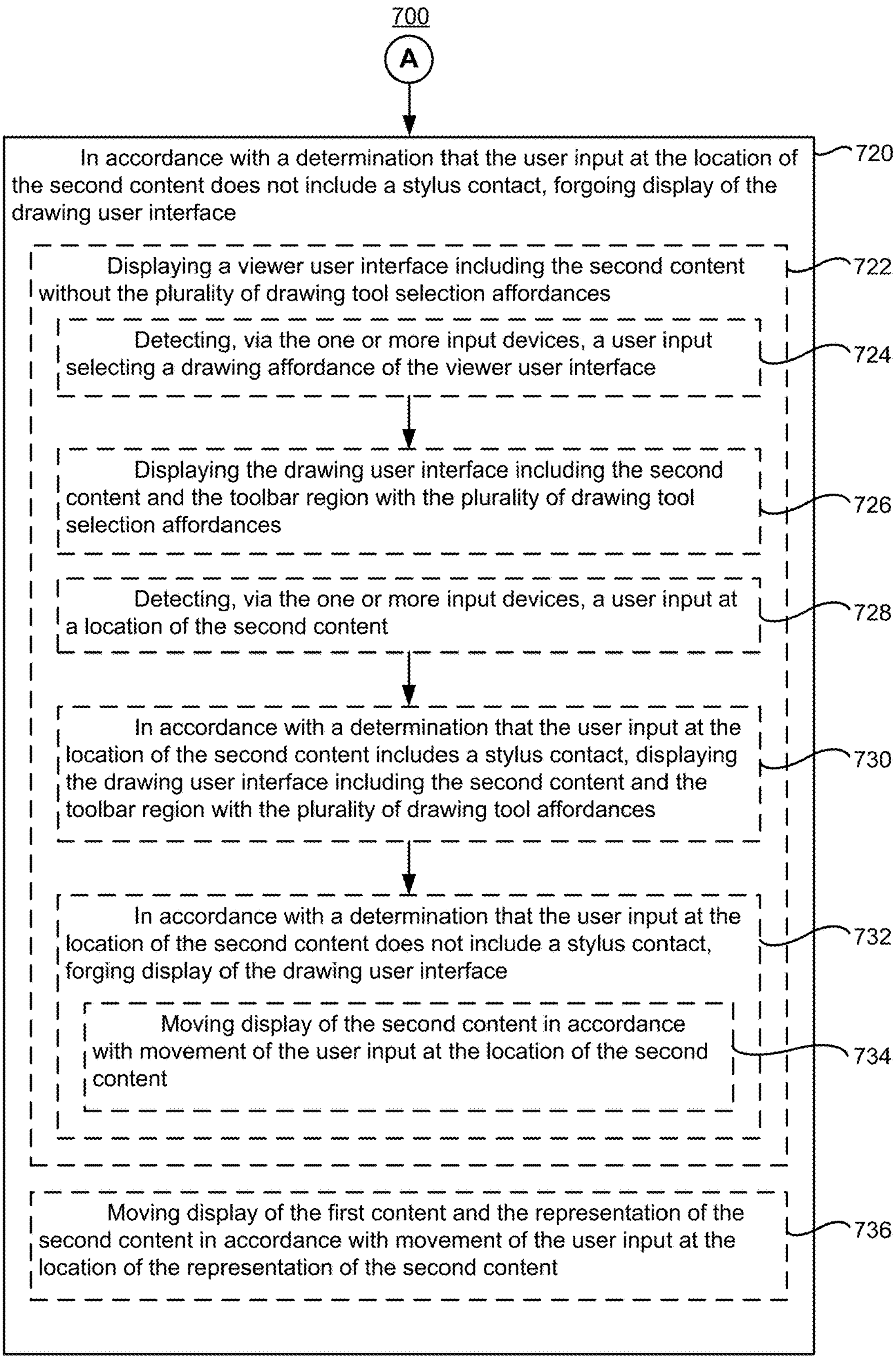
Figure 8A:
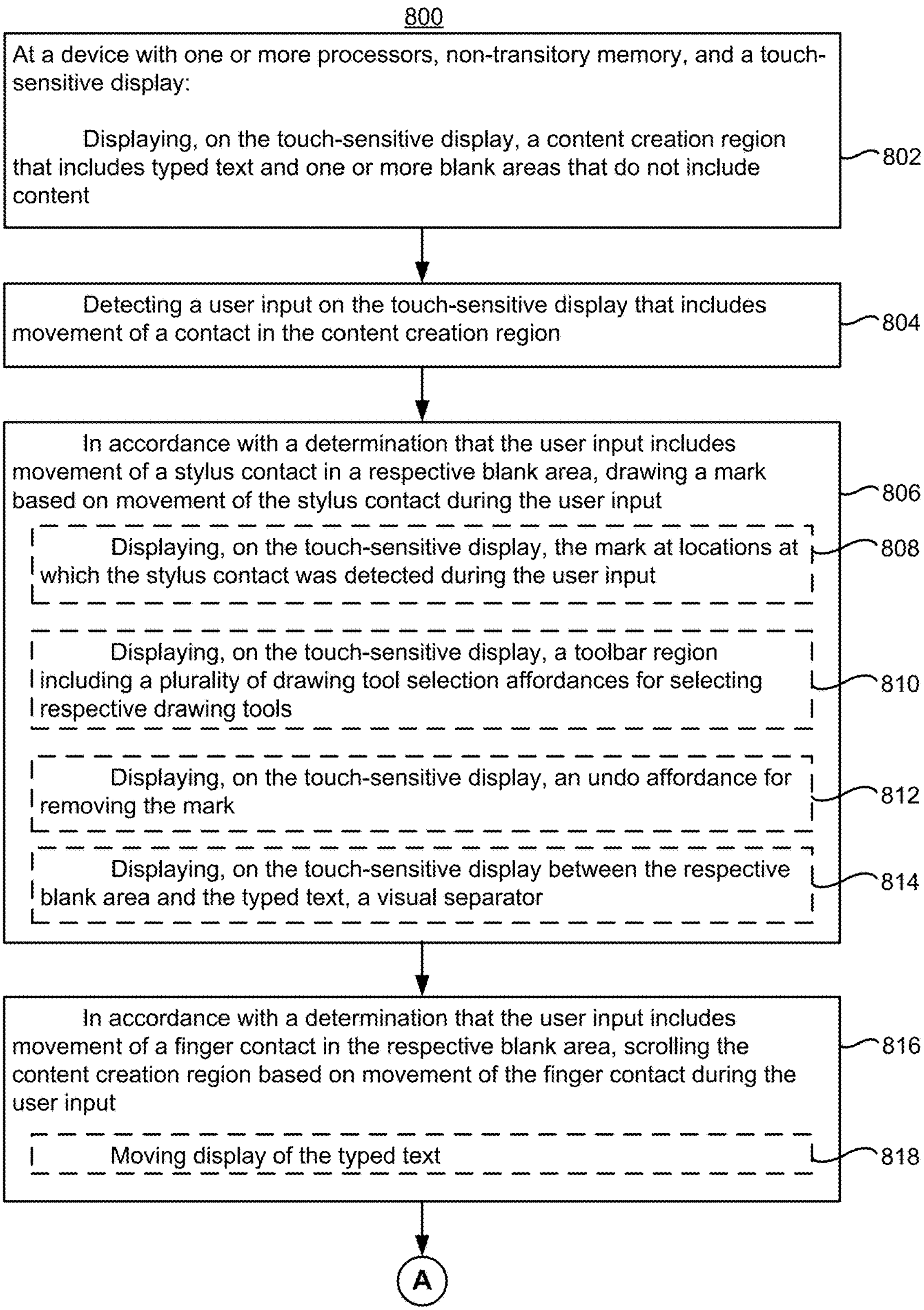
FIGS. 8A-8C are flow diagrams illustrating a method of manipulating a content creation region in accordance with some embodiments.
Figure 8B:
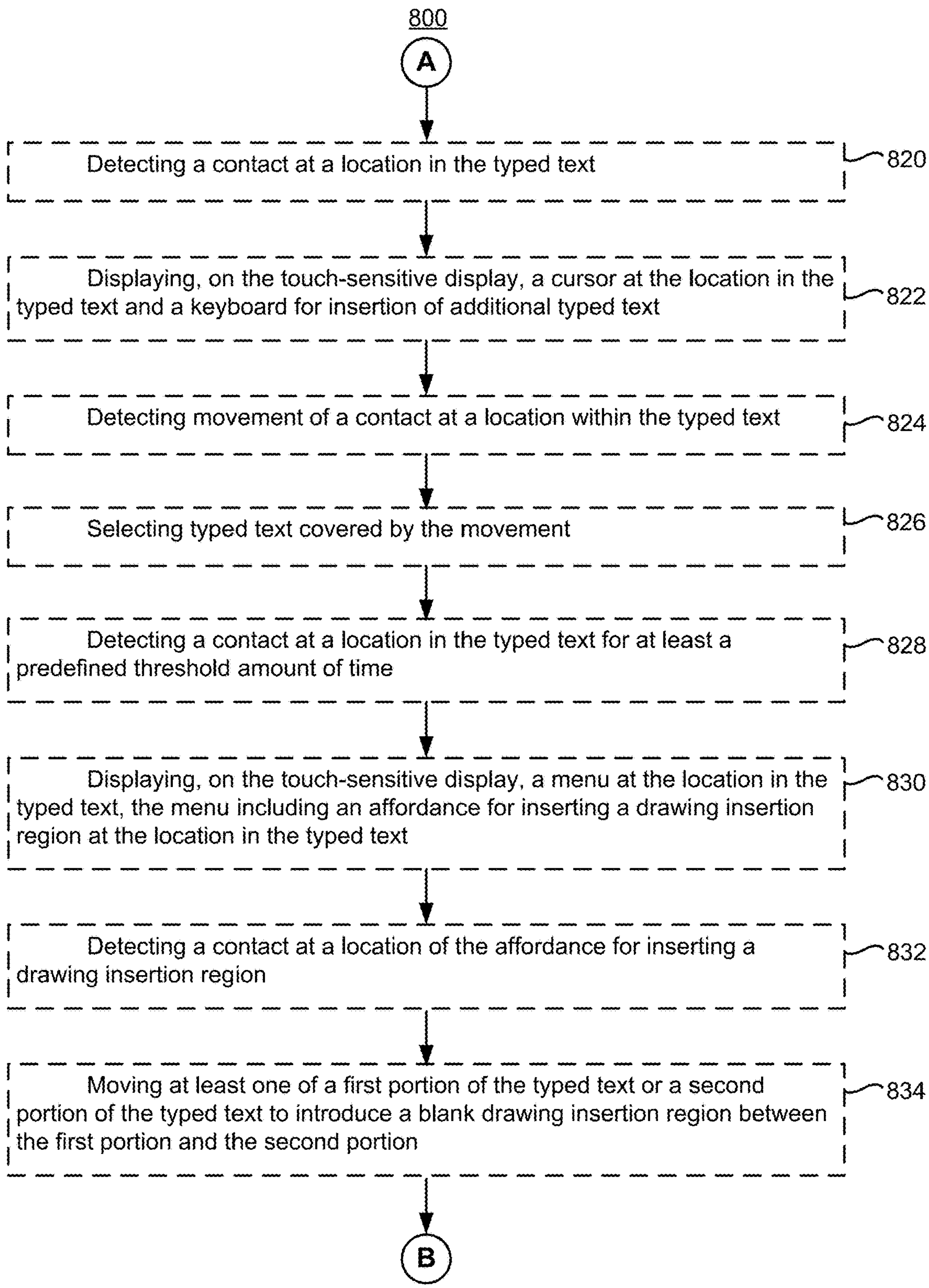
Figure 8C:
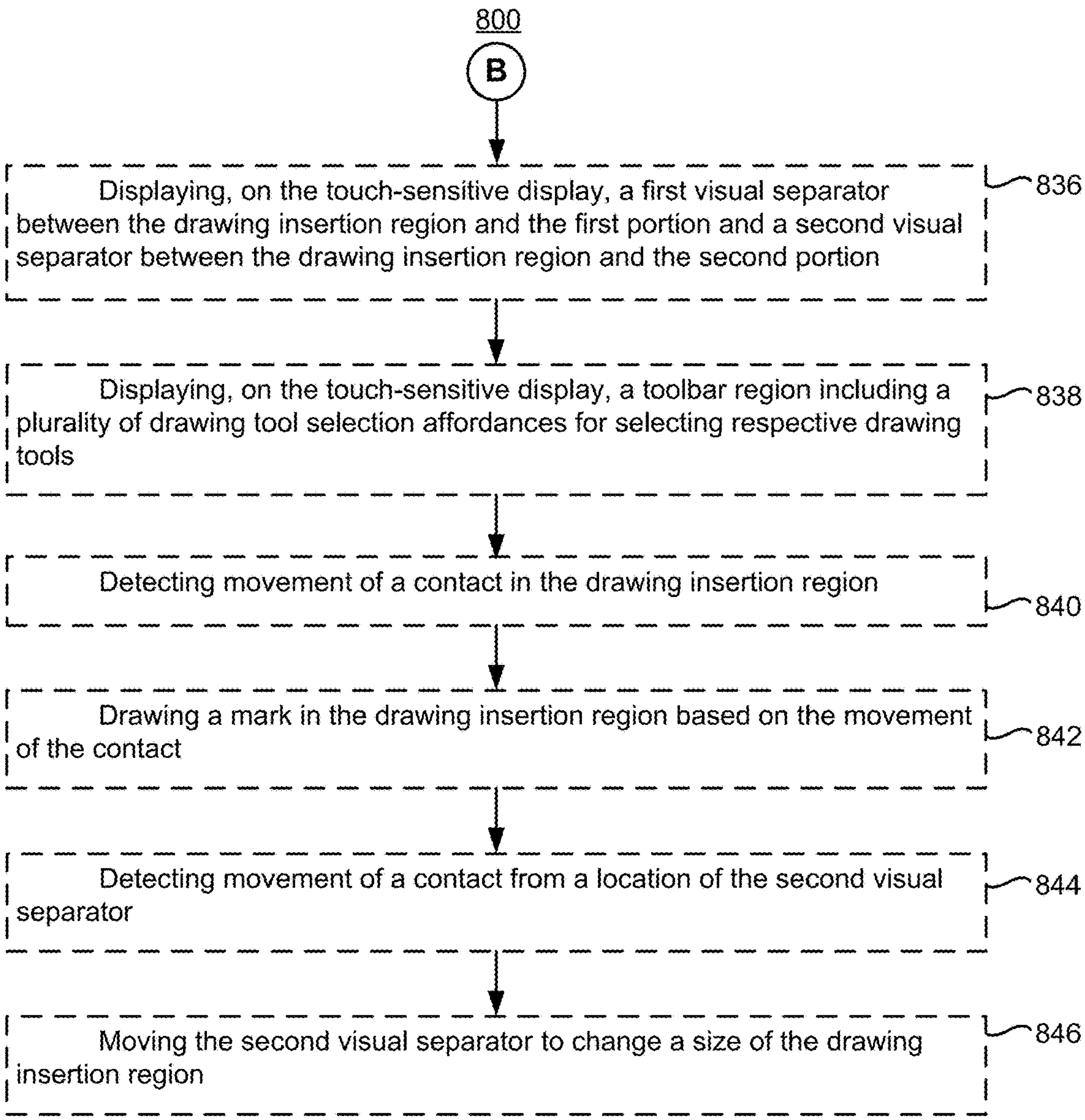
Figure 9A:
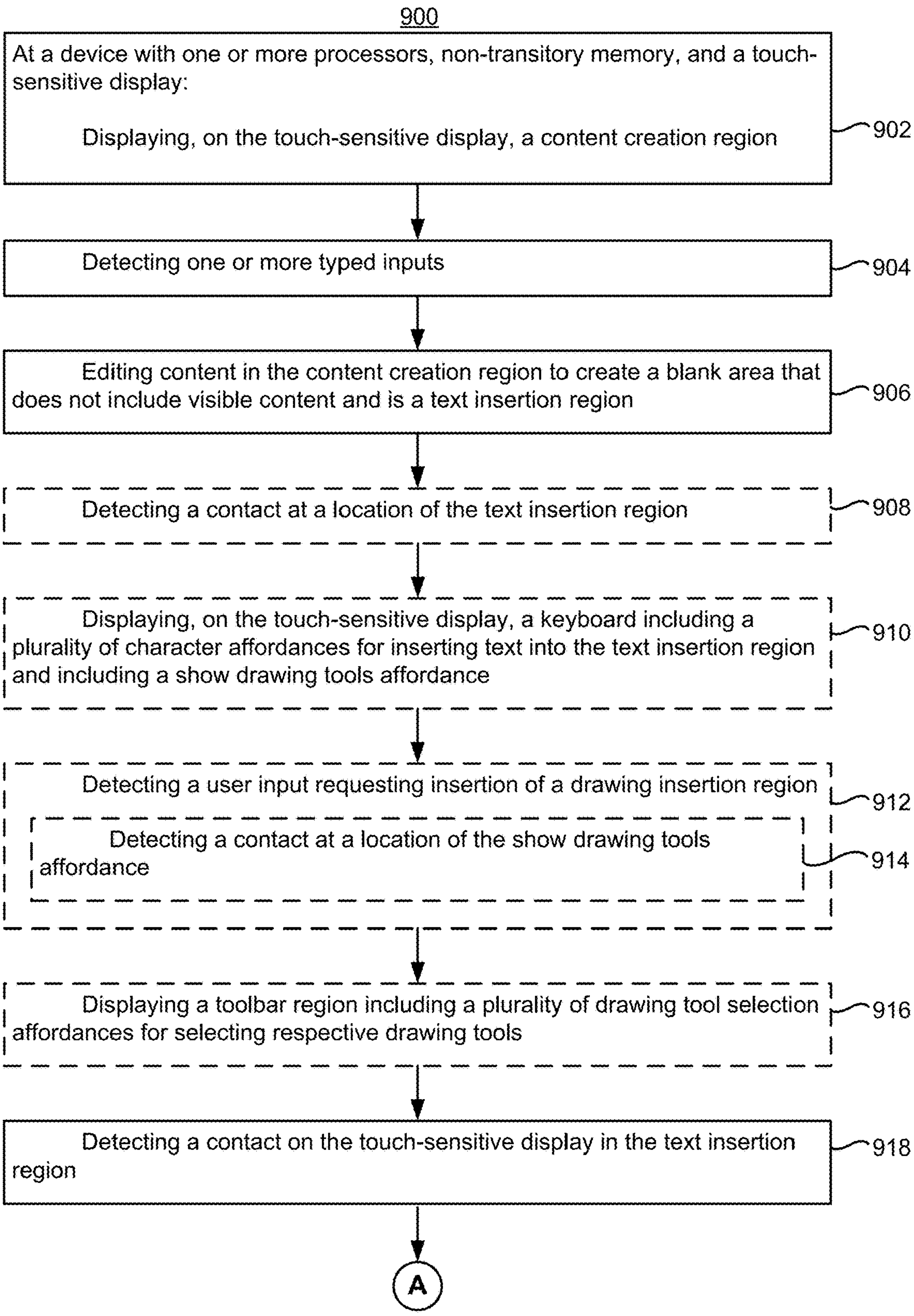
FIGS. 9A-9C are flow diagrams illustrating a method of inserting a drawing insertion region in accordance with some embodiments.
Figure 9B:
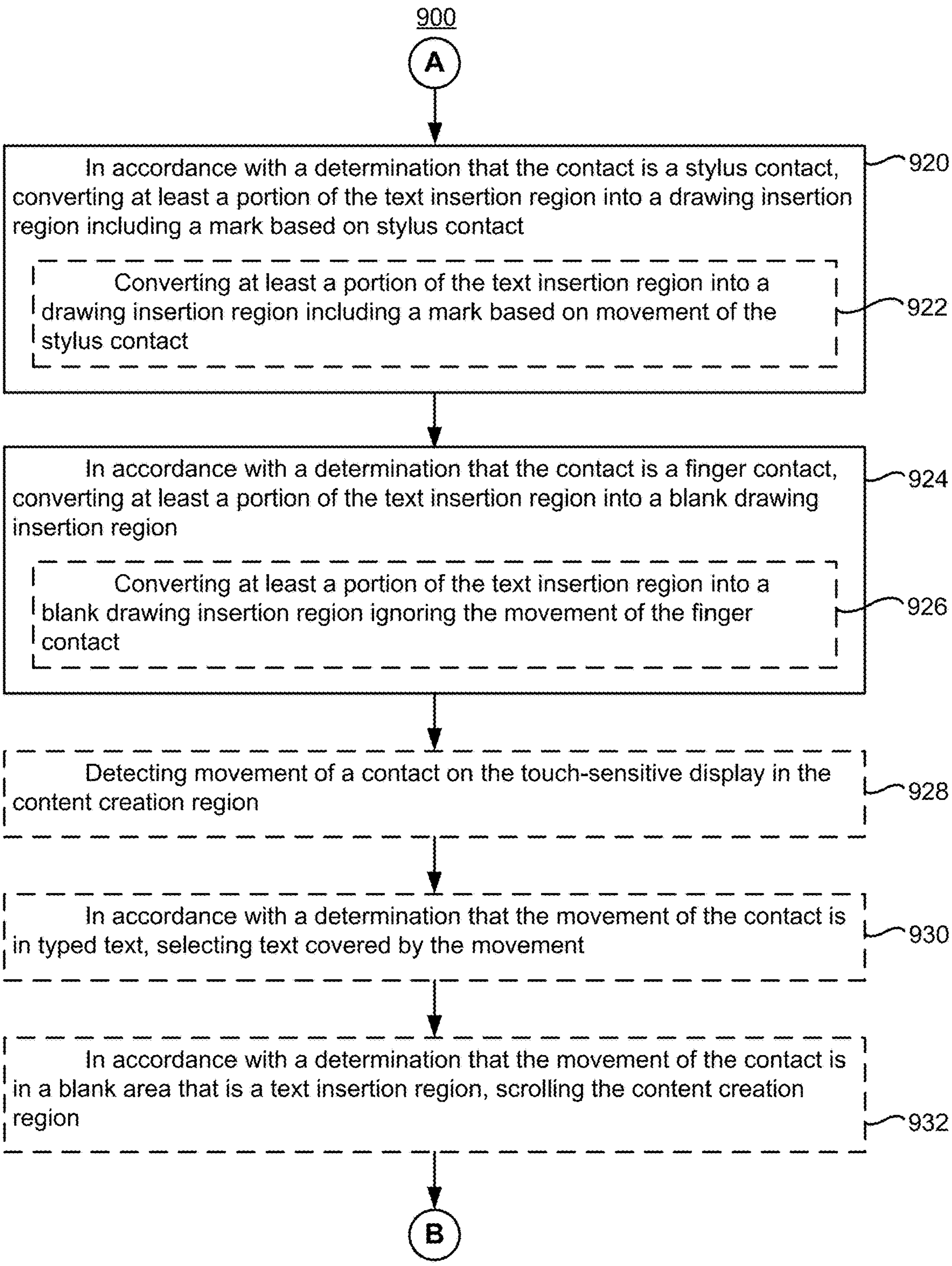
Figure 9C:
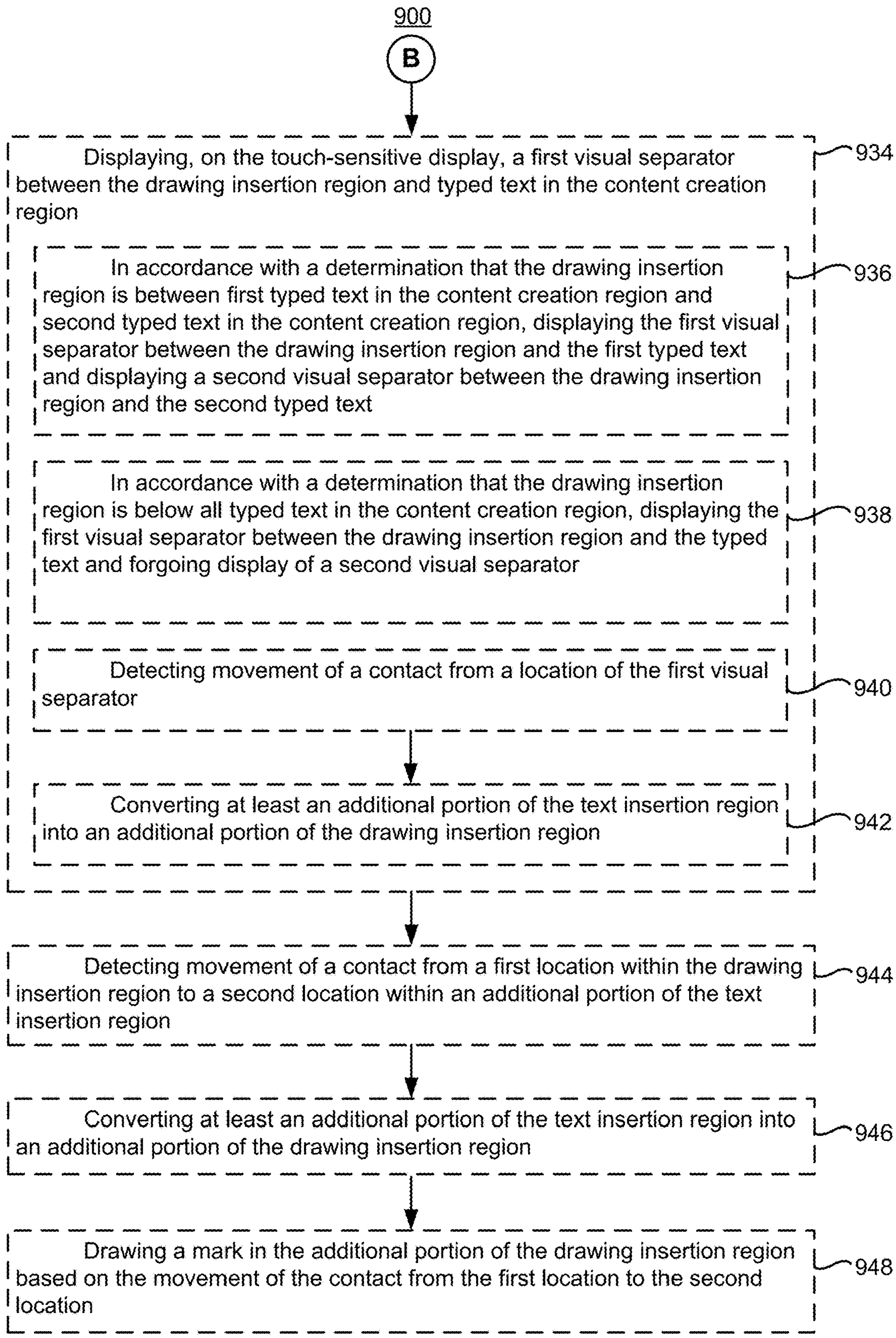

Below, a description of example devices illustrates in FIGS. 1A-1B, 2, and 3 is provided. FIGS. 4A-4B and 5A-5DR illustrate example user interfaces for annotating content. FIGS. 6A-6C illustrate a flow diagram of a method of manipulating drawing objects. FIGS. 7A-7B illustrate a flow diagram of a method of marking up content. FIGS. 8A-8C illustrate a flow diagram of a method of manipulating a content creation region. FIGS. 9A-9C illustrate a flow diagram of a method of inserting a drawing insertion region. The user interfaces in FIGS. 5A-5DR are used to illustrate the processes in FIGS. 6A-6C, 7A-7B, 8A-8C, and 9A-9C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
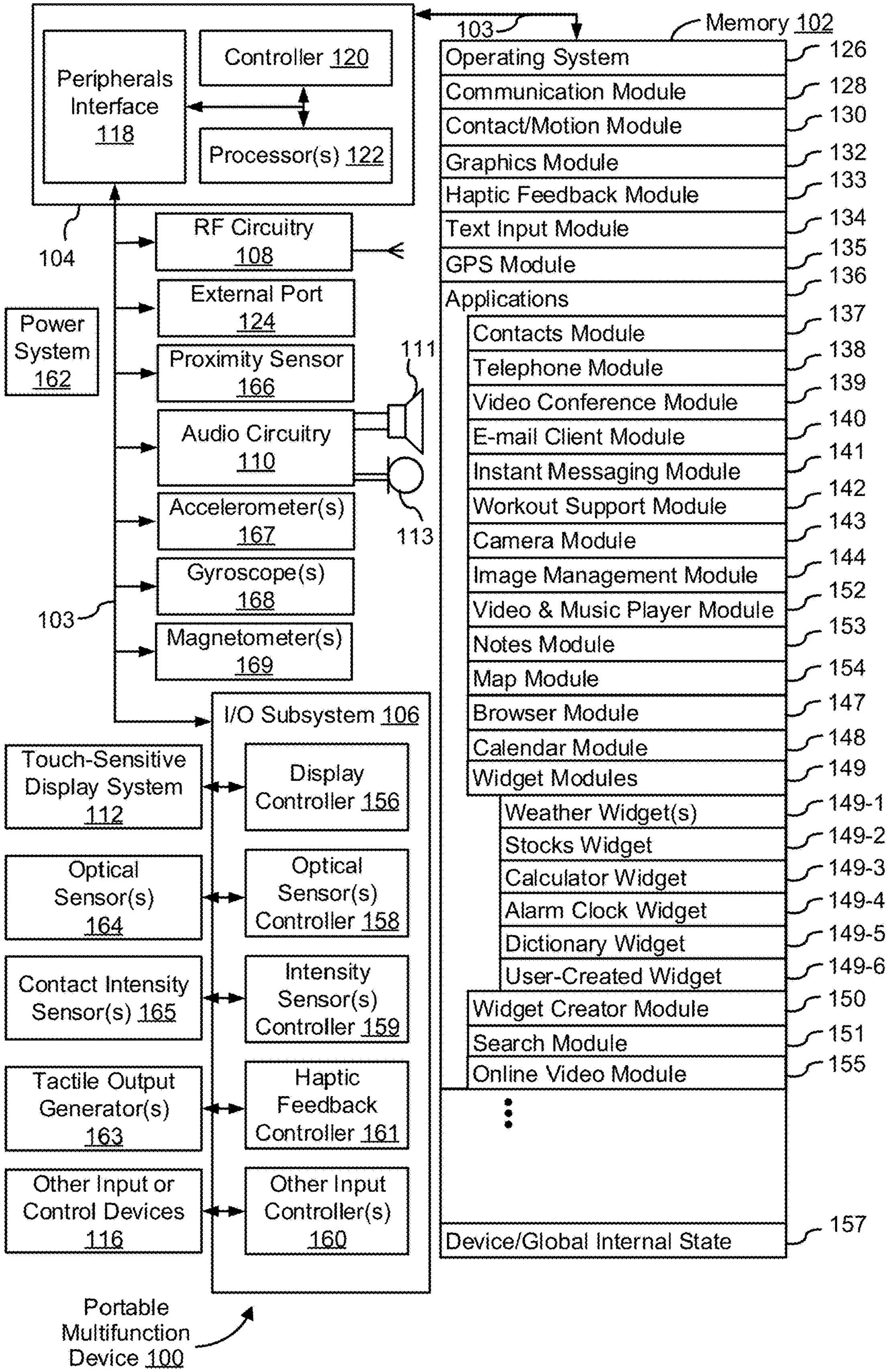
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 120, one or more processing units (CPUs) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or an "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 122 and the peripherals interface 118, is, optionally, controlled by memory controller 120.

Peripherals interface 118 can be used to couple input and output peripherals of the device to CPU(s) 122 and memory 102. The one or more processors 122 run or execute various software programs and/or sets of instructions stored in memory 102 to perform various functions for device 100 and to process data.

In some embodiments, peripherals interface 118, CPU(s) 122, and memory controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with camera module 143 (also called an imaging module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
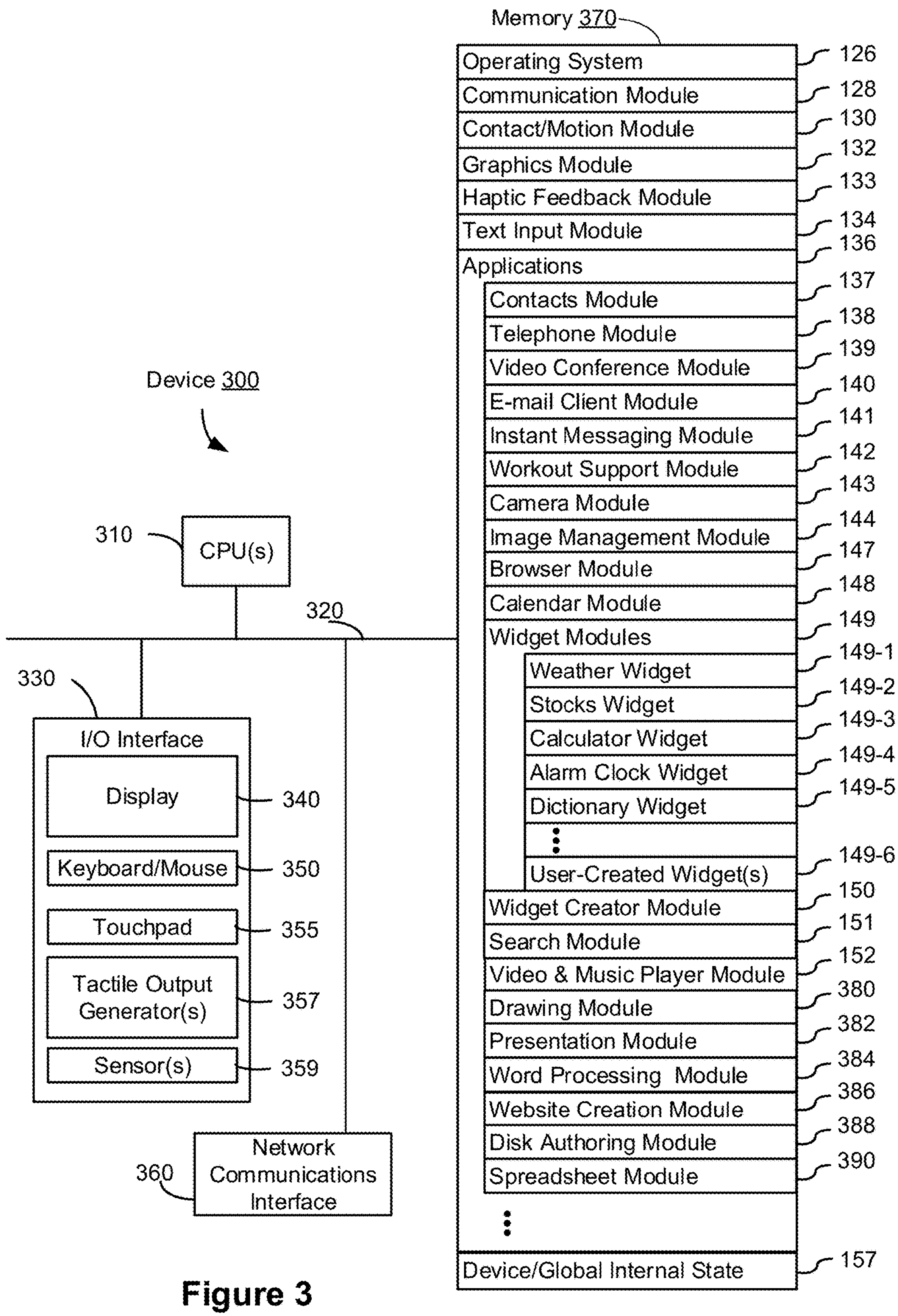
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conference module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference 139, e-mail client 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, video conference module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
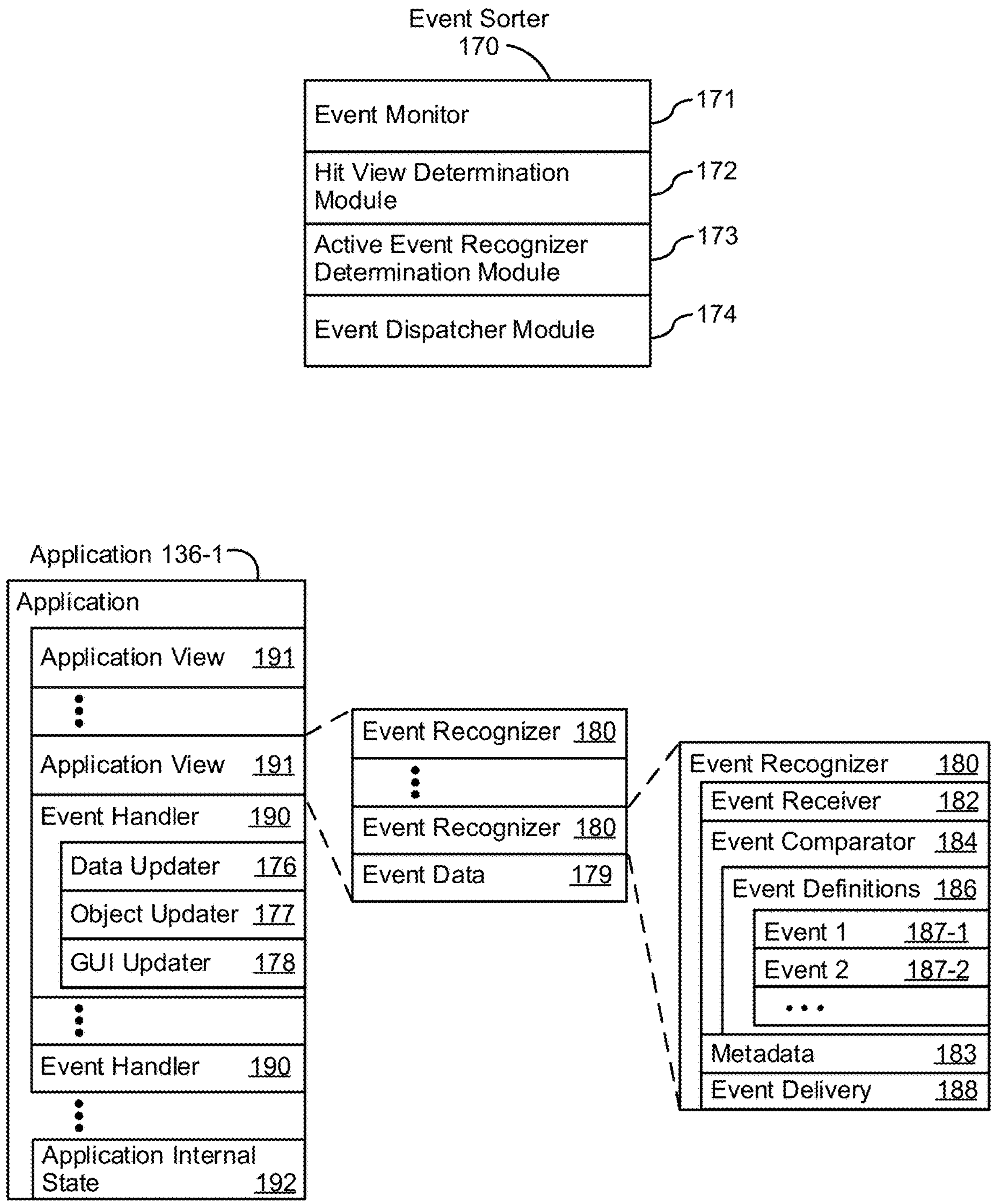
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
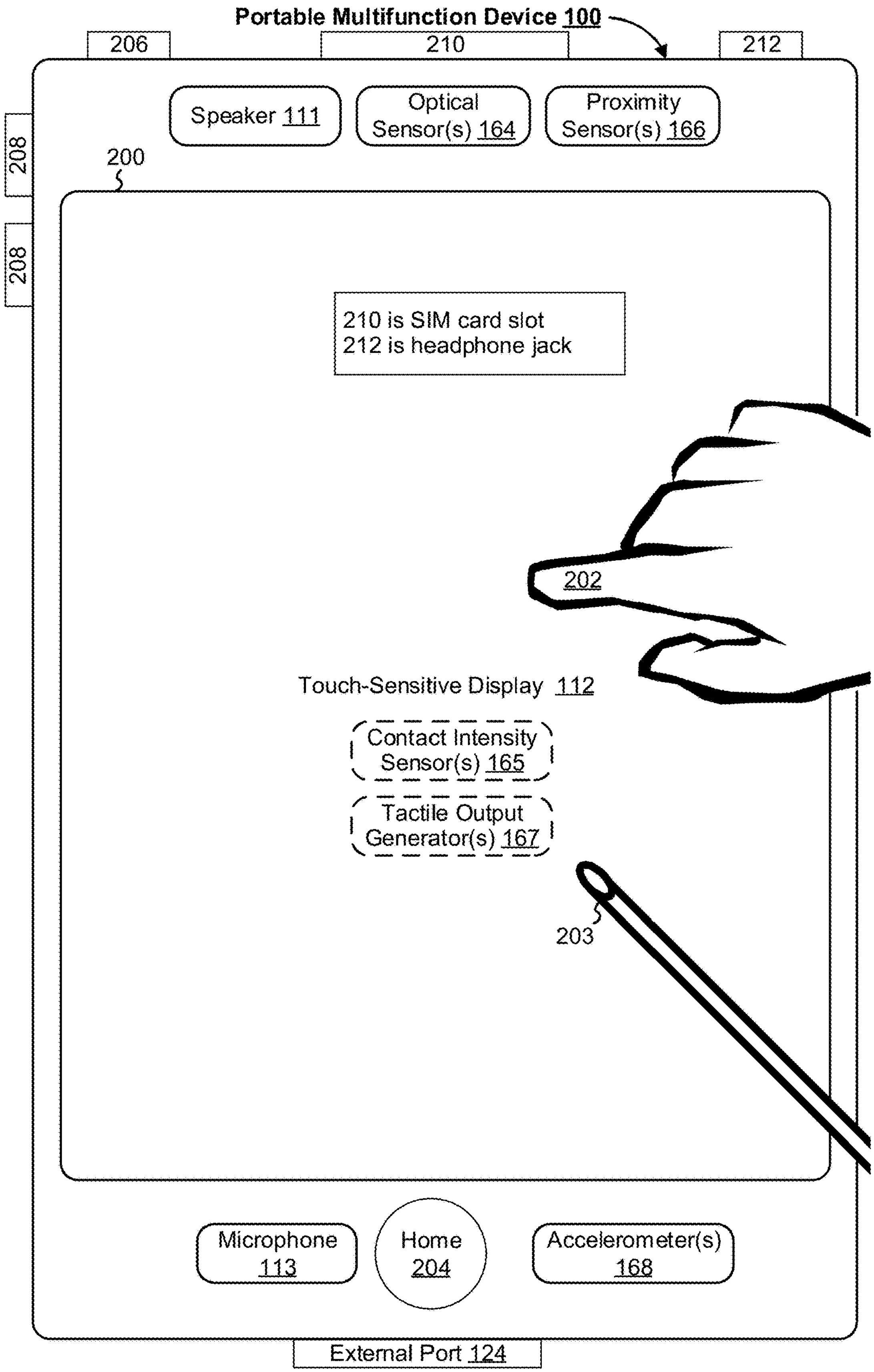
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
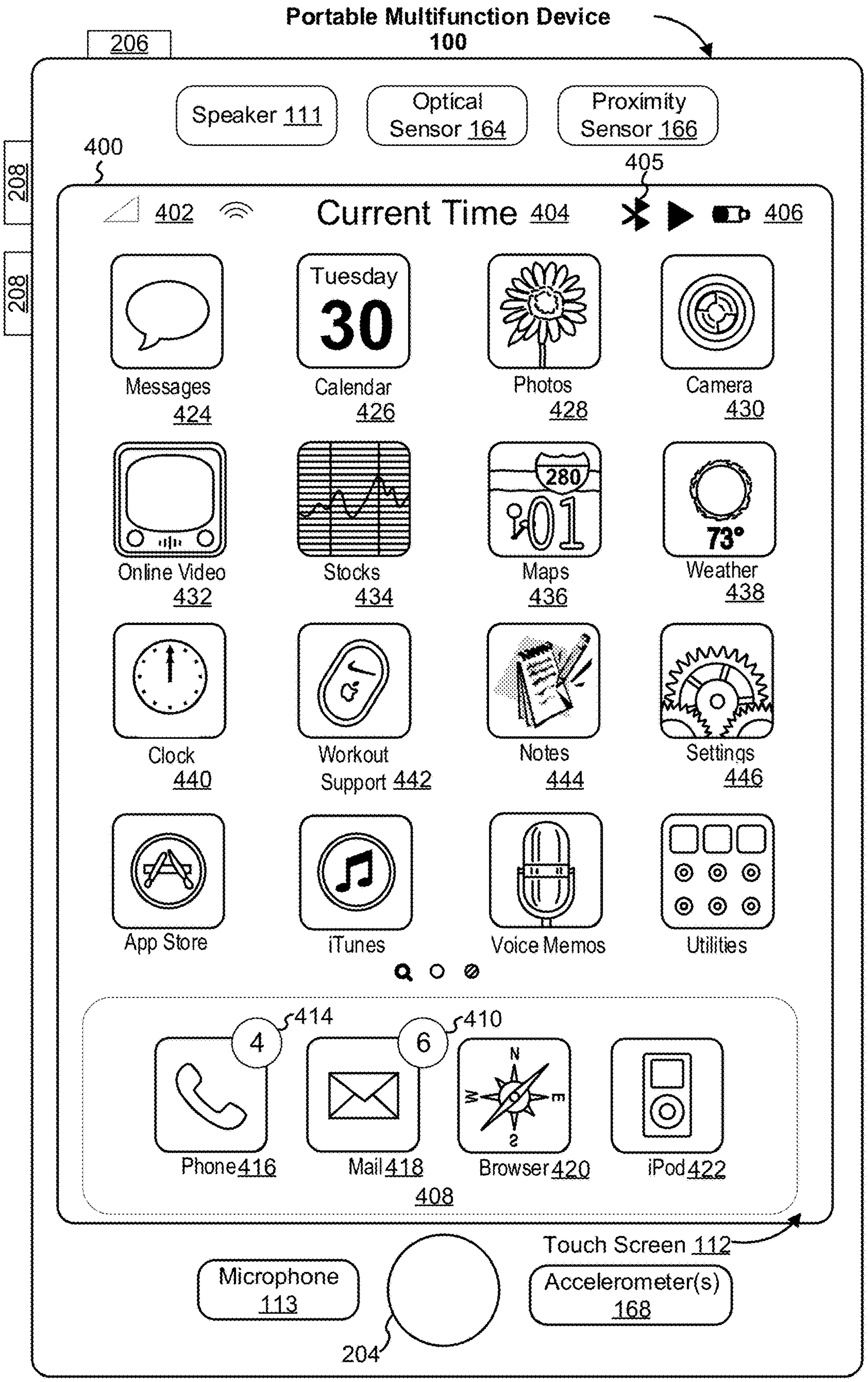
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, also referred to as iPod (trademark of Apple Inc.) module 152, labeled "iPod"; and
- Icons for other applications, such as:
  - Icon 424 for IM module 141, labeled "Text";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Map";
  - Icon 438 for weather widget 149-1, labeled "Weather";
  - Icon 440 for alarm clock widget 169-6, labeled "Clock";
  - Icon 442 for workout support module 142, labeled "Workout Support";
  - Icon 444 for notes module 153, labeled "Notes"; and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
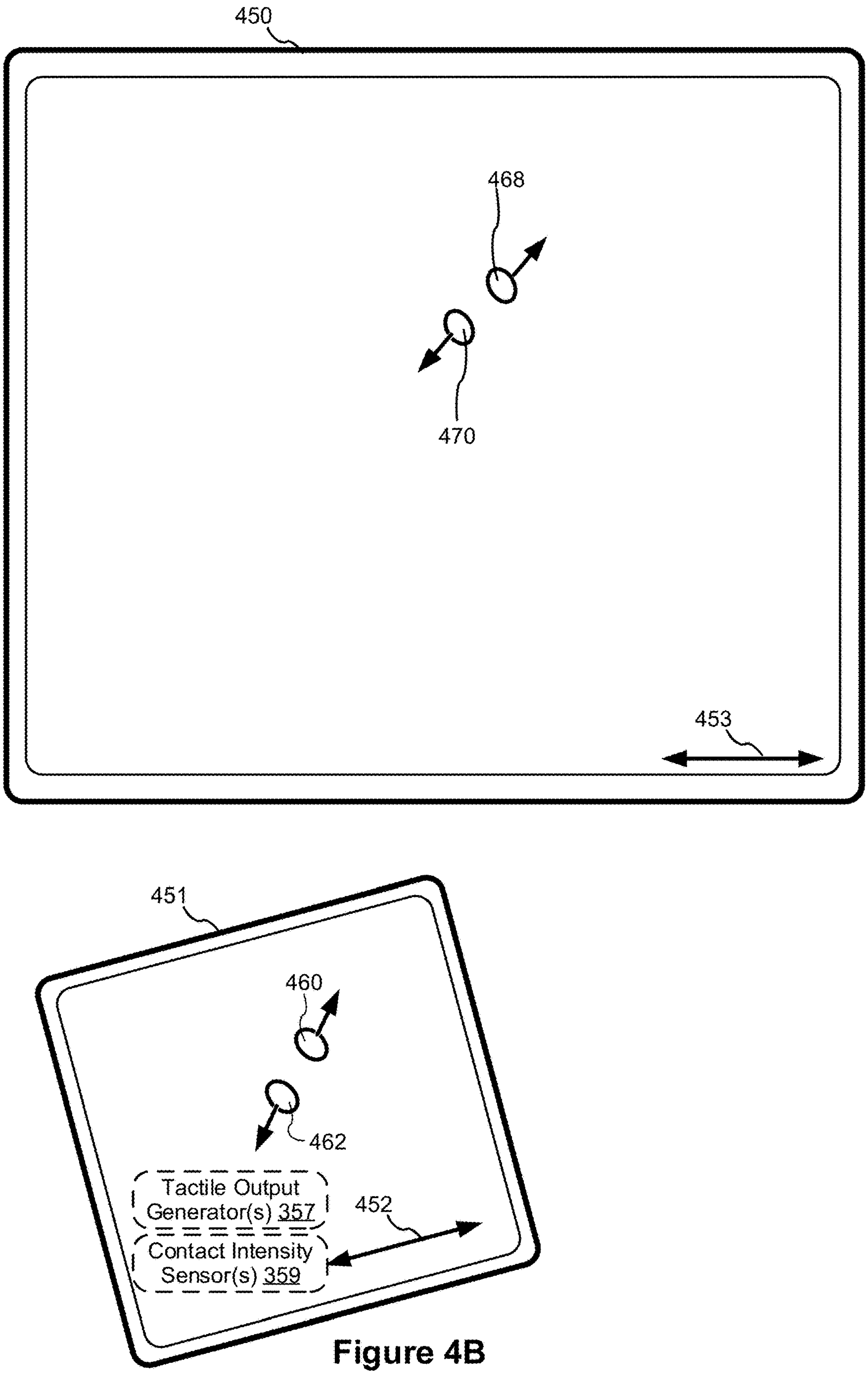
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

User Interfaces and Associated Processes

Attention is now directed towards embodiments of user interfaces ("UP") and associated processes that may be implemented on an electronic device, such as portable multifunction device (PMD) 100 or device 300, with a display, a touch-sensitive surface, and one or more sensors to detect intensity of contacts with the touch-sensitive surface.

FIGS. 5A-5DR illustrate example user interfaces for annotating content in accordance with some embodiments. The user interfaces in these figures are used to illustrate the processes described below, including the processes in FIGS. 6A-6C, 7A-7B, 8A-8C, and 9A-9C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 5A:
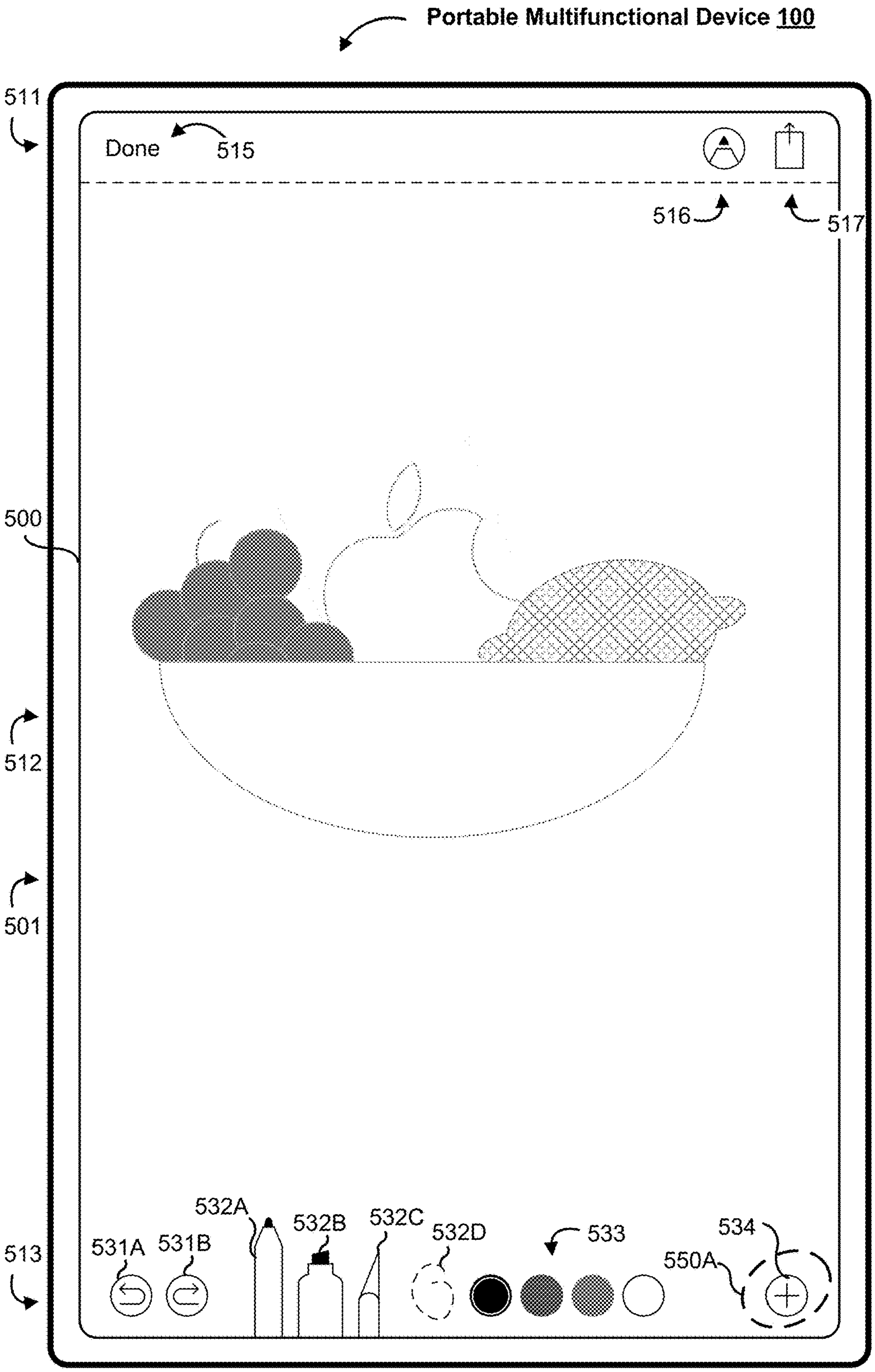
FIGS. 5A-5DR illustrate example user interfaces for annotating content in accordance with some embodiments.

FIG. 5A illustrates a drawing user interface 501 as part of a user interface 500 displayed by a portable multifunctional device 100 (hereinafter "device 100"). In FIG. 5A, the drawing user interface 501 spans the entire user interface 500. The drawing user interface 501 includes an options bar 511, a content region 512, and a toolbar region 513. The options bar 511 includes an exit affordance 515 for replacing, within the user interface 500, the drawing user interface 501 with, e.g., a user interface of another application. The options bar 511 includes a markup affordance 516 for toggling between an editing mode (illustrated in FIG. 5A) in which content in the content region 512 can be edited (e.g., marked up) and a viewing mode in which content in the content region 512 can be viewed, but not edited. The options bar 511 includes a share affordance 517 for sharing the content in the content region 512 with other users, e.g., emailing a copy of the content or sending a text message including a copy of the content.

The content region 512 includes content that can be edited via the drawing user interface 501. For example, in FIG. 5A, the content region includes a photo of a fruit bowl. In various implementations, the content region is blank, includes drawing objects (as described further below), includes an image, or includes a PDF (Portable Document Format) file.

The toolbar region 513 includes a plurality of drawing tool selection affordances respectively associated with a plurality of drawing tools. In FIG. 5A, the toolbar region 513 includes a pen tool selection affordance 532A associated with a pen tool that can be used to create opaque (or substantially opaque) strokes in the content region 512, a highlighter tool selection affordance 532B associated with a highlighter tool that can be used to create semi-transparent strokes in the content region 512, a deletion tool selection affordance 532C associated with a deletion tool that can be used to delete drawing objects in the content region 512, and a selection tool selection affordance 532D associated with a selection tool that can be used to select drawing objects in the content region 512.

The toolbar region 513 includes an undo affordance 531A that can be used to reverse the last action taken by the user (e.g., undo insertion of a drawing object) and a redo affordance 531B that can be used to retake an undone action (e.g., redo insertion of the drawing object). In various circumstances, the undo affordance 531A and/or the redo affordance 531B are not displayed or a grayed out if there is no action to undo or redo.

The toolbar region 513 includes color selection affordances 533 for selecting a color of drawing objects inserted via the drawing user interface 501. The toolbar region 513 includes a toolbar menu affordance 534 for displaying a toolbar menu.

Figure 5B:
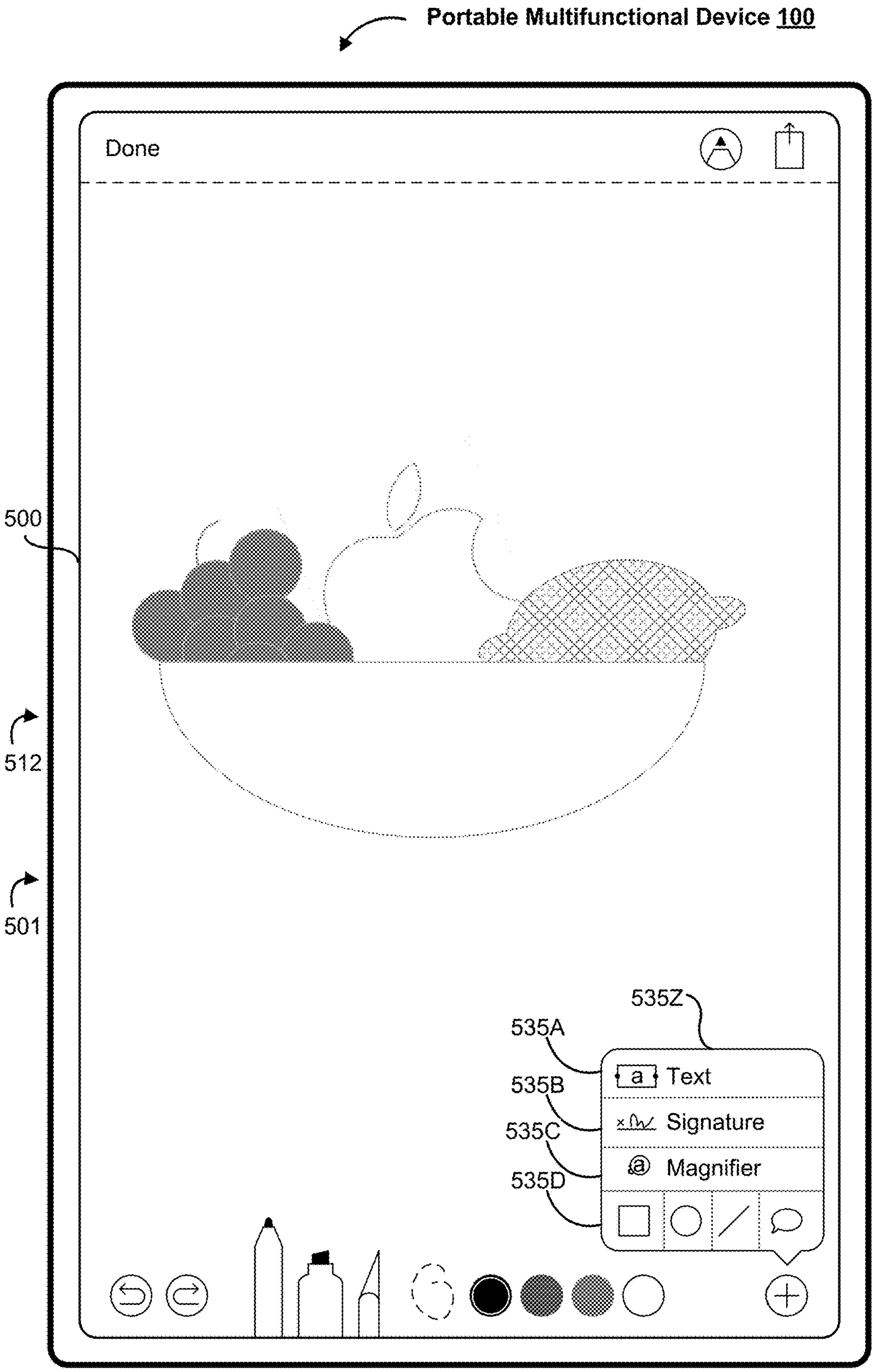

FIG. 5A illustrates a finger contact 550A detected at a location of the toolbar menu affordance 534. FIG. 5B illustrates the user interface 500 of FIG. 5A in response to detecting the finger contact 550A at the location of the toolbar menu affordance 534. In response to detecting the finger contact 550A, the drawing user interface 501 includes a toolbar menu 535Z with a number of drawing object insertion affordances 535A-535D for inserting drawing objects into the content region 512. In various implementations, upon selection of one of the drawing object insertion affordances 535A-535D, a drawing object is inserted into the content area 512 with default characteristics. Through further interaction, a user can modify the inserted drawing object to have a desired size, location, text characters, or other characteristic. In FIG. 5B, the drawing object affordances 535A-535D include a text insertion affordance 535A for inserting a text drawing object into the content area 512, a signature insertion affordance 535B for inserting a user-defined shape drawing object (e.g., a hand-drawn signature), a magnifier insertion affordance 535C for inserting a magnifier drawing object that displays a magnified version of the content behind the magnifier drawing object, and one or more shape insertion affordances 535D for inserting application-defined shape drawing objects, such as a square, circle, straight line, or speech bubble.

Figure 5C:
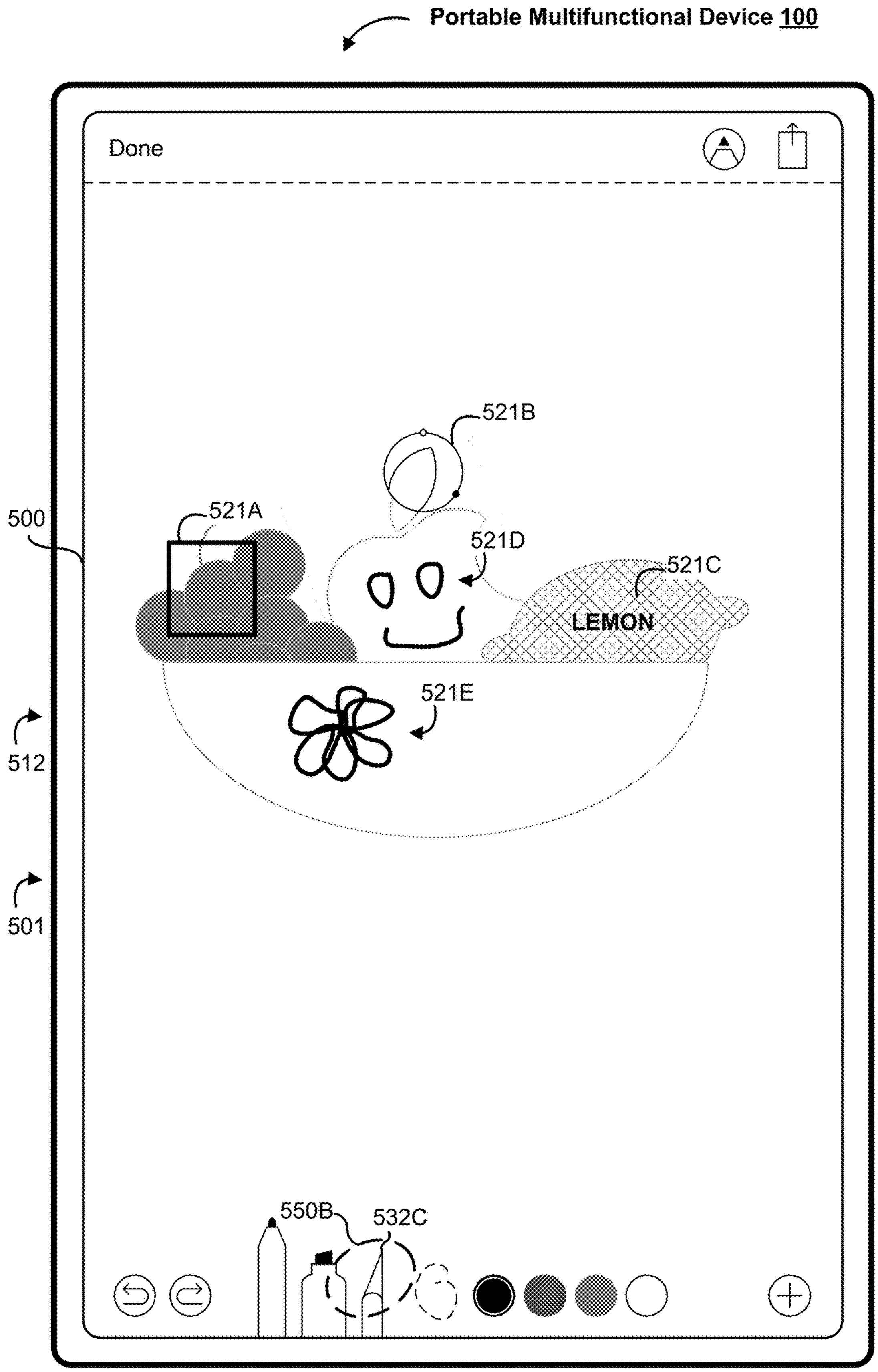

FIG. 5C illustrates the user interface 500 of FIG. 5B with a plurality of drawing objects in the content region 512 of the drawing user interface 501. The content region 512 includes, in addition to the underlying photograph of the bowl of fruit, a square drawing object 521A (approximately surrounding a grape of the bowl of fruit), a magnifier drawing object 521B (magnifying part of a leaf of an apple of the bowl of fruit), a text drawing object 521C (stating "LEMON" over a lemon of the bowl of fruit), a set of three stroke drawing objects 521D (which together form a smiley face on the apple), and a set of six stroke drawing objects 521E (which together form a flower on the bowl). In various implementations, a stroke drawing object is defined by a continuous user input within the drawing user interface 501 while a drawing tool that is associated with a stroke operation is selected, such as the pen tool associated with the pen tool selection affordance 532A, the highlighter tool associated with the highlighter tool selection affordance 532B, or other tools like a pencil tool (e.g., a pencil tool associated with the pencil tool selection affordance 532H of FIG. 5BG) or a brush tool.

Figure 5D:
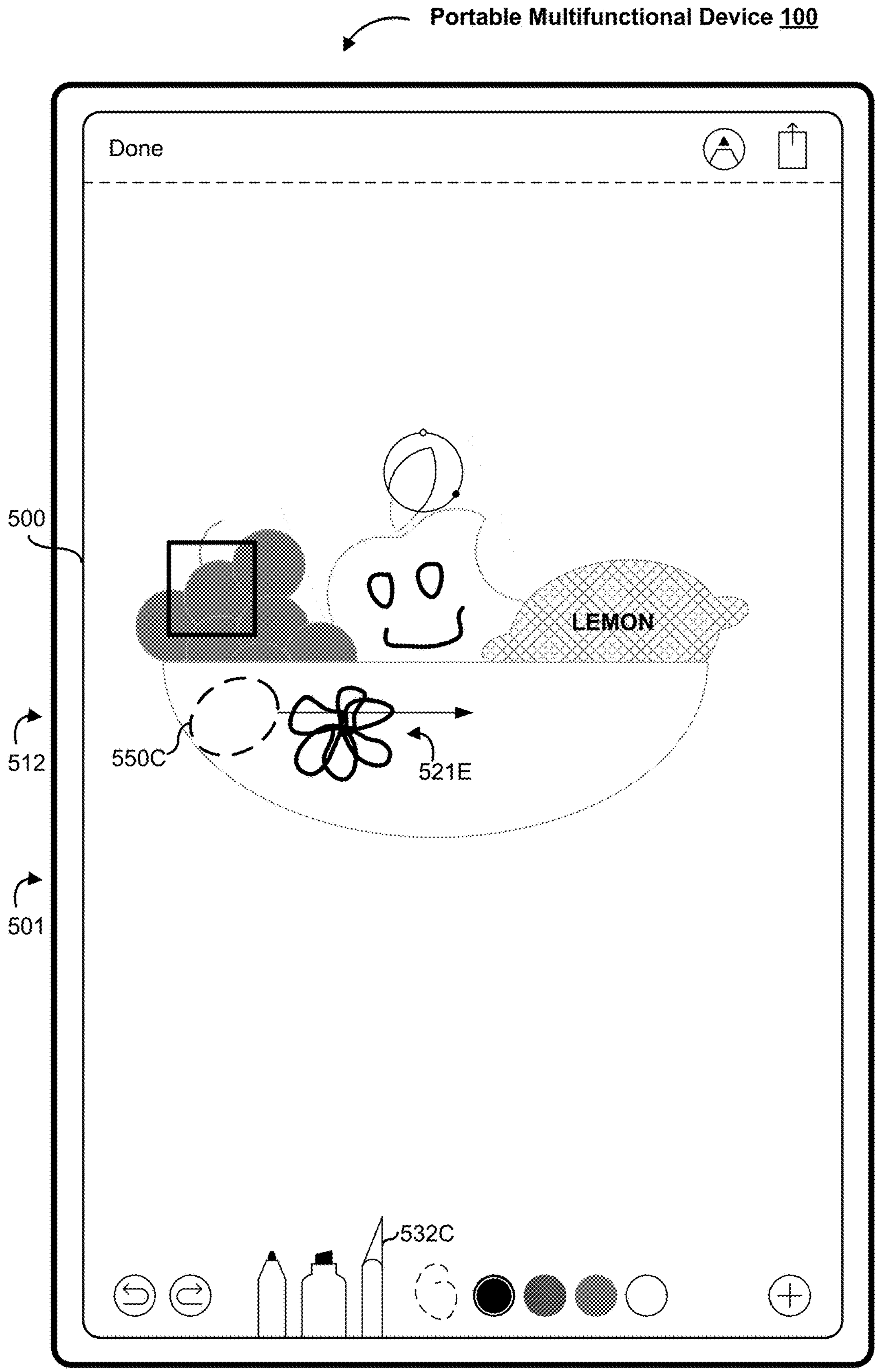

FIG. 5C illustrates a finger contact 550B detected at the location of the deletion tool selection affordance 532C. FIG. 5D illustrates the user interface 500 of FIG. 5C in response to detecting the finger contact 550B at the location of the deletion tool selection affordance 532C. In FIG. 5D, the deletion tool section affordance 532C is changed (e.g., raised) to indicate that a deletion tool has been selected. FIG. 5D illustrates movement of a finger contact 550C drawing a path within the content region 512 of the drawing user interface 501. Although the illustrated path is a straight line in FIG. 5D, in various implementations, the path is not straight. The path extends from a first location to a second location and intersects the top three stroke drawing objects of the set of six stroke drawing objects 521E.

Figure 5E:
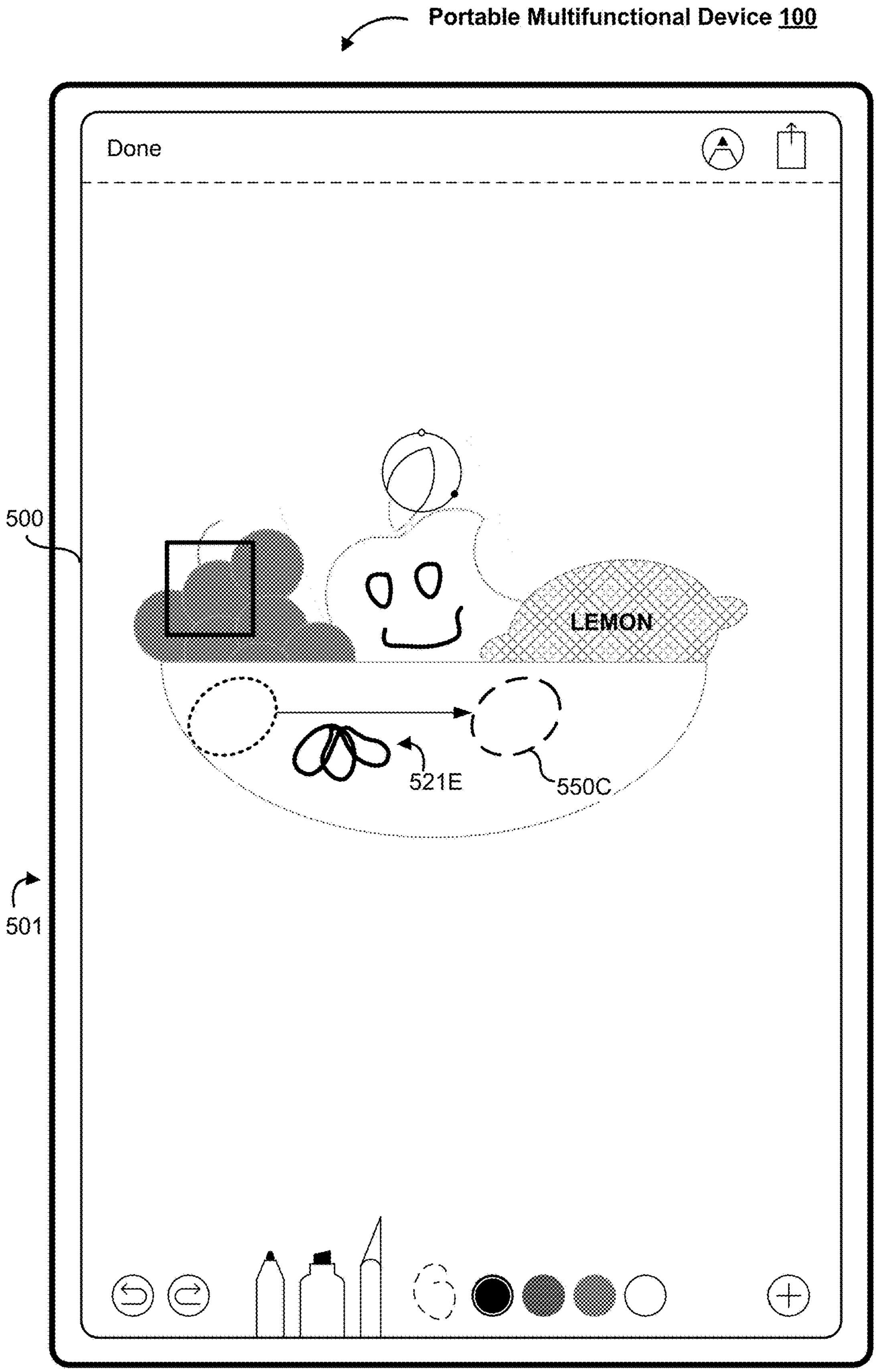

FIG. 5E illustrates the user interface 500 of FIG. 5D in response to detecting movement of the finger contact 550C drawing a path intersecting the top three stroke drawing objects of the set of six stroke drawing objects 521E, according to some implementations. In FIG. 5E, the top three stroke drawing objects cease to be displayed. In various implementations, when the deletion tool is selected, a user input drawing a path deletes drawing objects intersecting the path.

Figure 5F:
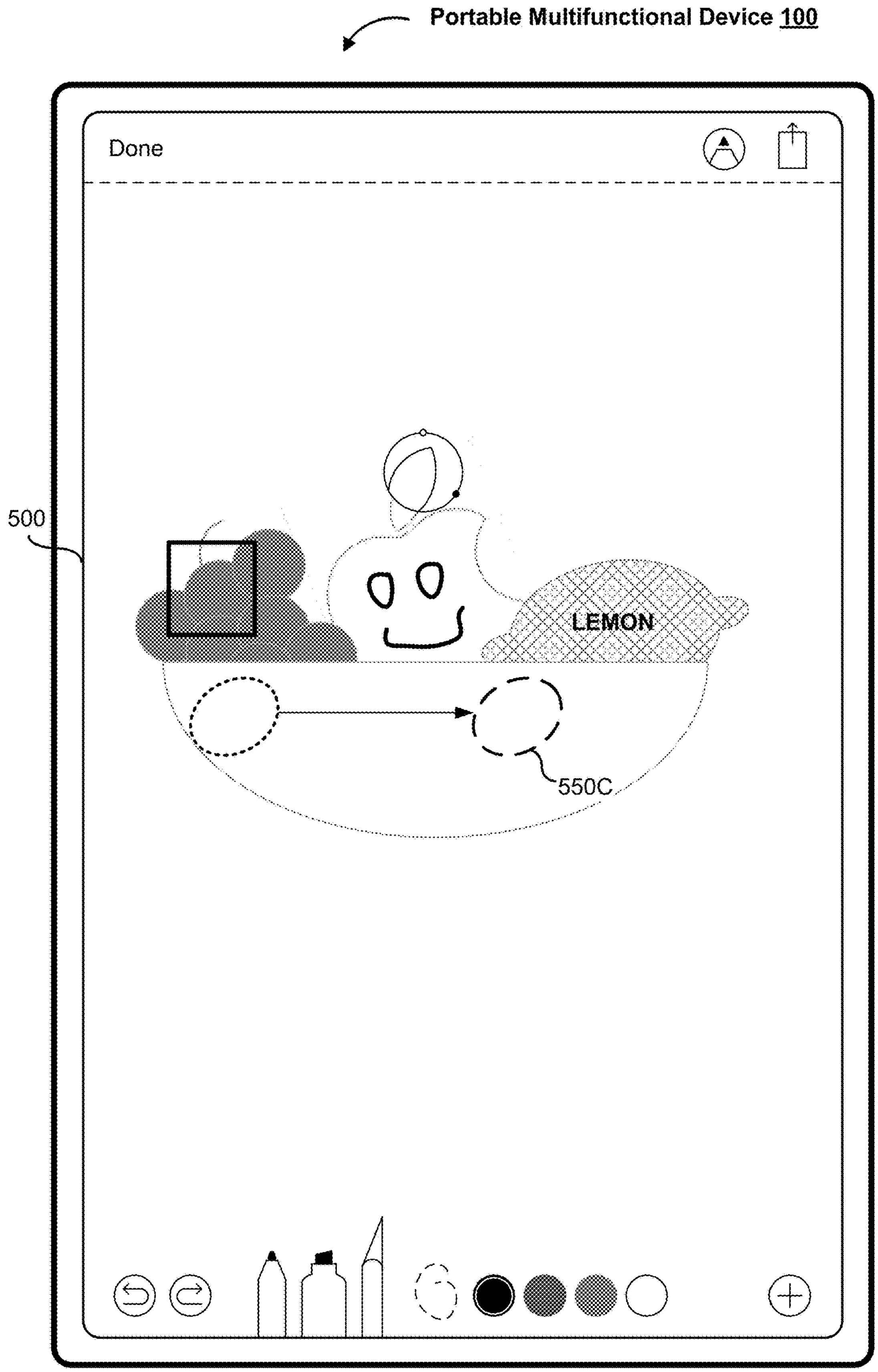

FIG. 5F illustrates the user interface 500 of FIG. 5D in response to detecting movement of the finger contact 550C drawing a path intersecting the top three stroke drawing objects of the set of six stroke drawing objects 521E, according to some implementations. In FIG. 5F, all six of the set of six stroke drawing objects 521E cease to be displayed in response to movement of the finger contact 550C drawing a path. In various implementations, when the deletion tool is selected, a user input drawing a path deletes drawing objects intersecting the path and also deletes drawing objects intersecting those being deleted.

Figure 5G:
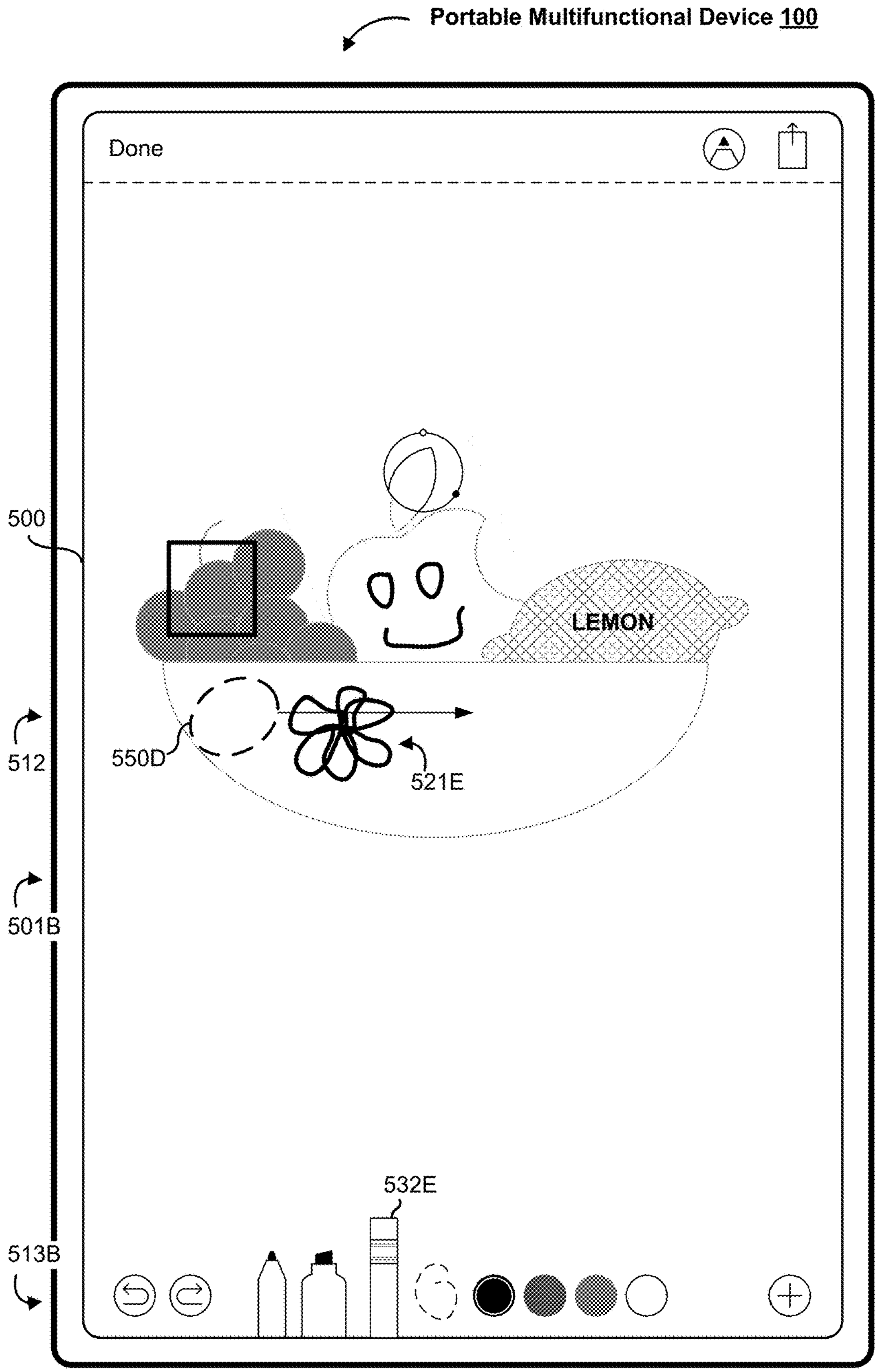

FIG. 5G illustrates the user interface 500 displaying a drawing user interface 501B that includes a toolbar region 513B with an eraser tool selection affordance 532E as opposed to the deletion tool selection affordance 532C of the drawing user interface 501 of FIG. 5A. FIG. 5G illustrates movement of a finger contact 550D drawing a path within the content region 512 of the drawing user interface 501. Although the illustrated path is a straight line in FIG. 5D, in various implementations, the path is not straight. The path extends from a first location to a second location and intersects the top three stroke drawing objects of the set of six stroke drawing objects 521E.

Figure 5H:
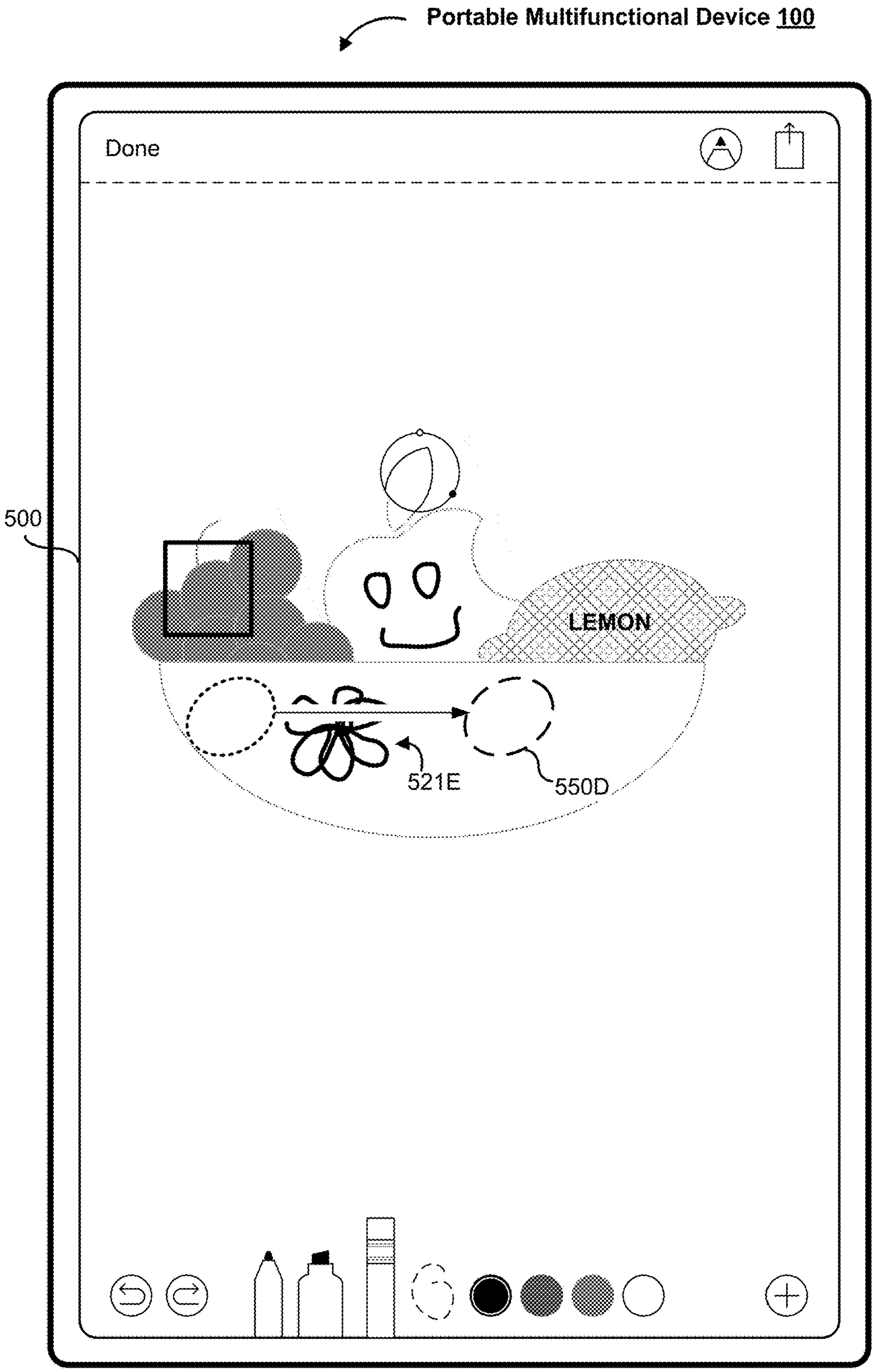

FIG. 5H illustrates the user interface 500 of FIG. 5G in response to detecting movement of the finger contact 550D drawing a path intersecting the top three stroke drawing objects of the set of six stroke drawing objects 521E, according to some implementations. In FIG. 5H, portions of the top three stroke drawing objects that intersect the path cease to be displayed without ceasing to display portions that do not intersect the path. In contrast to the deletion tool that deletes drawing objects intersecting a path, the eraser tool deletes portions of the drawings objects that intersect the path without deleting portions that do not intersect the path.

Figure 5I:
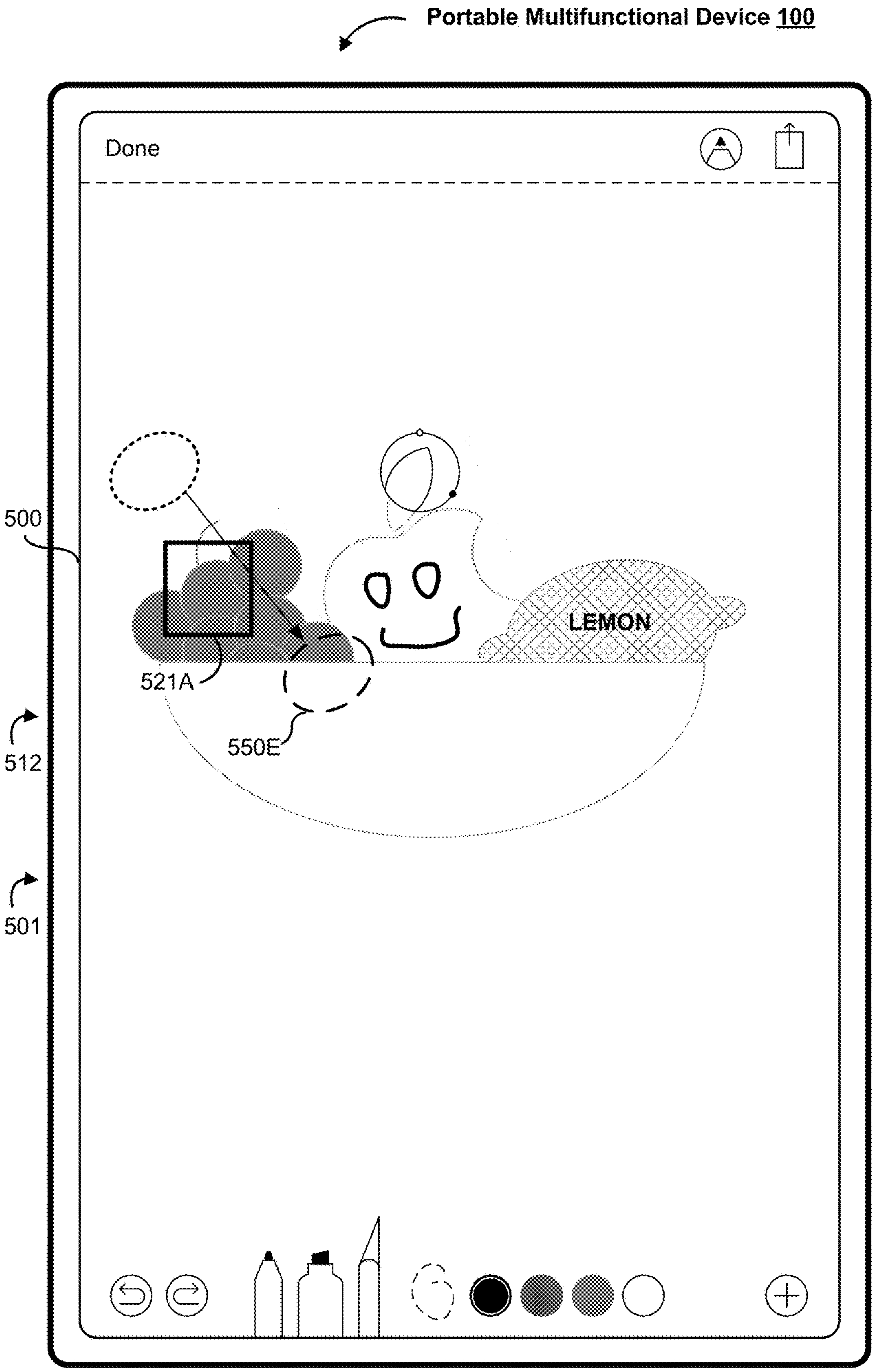

FIG. 5I illustrates the user interface 500 of FIG. 5F with movement of a finger contact 550E having been detected drawing a path within the content region 512 of the drawing user interface 501. Although the illustrated path is a straight line in FIG. 5I, in various implementations, the path is not straight. The path extends from a first location to a second location and intersects the square drawing object 521A. However, the square drawing object 521A continues to be displayed (e.g., because the path does not meet object deletion criteria).

In various implementations, in accordance with a determination that a speed of a contact drawing the path within the drawing user interface 501 exceeds a speed threshold, the device 100 ceases to display drawing objects that intersect the path and, in accordance with a determination that the speed of the contact does not exceed the speed threshold, the device 100 continues to display the drawing objects that intersect the path. Accordingly, a quick swipe through a drawing object (even with the deletion tool selected) does not delete the object. In some embodiments, the speed of the contact is determined separately for each drawing object intersecting the path. Thus, if the speed of the contact while moving over a first object is above the speed threshold (e.g., the path meets object deletion criteria), the first object is deleted and if the speed of the contact while moving over a second object is below the speed threshold (e.g., the path does not meet the object deletion criteria), then the second object is not deleted.

Figure 5J:
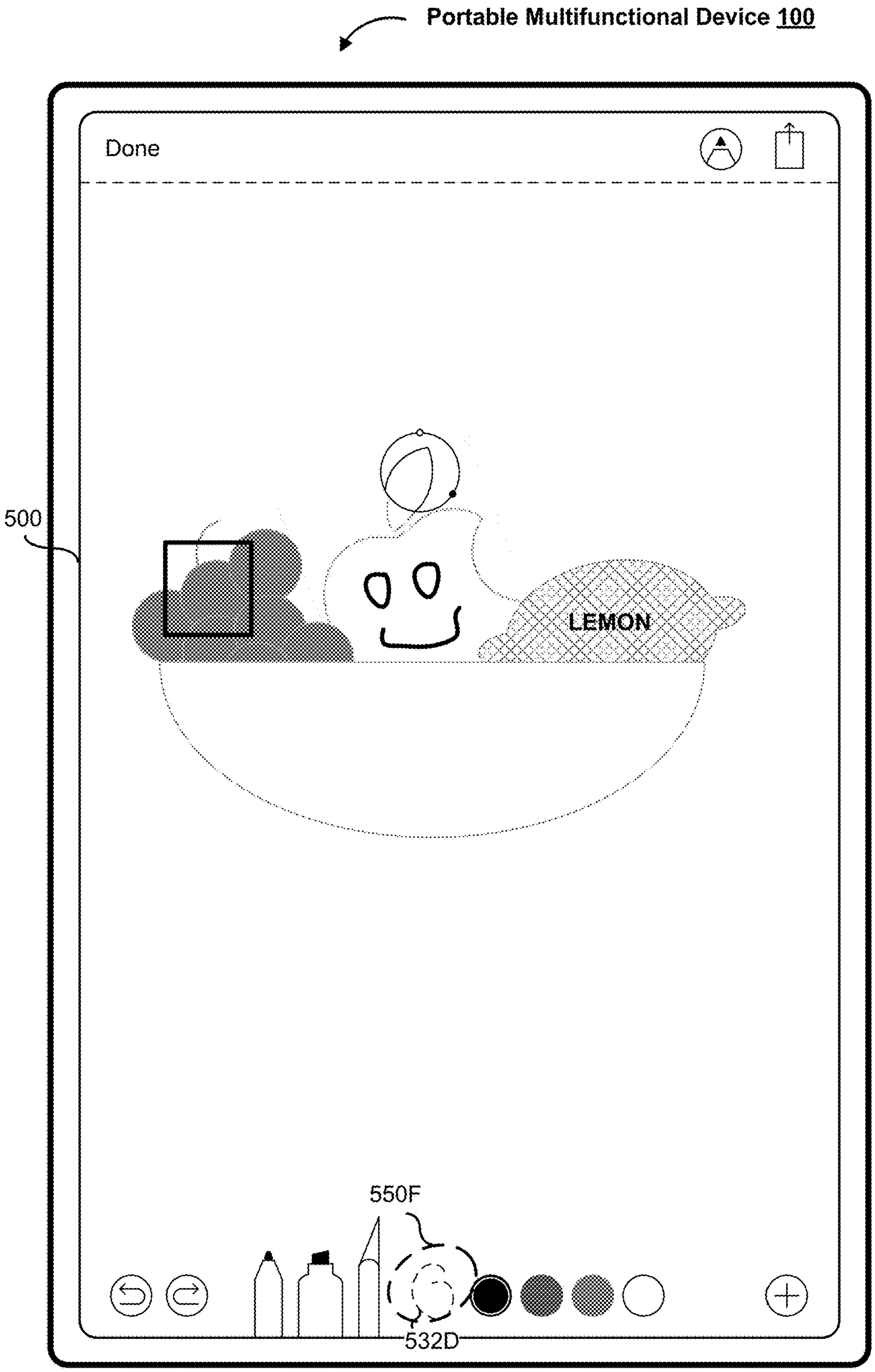
Figure 5K:
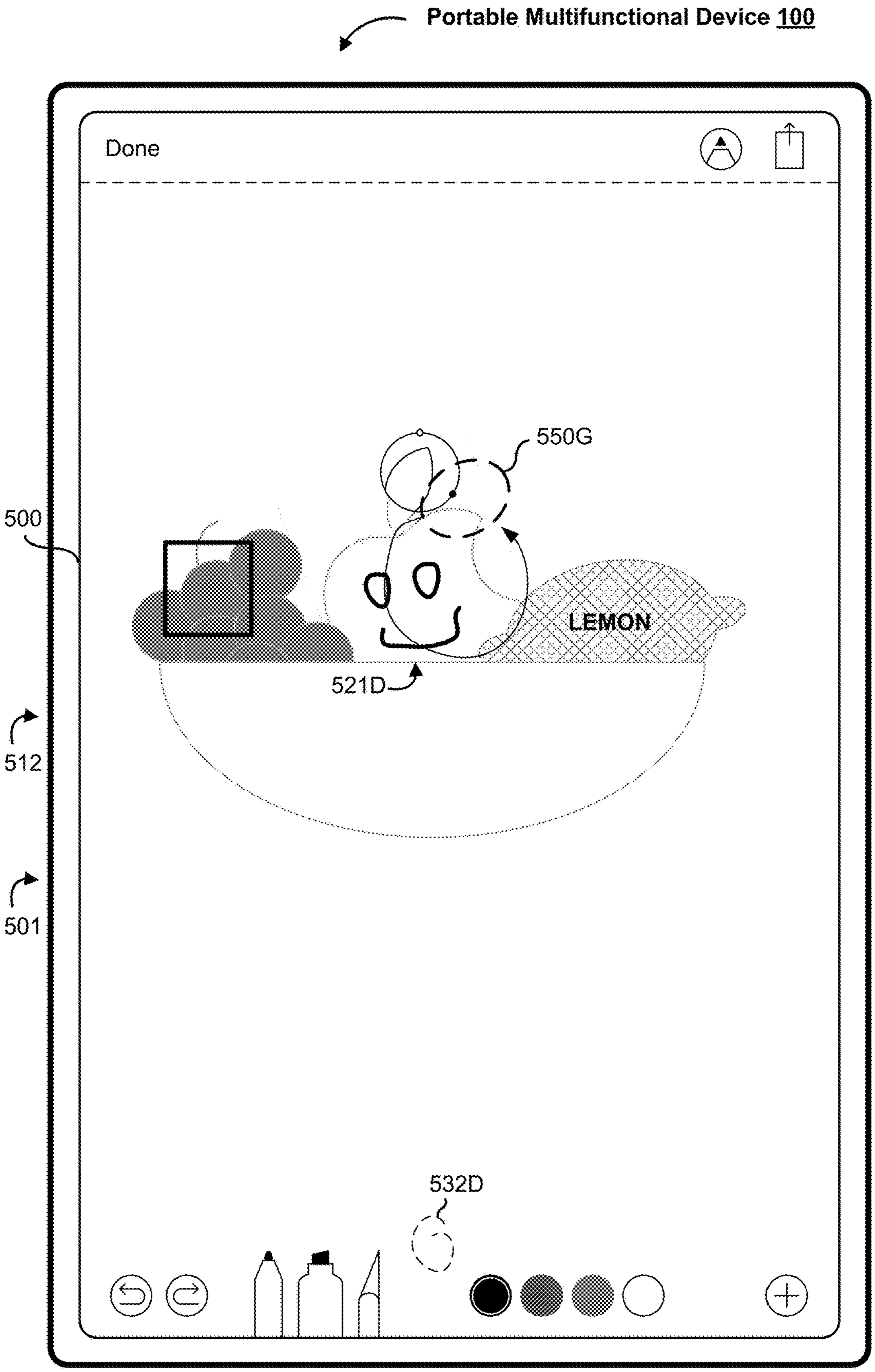

FIG. 5J illustrates the user interface 500 of FIG. 5I with a finger contact 550F detected at the location of the selection tool selection affordance 532D. FIG. 5K illustrates the user interface 500 of FIG. 5J in response to detecting the finger contact 550F at the location of the selection tool selection affordance 532D. In FIG. 5K, the selection tool selection affordance 523D is changed (e.g., raised) to indicate that a selection tool has been selected. FIG. 5K illustrates movement of a finger contact 550G drawing a path within the content region 512 of the drawing user interface 501. The path extends from a first location to a second location and intersects two of the stroke drawing objects of the set of three stroke drawing objects 521D.

Figure 5L:
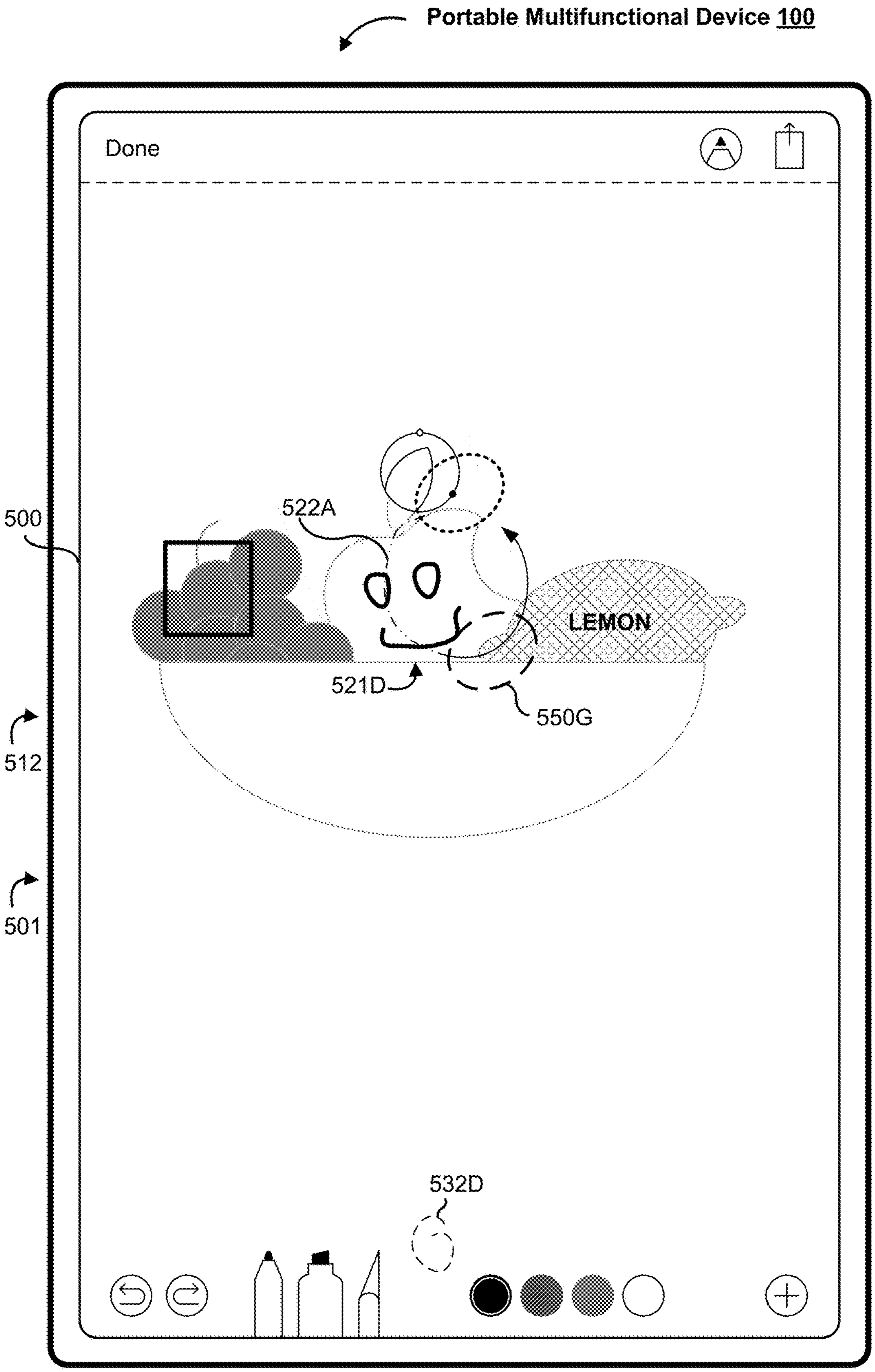

FIG. 5L illustrates the user interface 500 of FIG. 5K in response to detecting movement of the finger contact 550G drawing a portion of the path. While the finger contact 550G moves along the path, a selection path preview graphic 522A is displayed at locations at which the finger contact 550G is detected. In various implementations, the selection path preview graphic has similar visual characteristics to the selection path graphic 522B described below.

Figure 5M:
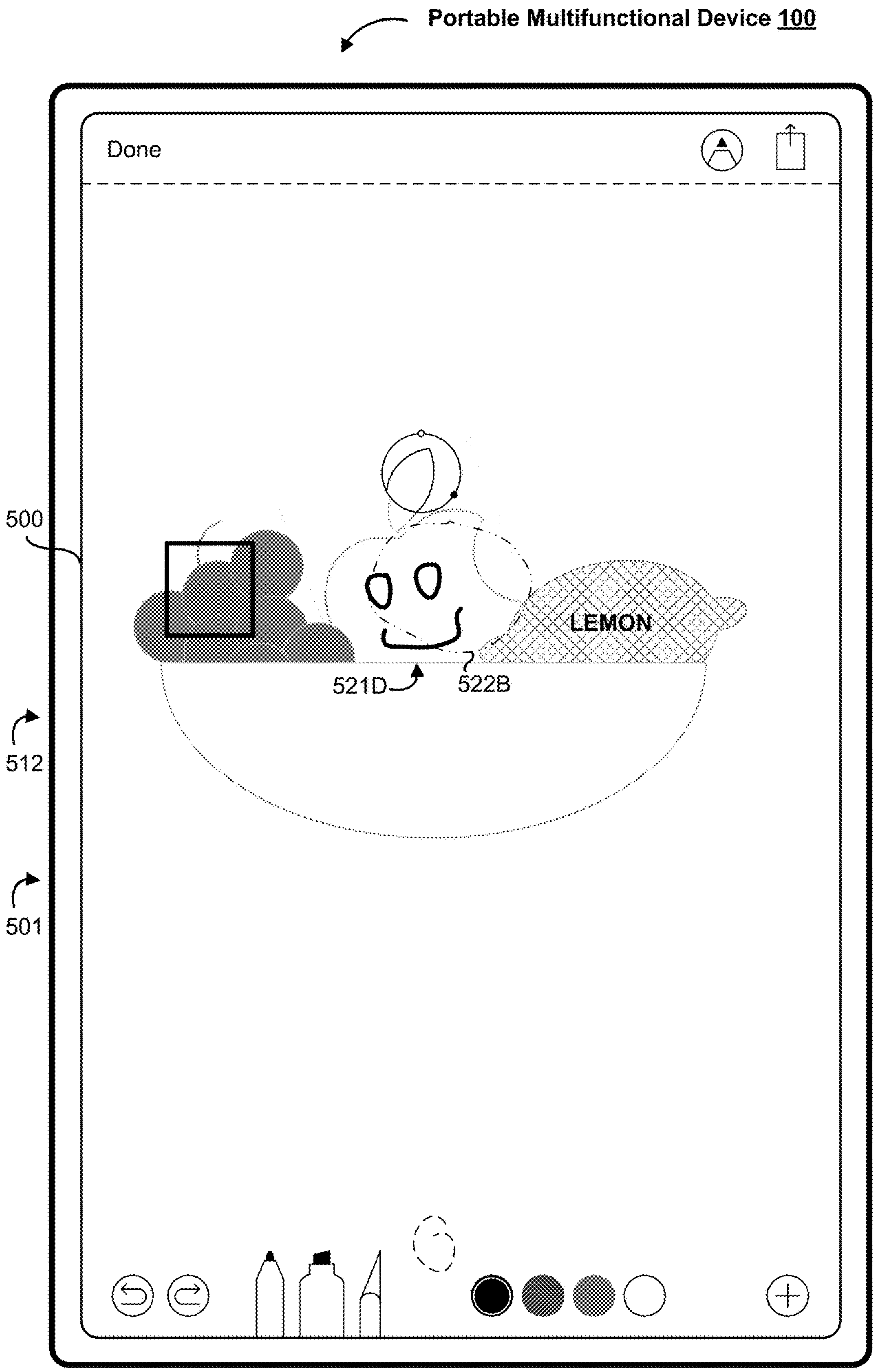

FIG. 5M illustrates the user interface 500 of FIG. 5L in response to detecting movement of the finger contact 550G completing the path intersecting two of the stroke drawing objects of the set of three stroke drawing objects 521D. In response to detecting movement of the finger contact 550G, a selection path is defined based on the path. In various implementations, the selection path is the same as the drawn path. In various implementations, the selection path is an extension of the drawn path, e.g. to close a loop. Thus, in various implementations, the selection path is a closed shape based on the shape of the drawn path. In FIG. 5K, the content region 512 of the drawing user interface 501 includes a selection path graphic 522B corresponding to the selection path. In various implementations, the selection path graphic 522B includes partially transparent (e.g., 50% opacity) alternating shaded (e.g., black) and white dashes. In such a way, the selection path graphic 522B can be seen over any color in underlying content. In various implementations, the selection path graphic is animated, e.g., such that the alternating shaded and white dashes appear to rotate about the selection path.

The selection path graphic 522B provides a visual indication to a user as to which drawing objects are selected by the selection tool. In various implementations, drawing objects intersecting the selection path are selected. In various implementations, drawing objects intersecting those intersecting the selection path are also selected. In various implementations, drawing objects encompassed by the selection path are also selected. Thus, in FIG. 5M, all three stroke drawing objects 521D are selected, two by virtue of intersecting the selection path and the third by virtue of being encompassed by the selection path.

Figure 5N:
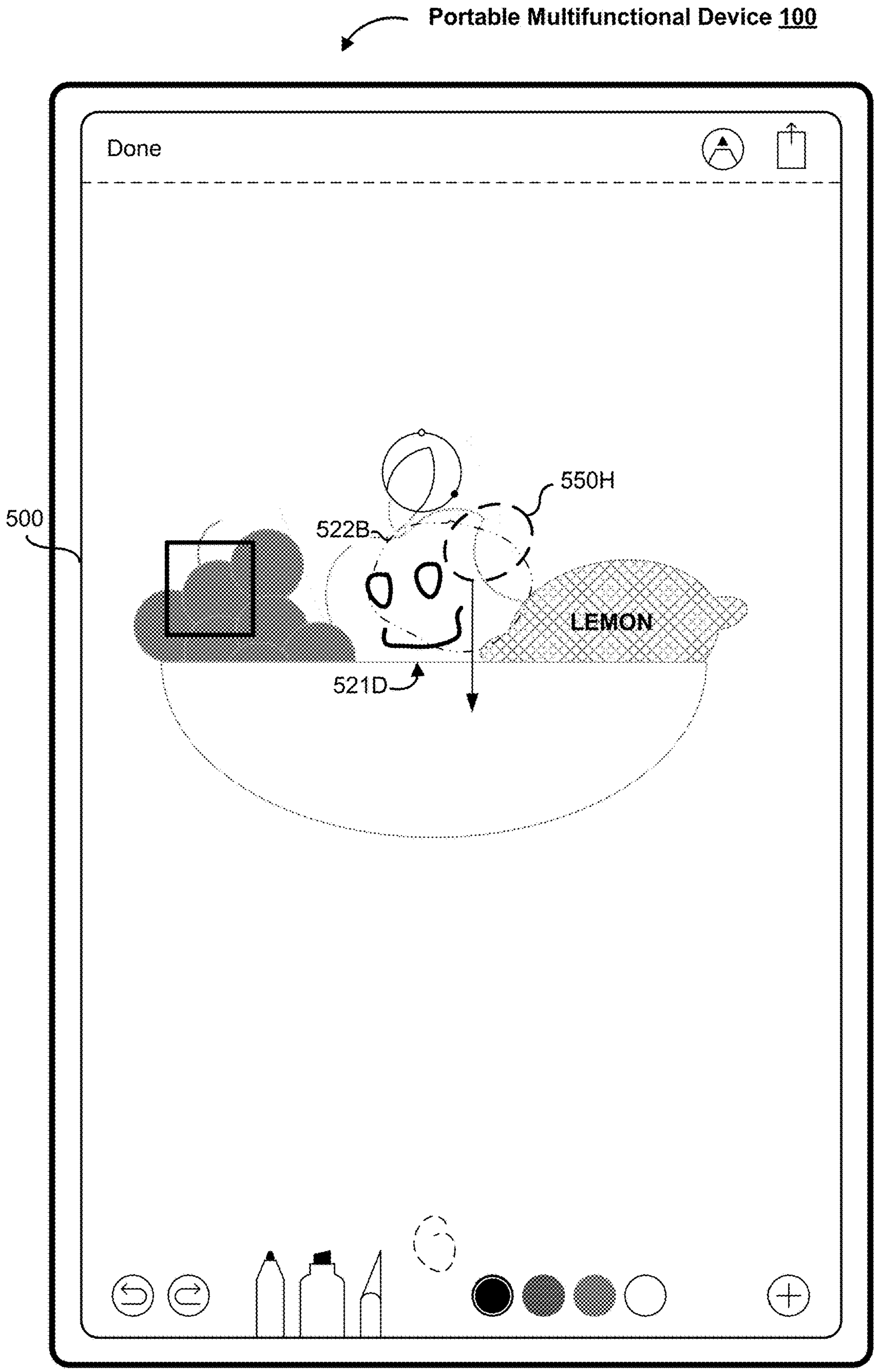
Figure 5O:
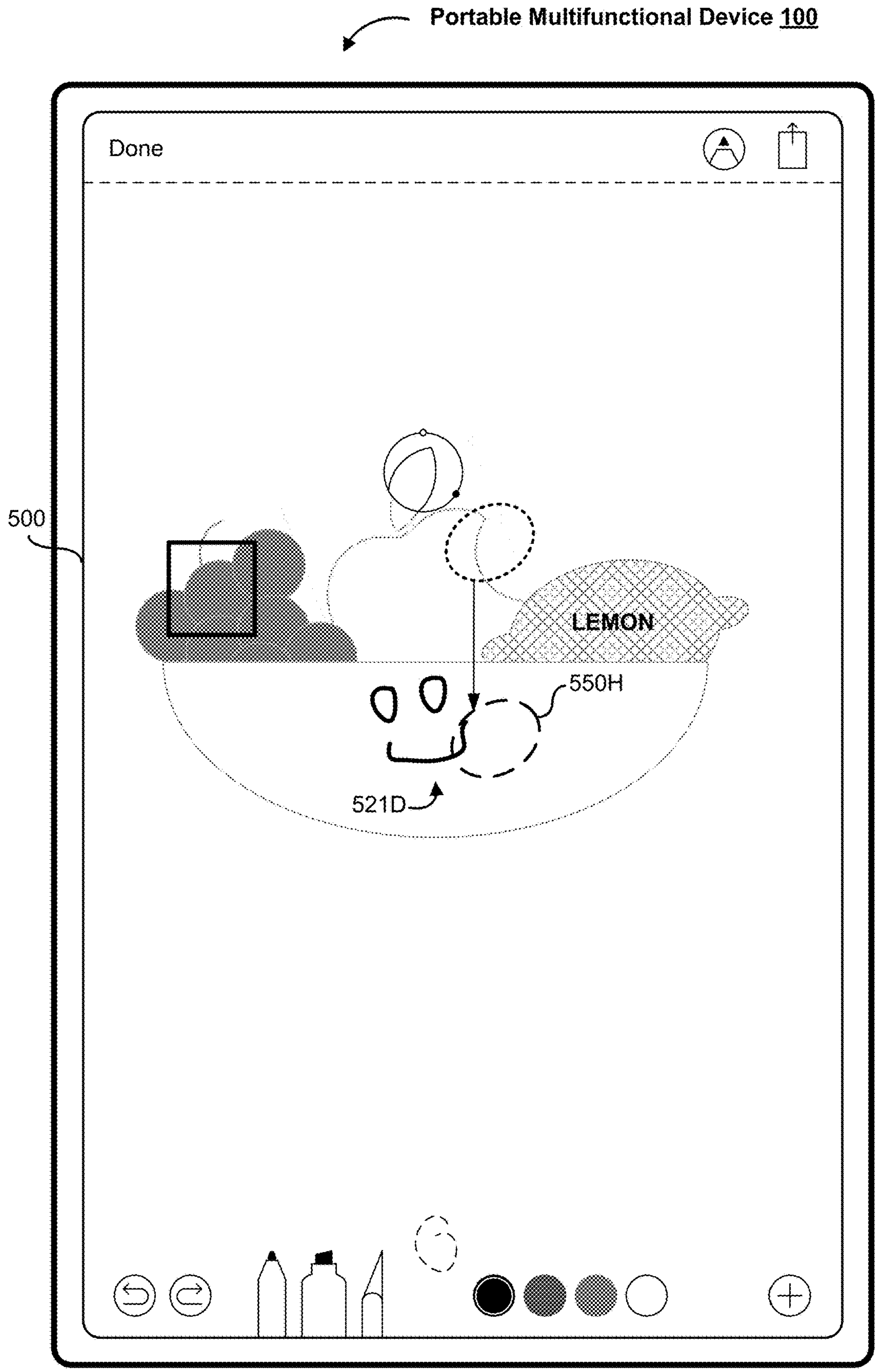

FIG. 5N illustrates the user interface of FIG. 5M with a finger contact 550H detected at a location of the selection path graphic 522B and moving to another location. FIG. 5O illustrates the user interface 500 of FIG. 5N in response to detecting movement of the finger contact 550H. In FIG. 5O, the selection path graphic 522B ceases to be displayed and the selected drawing objects (e.g., the stroke drawing objects 521D) are moved in accordance with the movement of the contact 550H. Although the selection path graphic 522B ceases to be displayed, in various implementations, the selected drawing objects are displayed with a drop-shadow, or other visual indicator that was not displayed before the selected drawing objects were selected, to provide a visual indication of which drawing objects are selected. In various implementations, the selection path graphic 522B is replaced with an alternative visual indicator of selection.

Figure 5P:
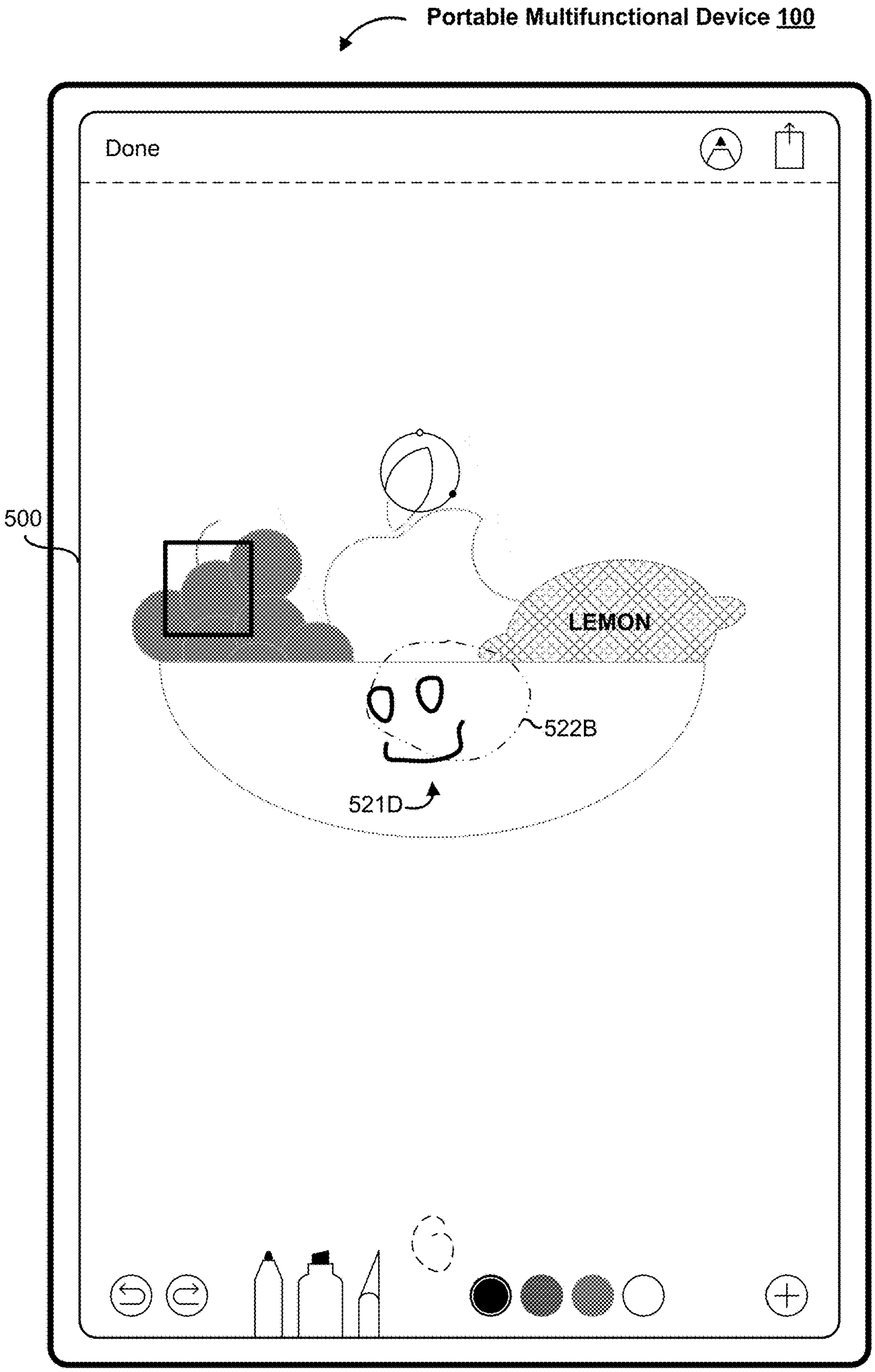

FIG. 5P illustrates the user interface 500 in response to detecting liftoff of the finger contact 550H. In FIG. 5P, the selection path graphic 522B is again displayed (and the drop-shadow or other visual indicator ceases to be displayed to indicate that the drawing objects are no longer selected).

Figure 5Q:
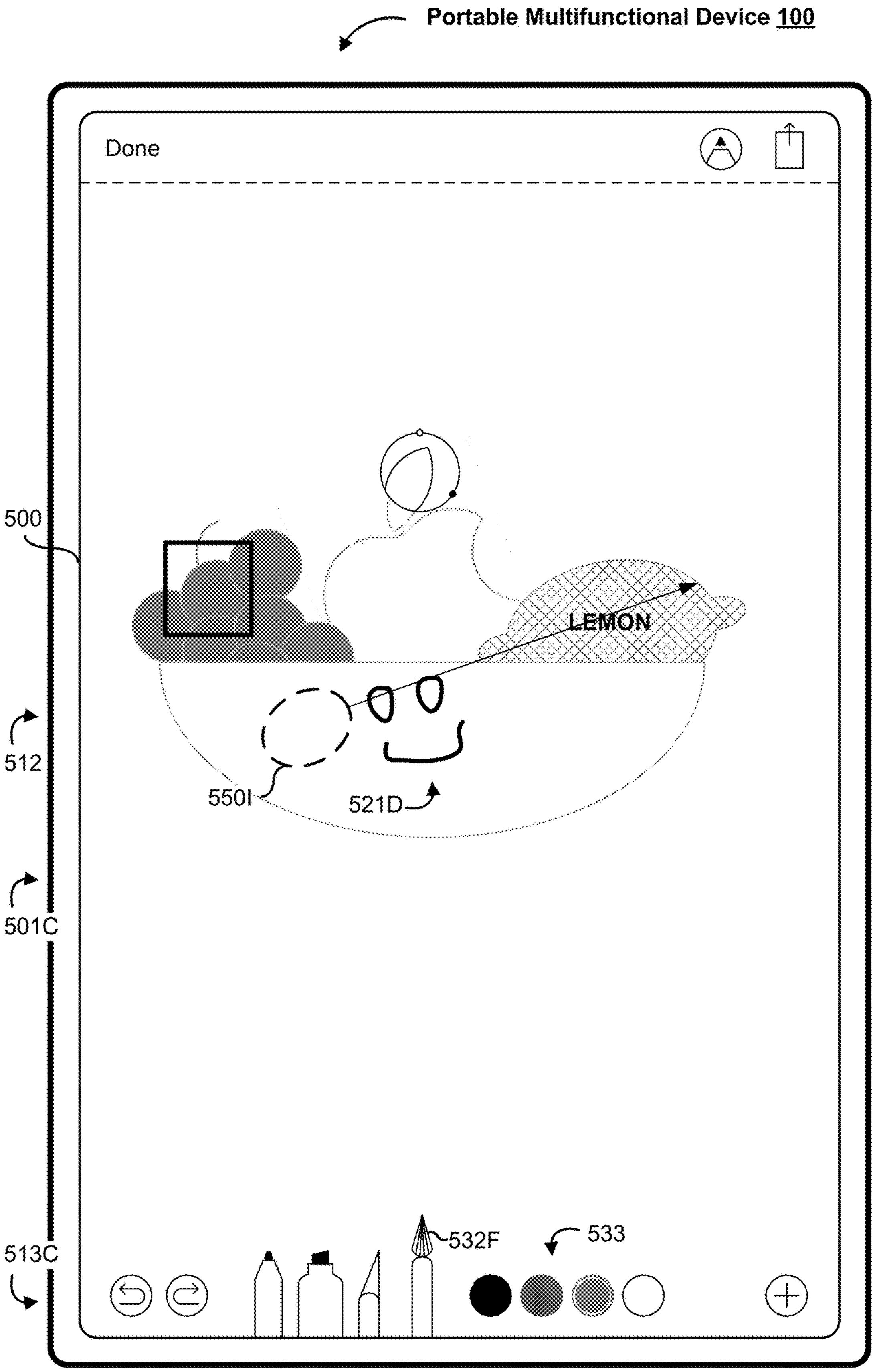

FIG. 5Q illustrates the user interface 500 displaying a drawing user interface 501C that includes a toolbar region 513C with a coloring tool selection affordance 532F as opposed to the selection tool selection affordance 532D of the drawing user interface 501 of FIG. 5A. In FIG. 5Q, the color selection affordances 533 indicate that a gray color is selected (as opposed to the black color selected in FIG. 5A).

FIG. 5Q illustrates movement of a finger contact 550I drawing a path within the content region 512 of the drawing user interface 501. Although the illustrated path is a straight line in FIG. 5Q, in various implementations, the path is not straight. The path extends from a first location to a second location and intersects the top two stroke drawing objects of the set of three stroke drawing objects 521D and the text drawing object 521C.

Figure 5R:
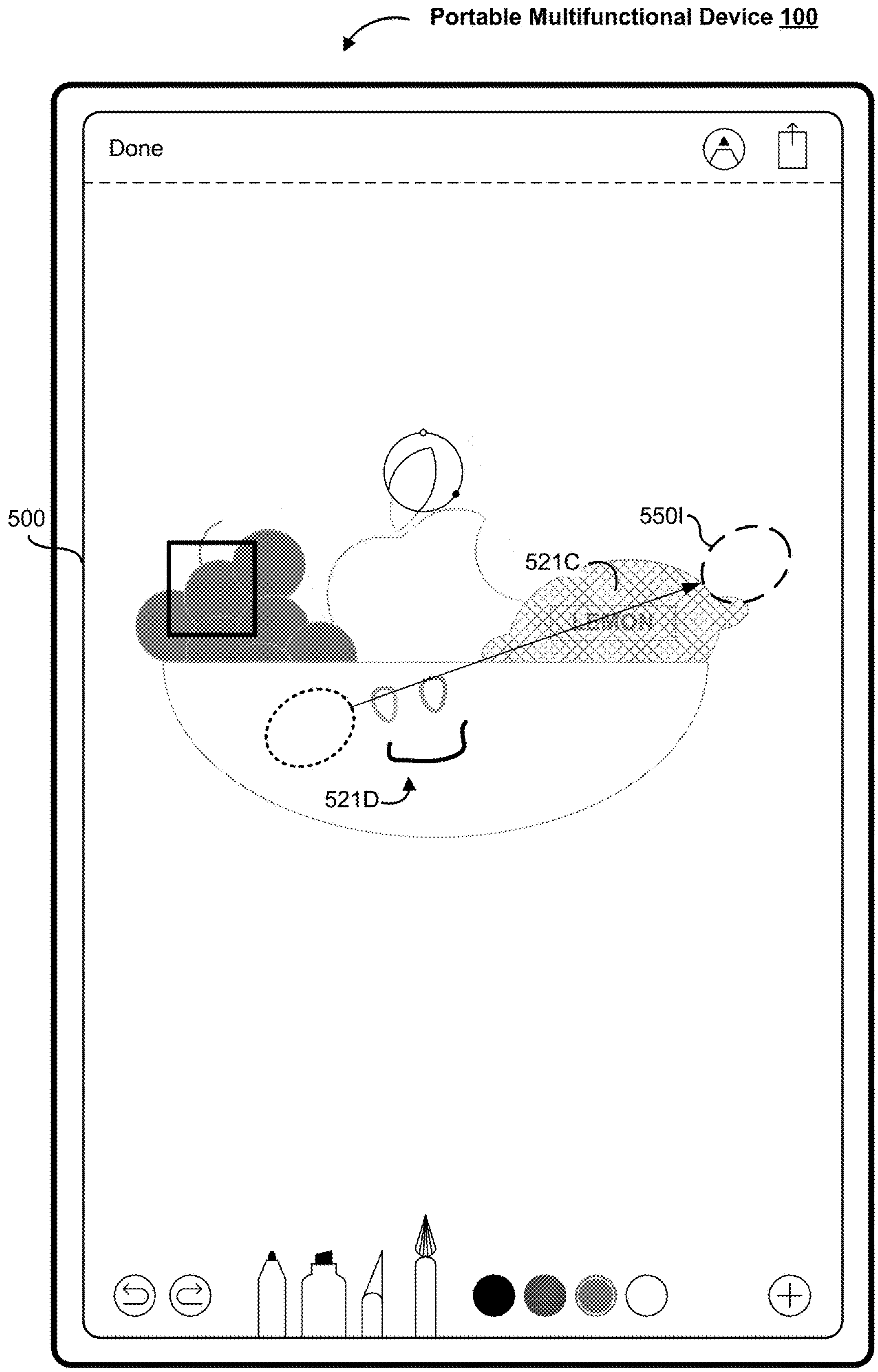

FIG. 5R illustrates the user interface 500 in response to detecting movement of the finger contact 550I drawing a path intersecting the top two stroke drawing objects of the set of three stroke drawing objects 521D and the text drawing object 521C. In FIG. 5R, the top two stroke drawing objects of the set of three stroke drawing objects 521D and the text drawing object 521C have changed color (e.g., from black to gray).

Figure 5S:
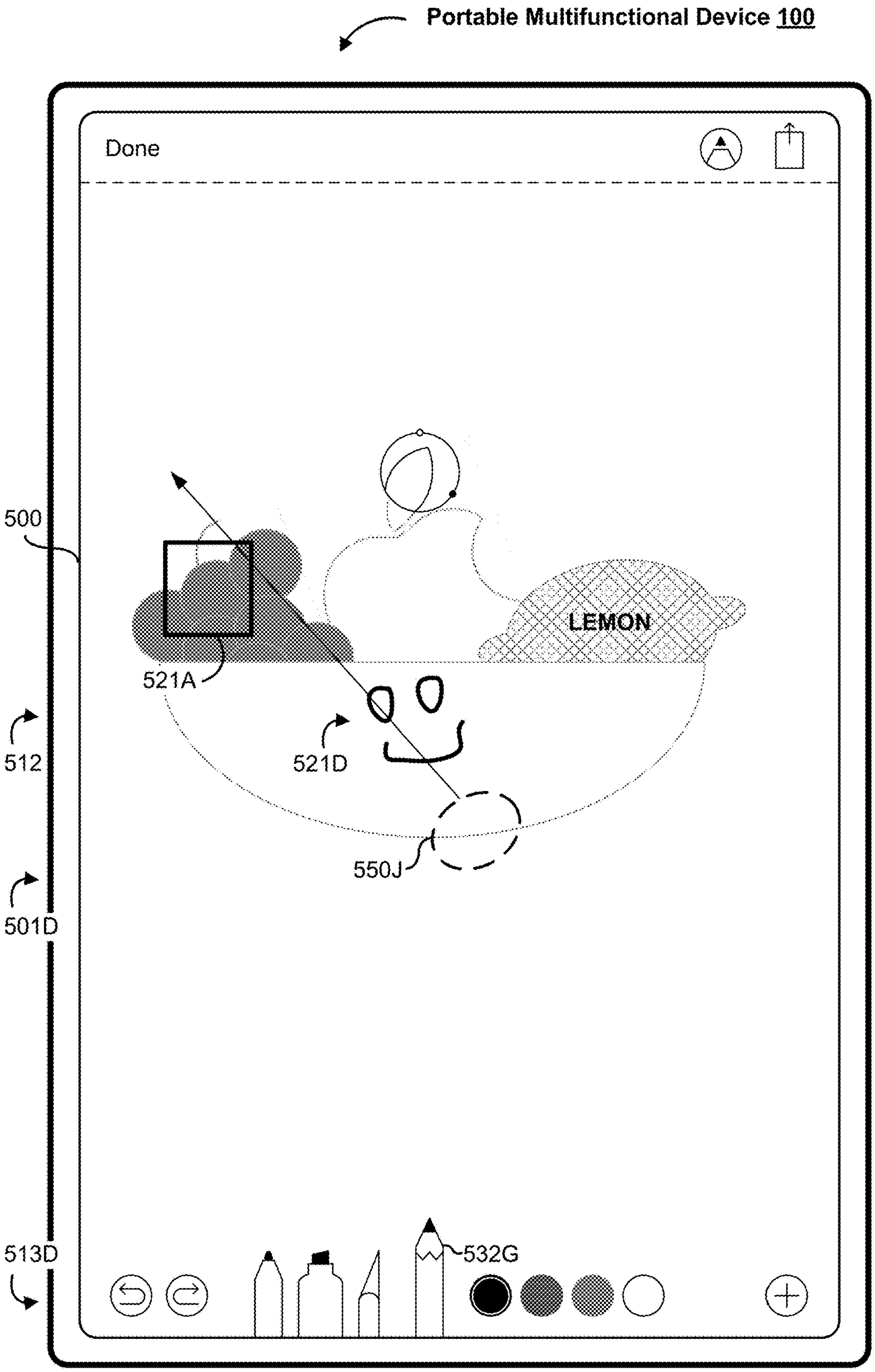

FIG. 5S illustrates the user interface 500 displaying a drawing user interface 501D that includes a toolbar region 513D with a thinning tool selection affordance 532G as opposed to the selection tool selection affordance 532D of the drawing user interface 501 of FIG. 5A. FIG. 5S illustrates movement of a finger contact 550J drawing a path within the content region 512 of the drawing user interface 501. Although the illustrated path is a straight line in FIG. 5S, in various implementations, the path is not straight. The path extends from a first location to a second location and intersects the left two stroke drawing objects of the set of three stroke drawing objects 521D and the square drawing object 521A.

Figure 5T:
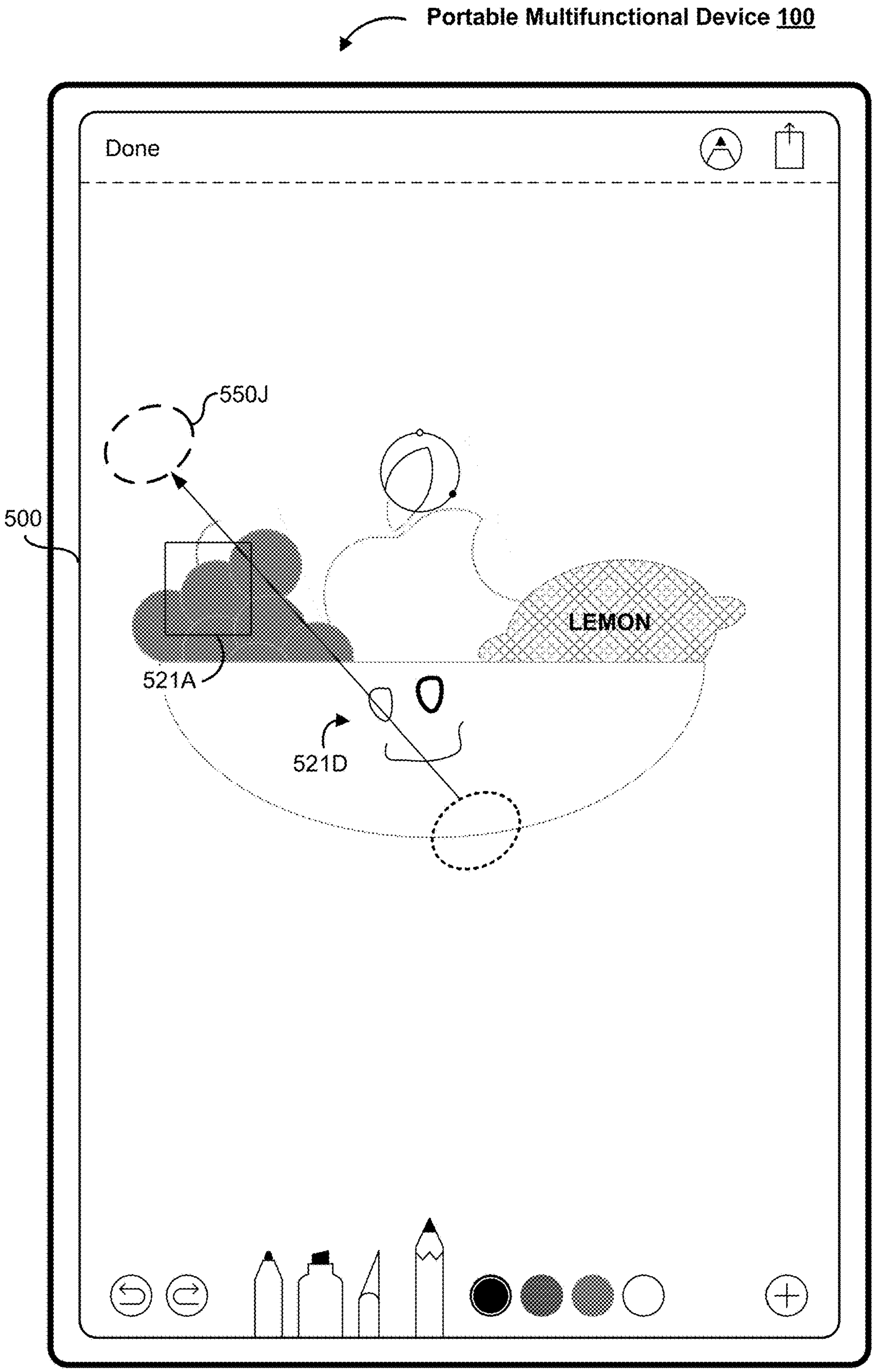

FIG. 5T illustrates the user interface 500 in response to detecting movement of the finger contact 550J drawing a path intersecting the left two stroke drawing objects of the set of three stroke drawing objects 521D and the square drawing object 521A. In FIG. 5T, the left two stroke drawing objects of the set of three stroke drawing objects 521D and the square drawing object 521A have changed line width (e.g., the line width is reduced). In various implementations, a drawing tool is provided that changes a size of drawing objects intersecting a path. In various implementations, a sizing drawing tool changes one or more dimensions of the drawing objects (e.g., shrink or enlarge the drawing objects), changes a font size of the drawing objects, or change a line width of the drawing objects.

Figure 5U:
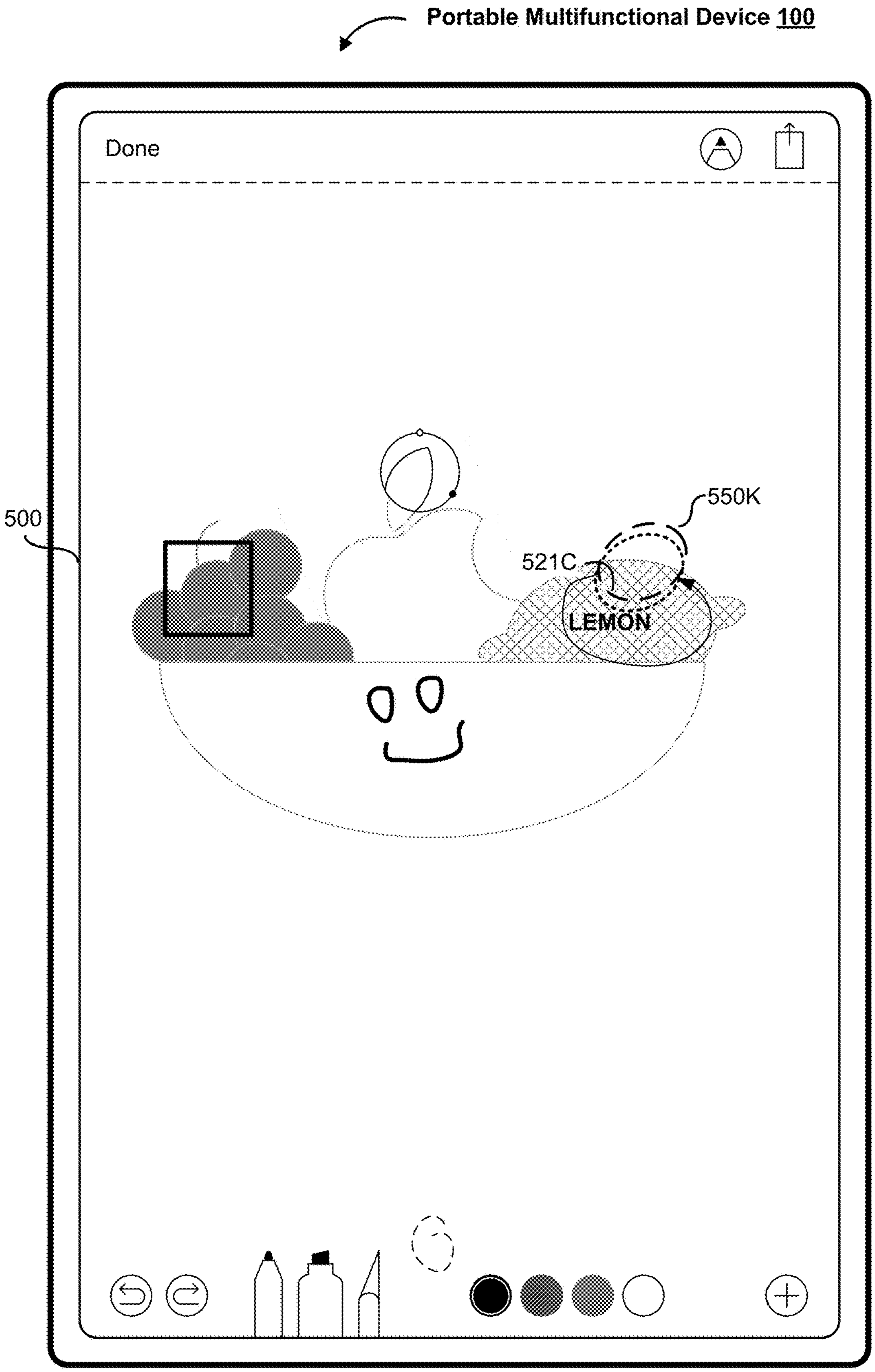
Figure 5V:
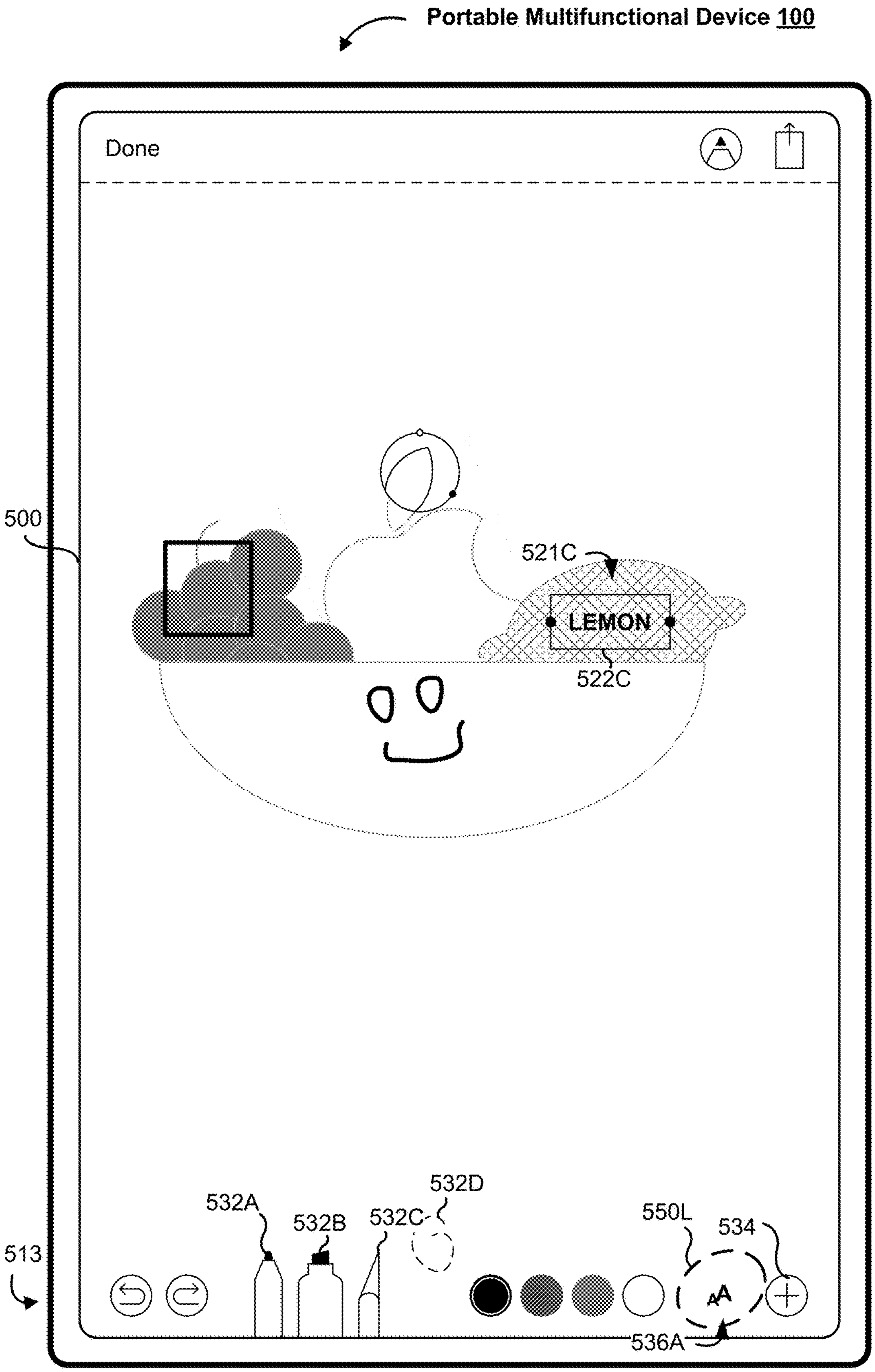

FIG. 5U illustrates the user interface 500 of FIG. 5P with movement of finger contact 550K drawing a path intersecting the text drawing object 521C. FIG. 5V illustrates the user interface 500 of FIG. 5U in response to detecting movement of the finger contact 550K drawing a path intersecting the text drawing object 521C. In FIG. 5V, the text drawing object 521C is selected (e.g., by the selection tool) as indicated by a selection perimeter 522C. Since a text drawing object is selected, the toolbar region 513 includes a text options affordance 536A. The text options affordance 536A is displayed between the plurality of drawing tool selection affordances 521A-531D and the toolbar menu affordance 534. The text options affordance 536A is displayed next to the toolbar menu affordance 534. FIG. 5V illustrates a finger contact 550L detected at a location of the text options affordance 536A.

Figure 5W:
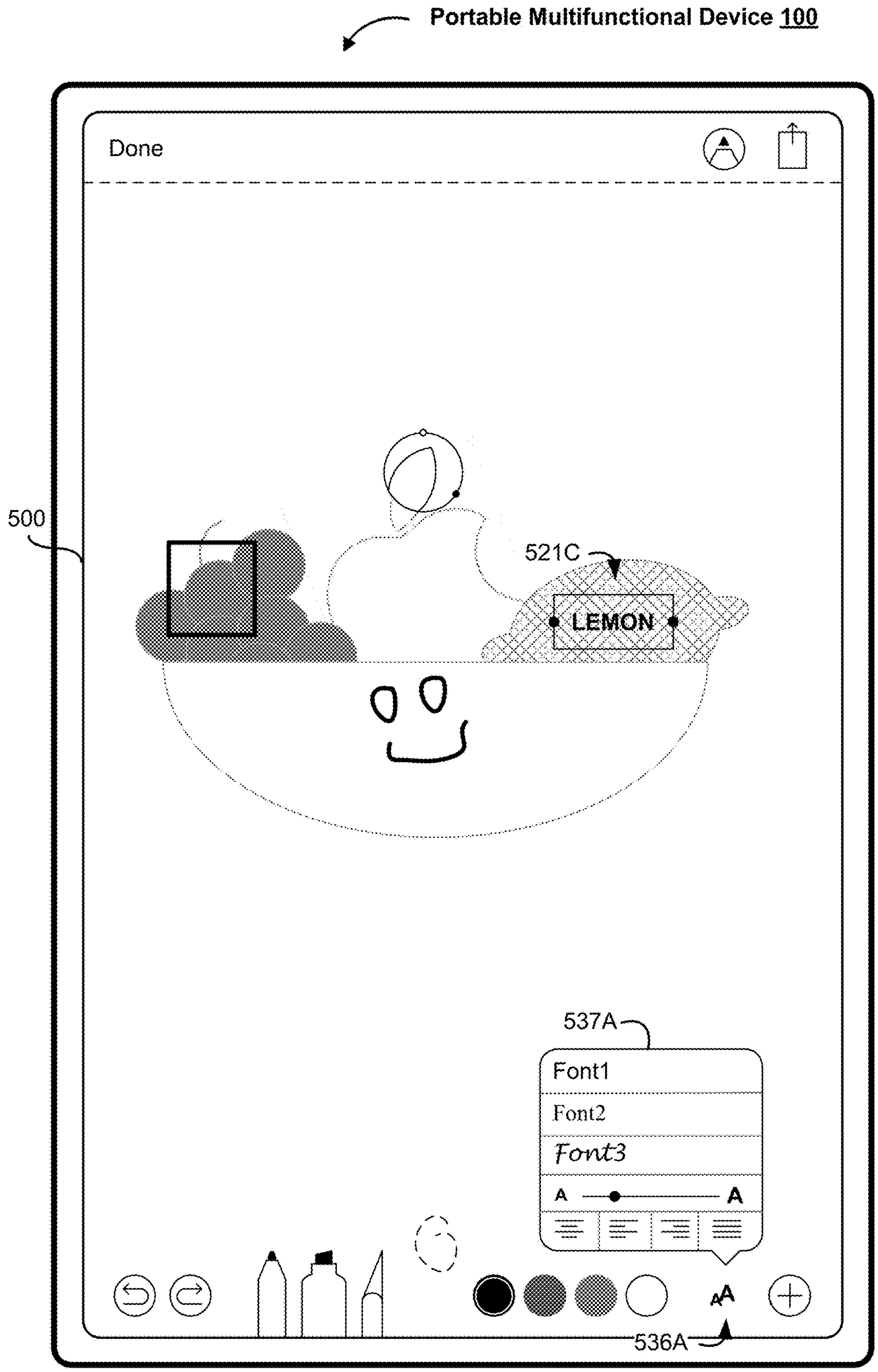

FIG. 5W illustrates the user interface 500 of FIG. 5V in response to detecting the finger contact 550L at the location of the text options affordance 536A. In FIG. 5V, a text options menu 537A is displayed including affordances for changing characteristics of the text drawing object 521C. In various implementations, the text options menu 537A includes affordances for changing a font of the text drawing object 521C, a font size of the text drawing object 521C, and a justification of the text drawing object 521C.

Figure 5X:
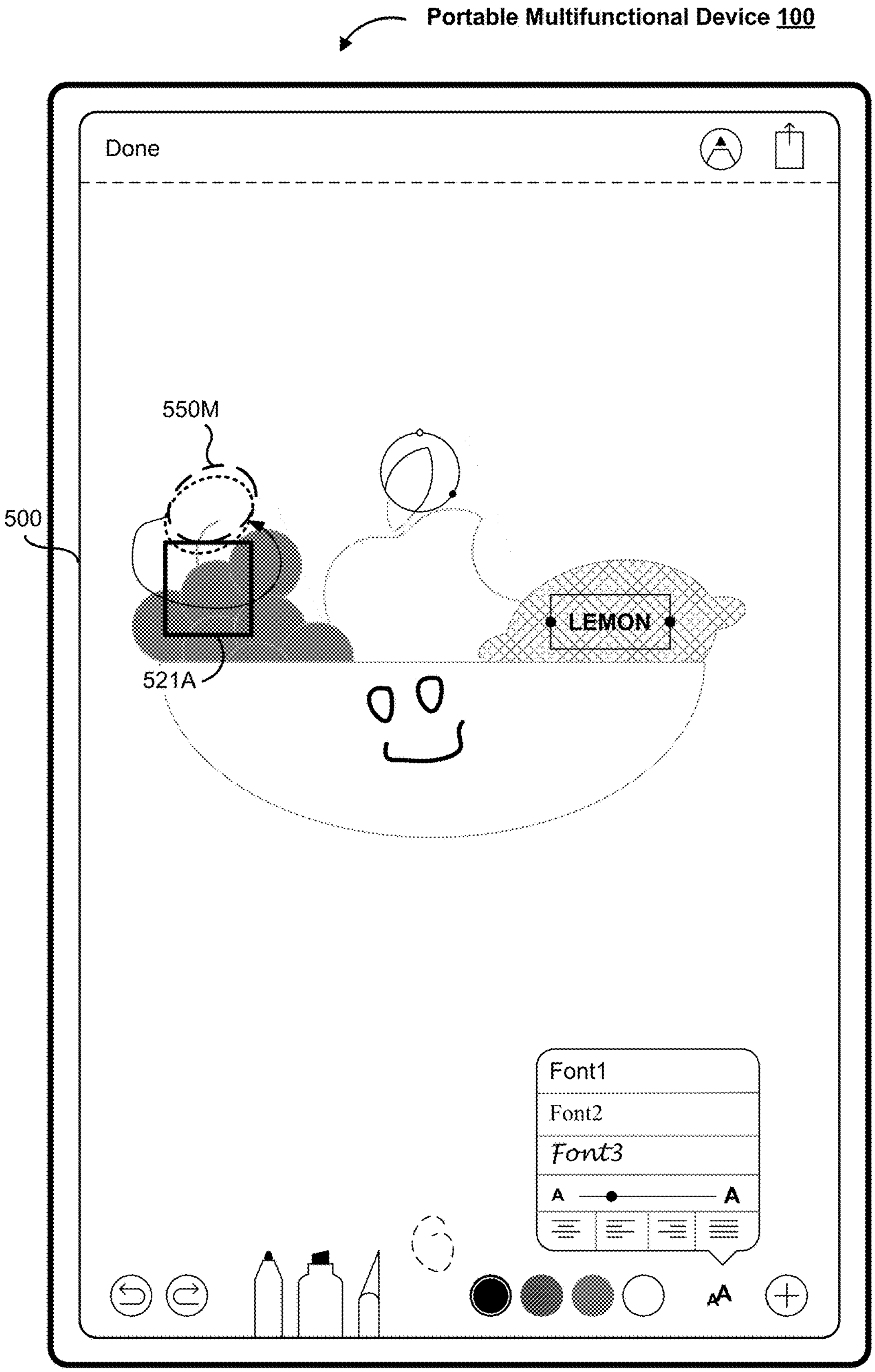
Figure 5Y:
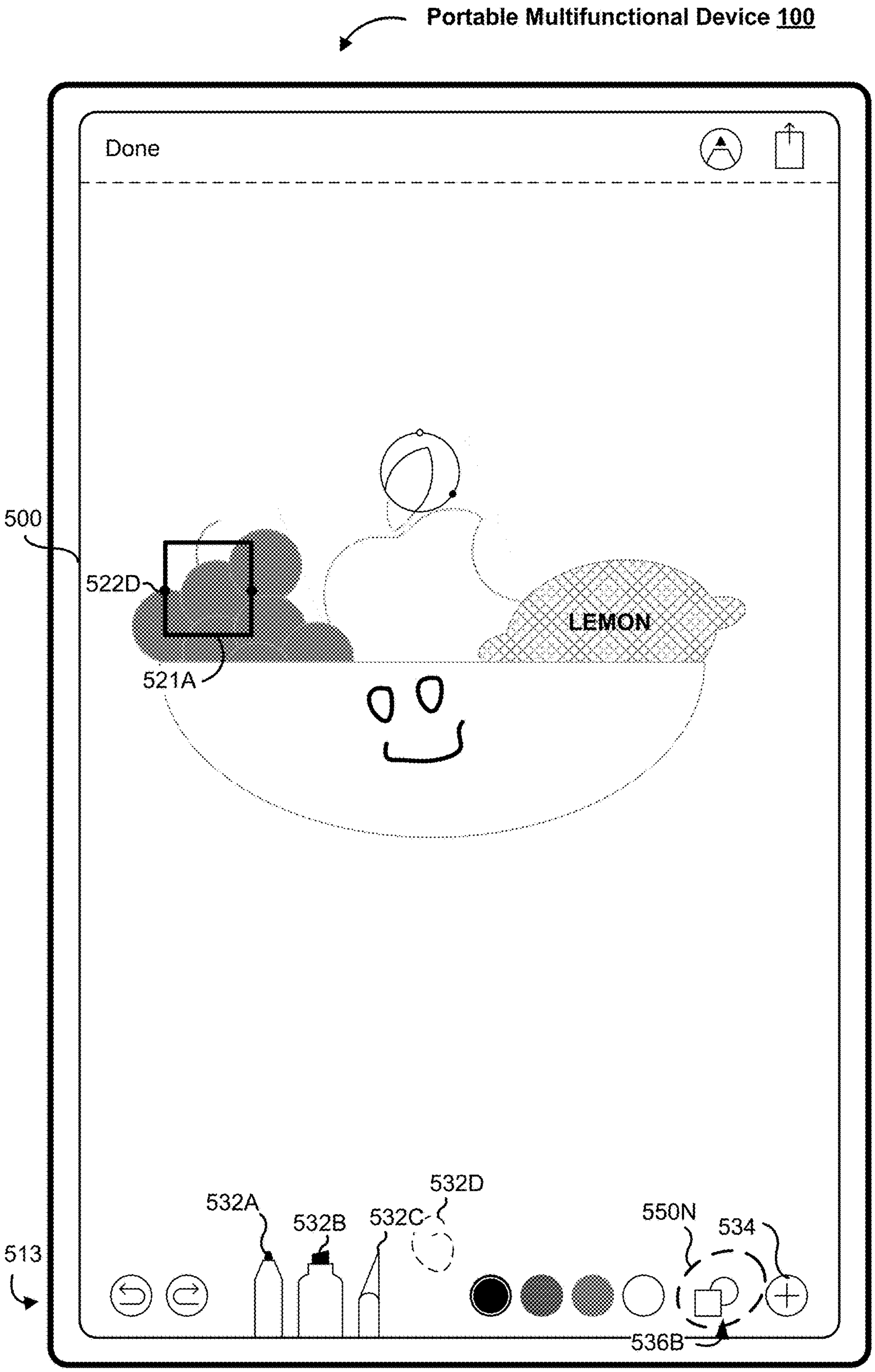

FIG. 5X illustrates the user interface 500 of FIG. 5W with movement of finger contact 550M drawing a path intersecting the square drawing object 521A. FIG. 5Y illustrates the user interface 500 of FIG. 5X in response to detecting movement of the finger contact 550M drawing a path intersecting the square drawing object 521A. In FIG. 5Y, the square drawing object 521C is selected (e.g., by the selection tool) as indicated by a selection indicia 522D. Since a shape drawing object is selected, the toolbar region 513 includes a shape options affordance 536B. The shape options affordance 536B is displayed between the plurality of drawing tool selection affordances 521A-531D and the toolbar menu affordance 534. The shape options affordance 536B is displayed next to the toolbar menu affordance 534. FIG. 5Y illustrates a finger contact 550N detected at a location of shape text options affordance 536A.

Figure 5Z:
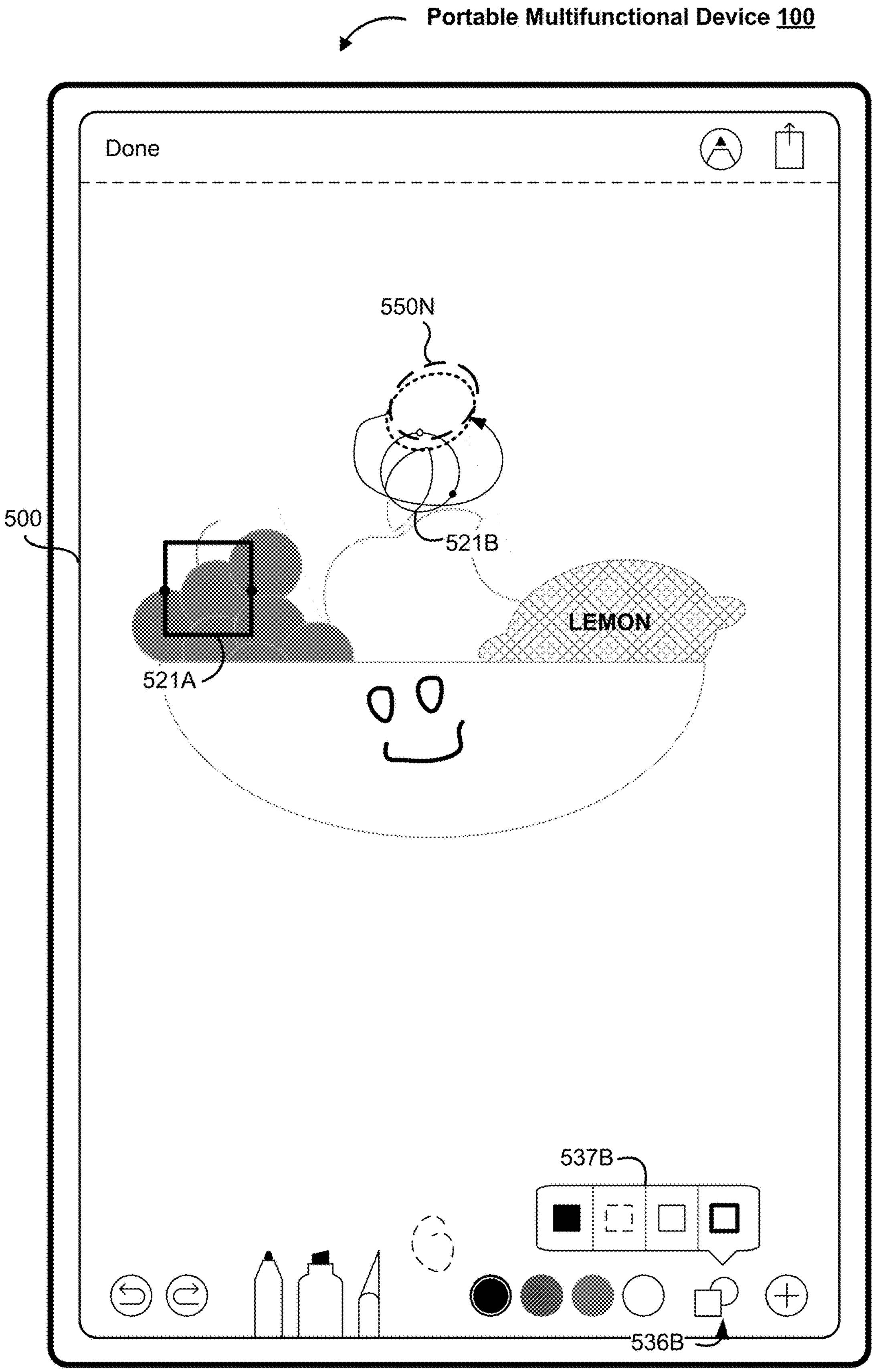
Figure 5A:
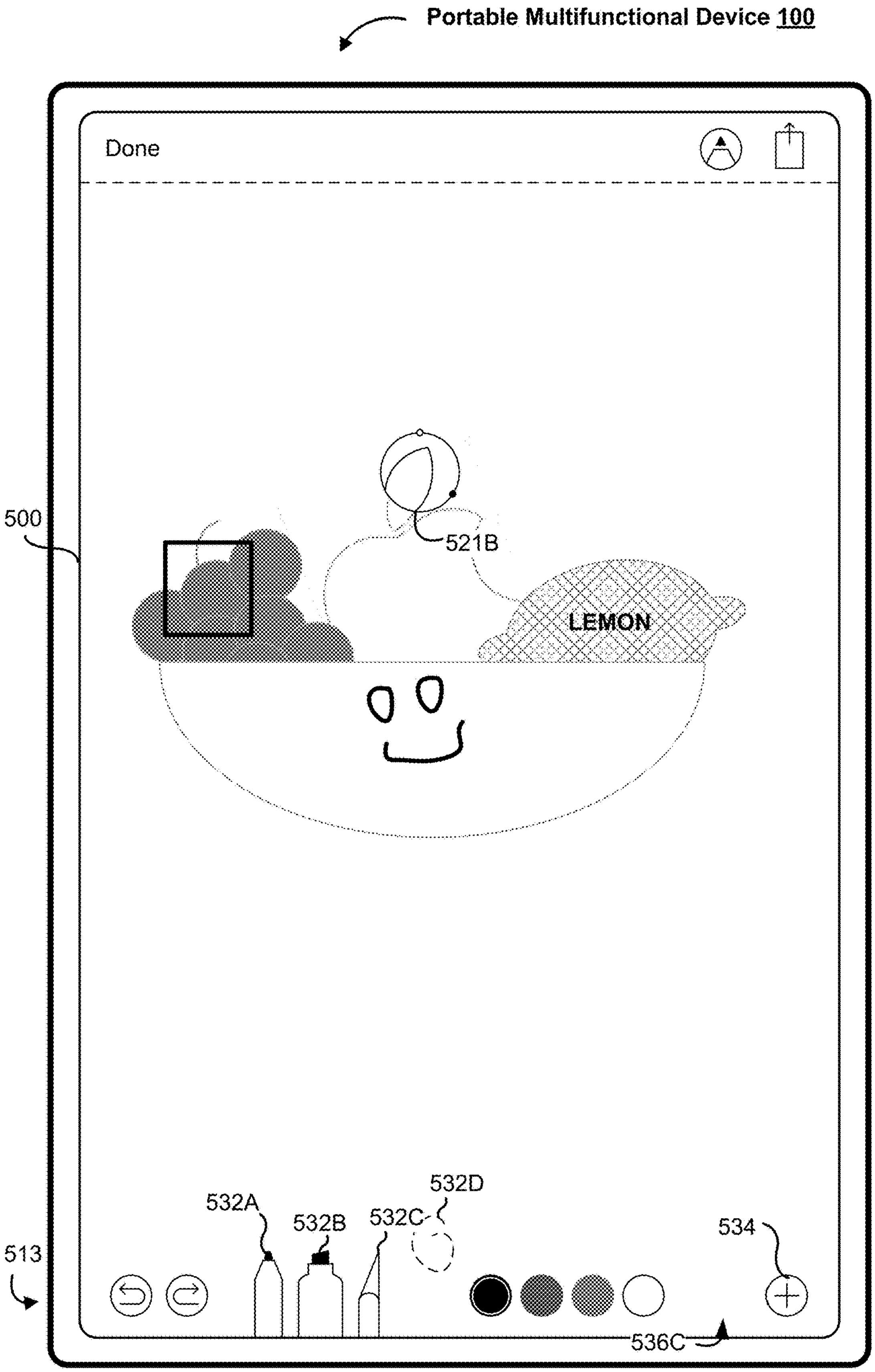
Figure 5A:
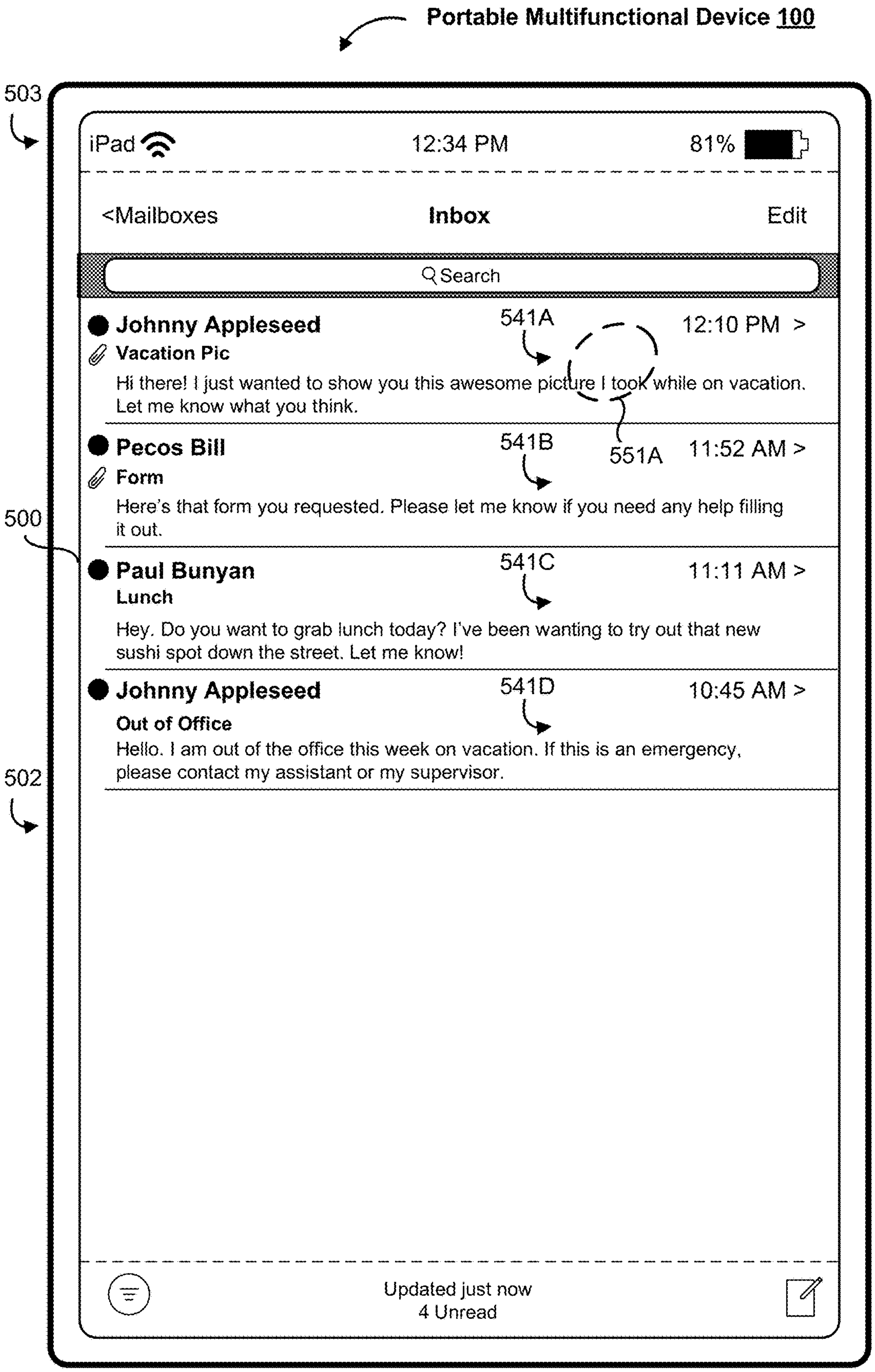
Figure 5A:
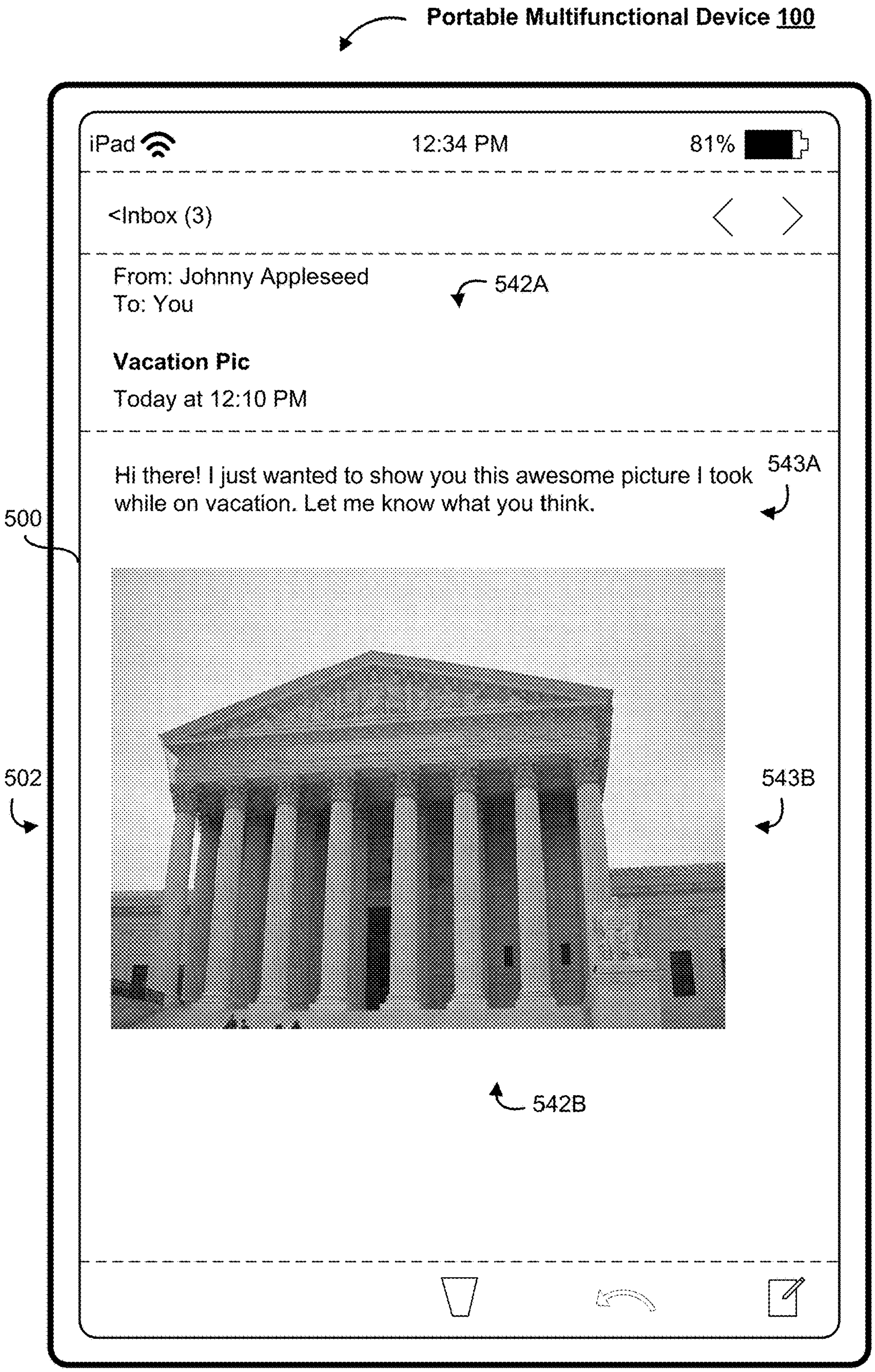
Figure 5A:
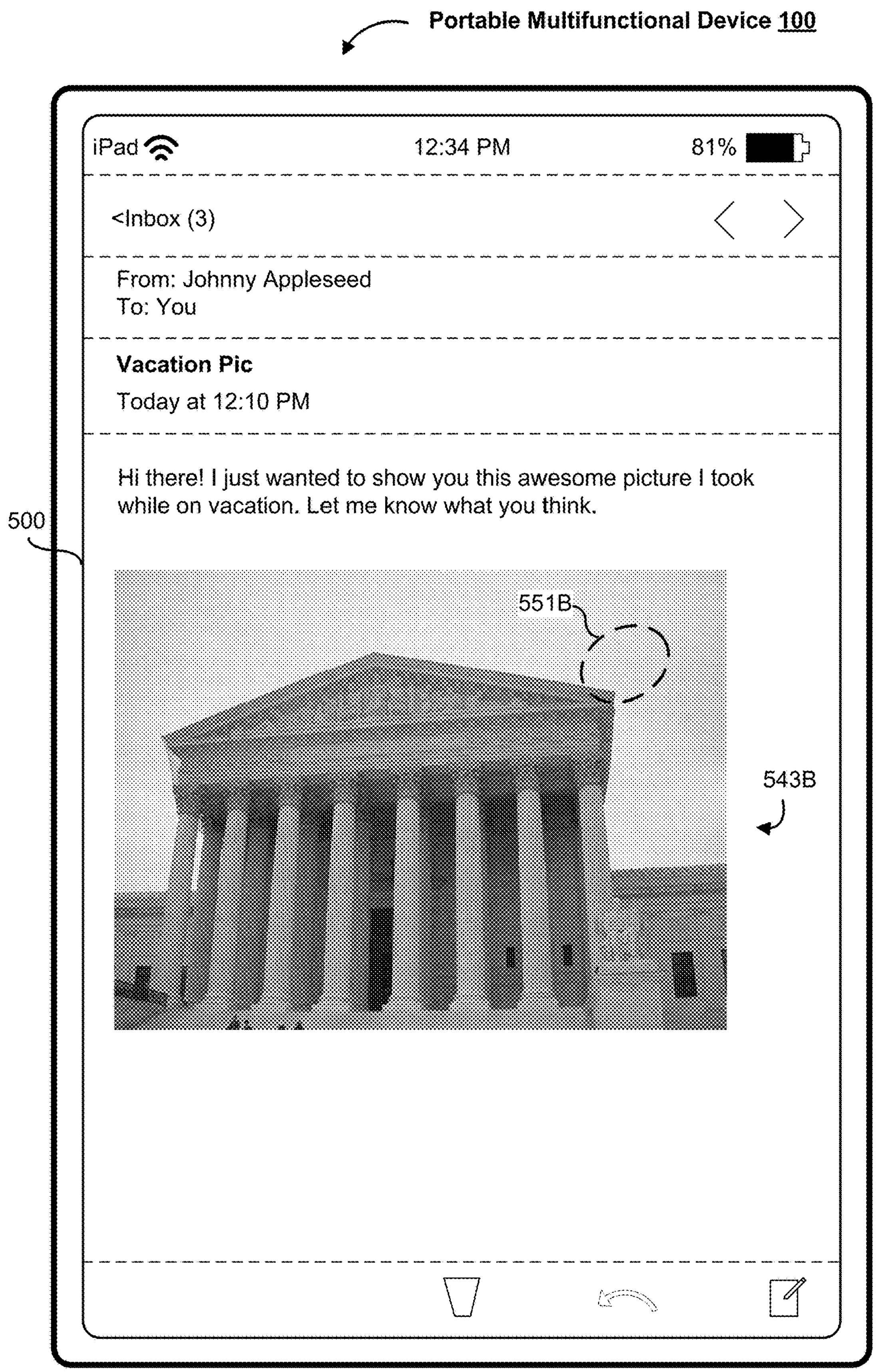
Figure 5A:
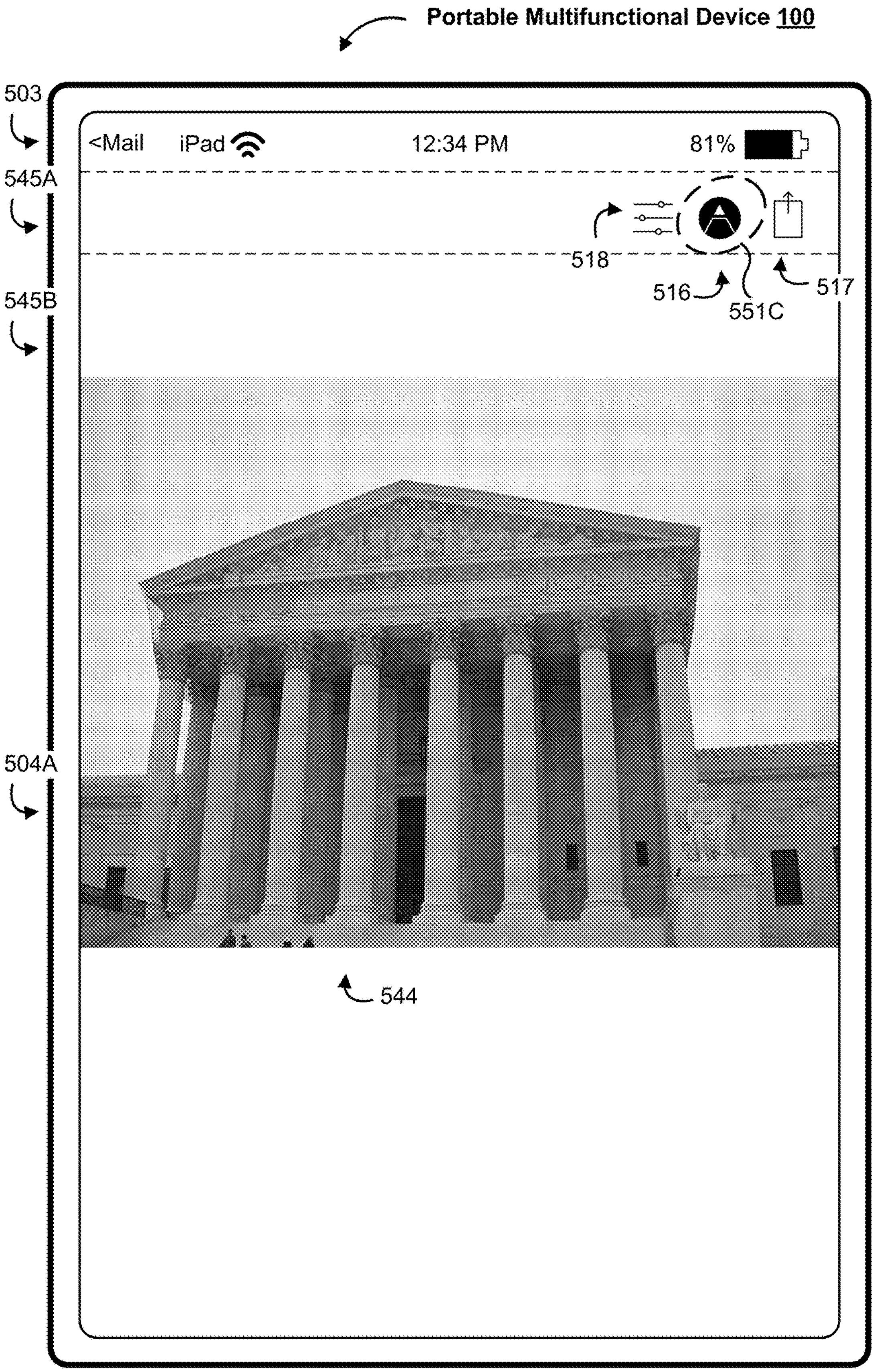
Figure 5A:
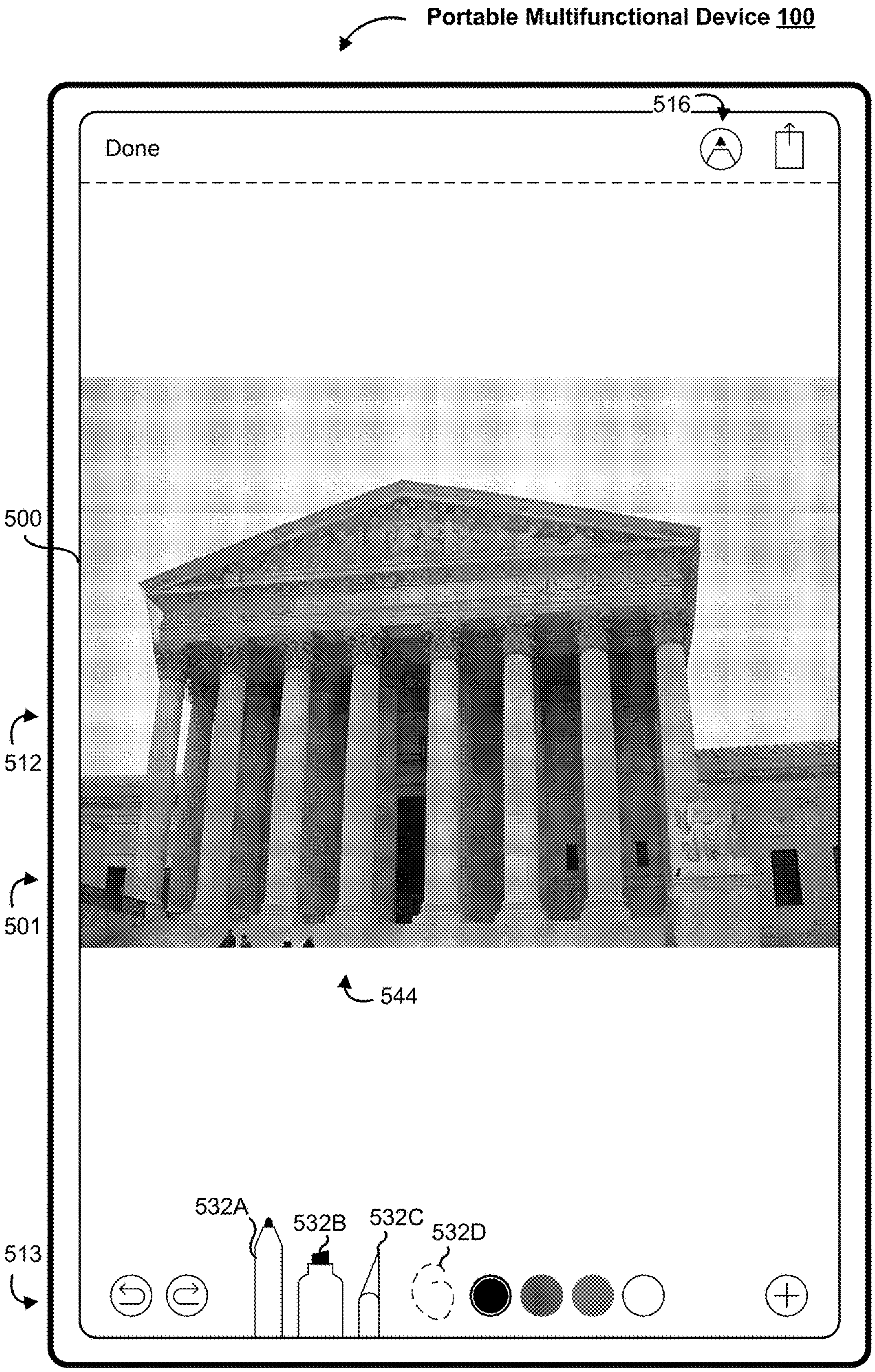
Figure 5A:
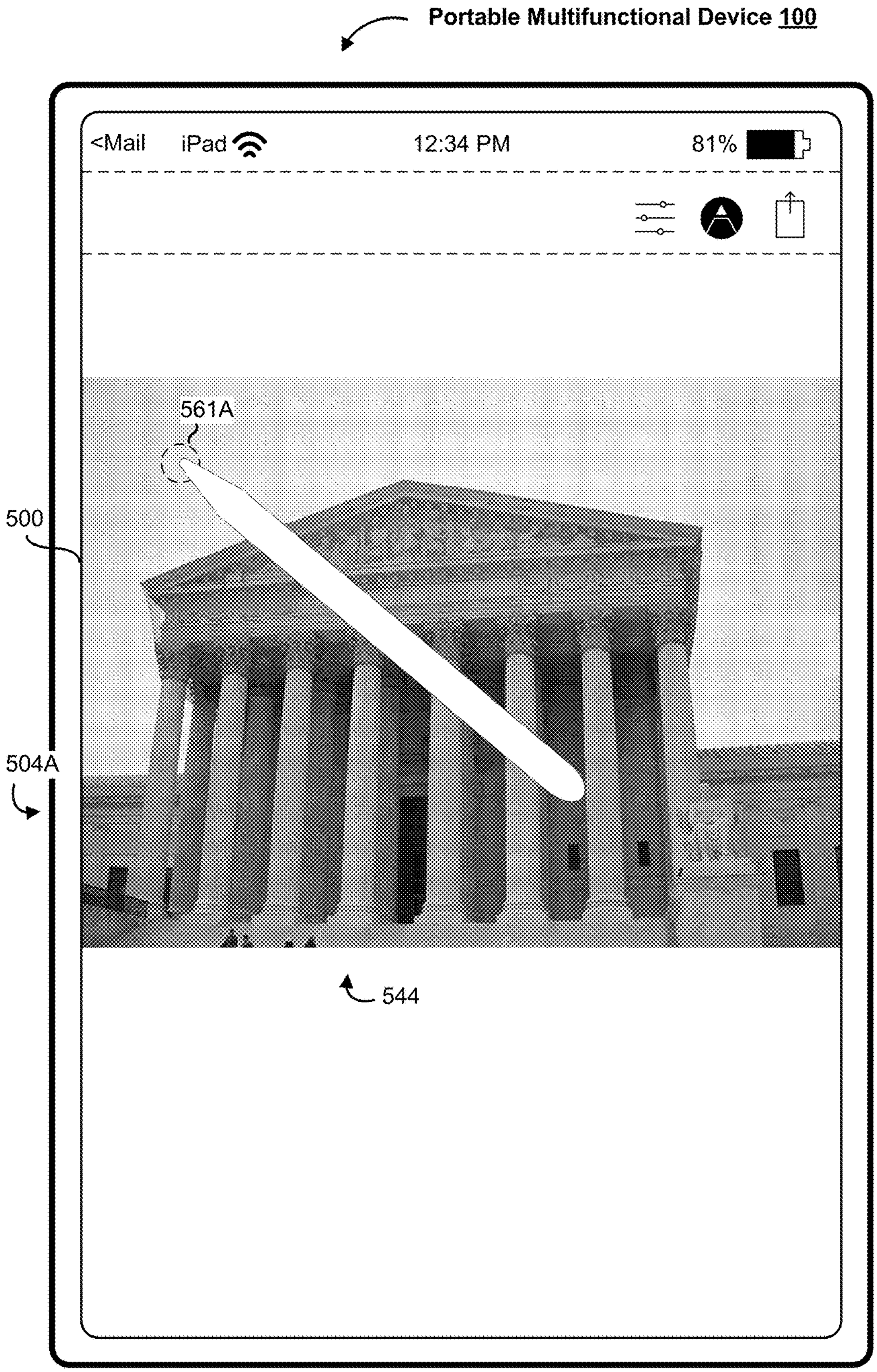
Figure 5A:
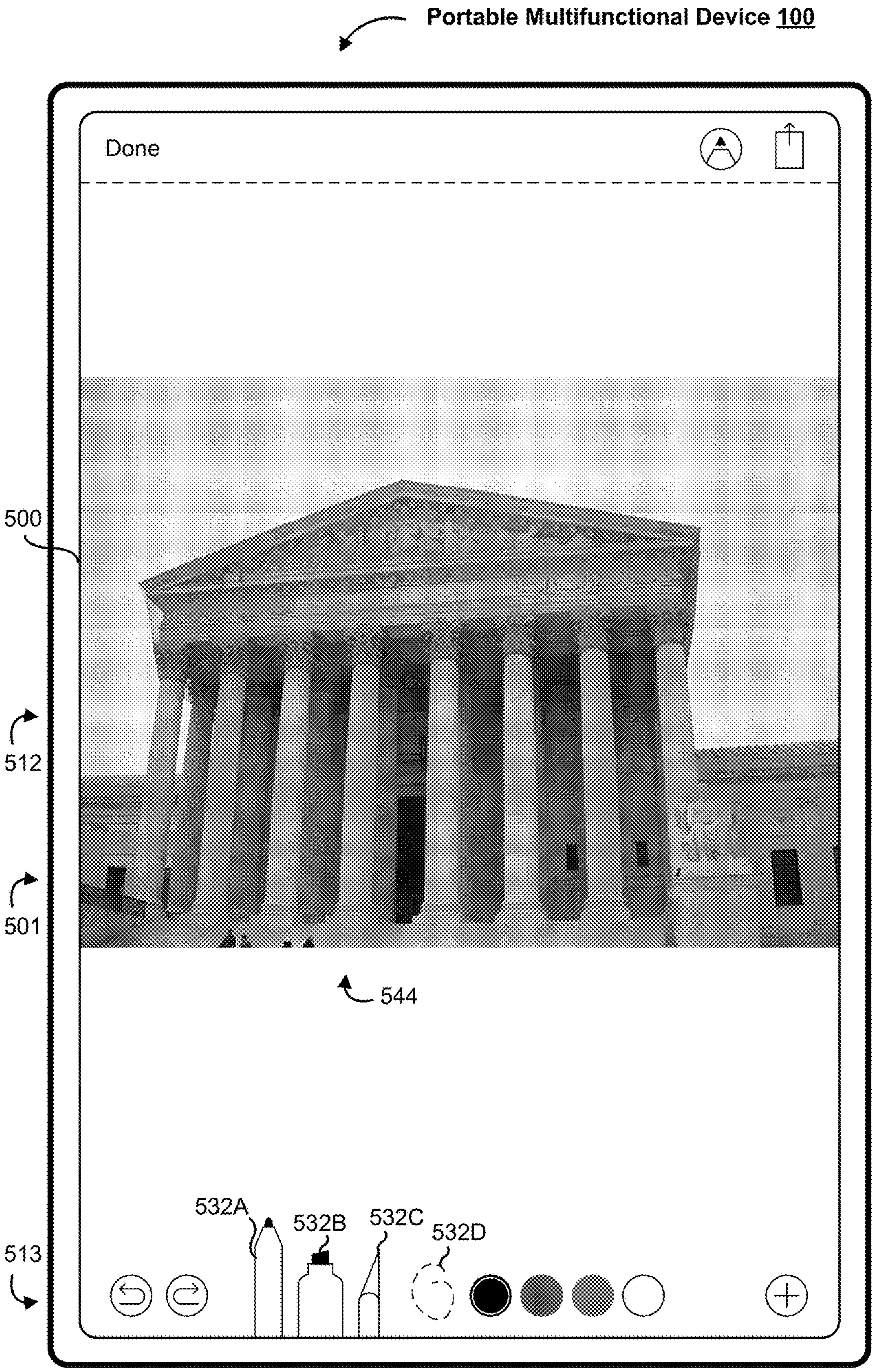
Figure 5A:
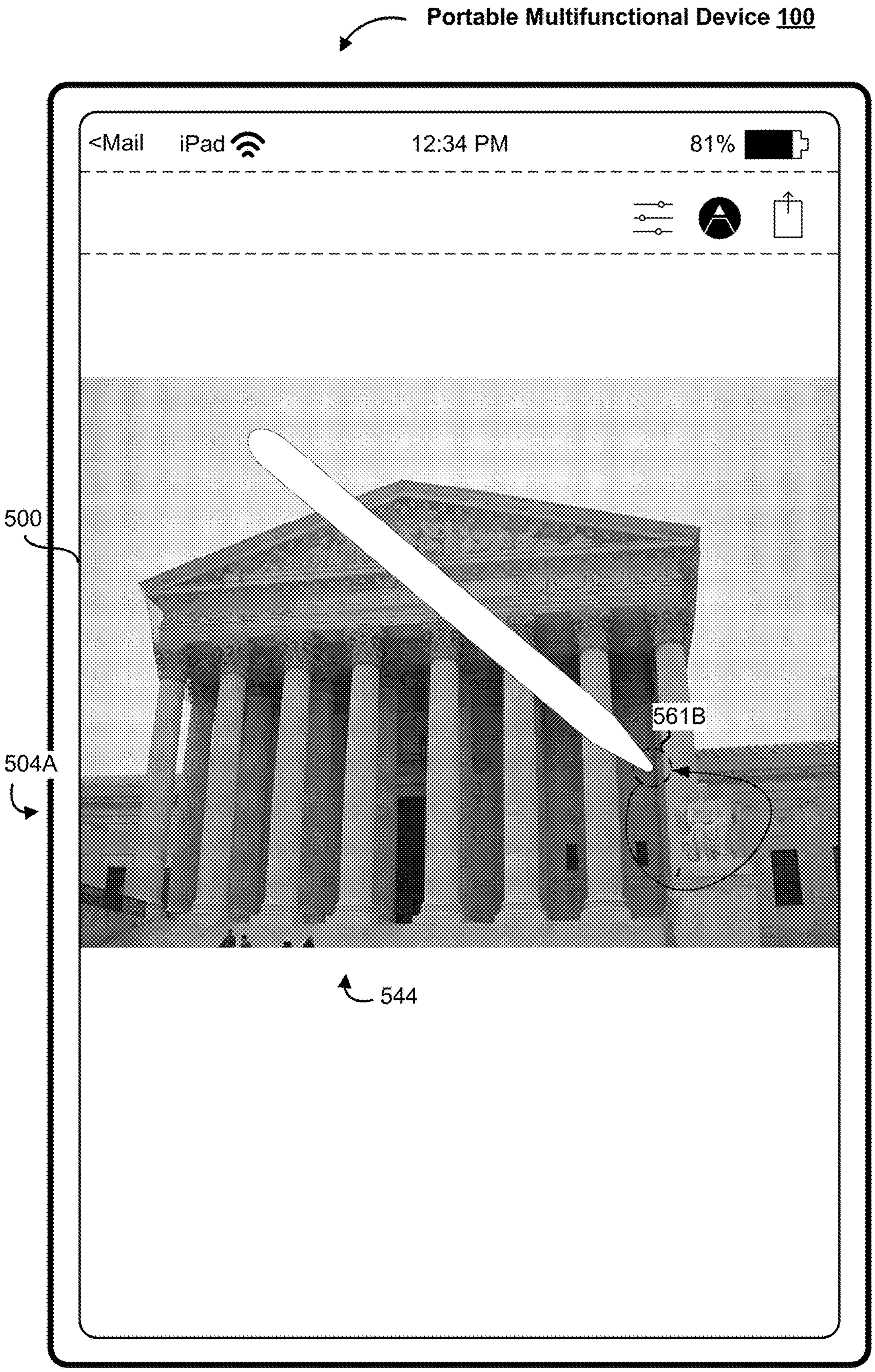
Figure 5A:
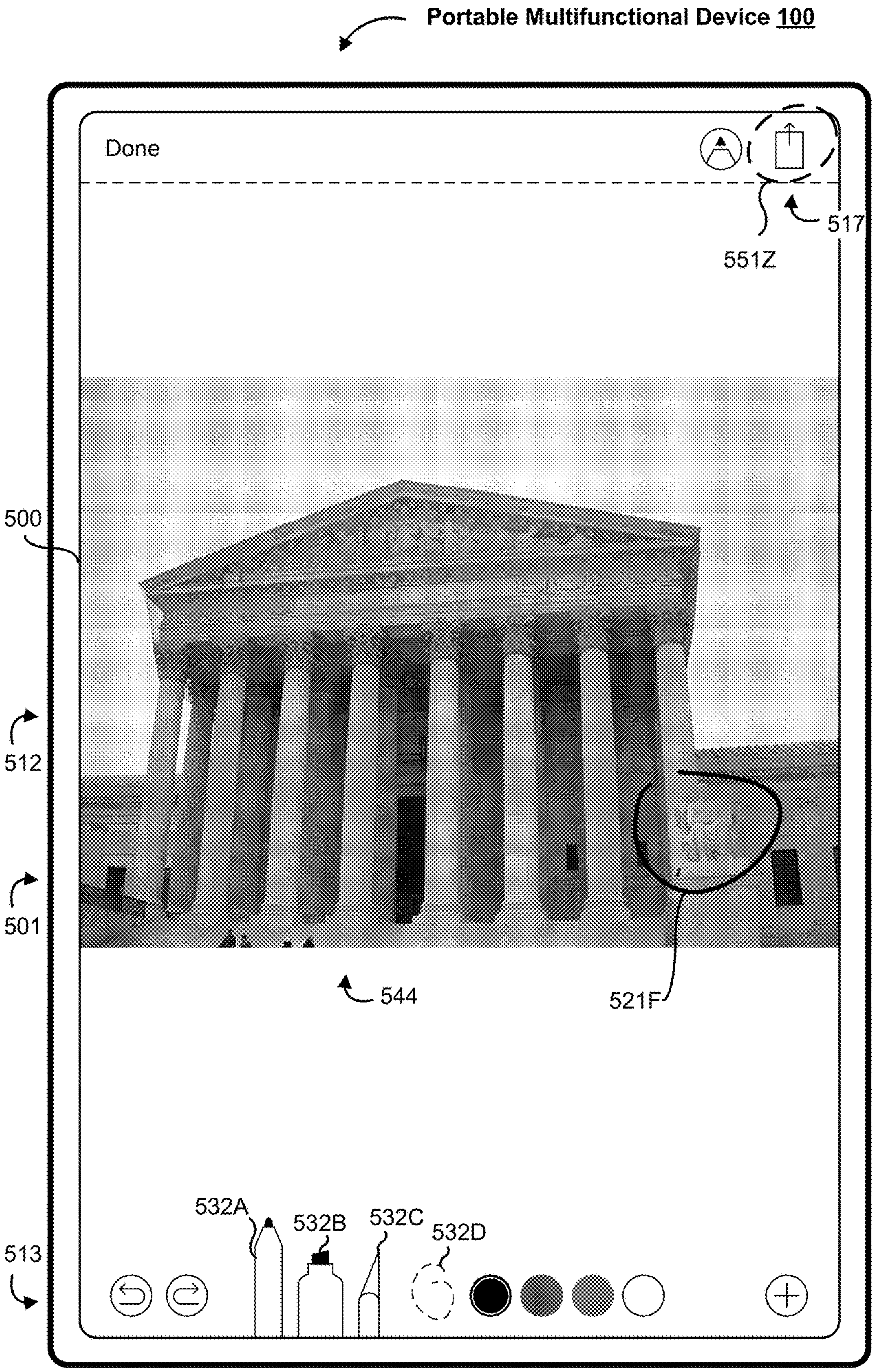
Figure 5A:
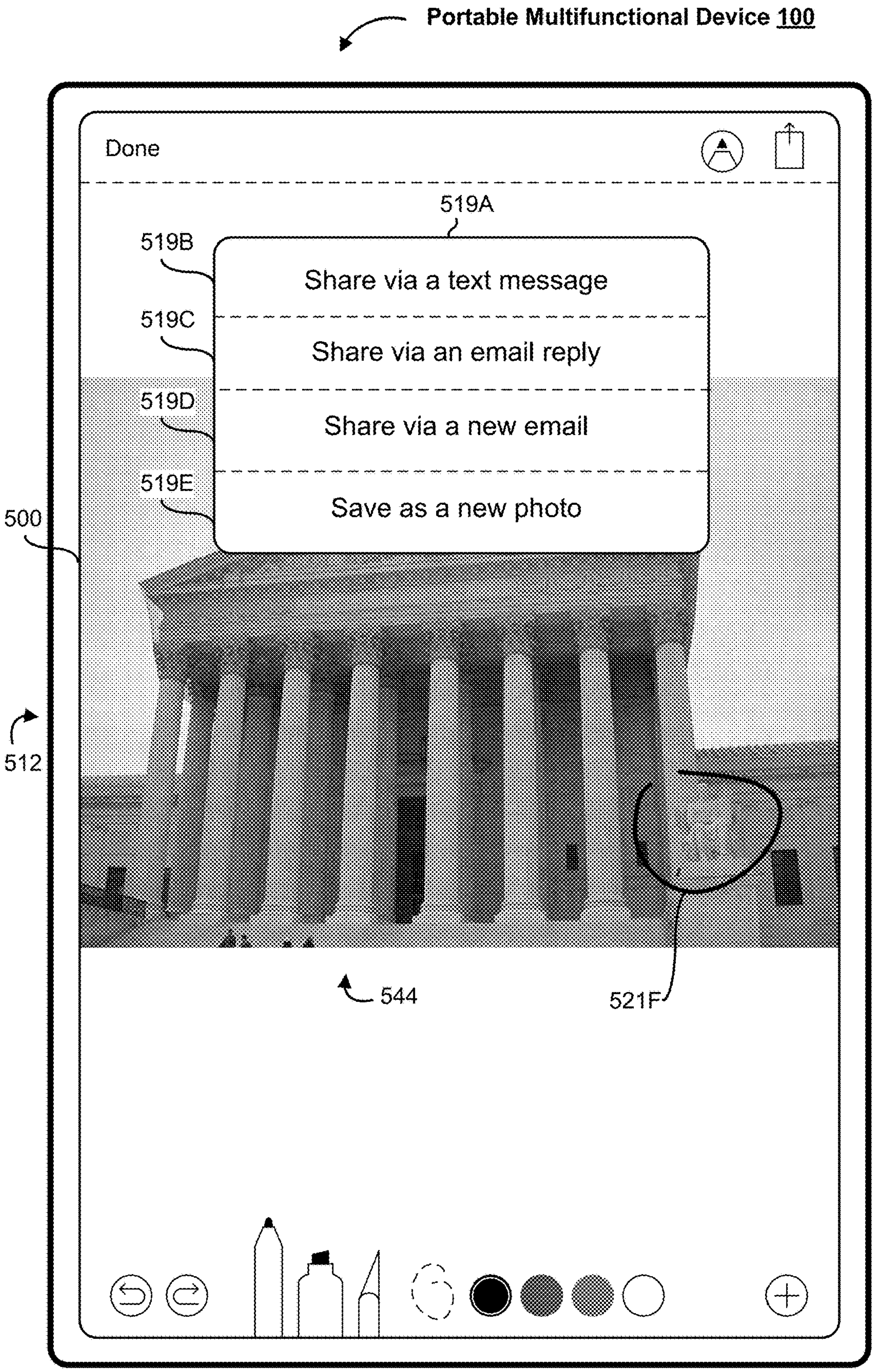
Figure 5A:
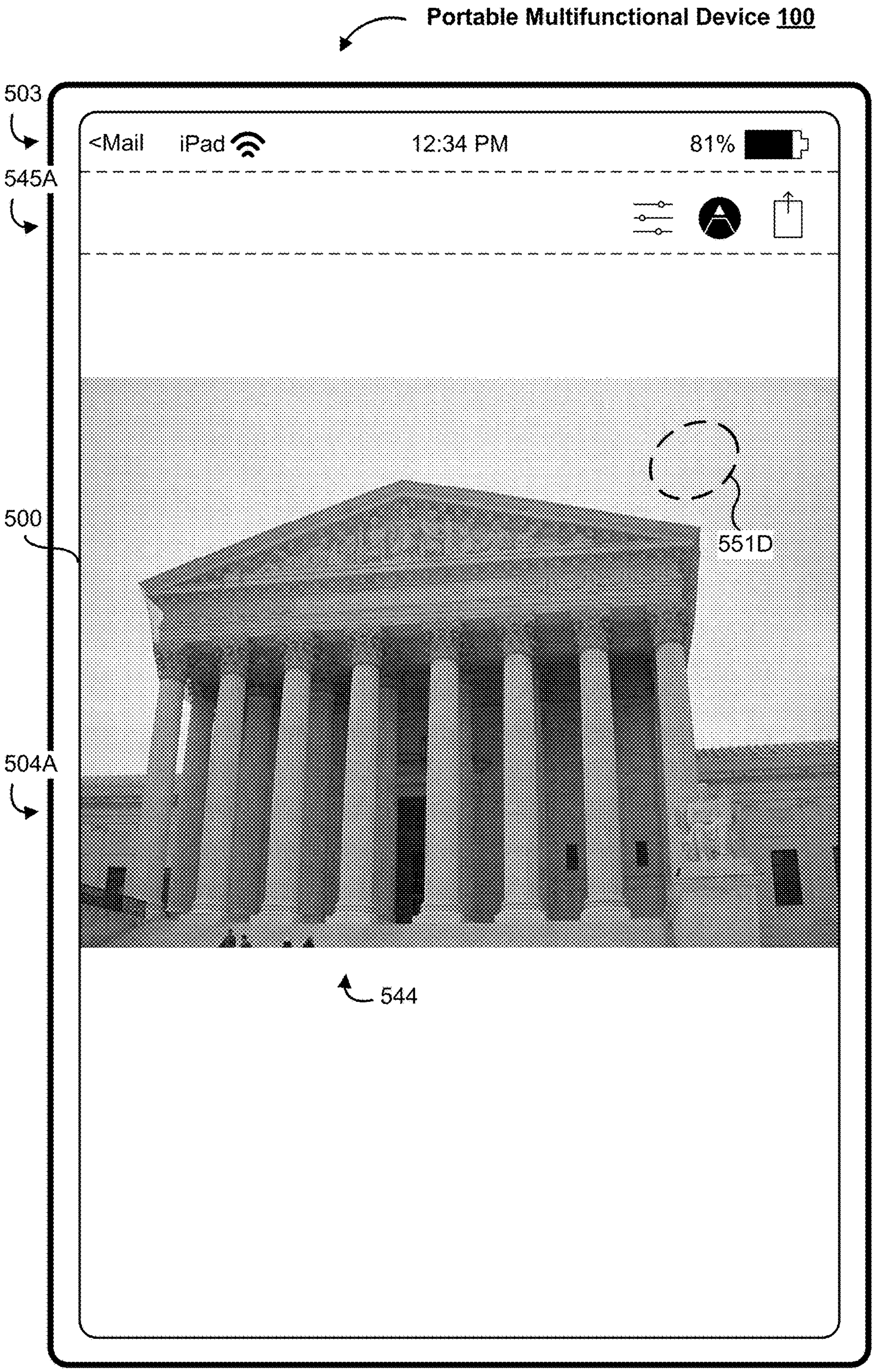
Figure 5A:
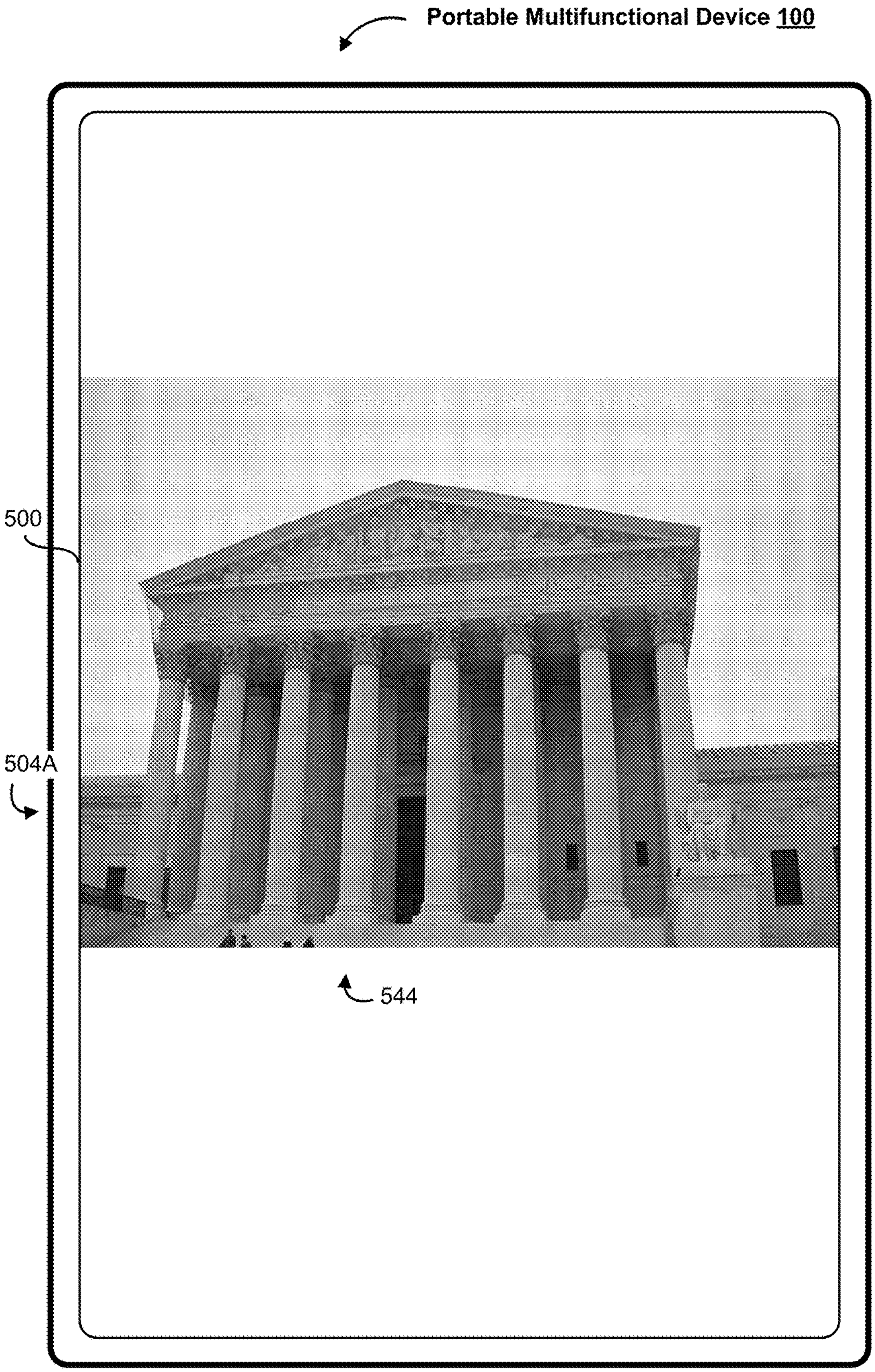
Figure 5A:
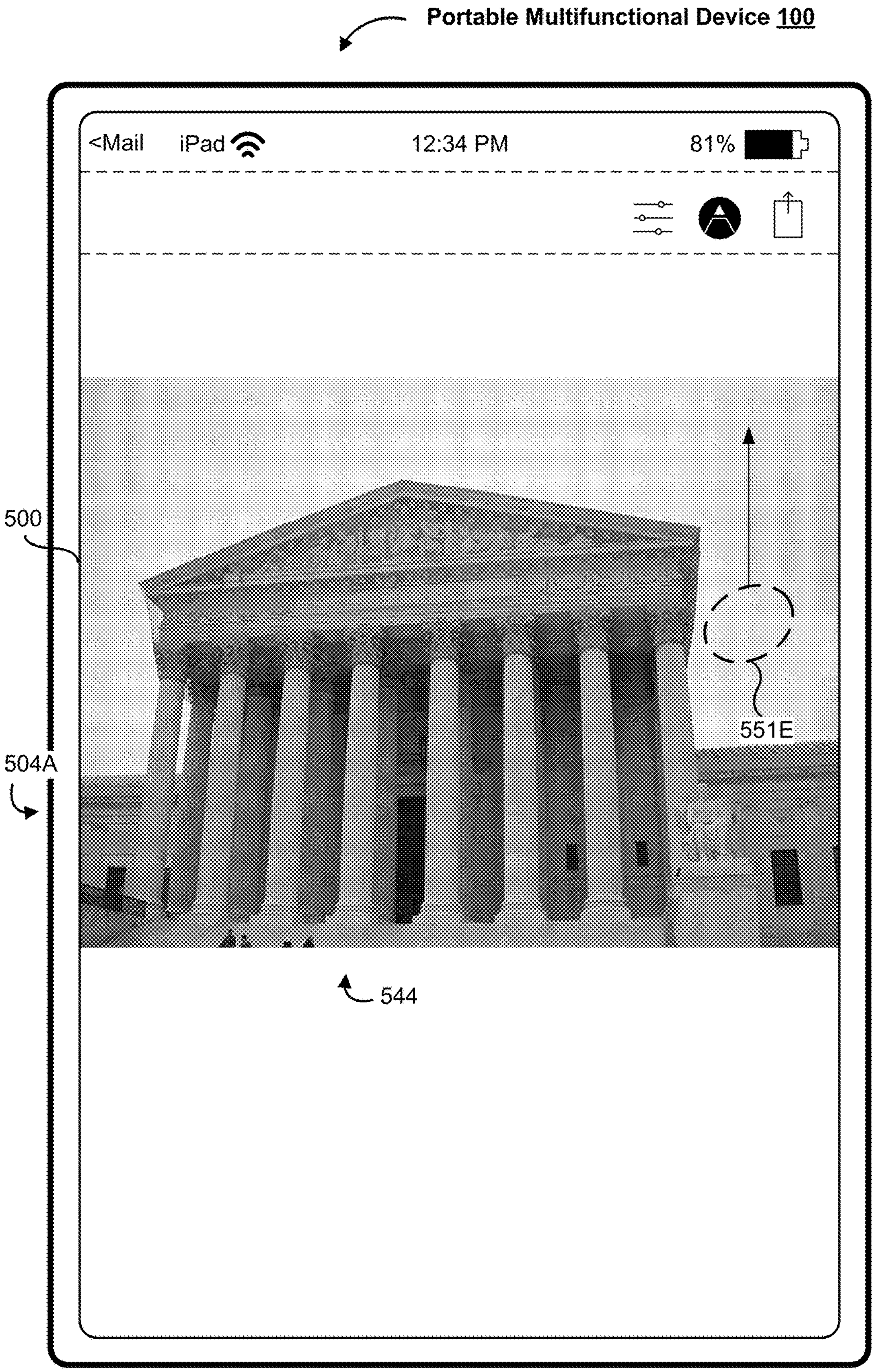
Figure 5A:
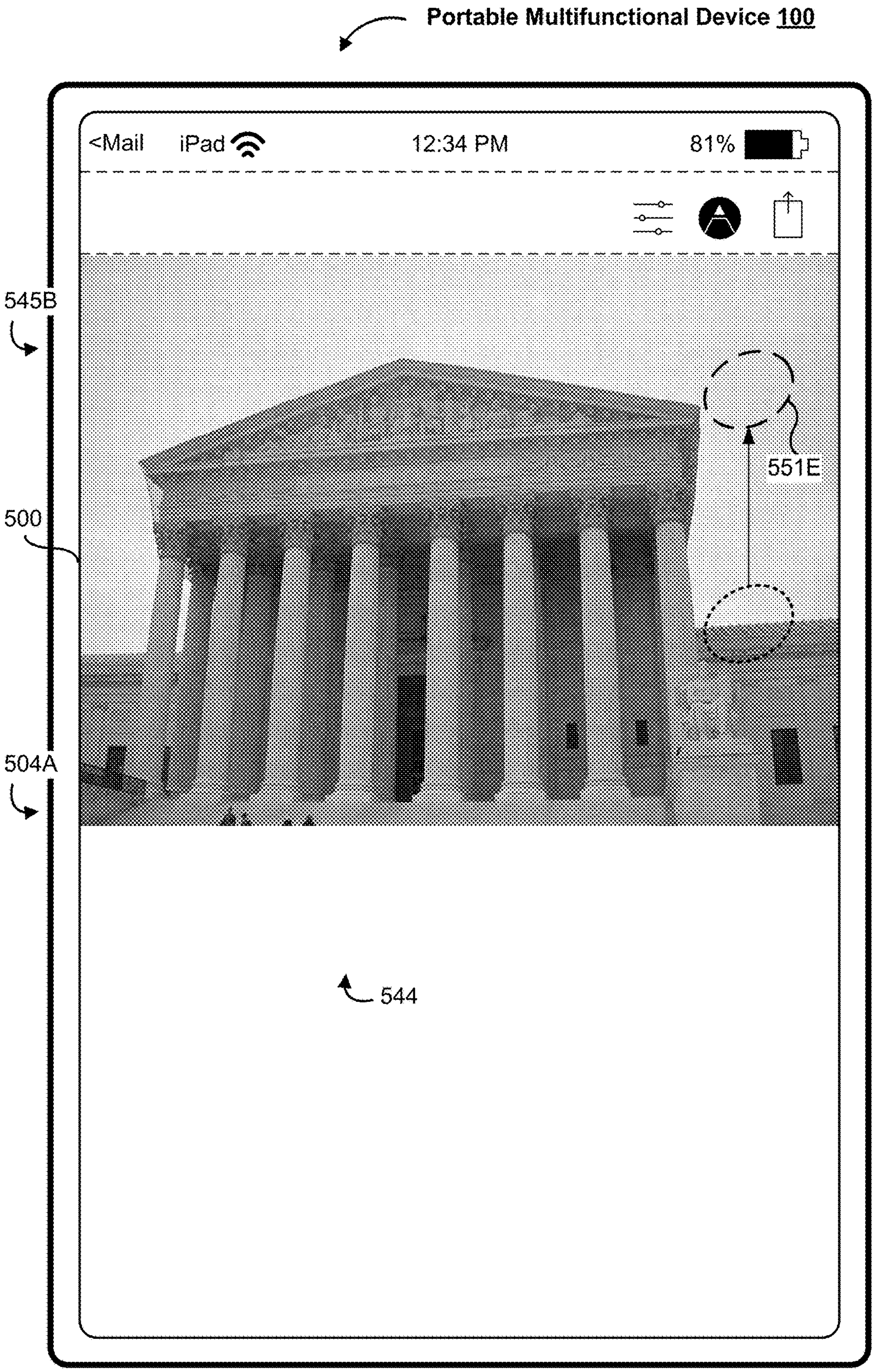
Figure 5A:
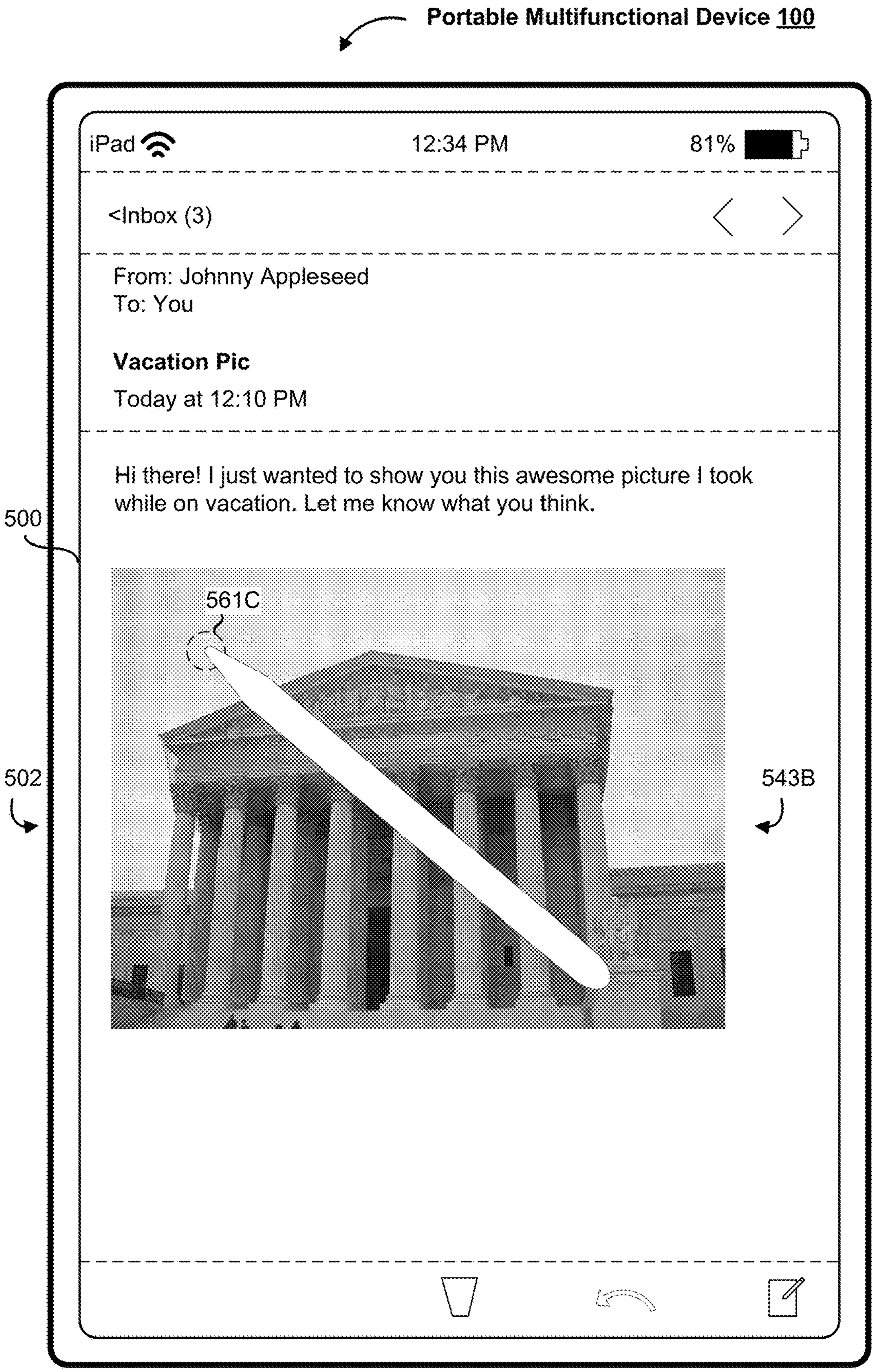
Figure 5A:
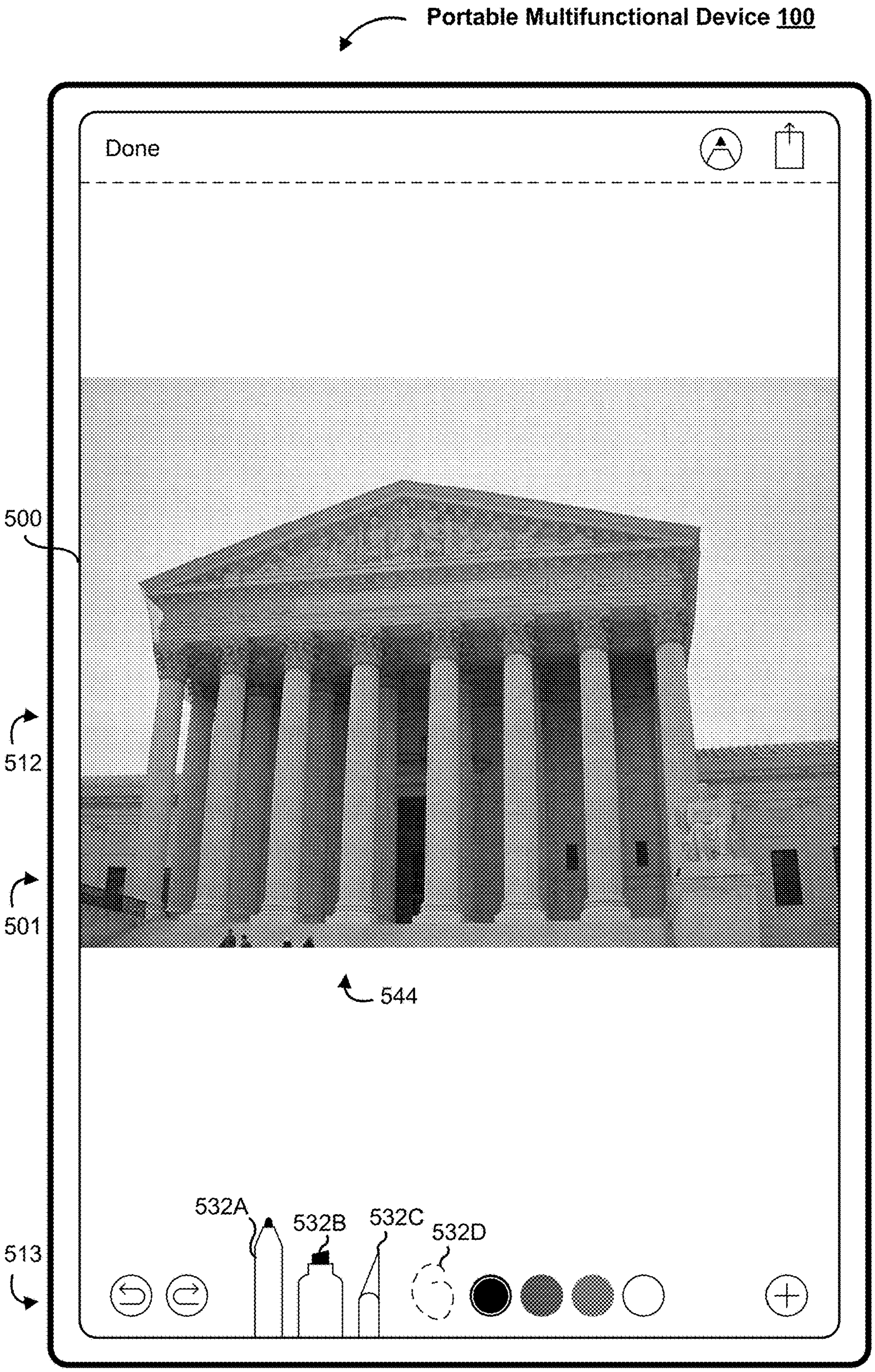
Figure 5A:
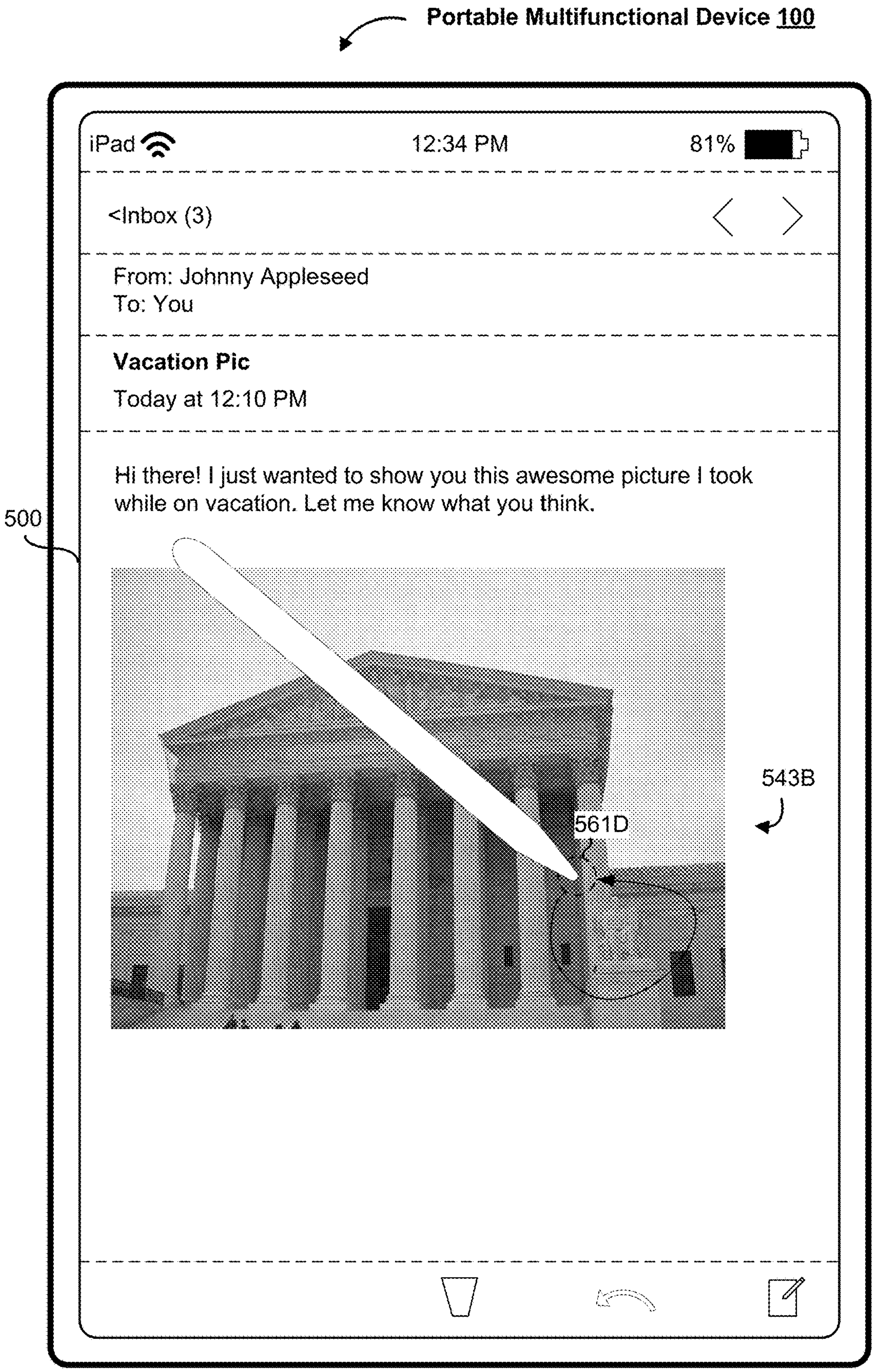
Figure 5A:
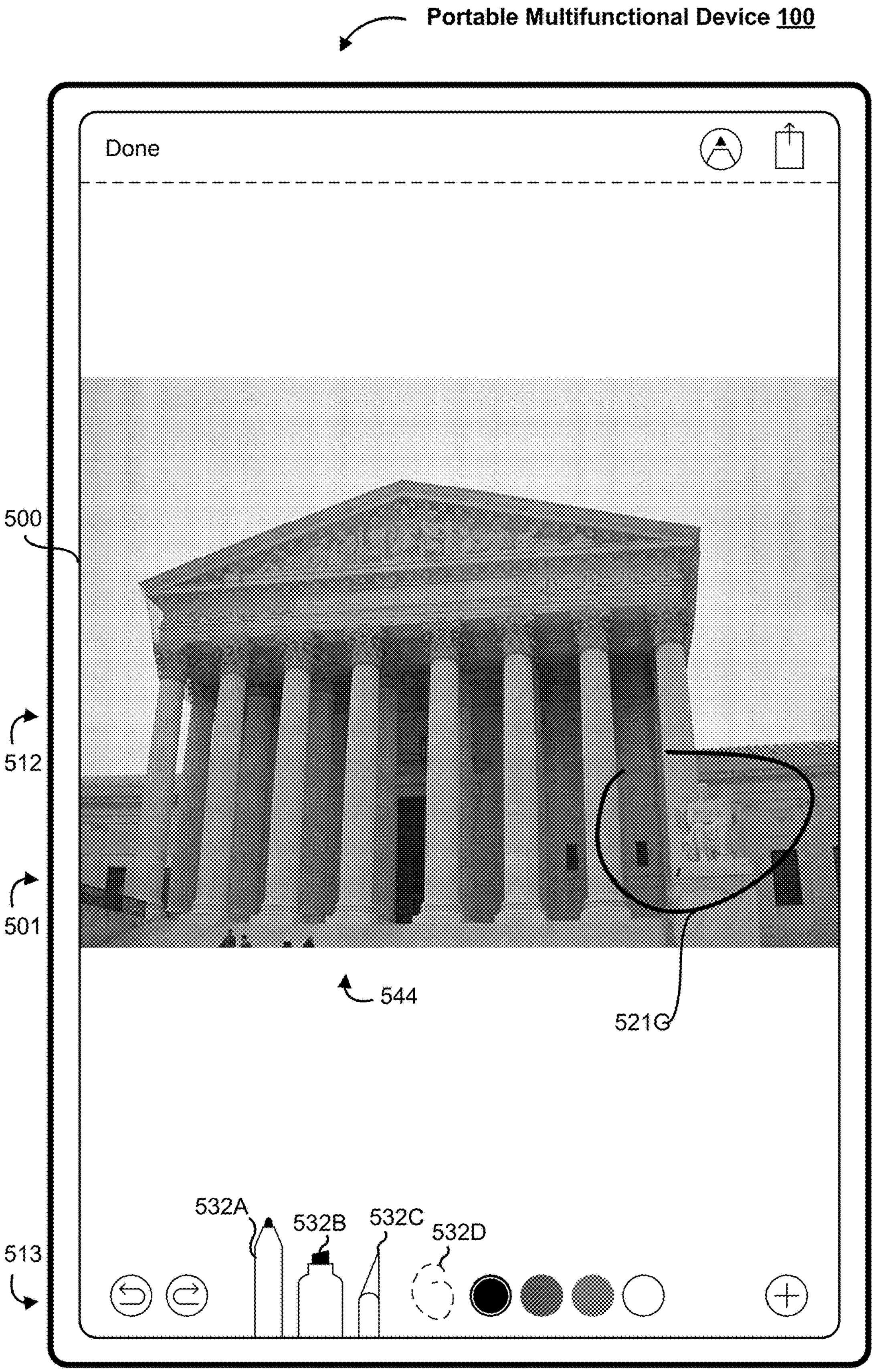
Figure 5A:
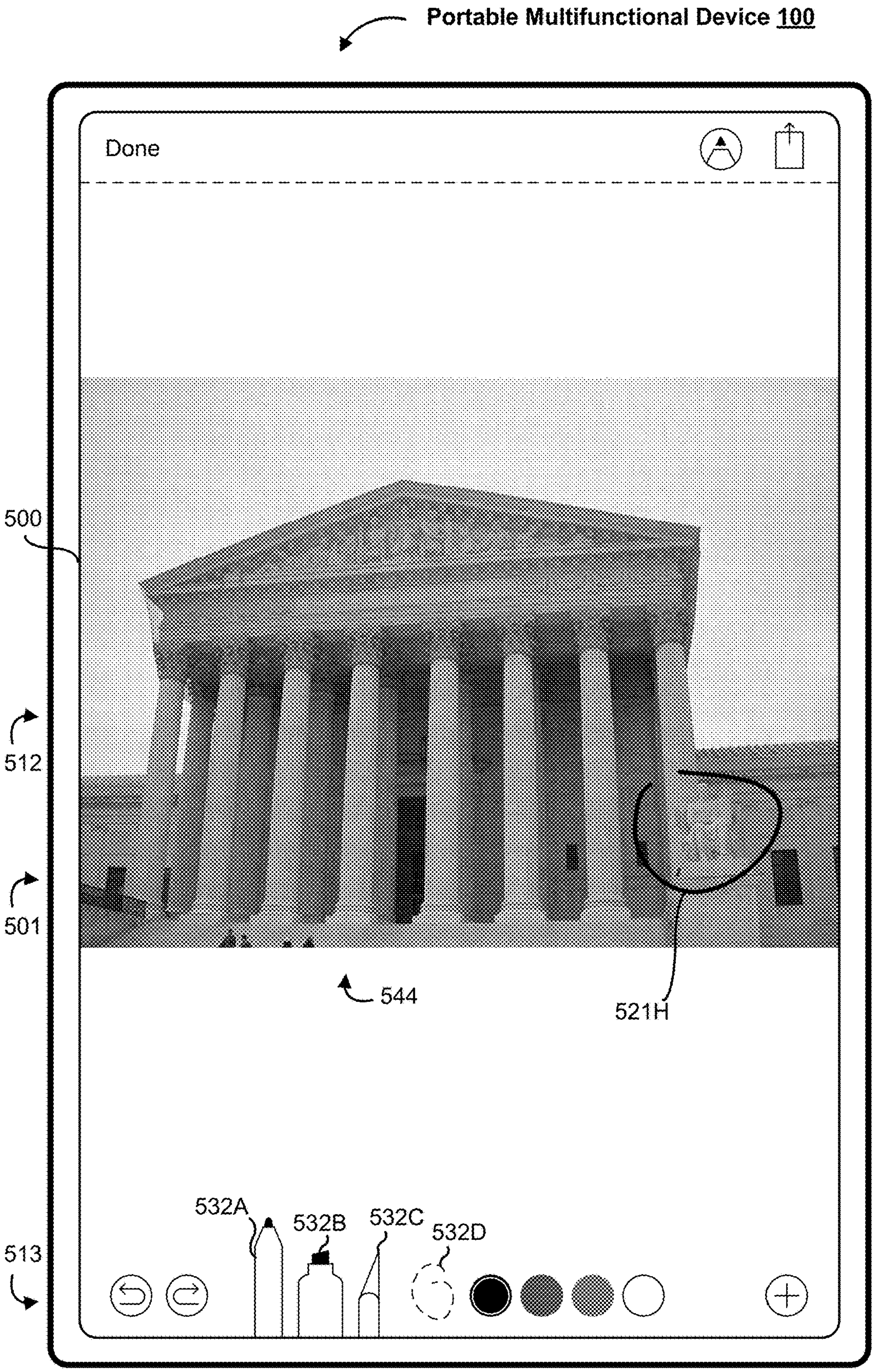
Figure 5A:
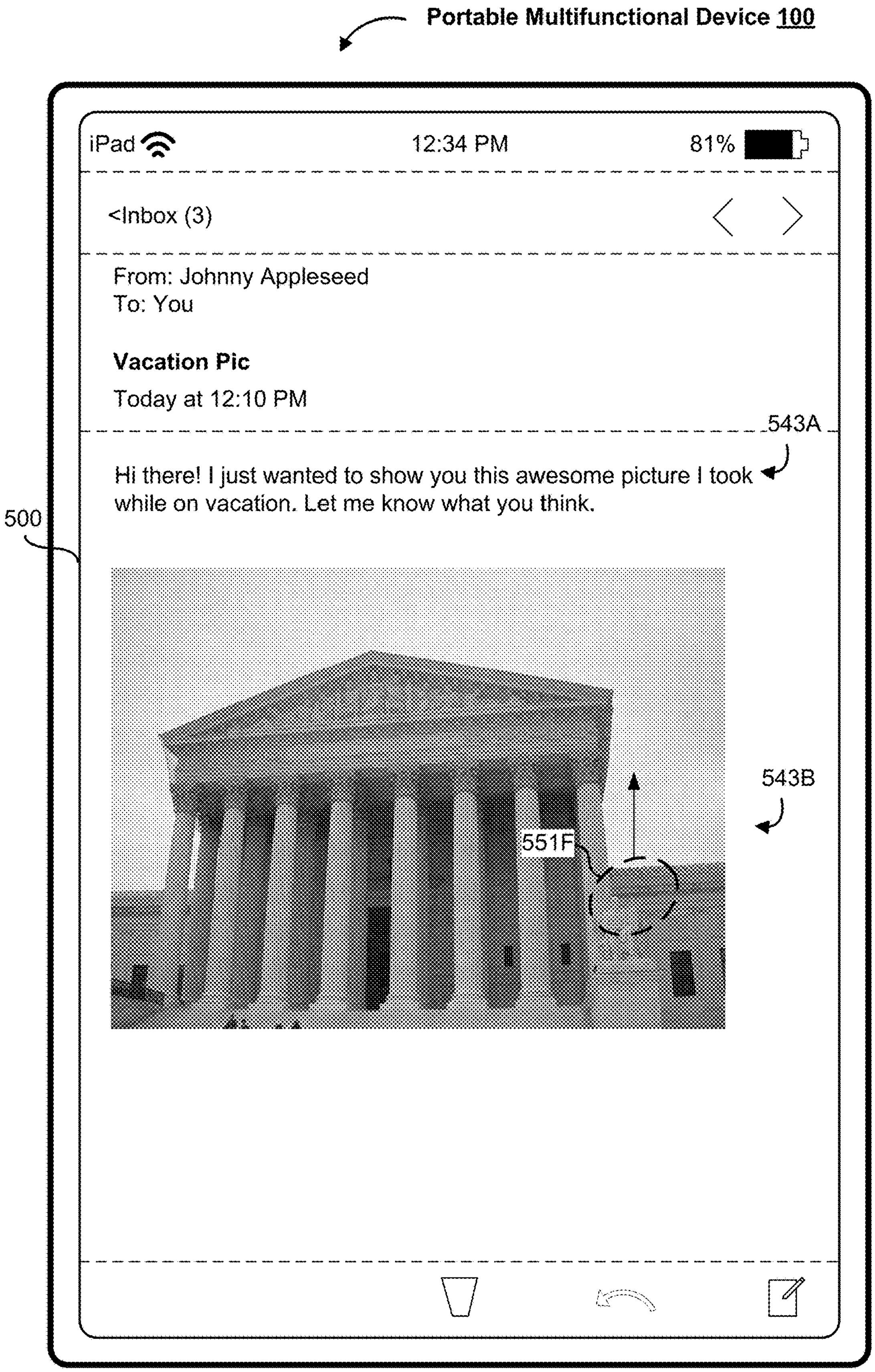
Figure 5A:
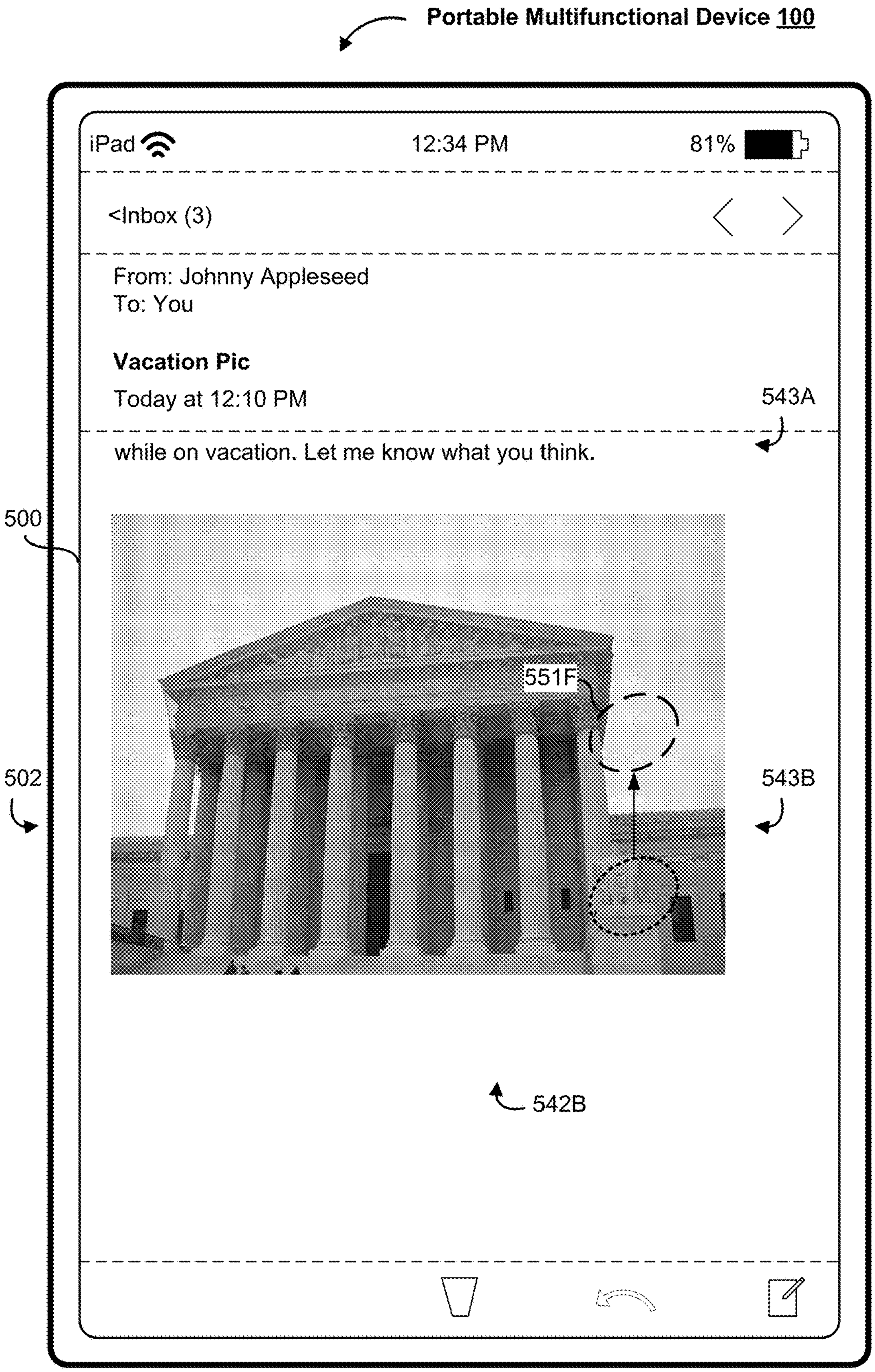
Figure 5A:
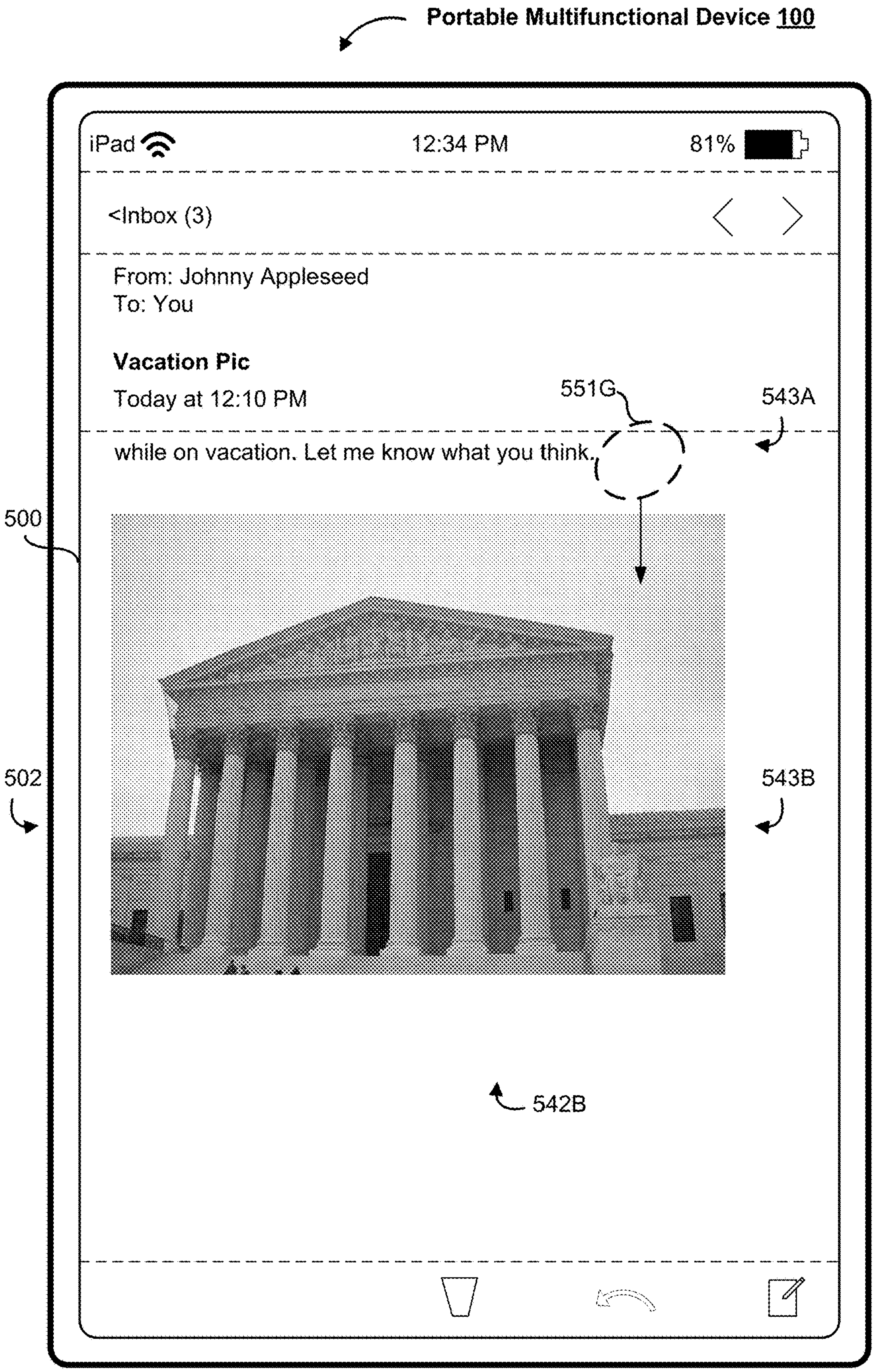
Figure 5A:
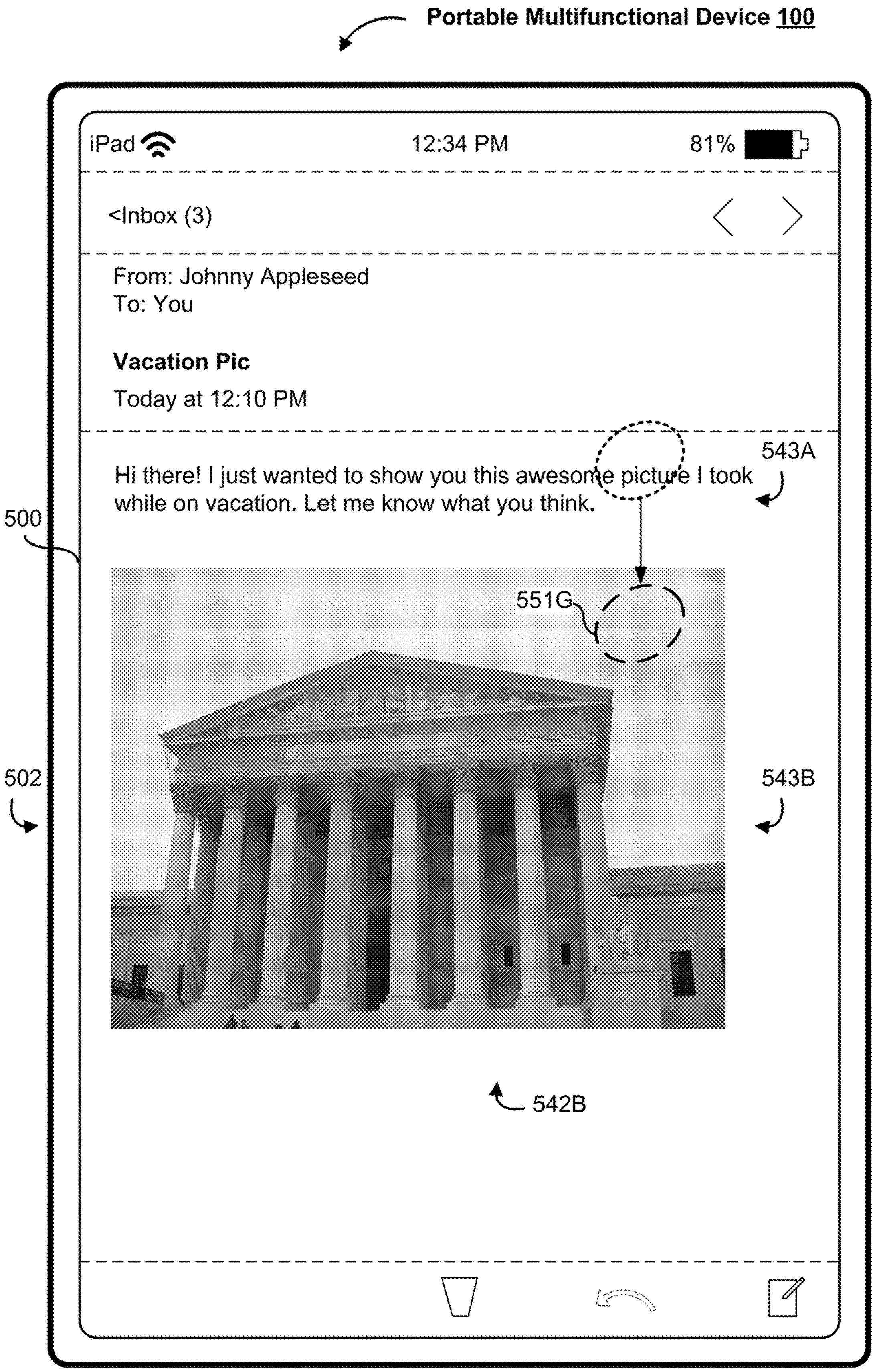
Figure 5A:
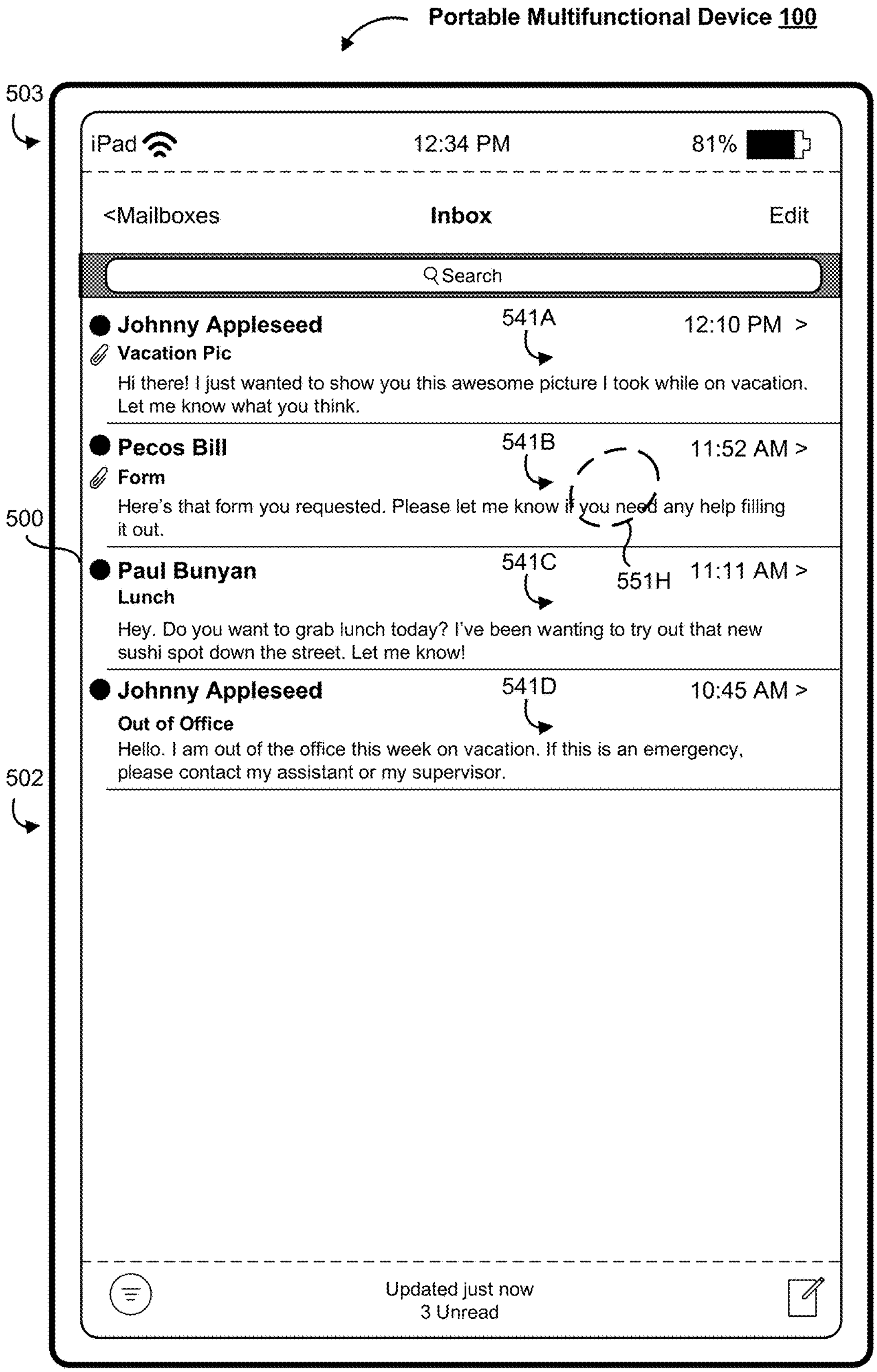
Figure 5A:
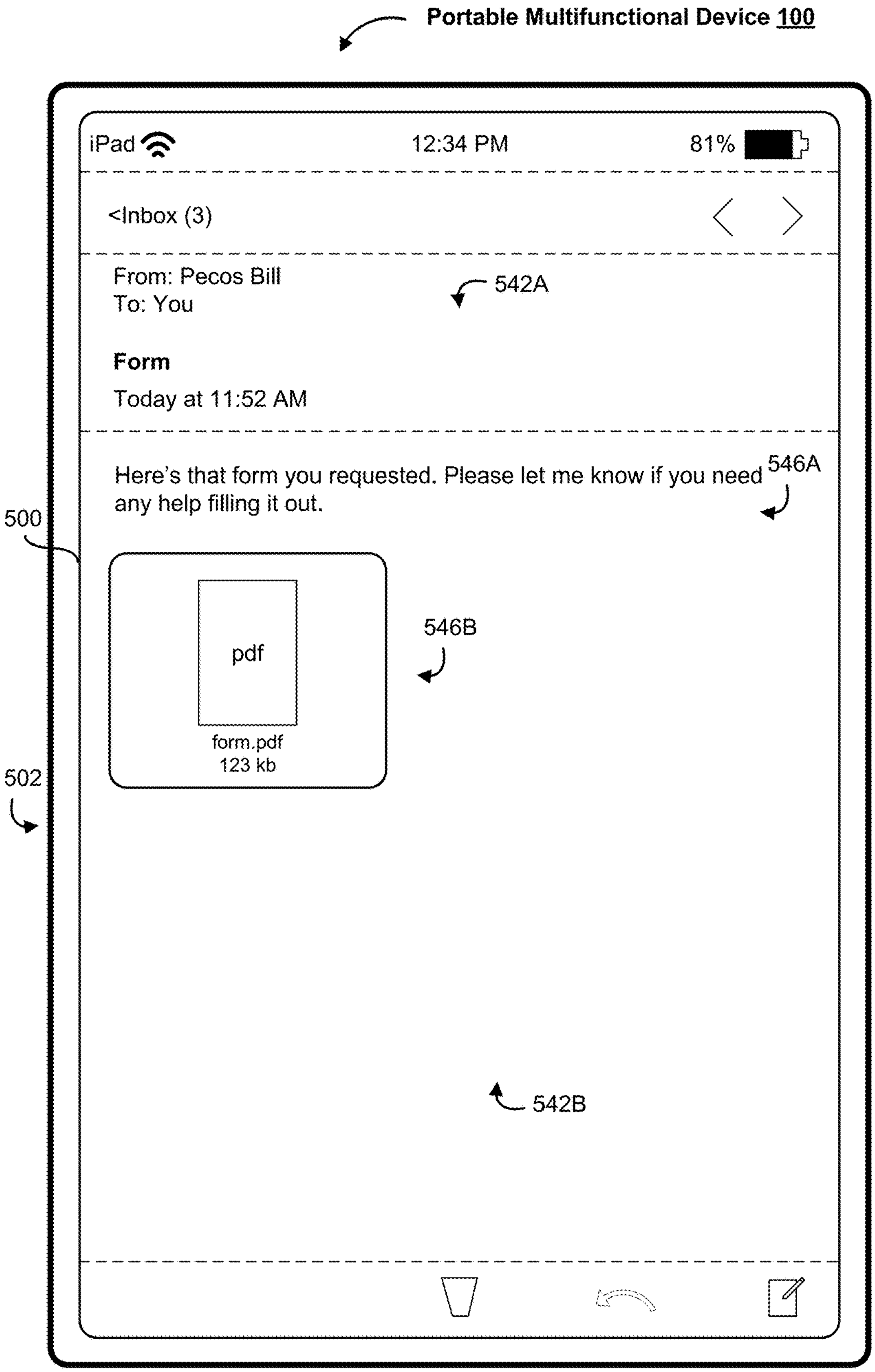
Figure 5B:
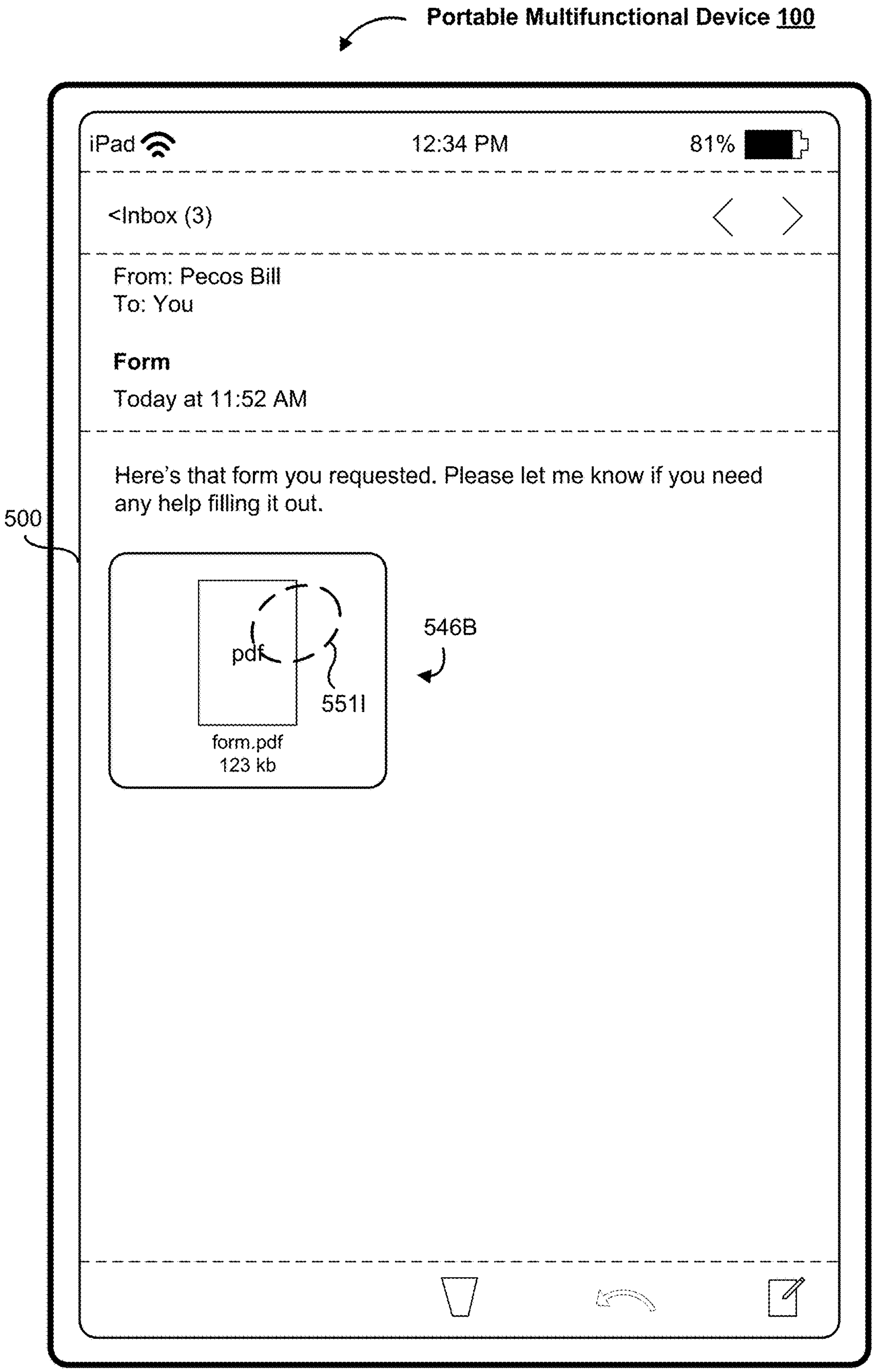
Figure 5B:
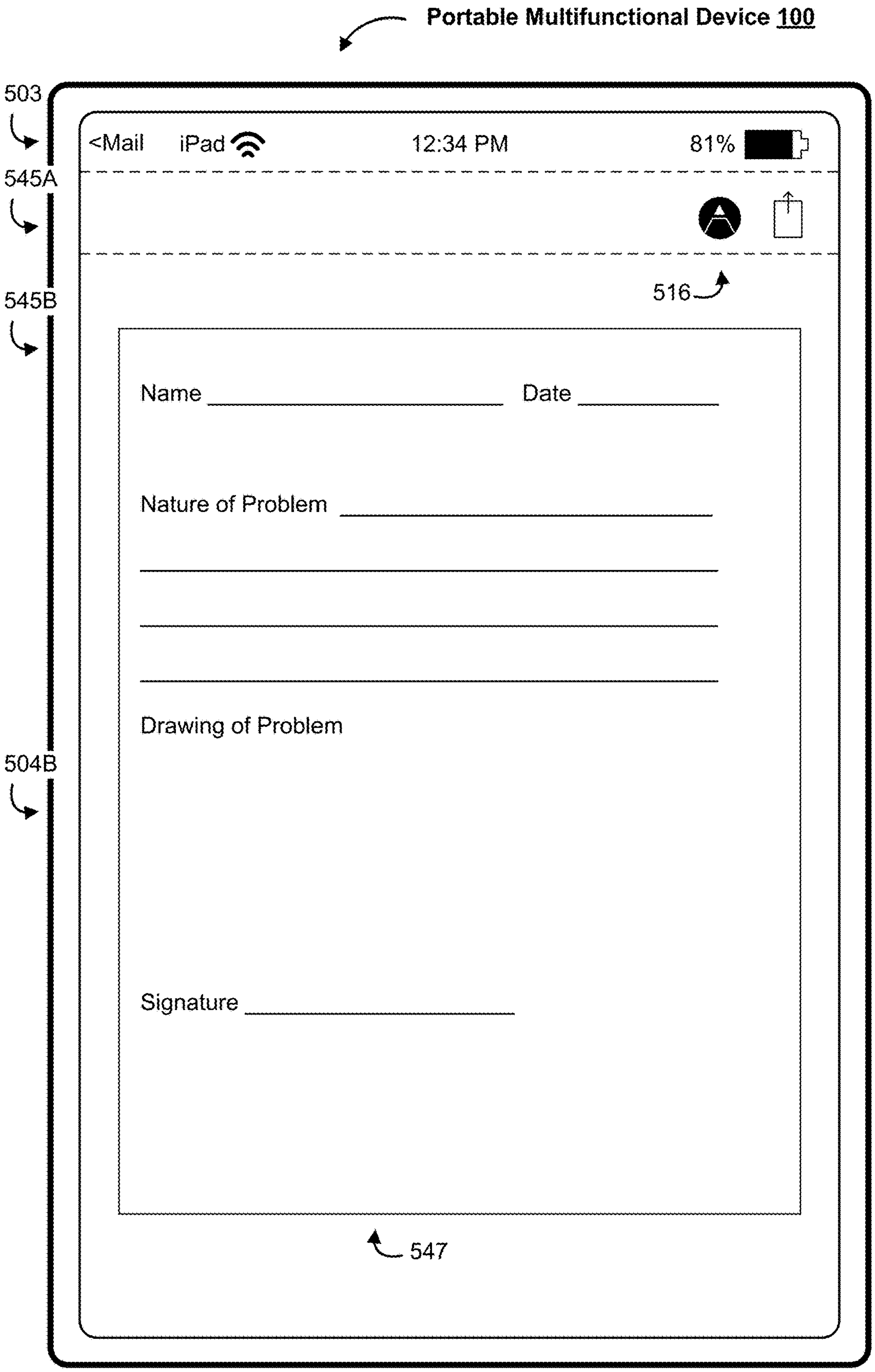
Figure 5B:
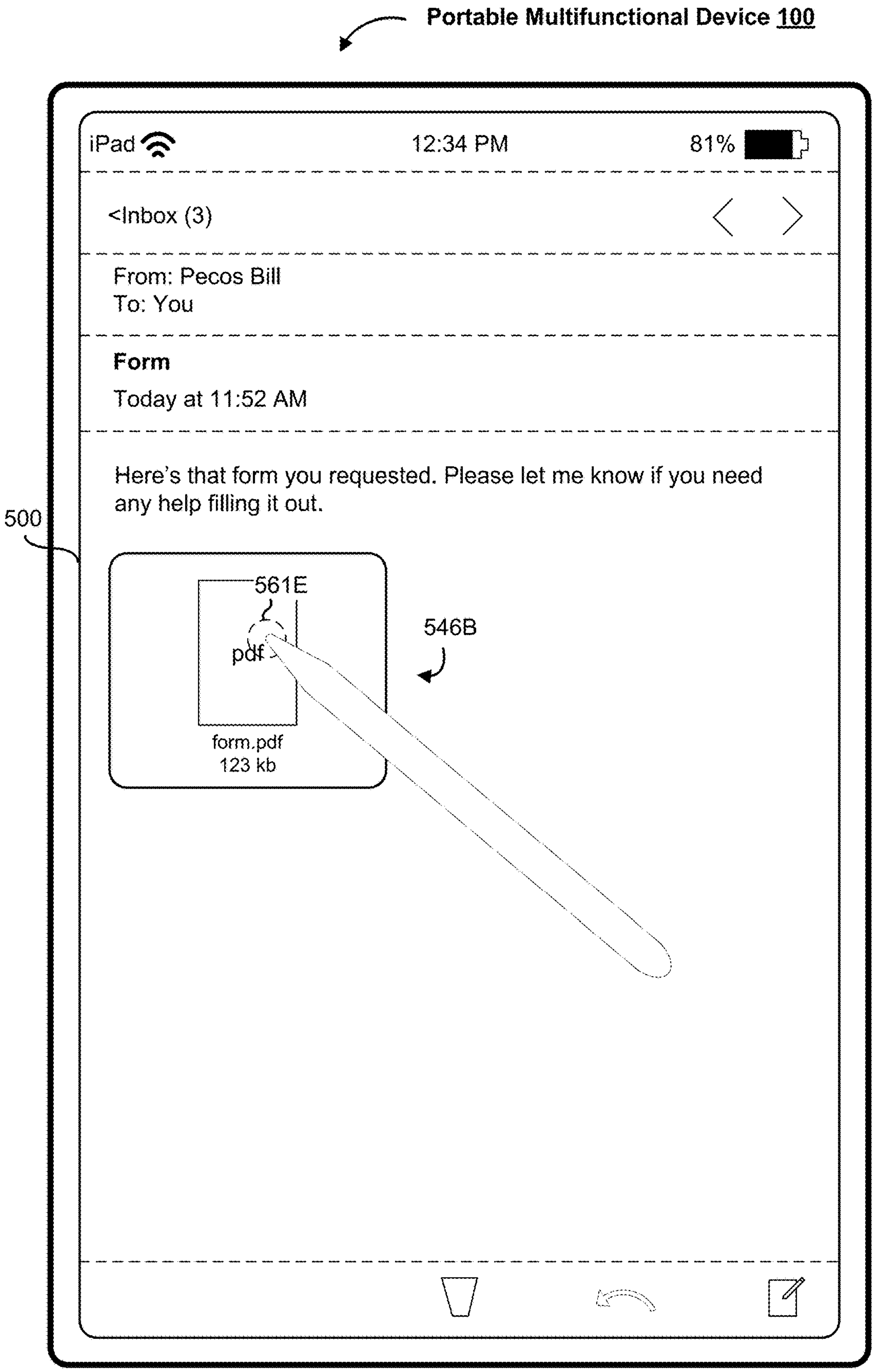
Figure 5B:
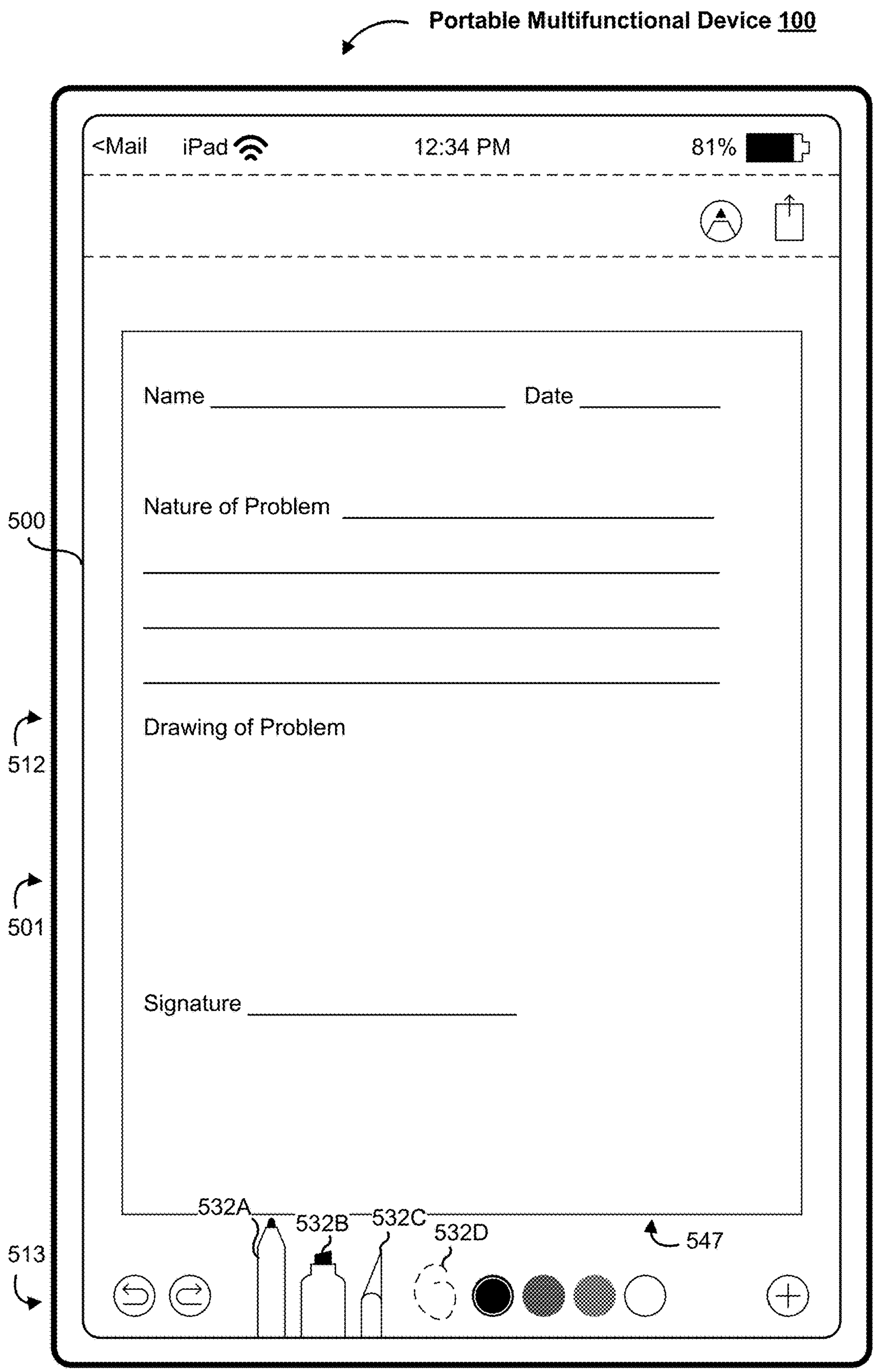
Figure 5B:
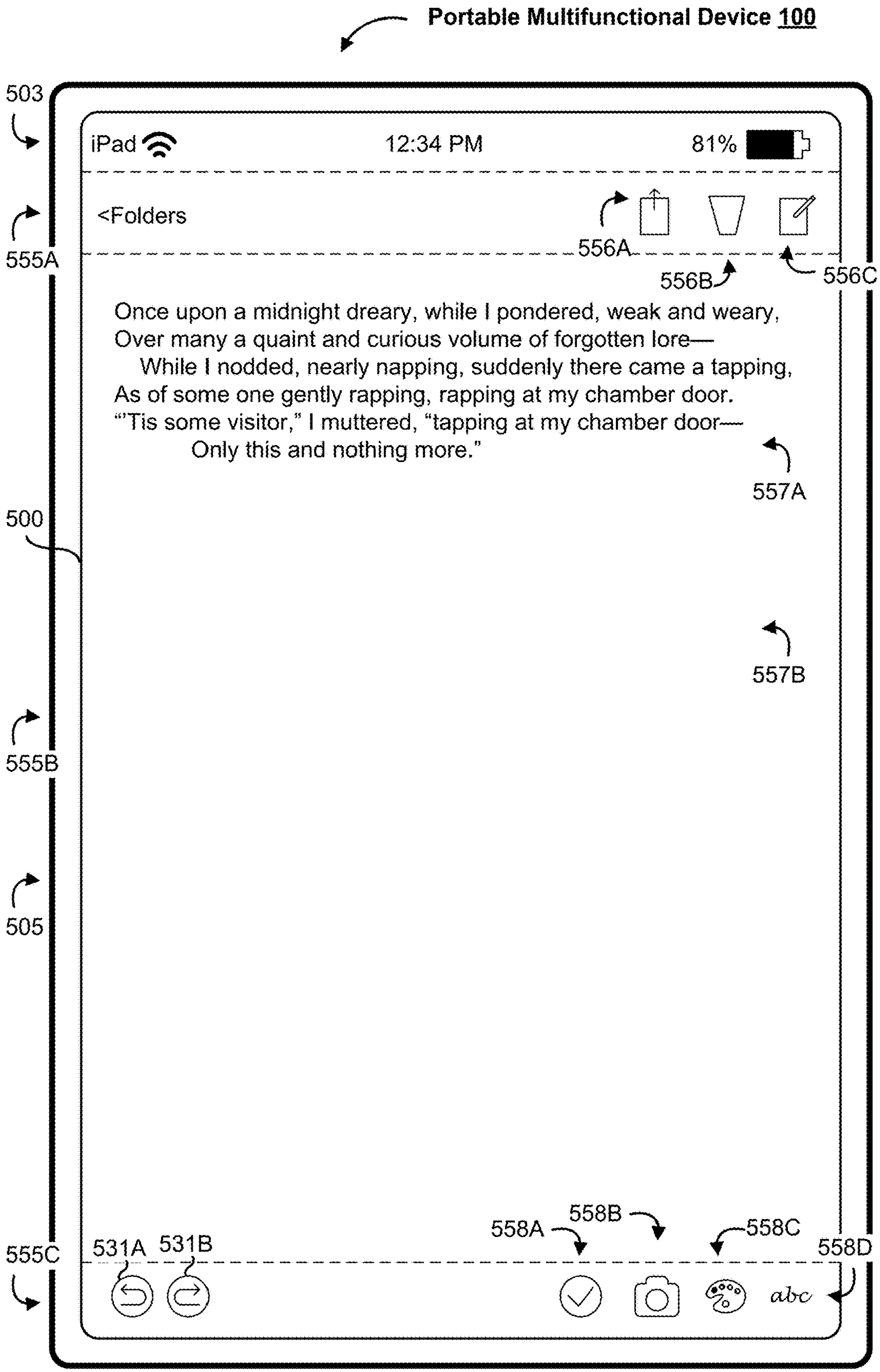
Figure 5B:
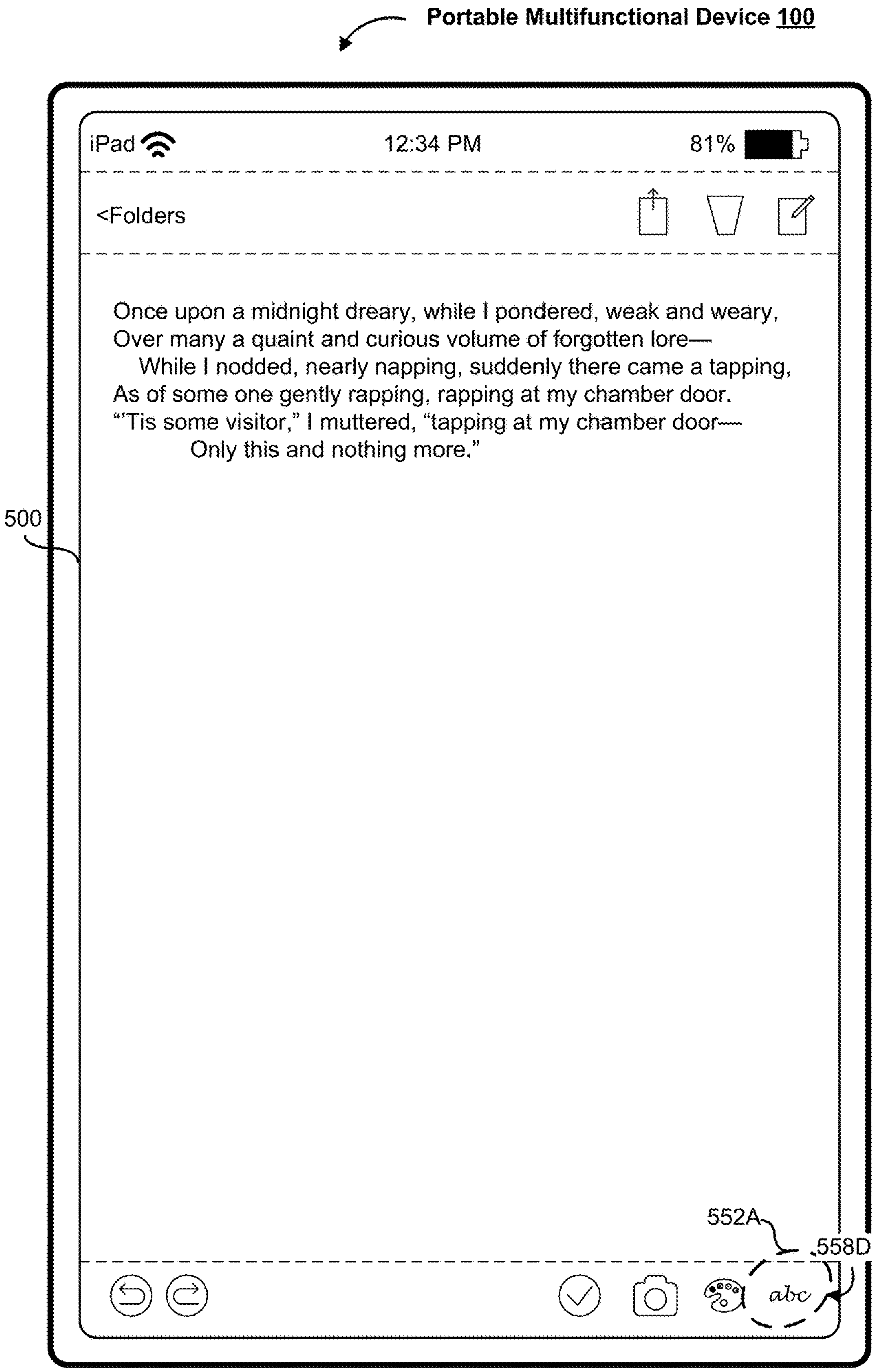
Figure 5B:
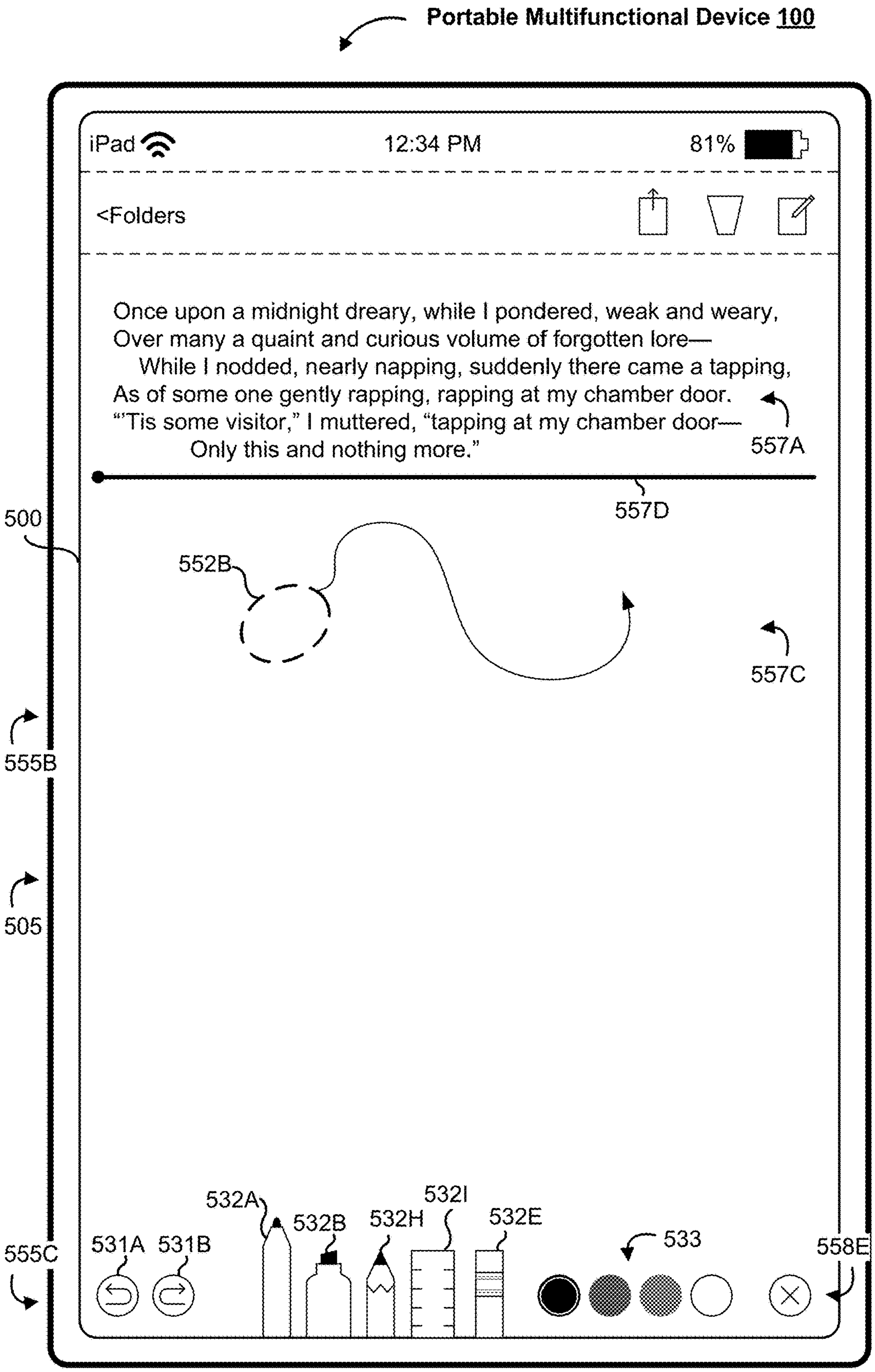
Figure 5B:
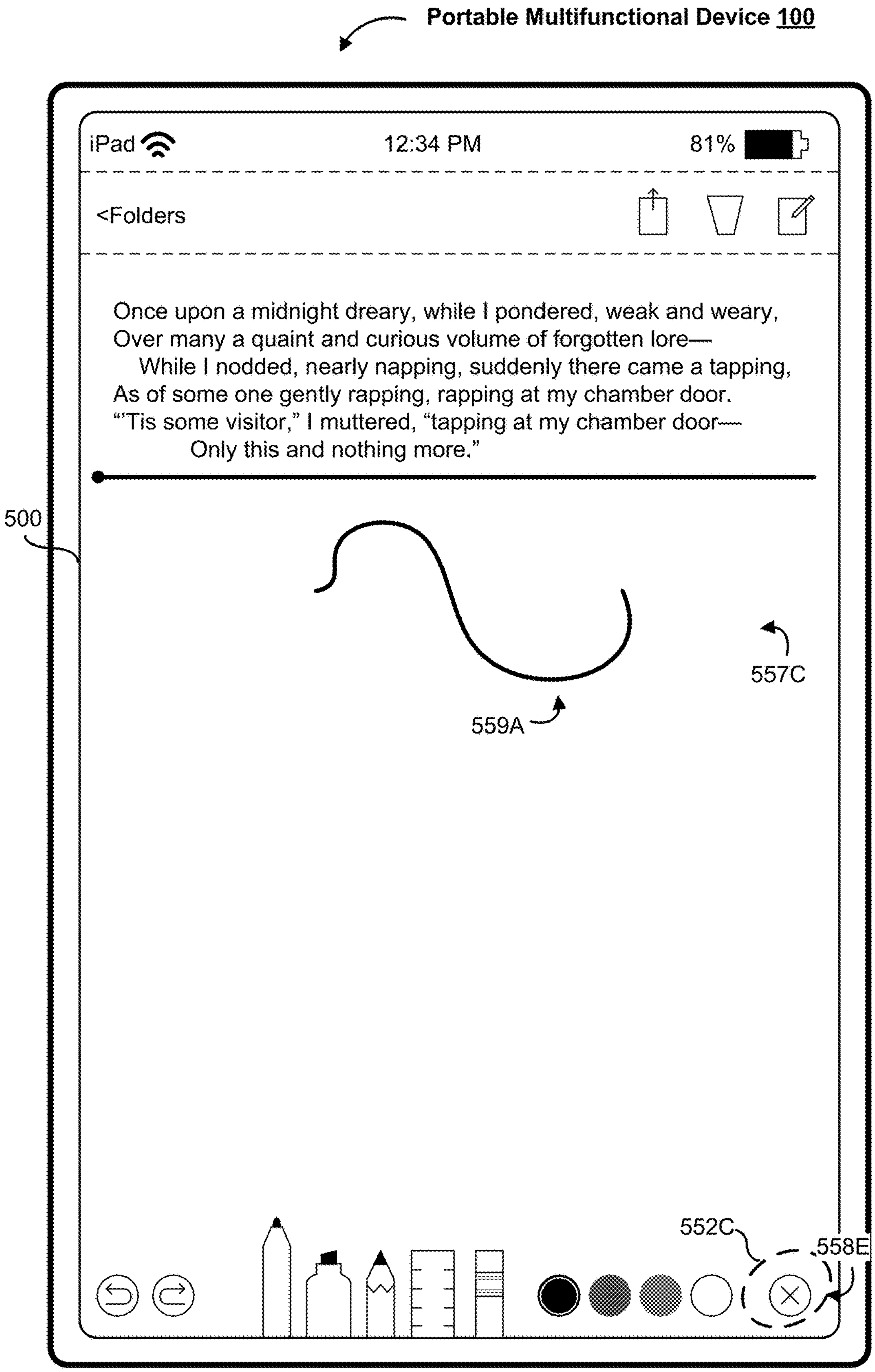
Figure 5B:
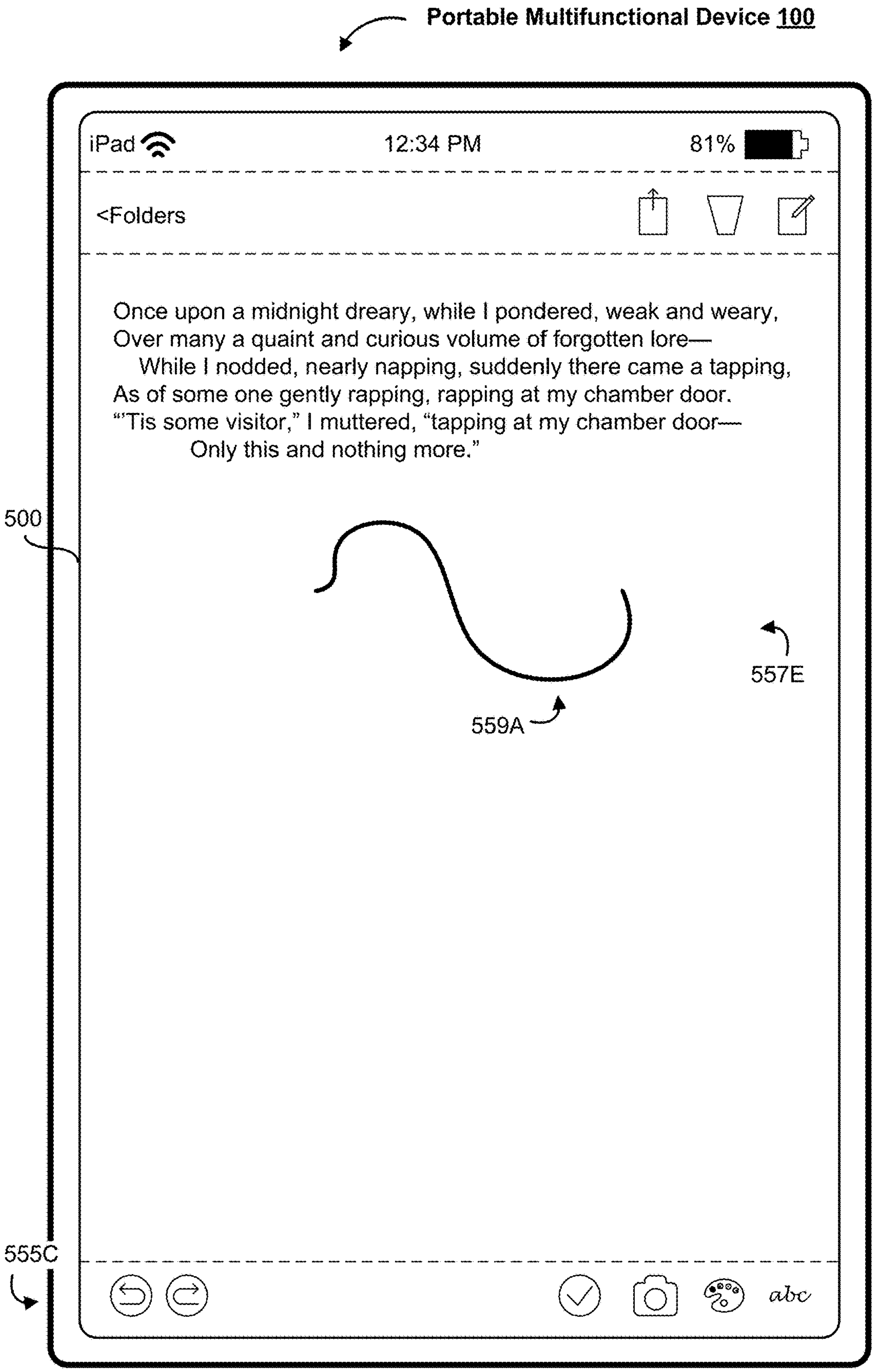
Figure 5B:
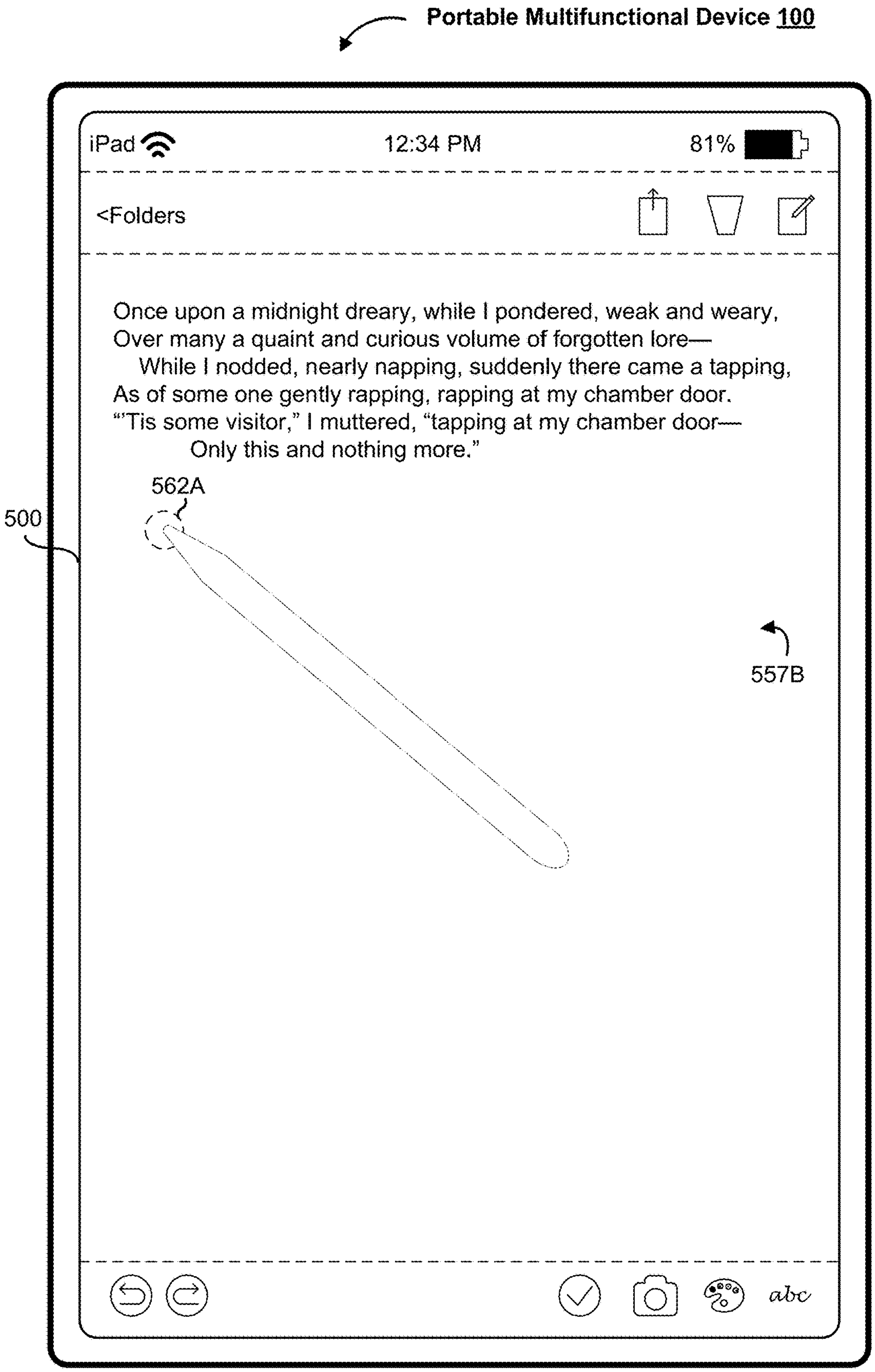
Figure 5B:
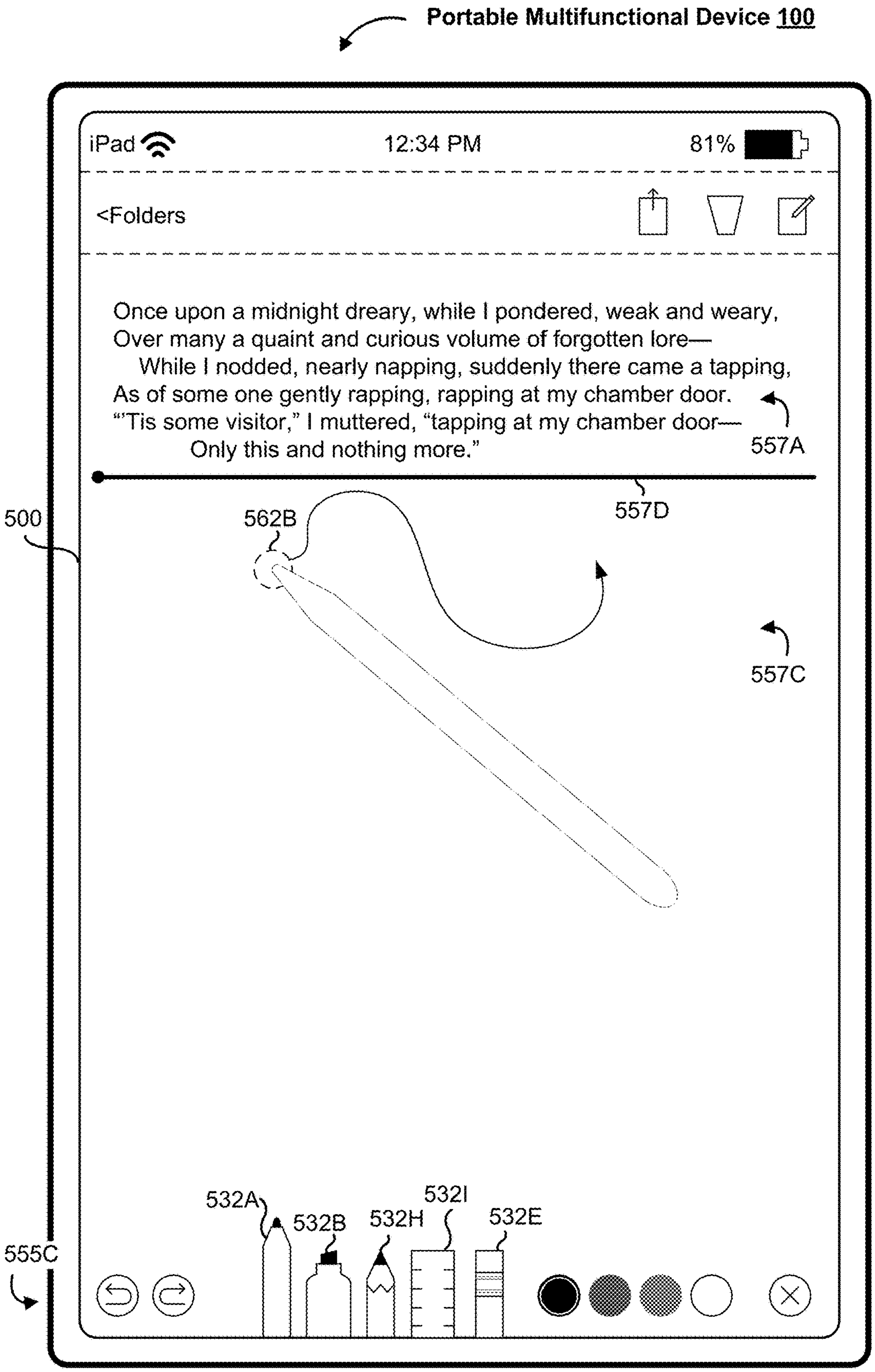
Figure 5B:
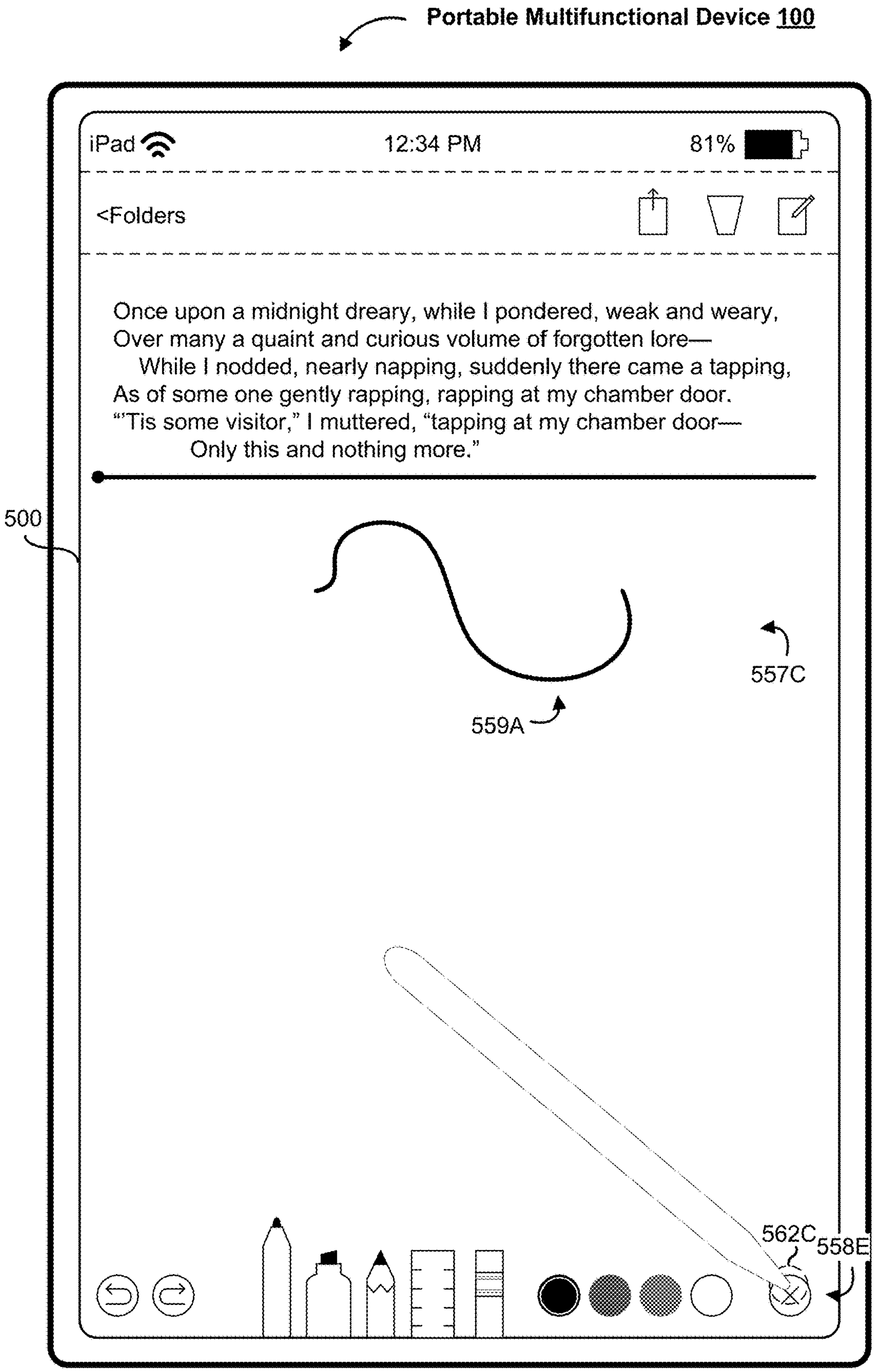
Figure 5B:
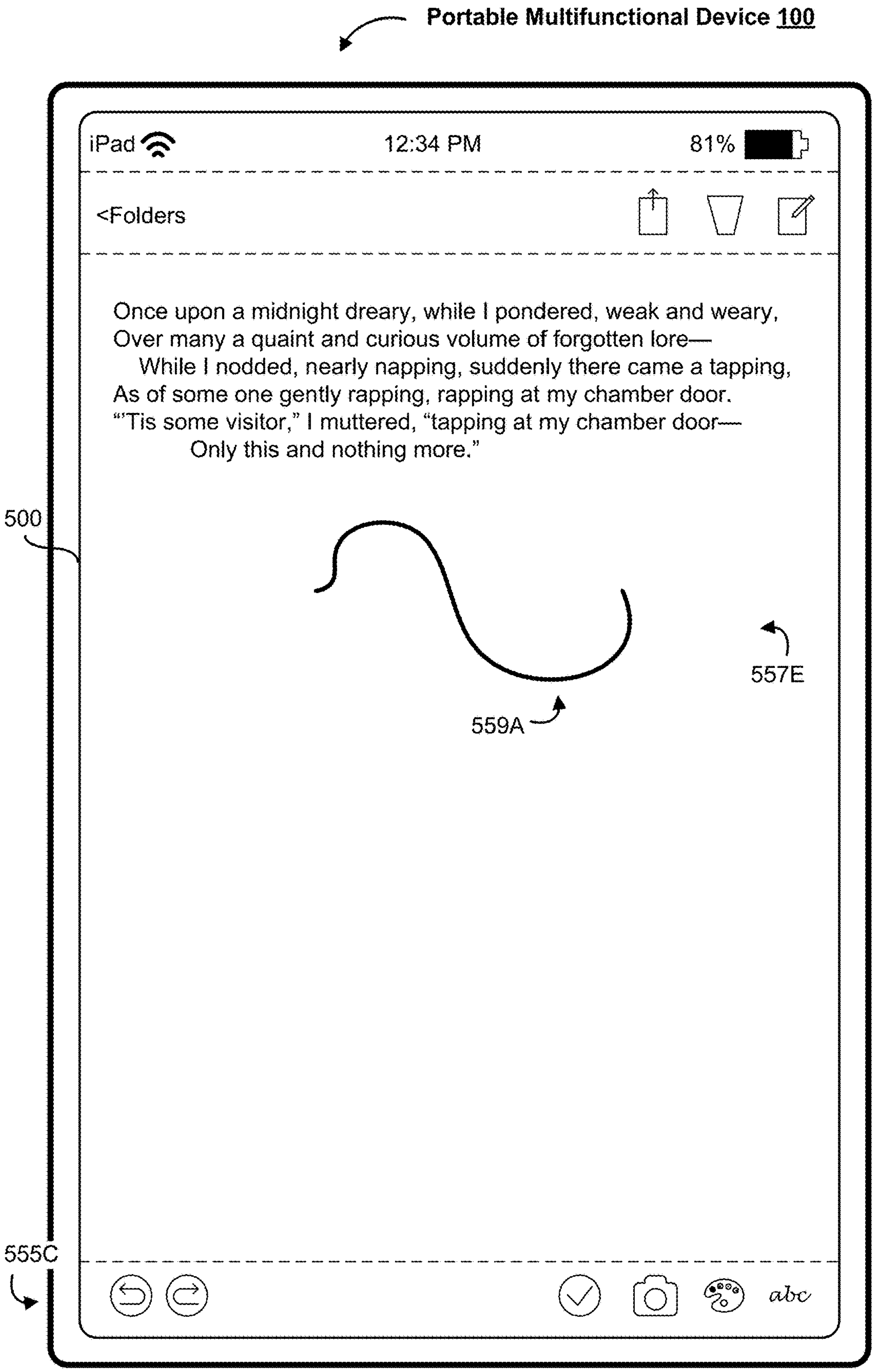
Figure 5B:
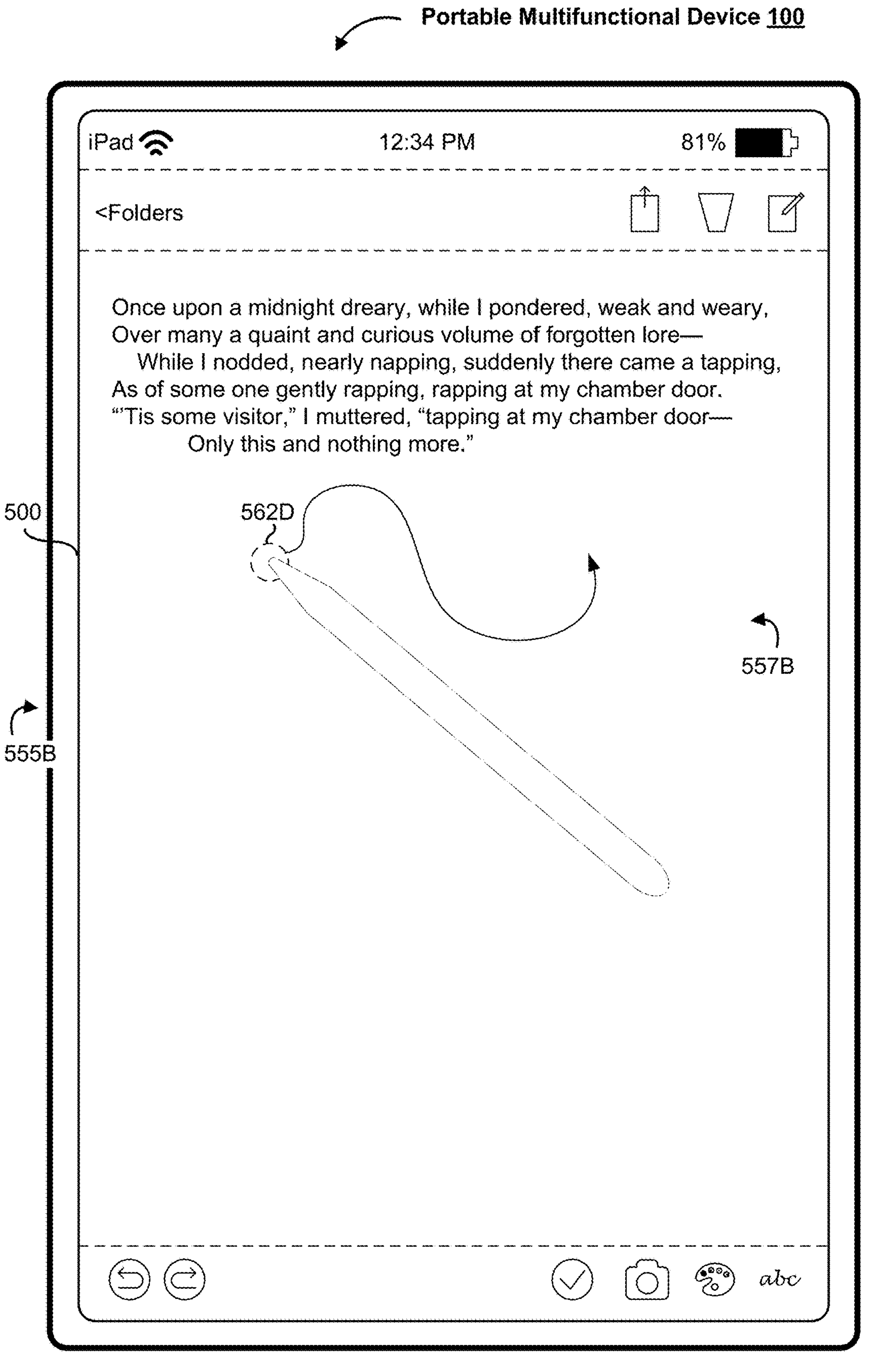
Figure 5B:
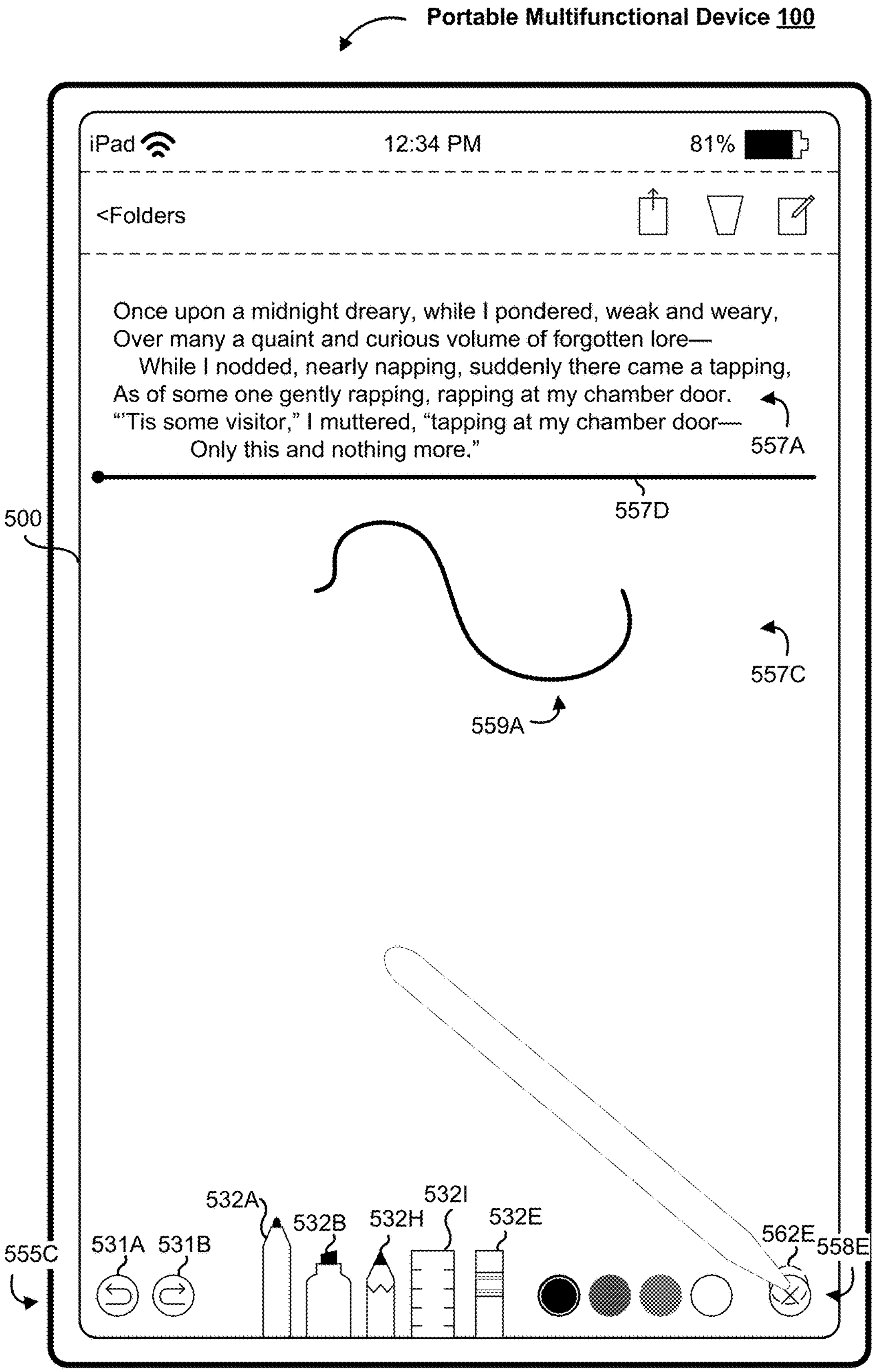
Figure 5B:
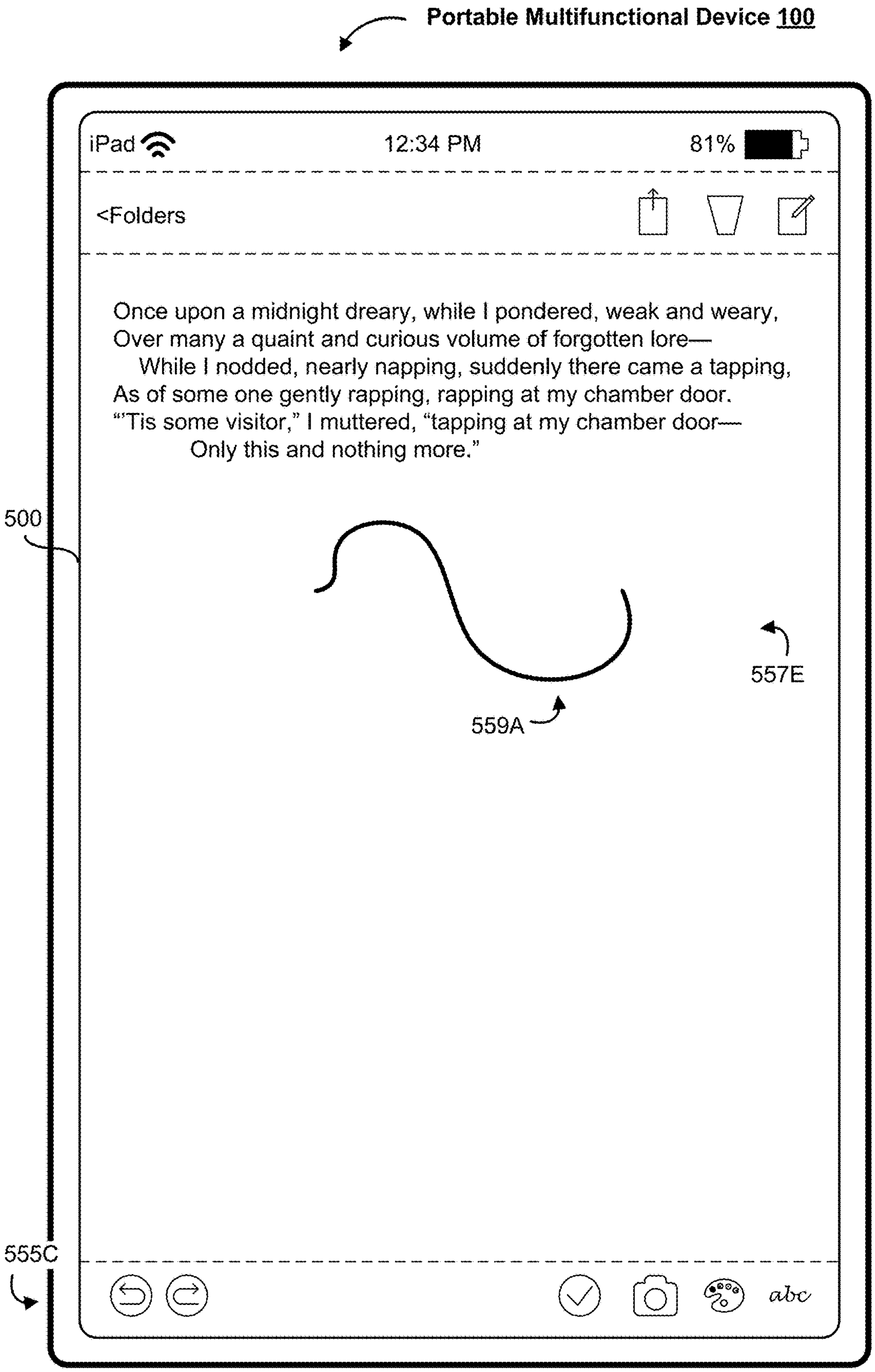
Figure 5B:
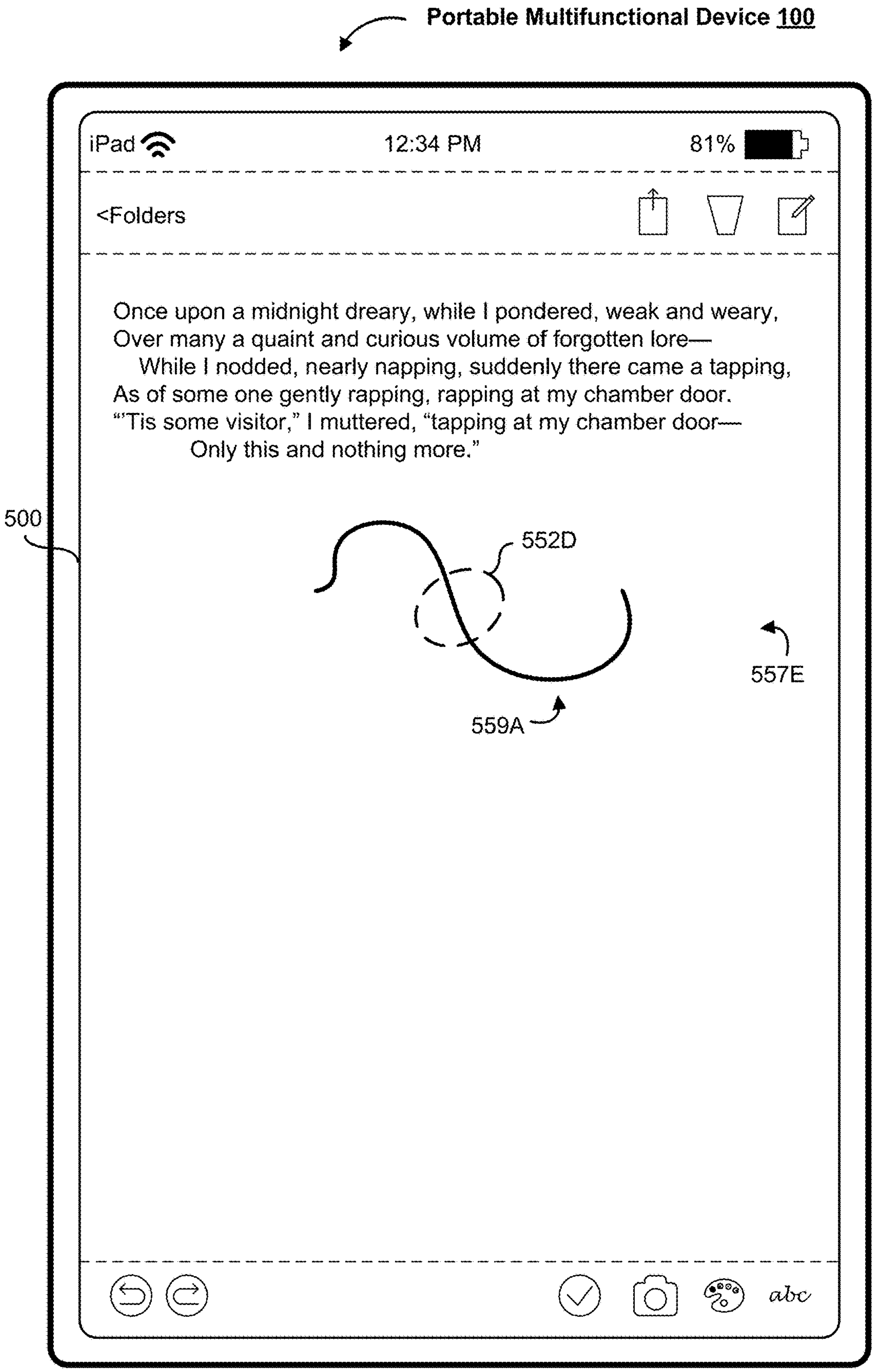
Figure 5B:
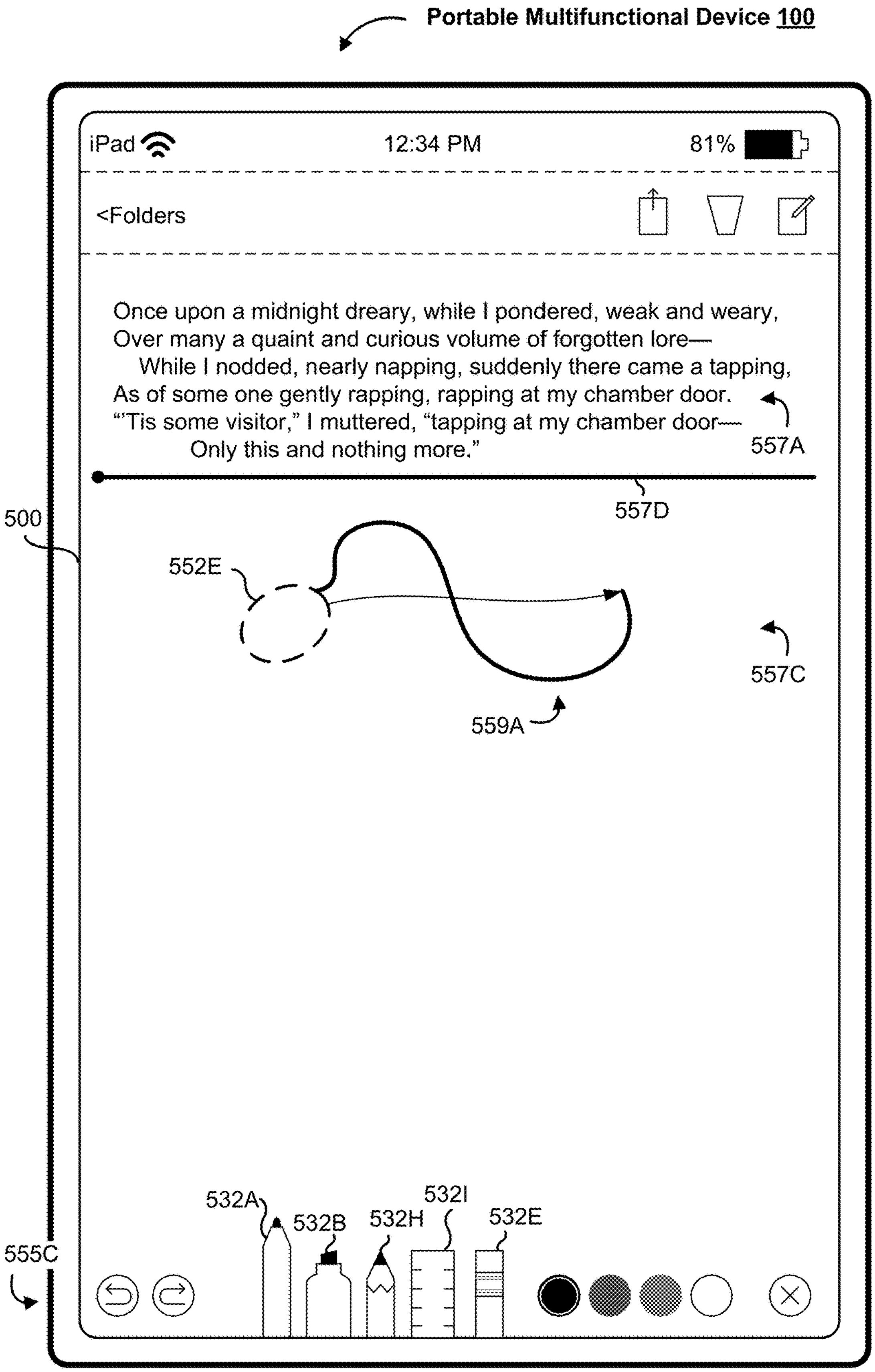
Figure 5B:
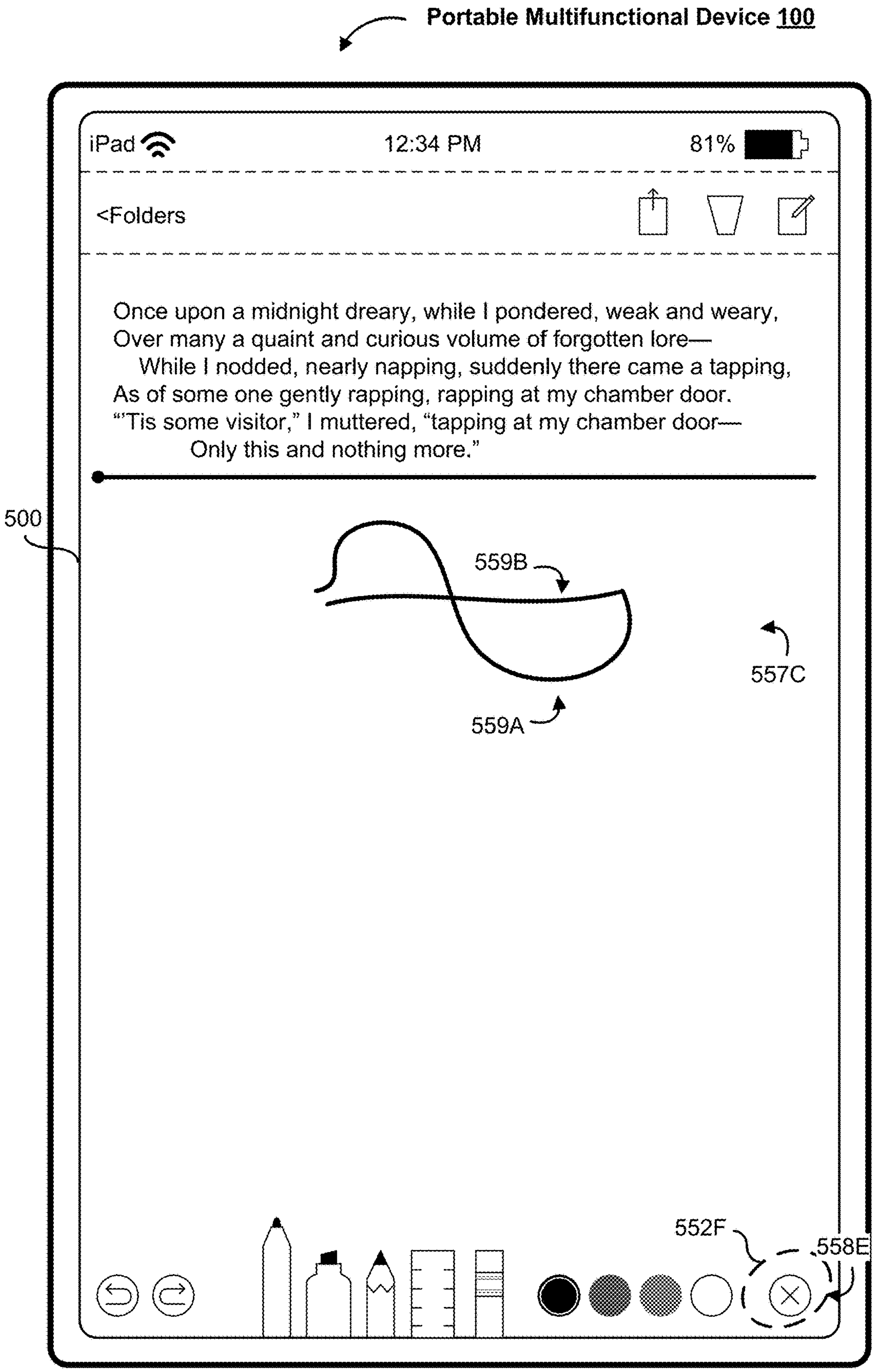
Figure 5B:
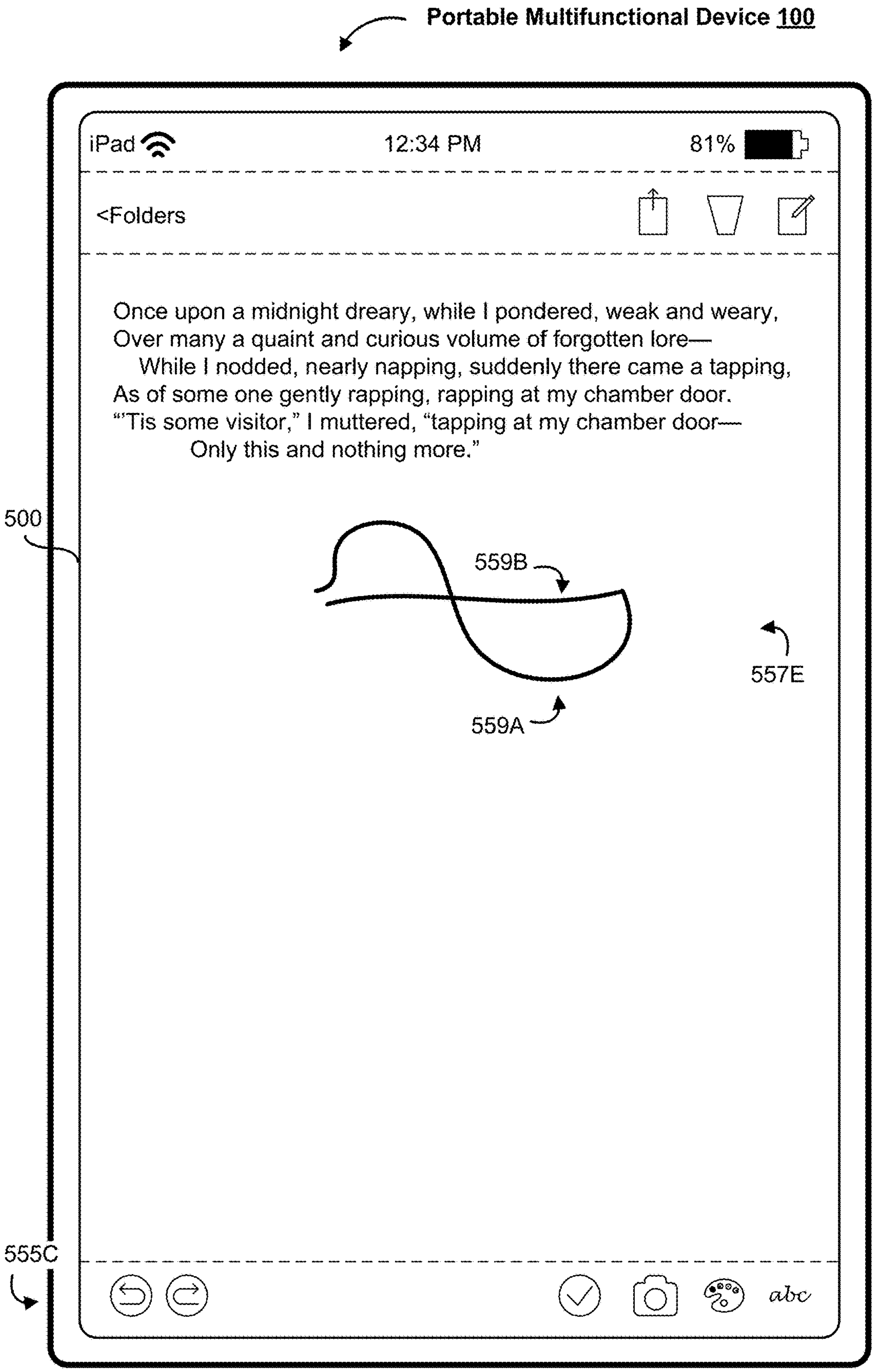
Figure 5B:
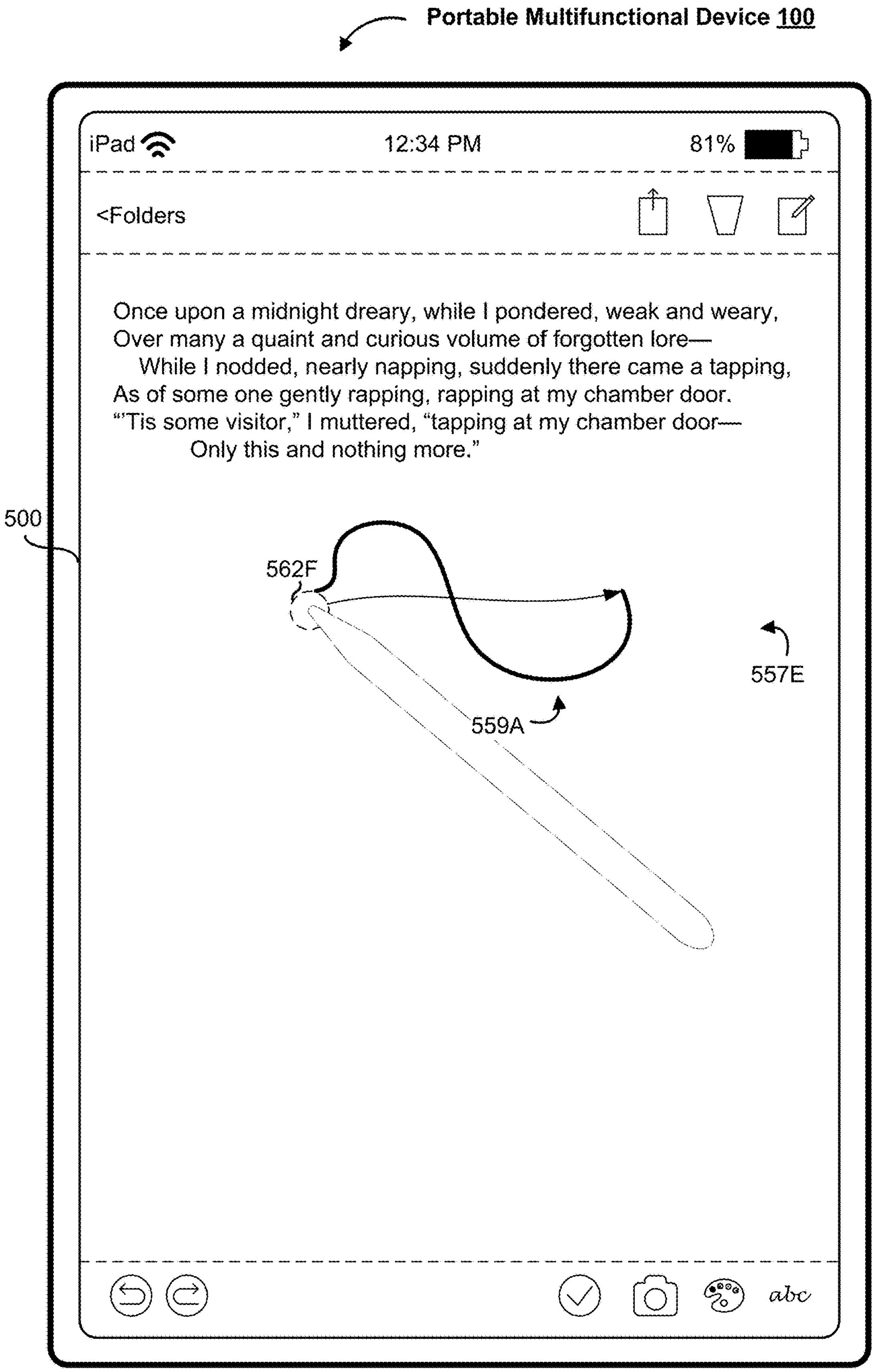
Figure 5B:
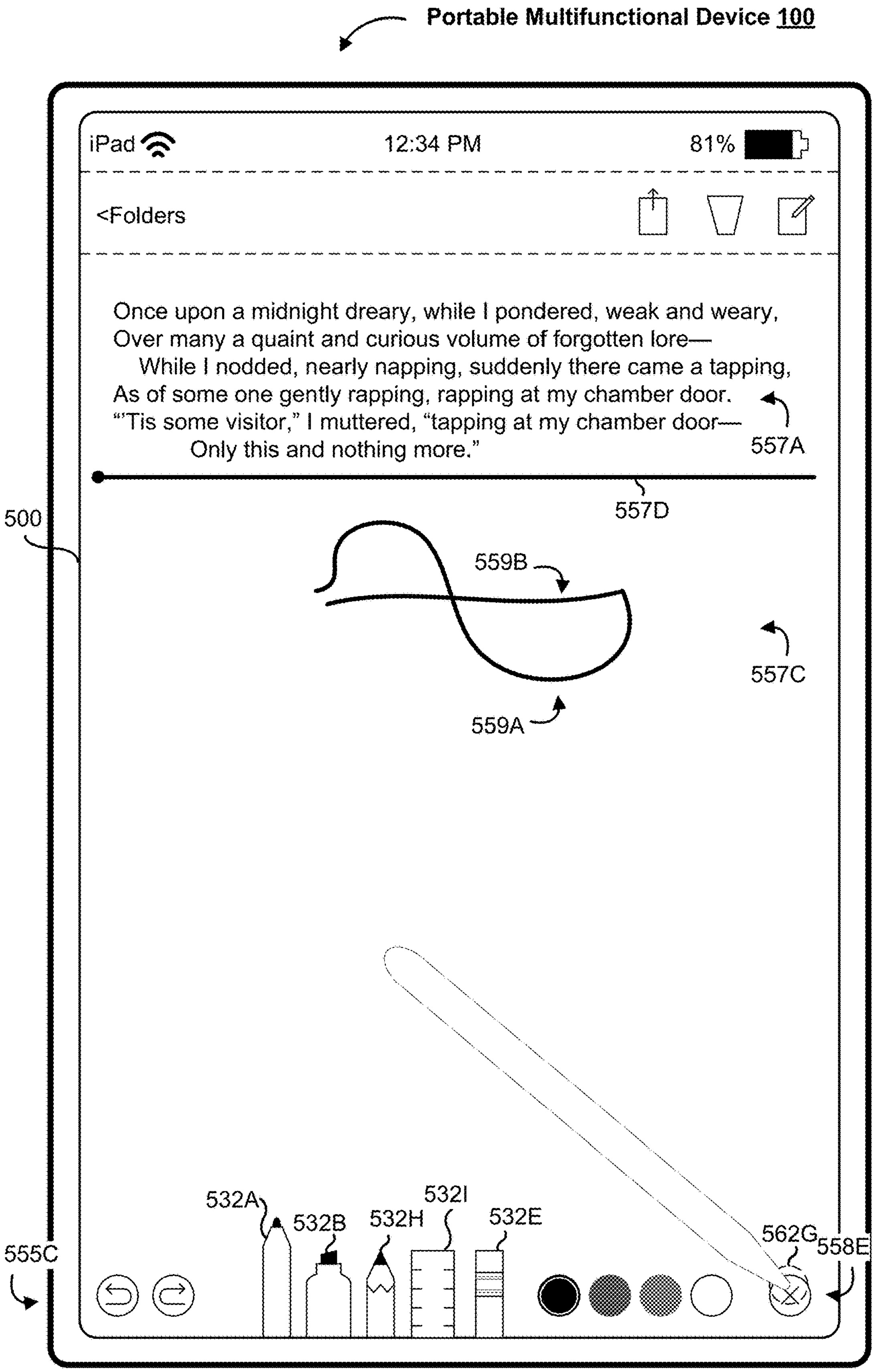
Figure 5B:
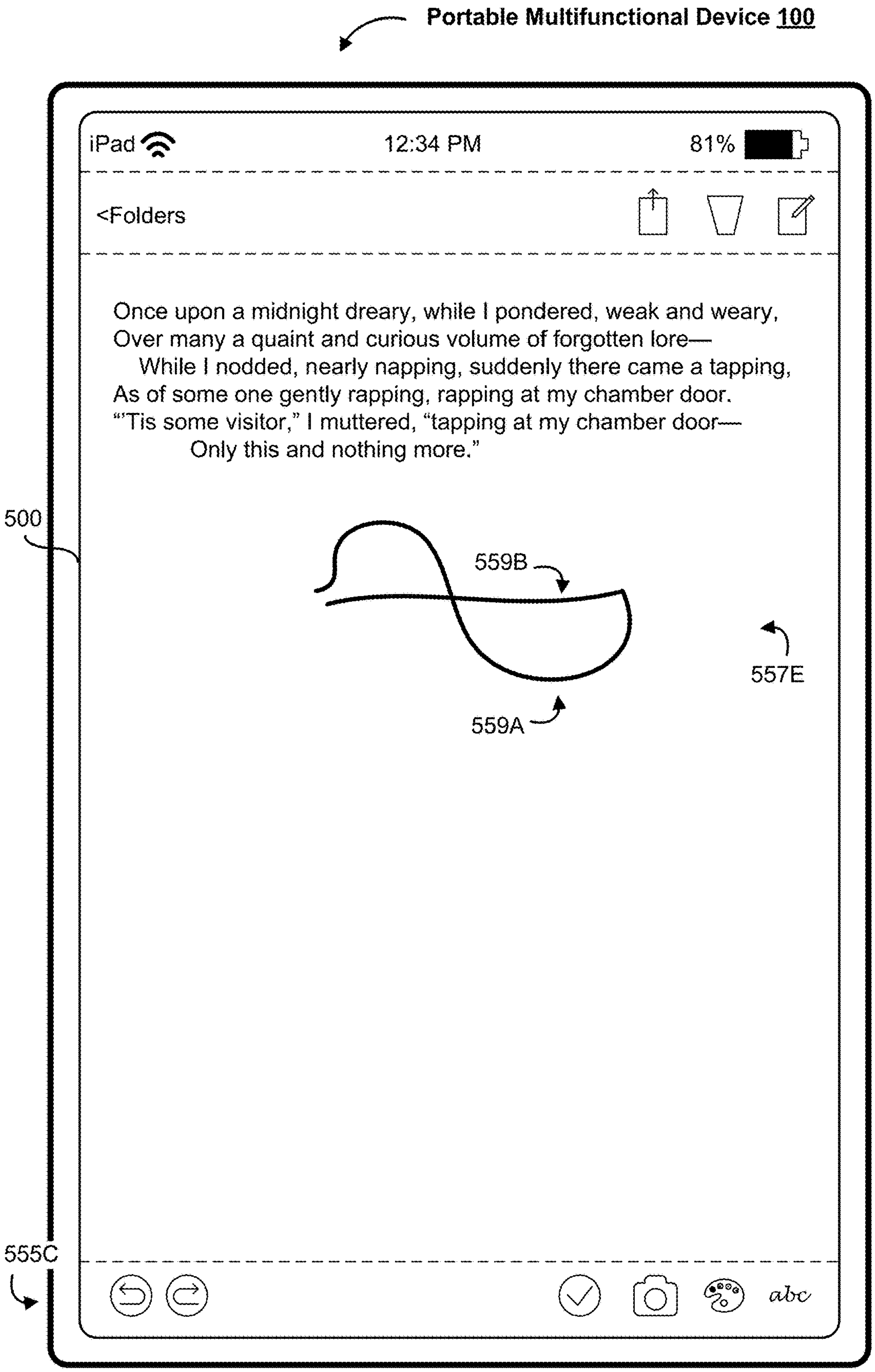
Figure 5B:
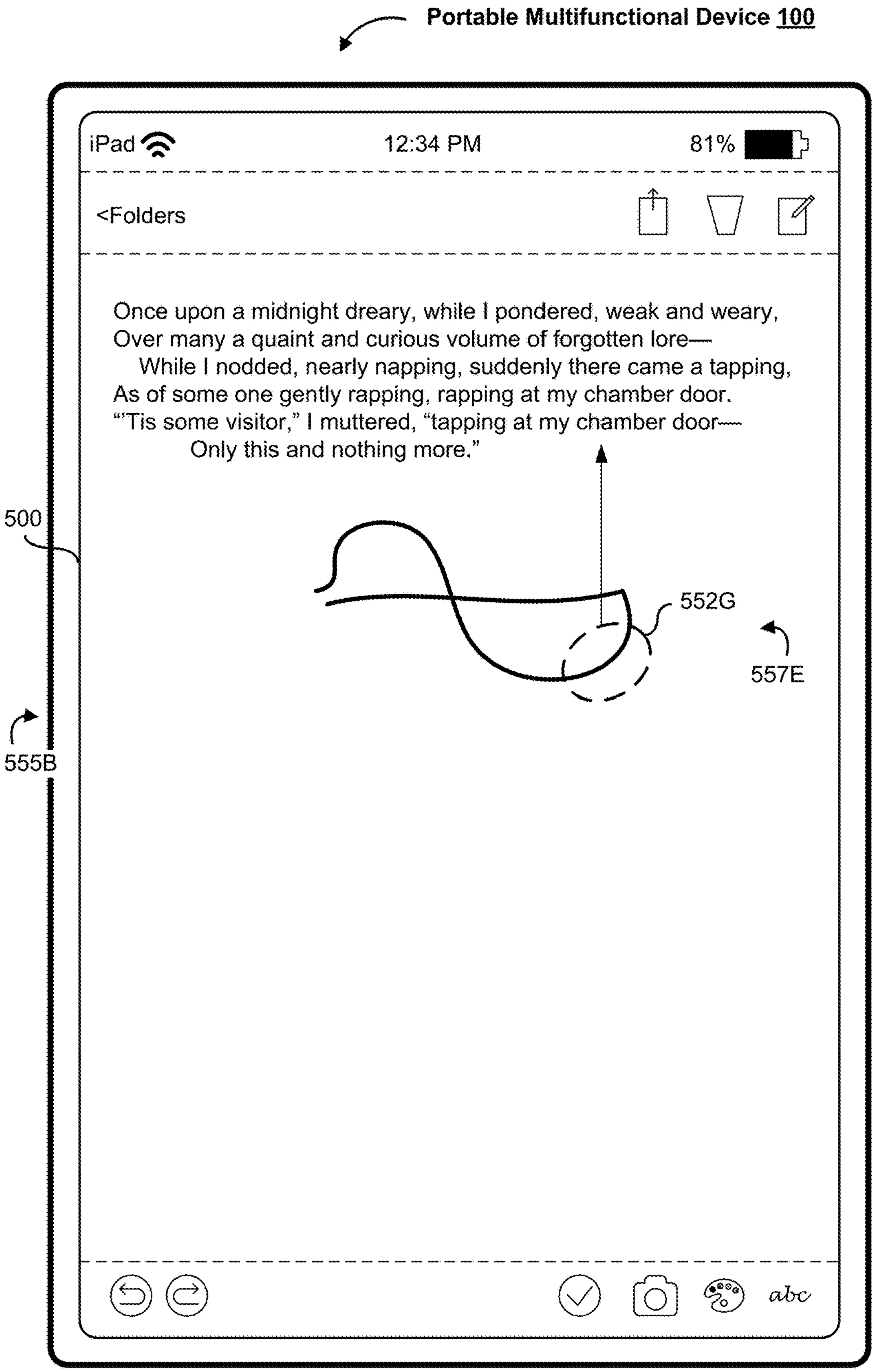
Figure 5B:
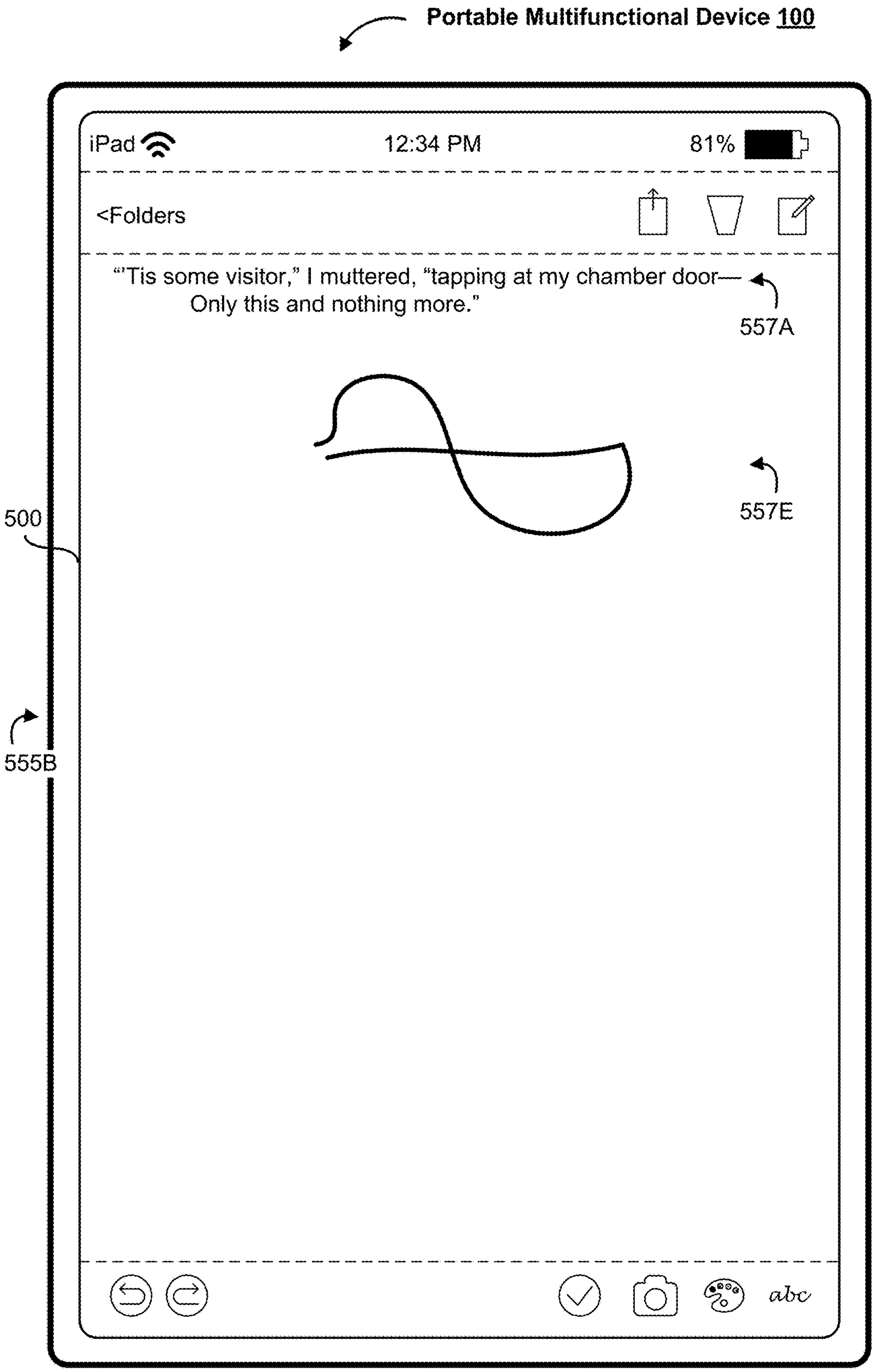
Figure 5B:
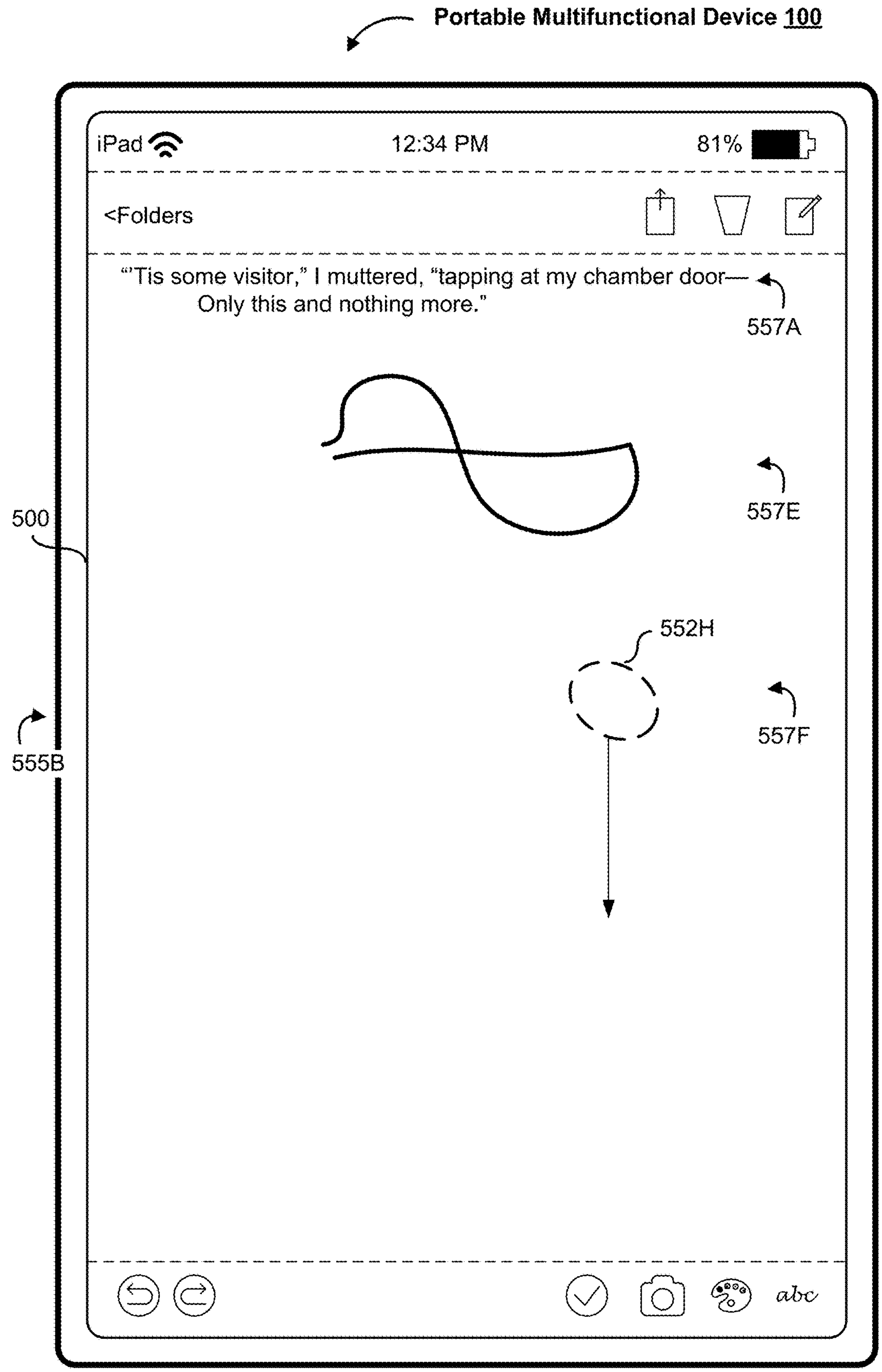
Figure 5C:
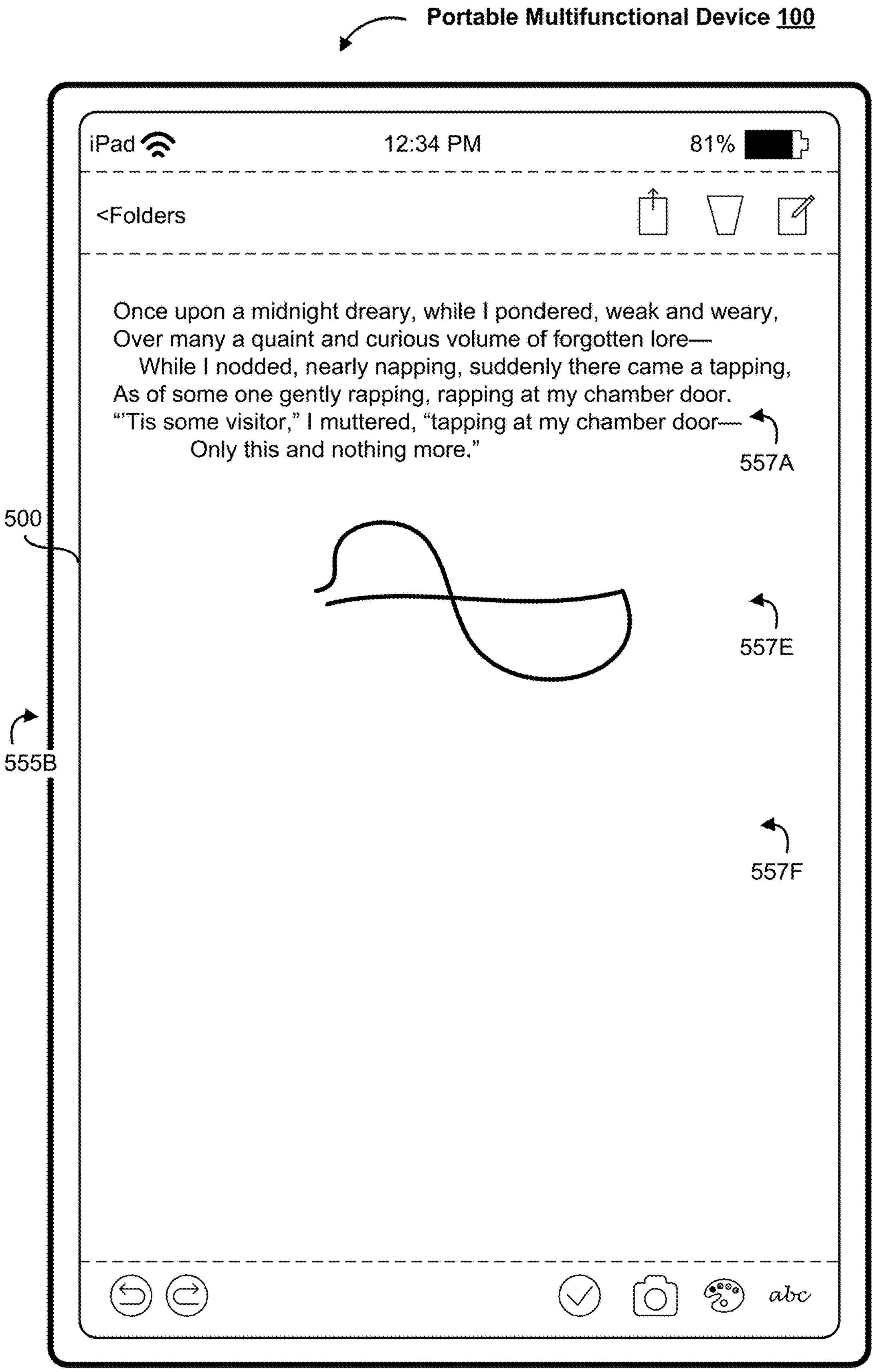
Figure 5C:
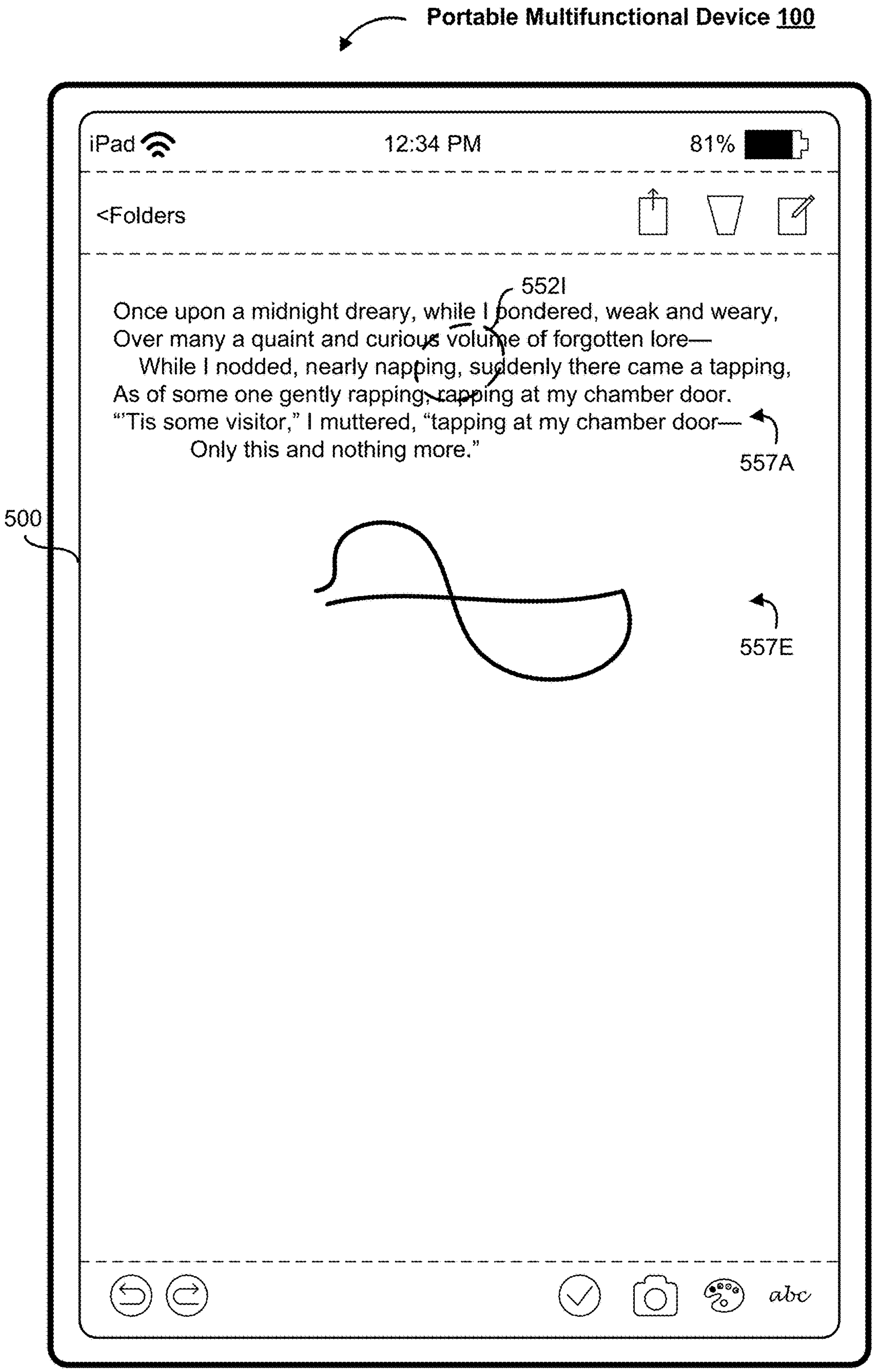
Figure 5C:
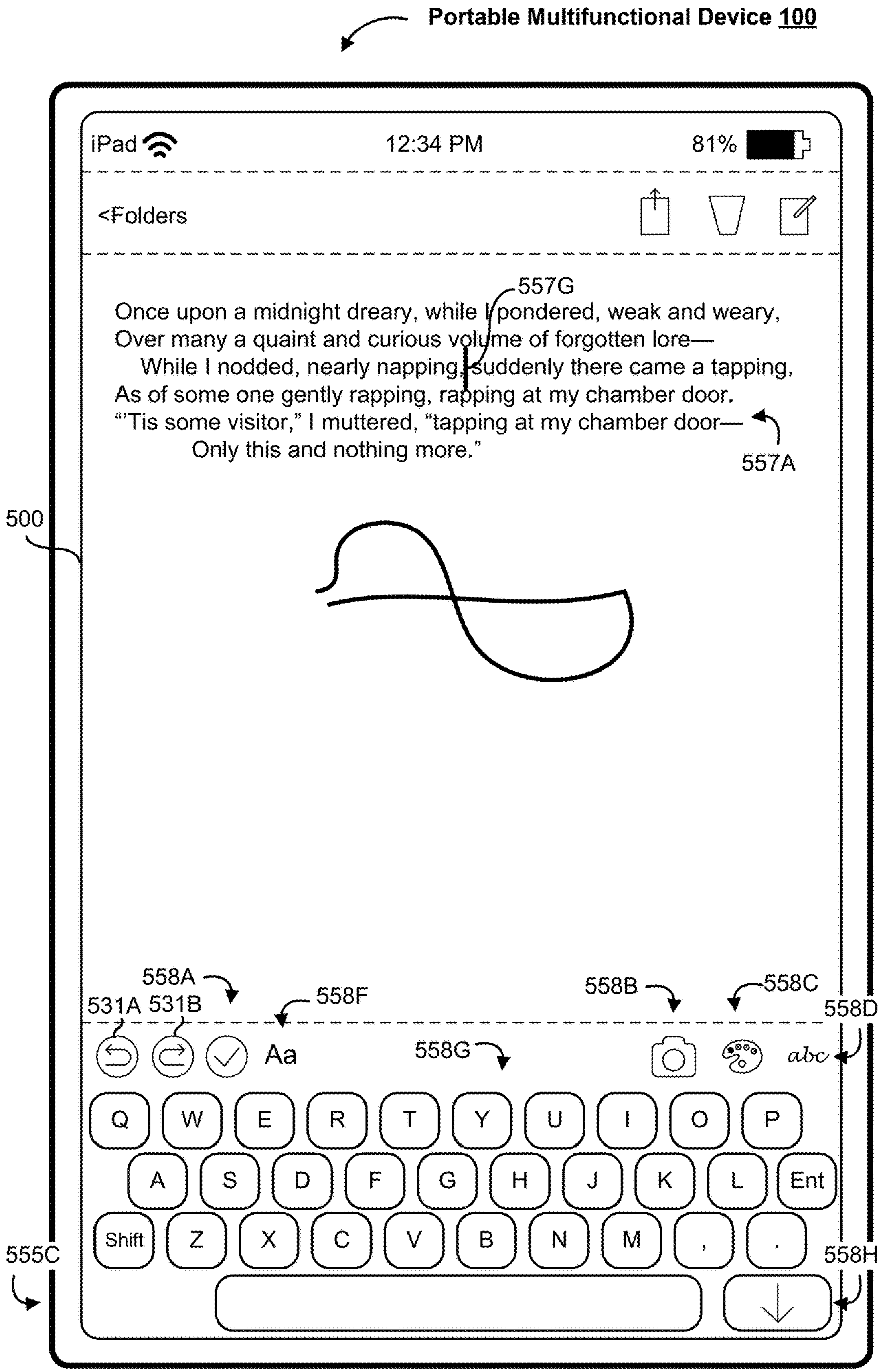
Figure 5C:
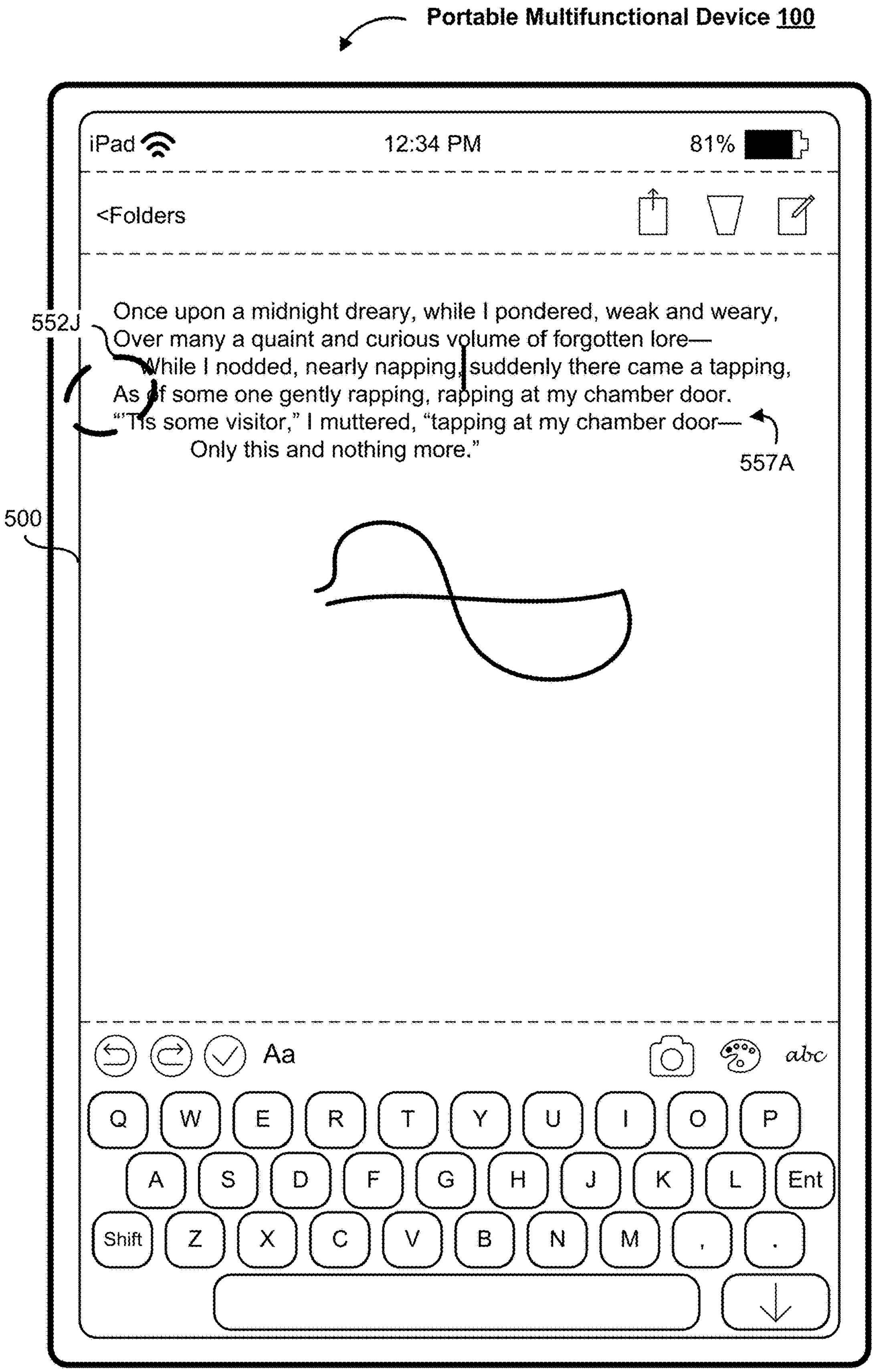
Figure 5C:
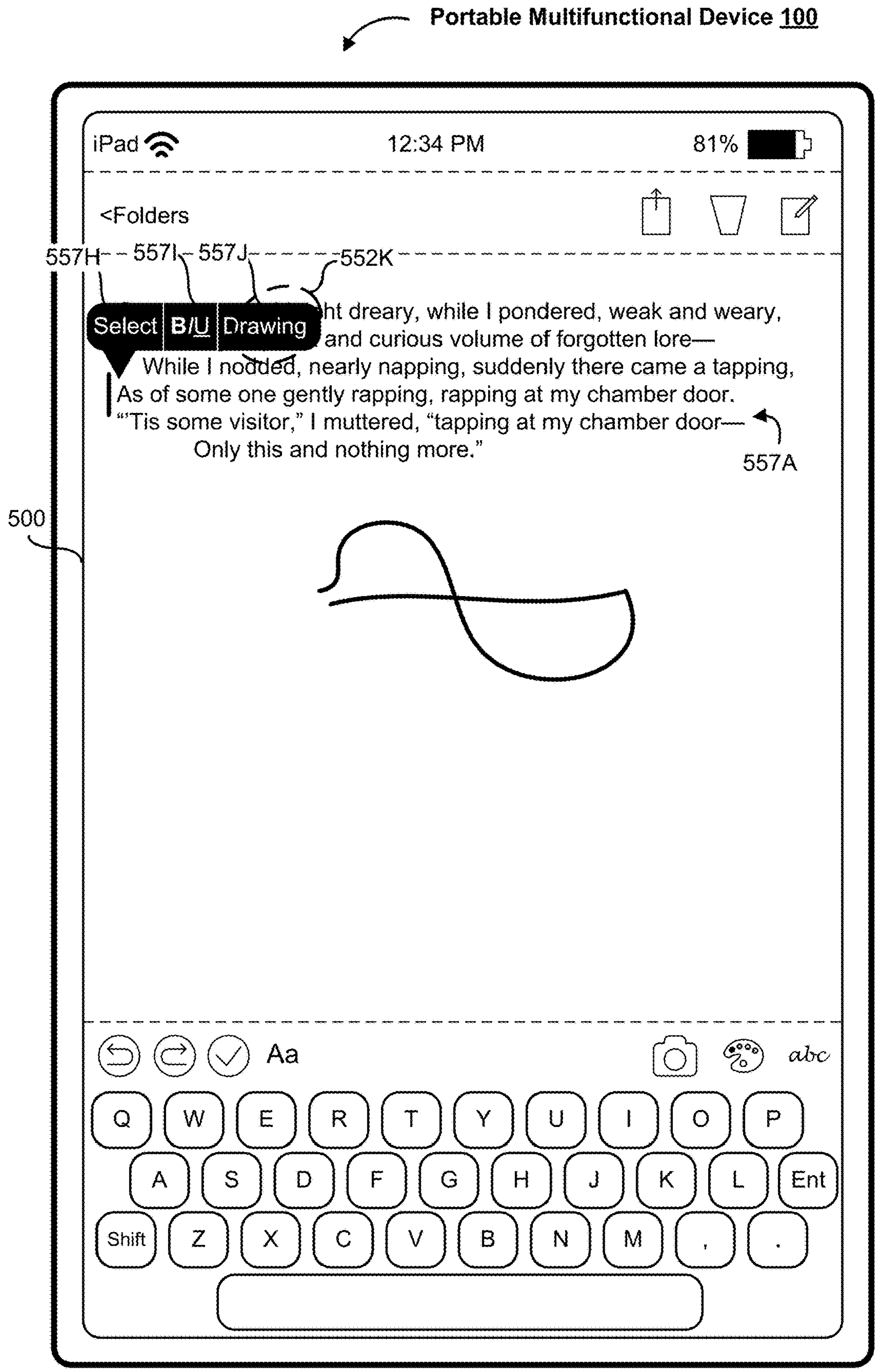
Figure 5C:
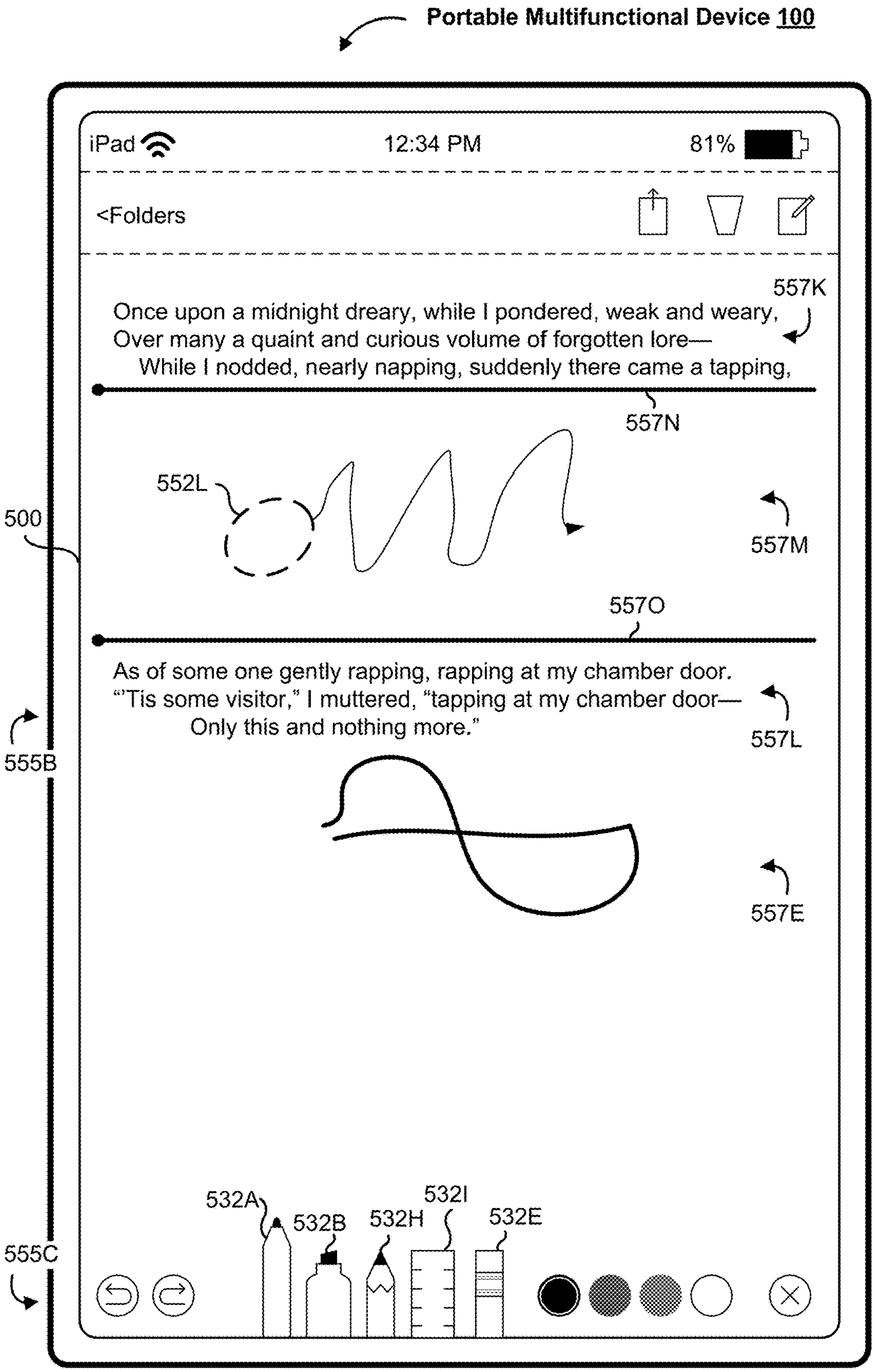
Figure 5C:
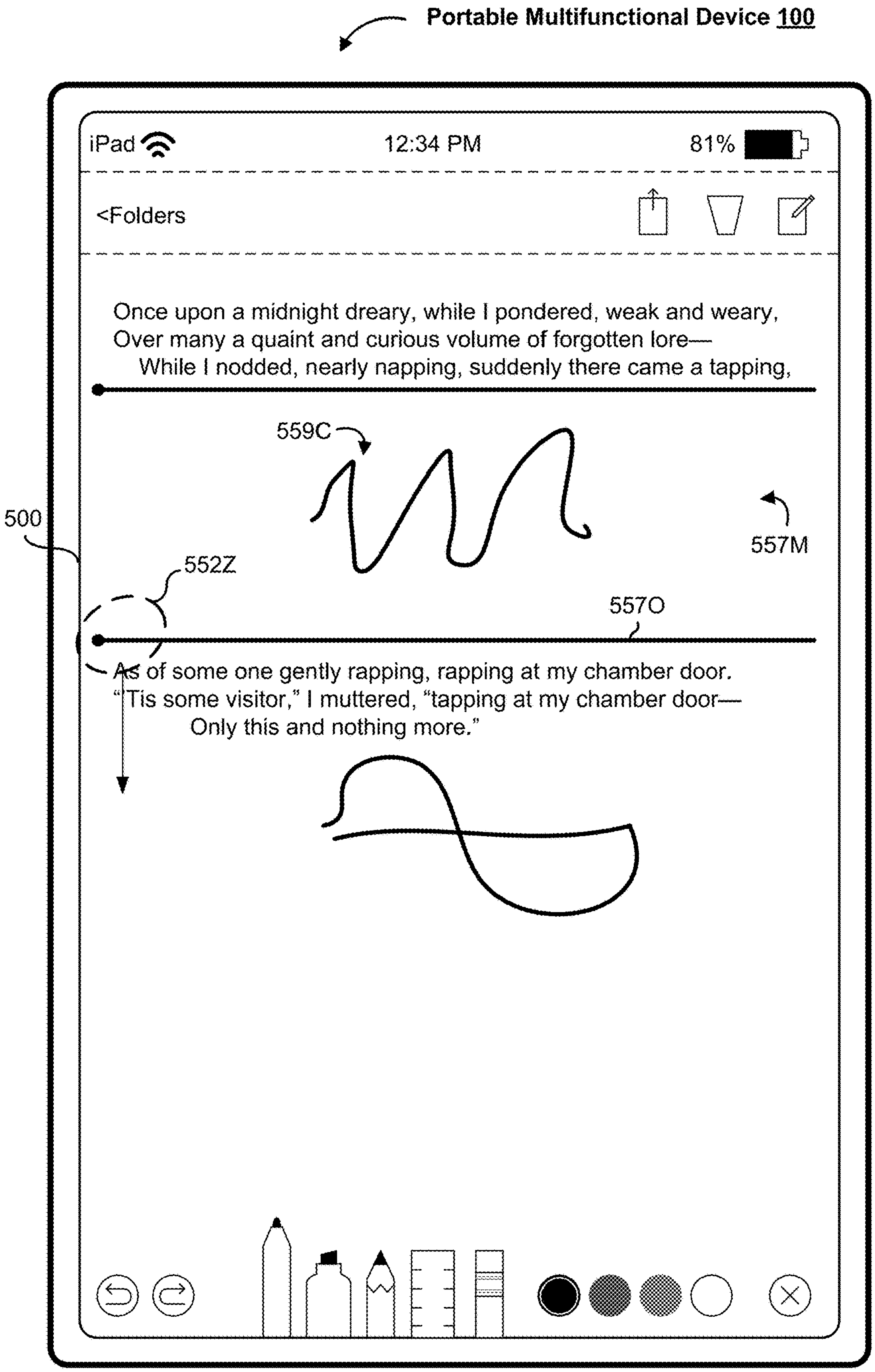
Figure 5C:
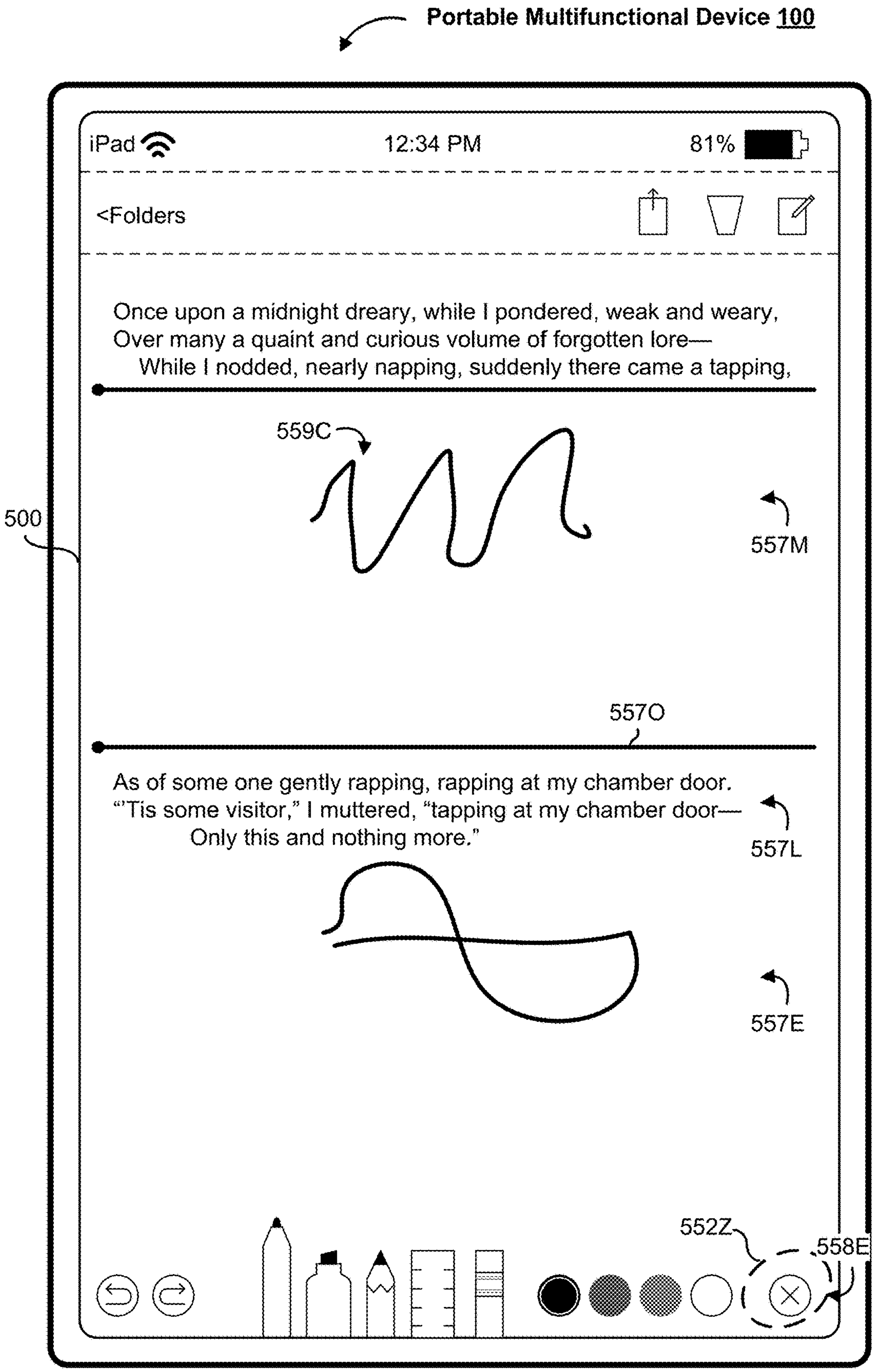
Figure 5C:
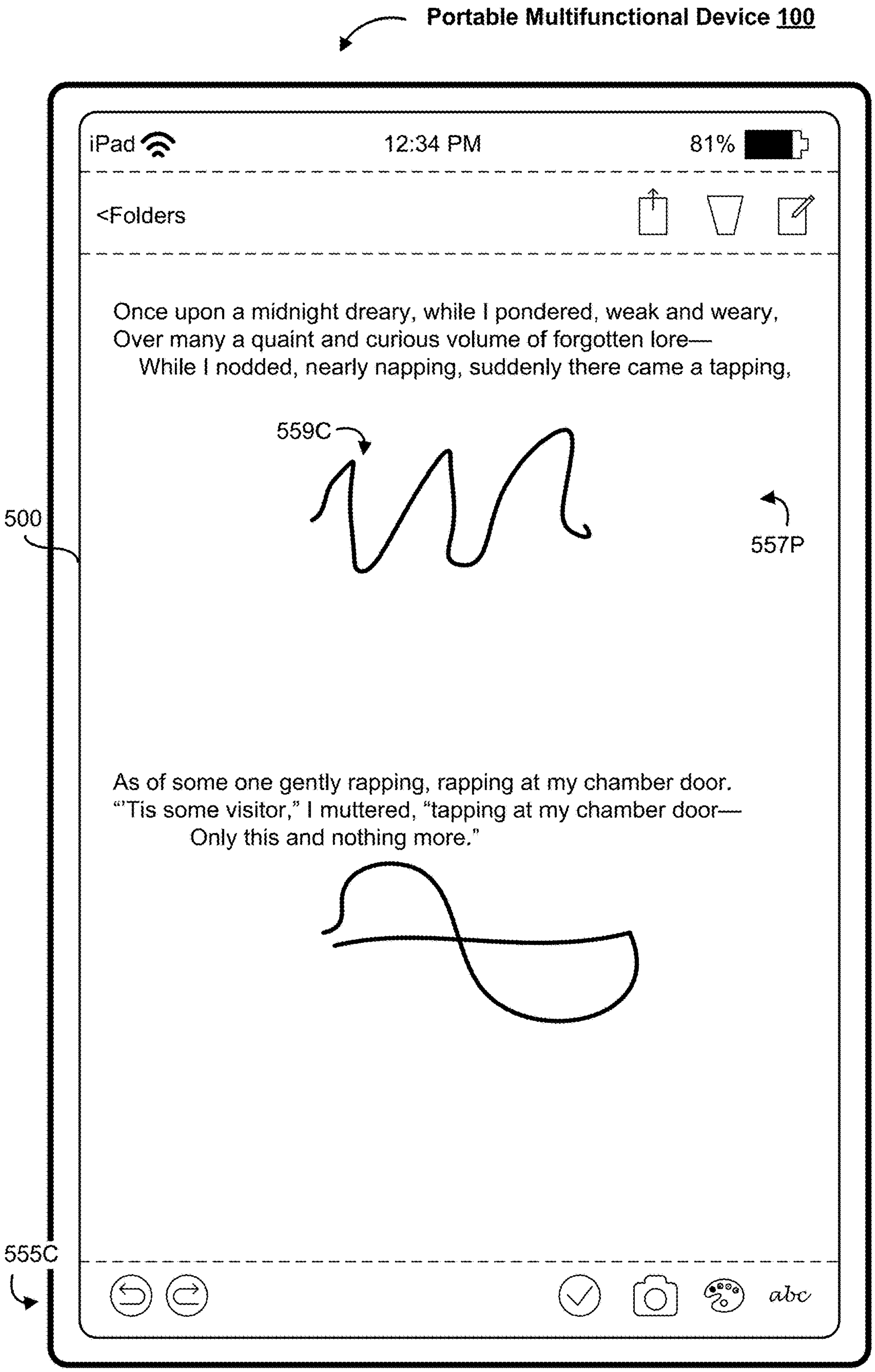
Figure 5C:
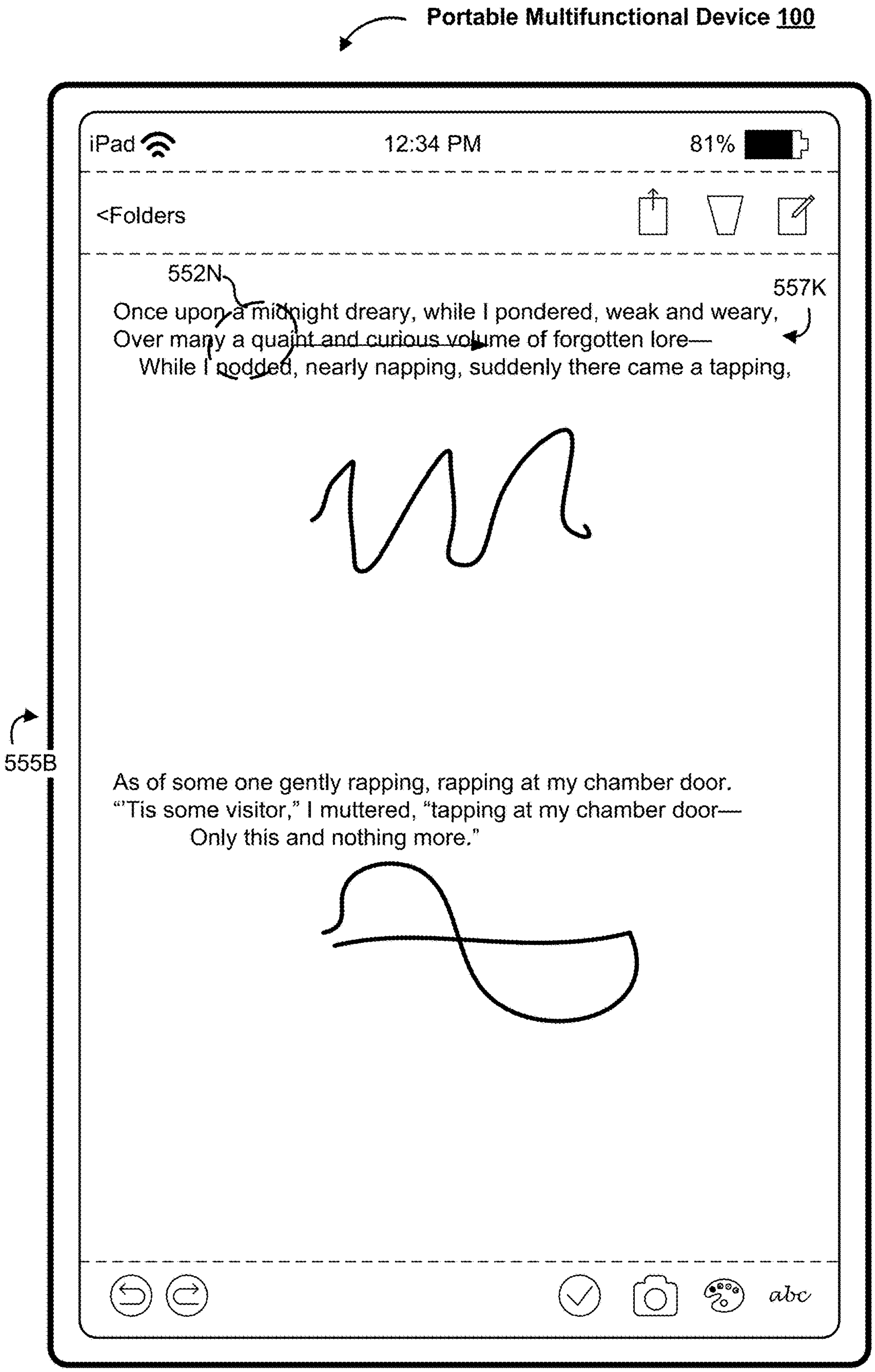
Figure 5C:
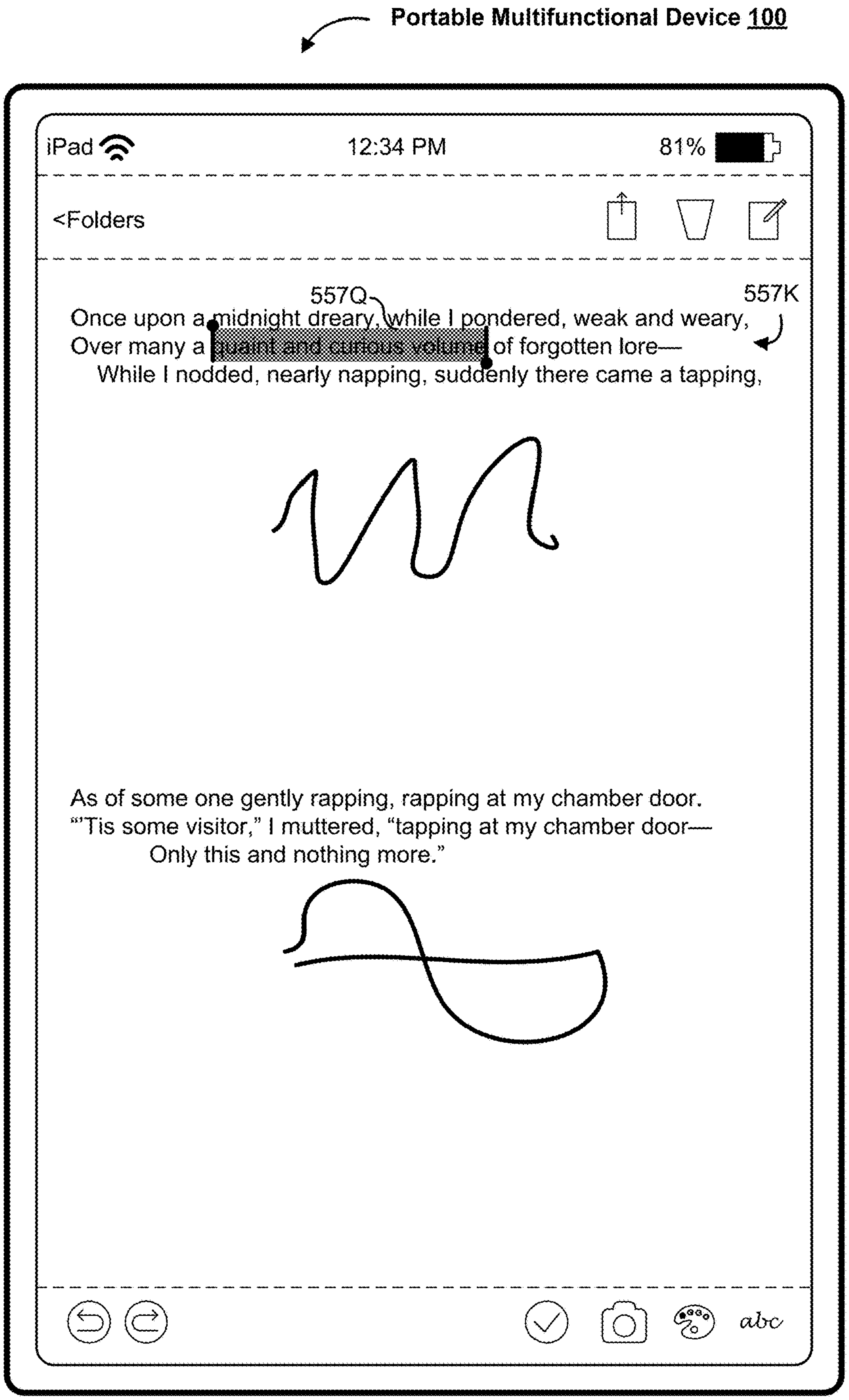
Figure 5C:
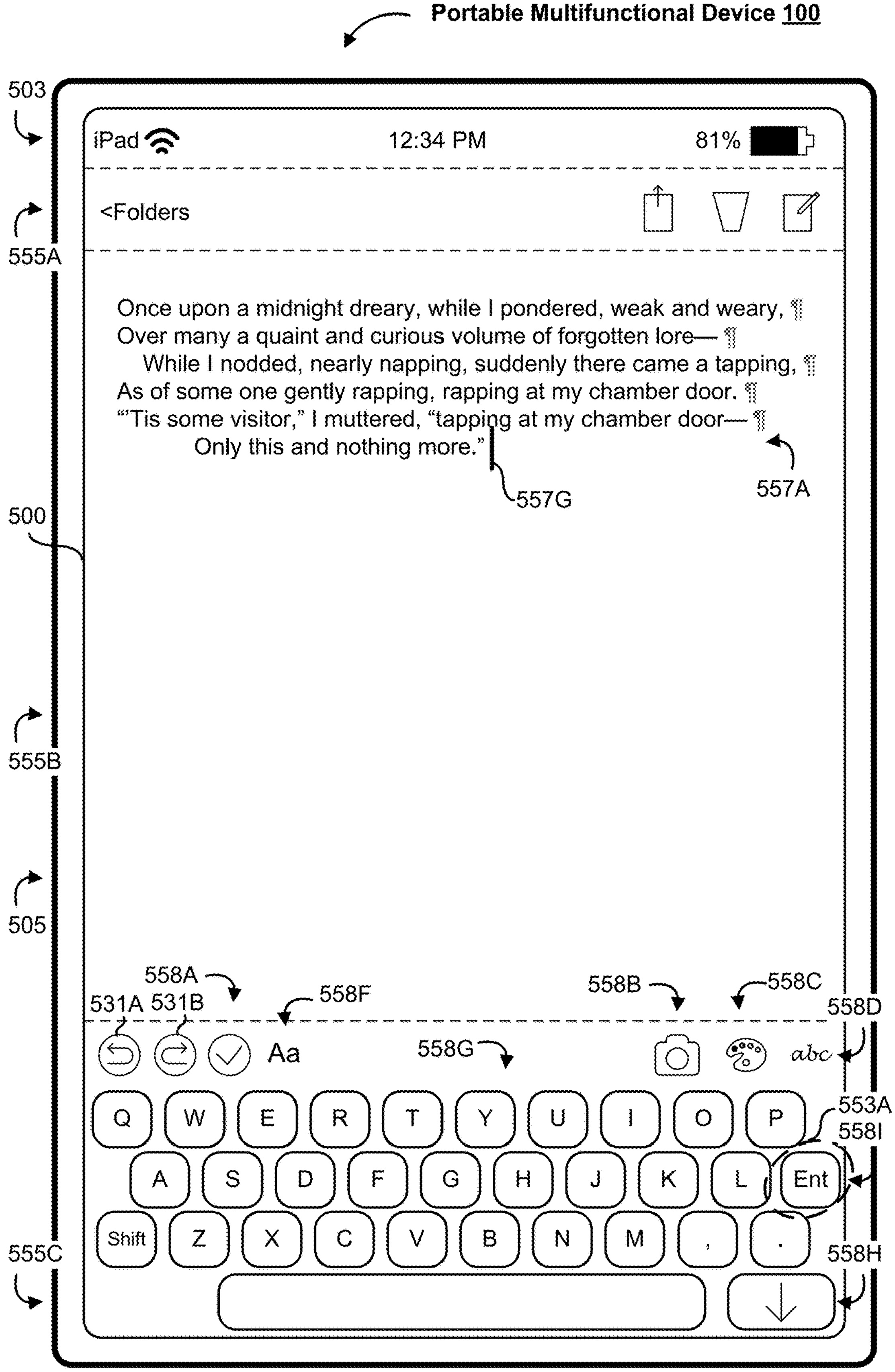
Figure 5C:
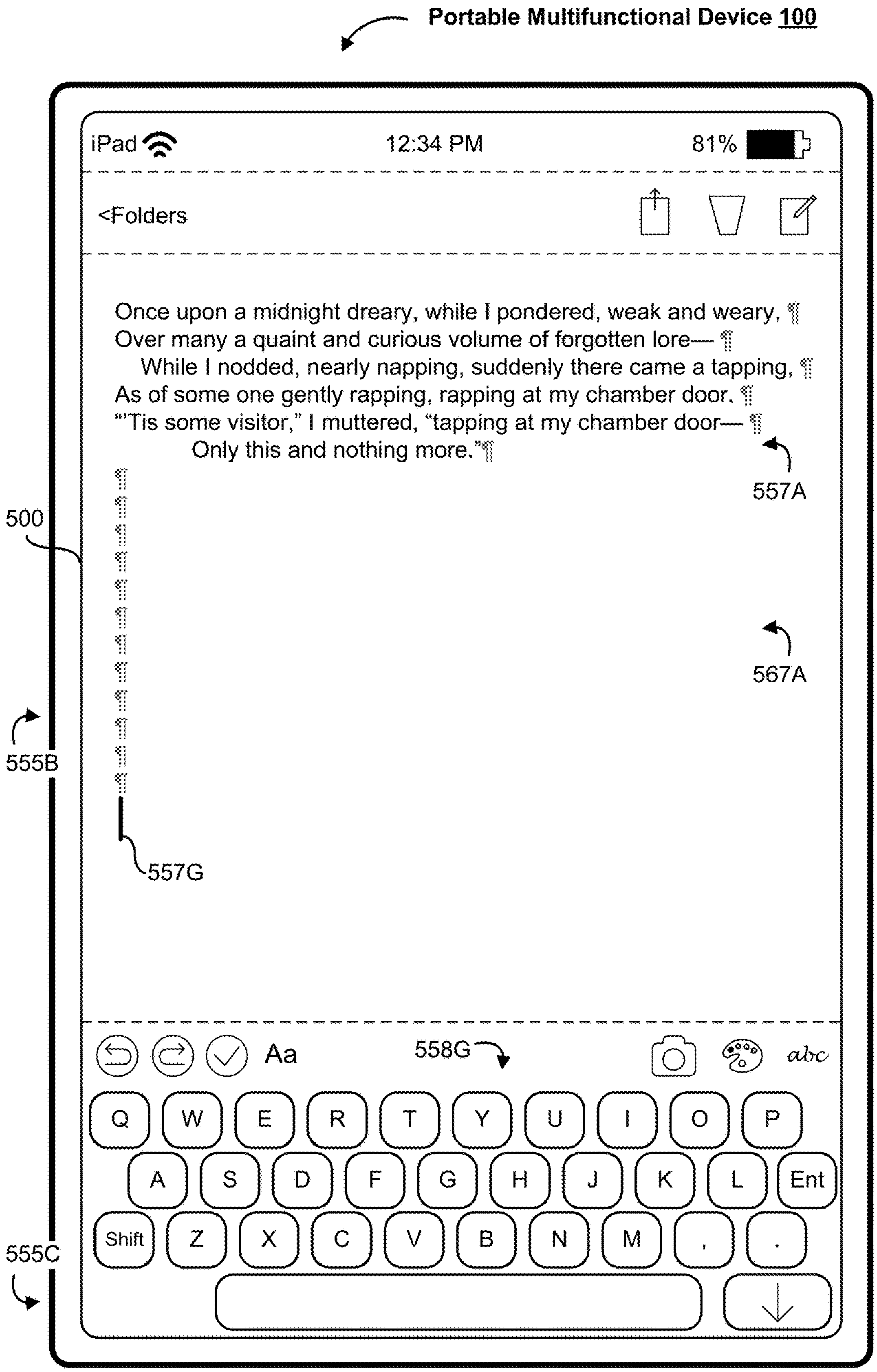
Figure 5C:
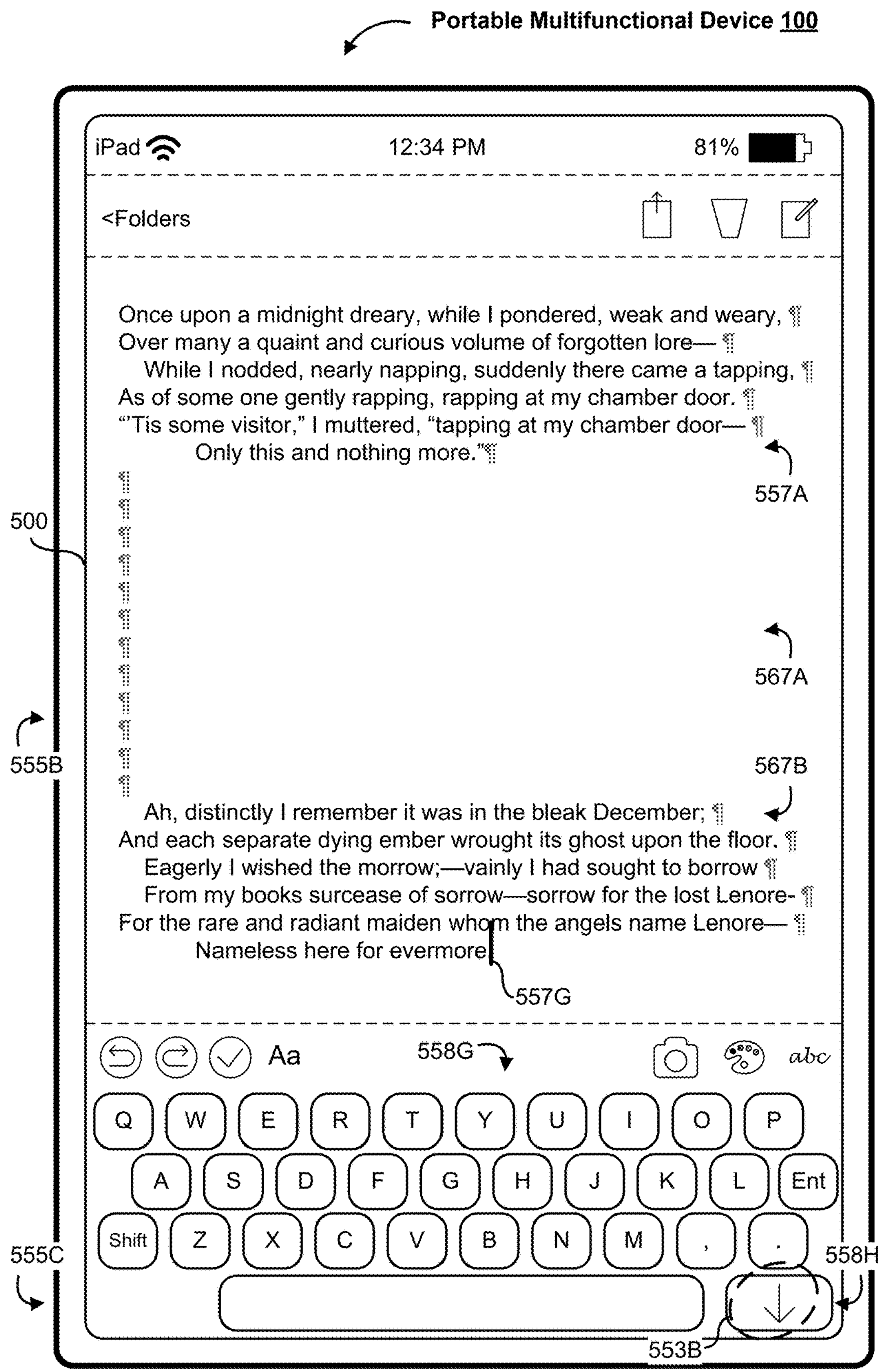
Figure 5C:
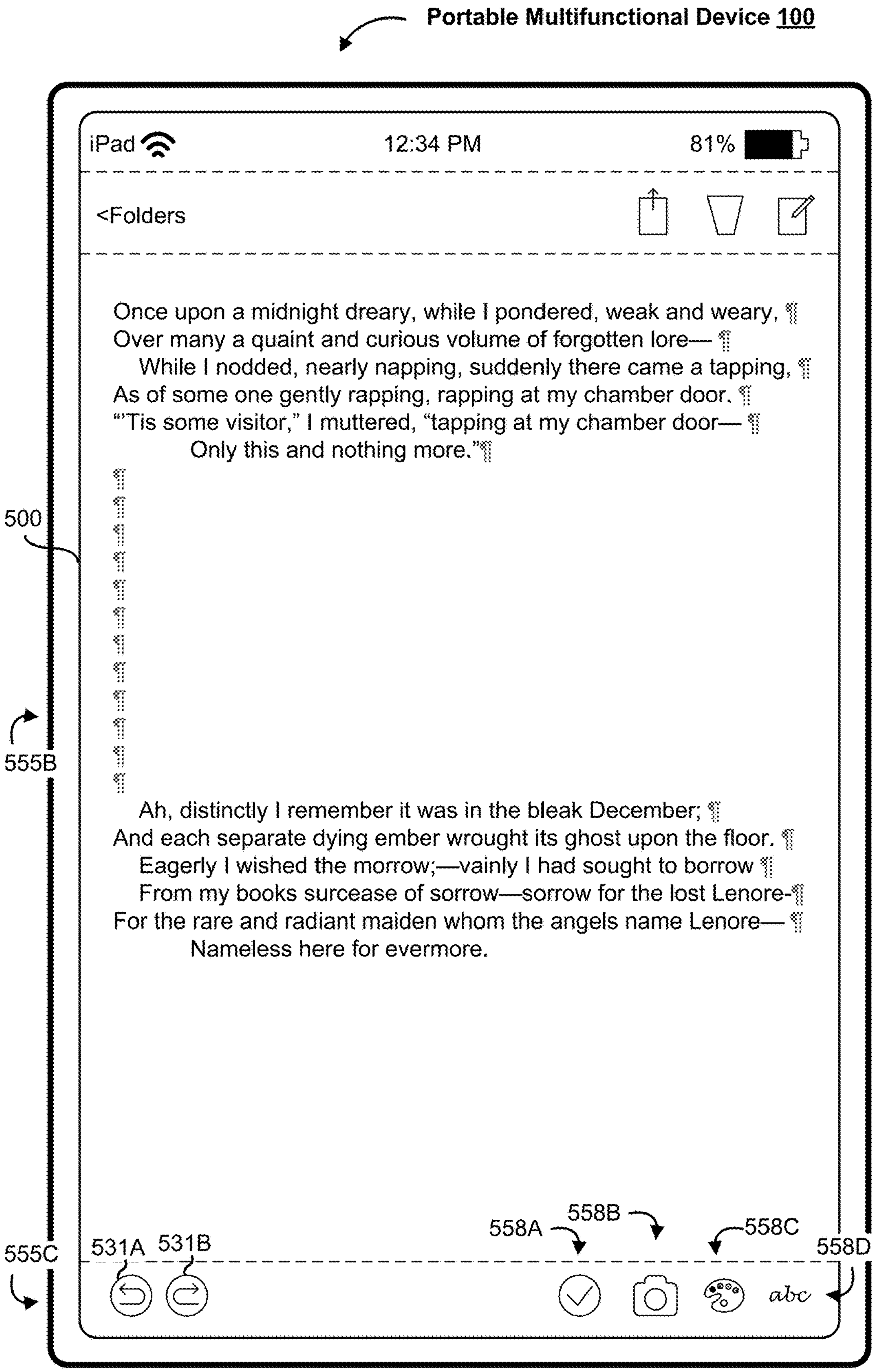
Figure 5C:
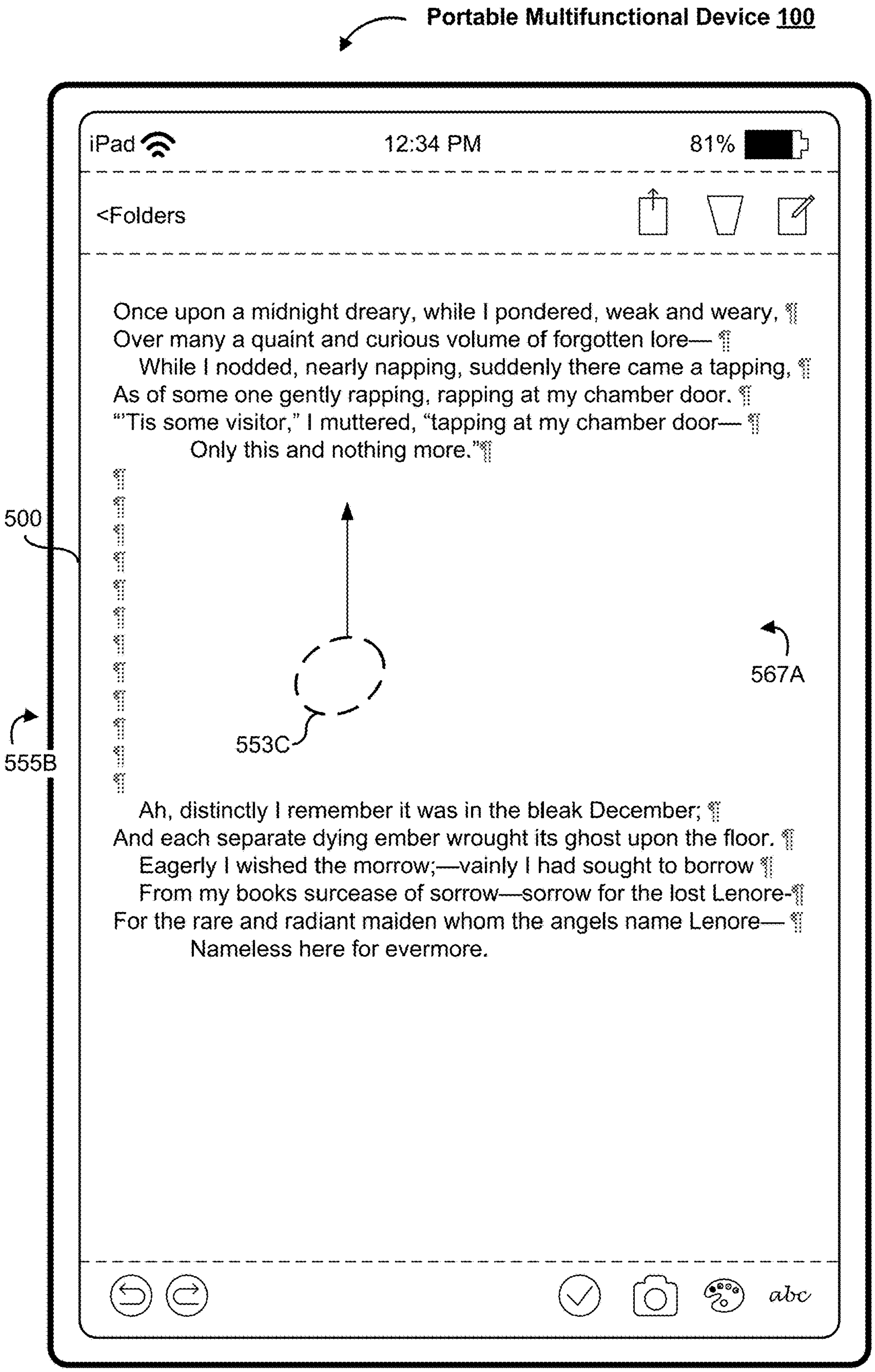
Figure 5C:
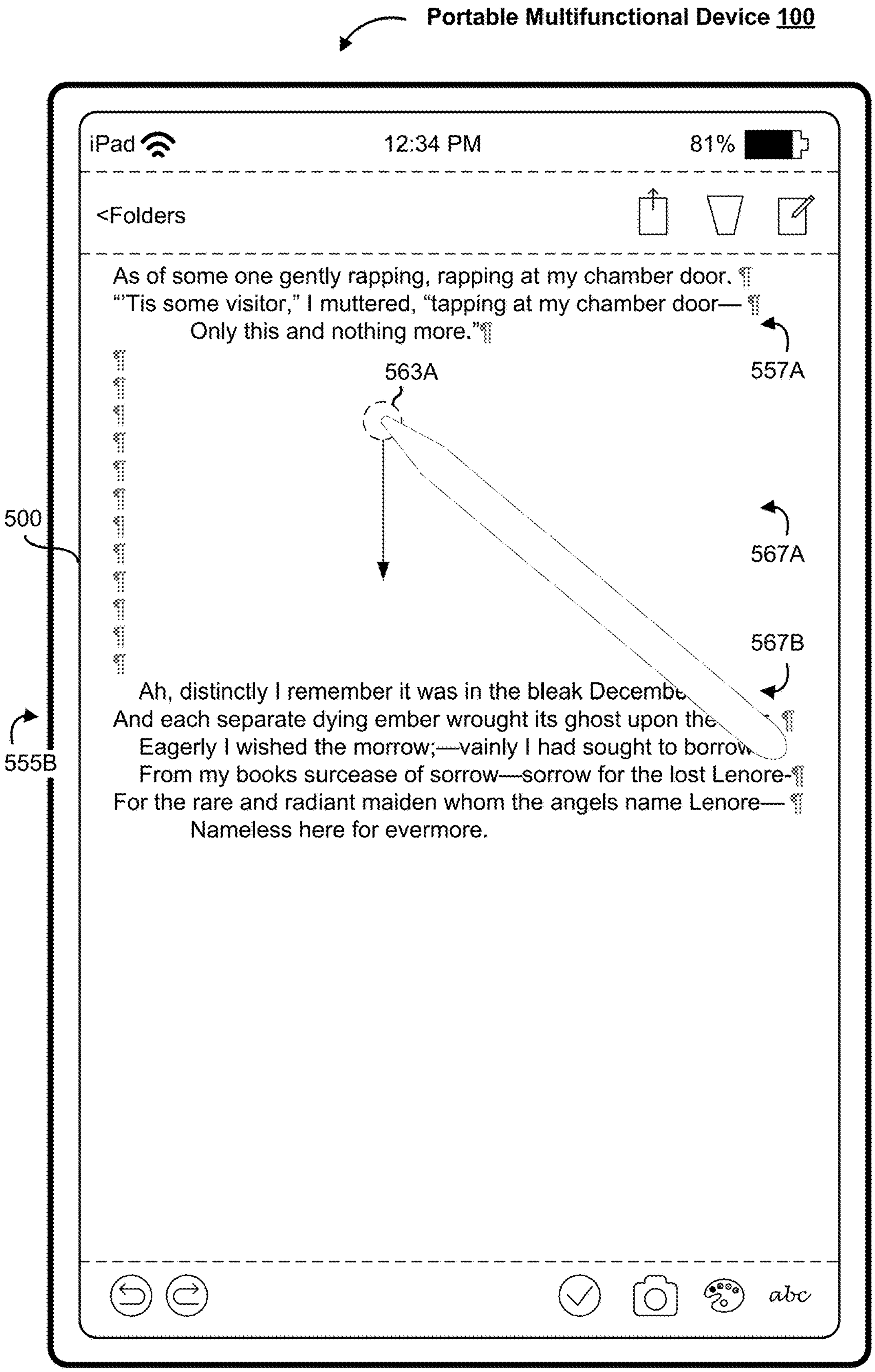
Figure 5C:
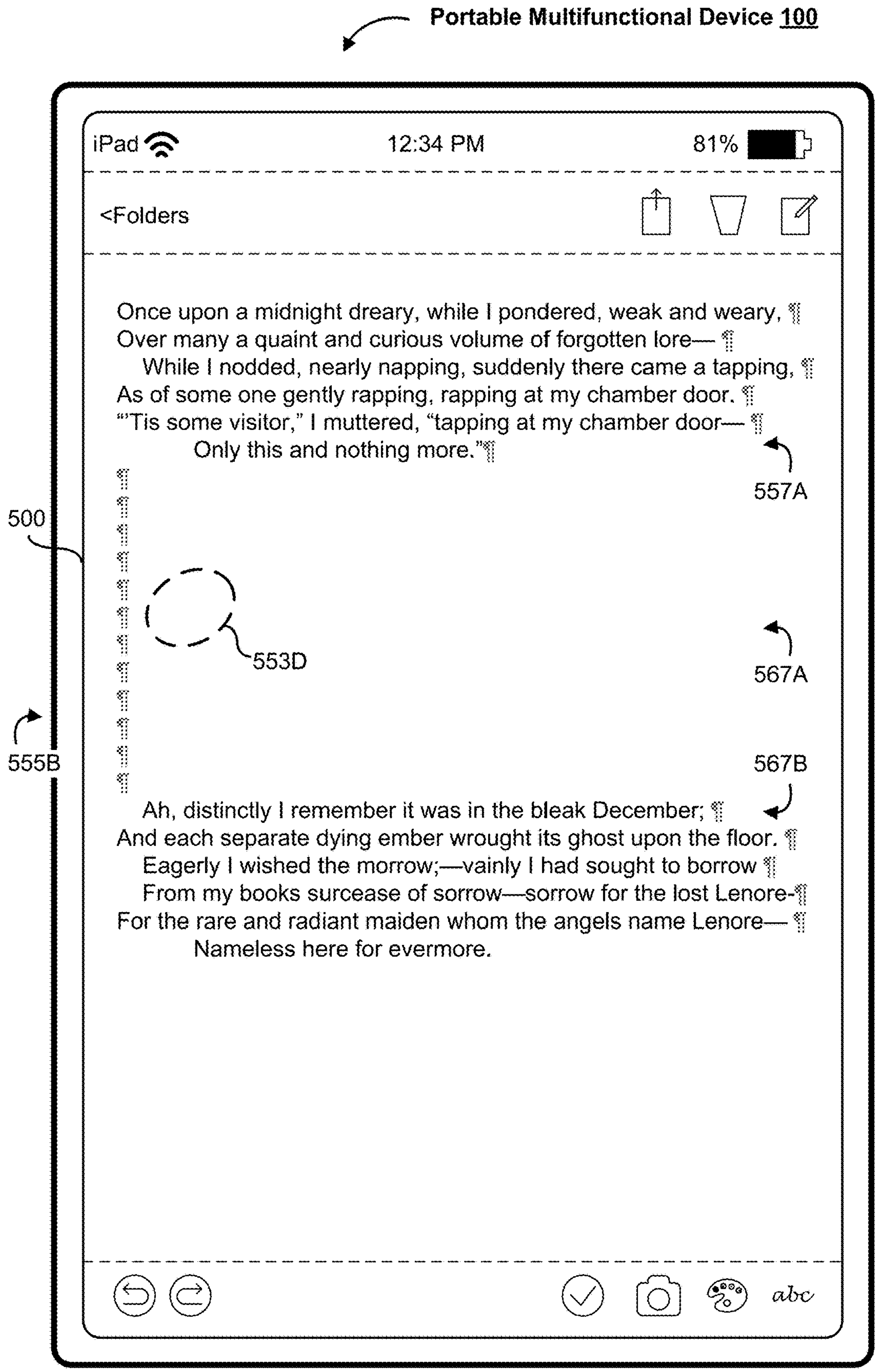
Figure 5C:
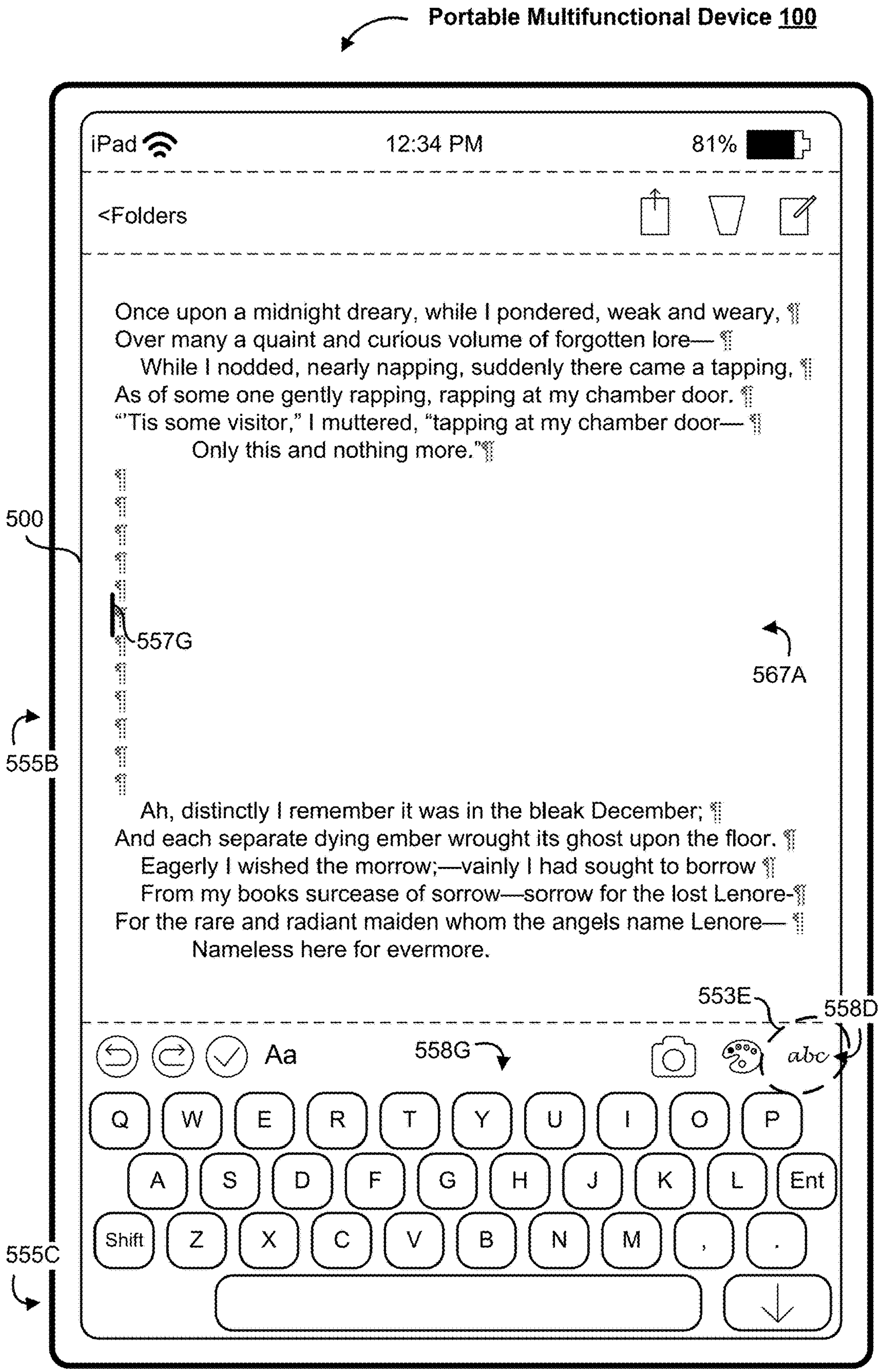
Figure 5C:
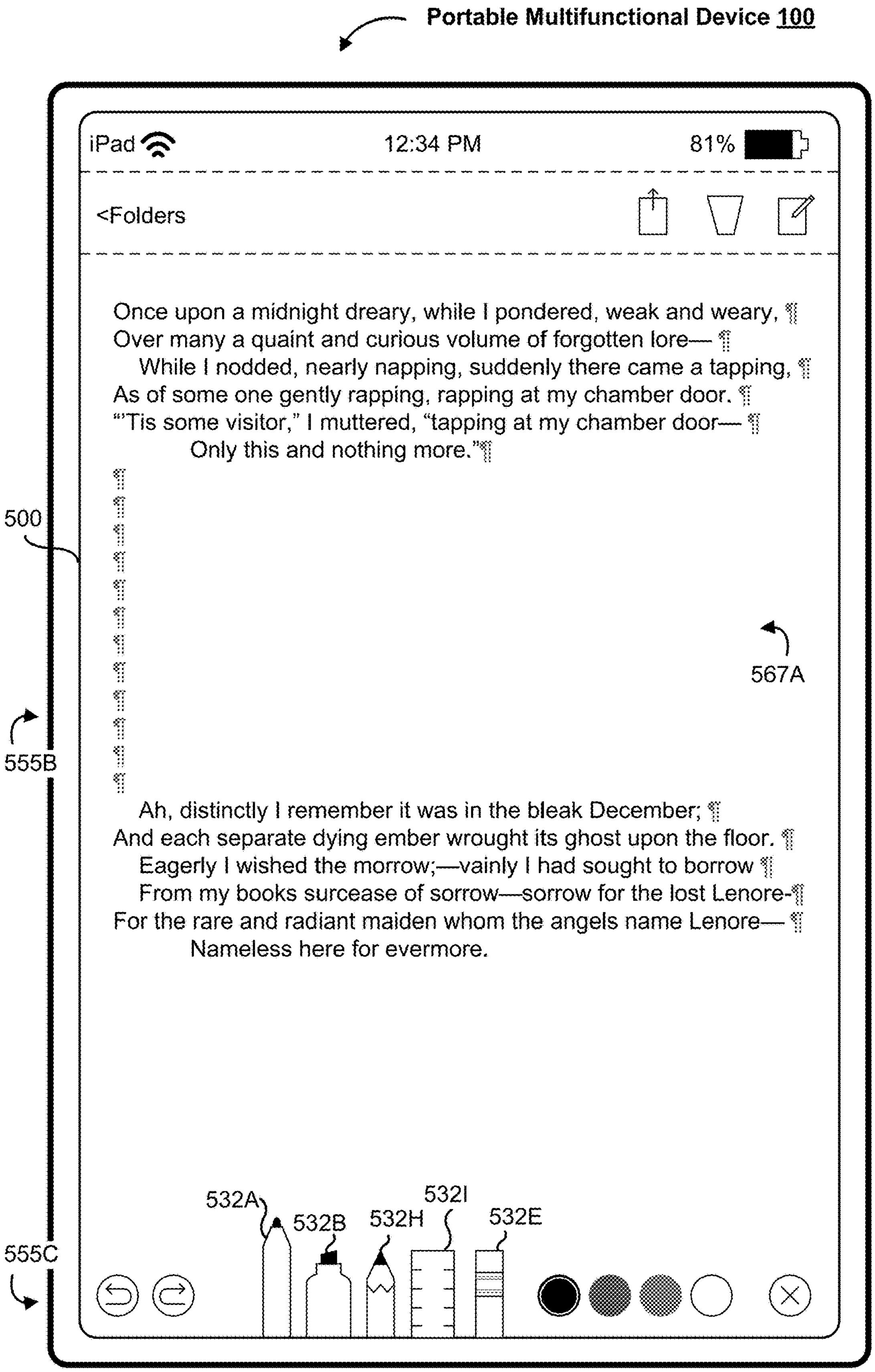
Figure 5C:
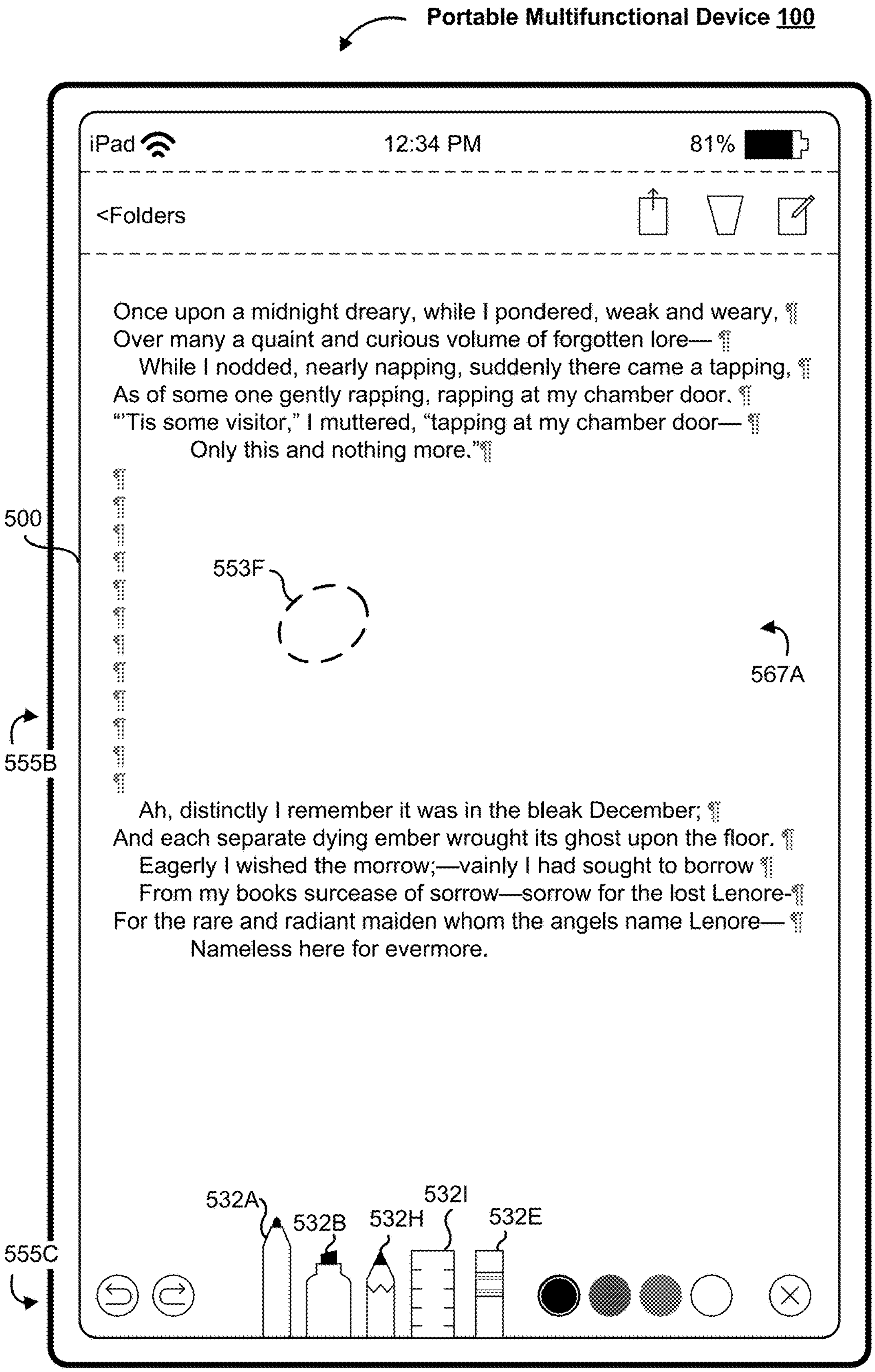
Figure 5C:
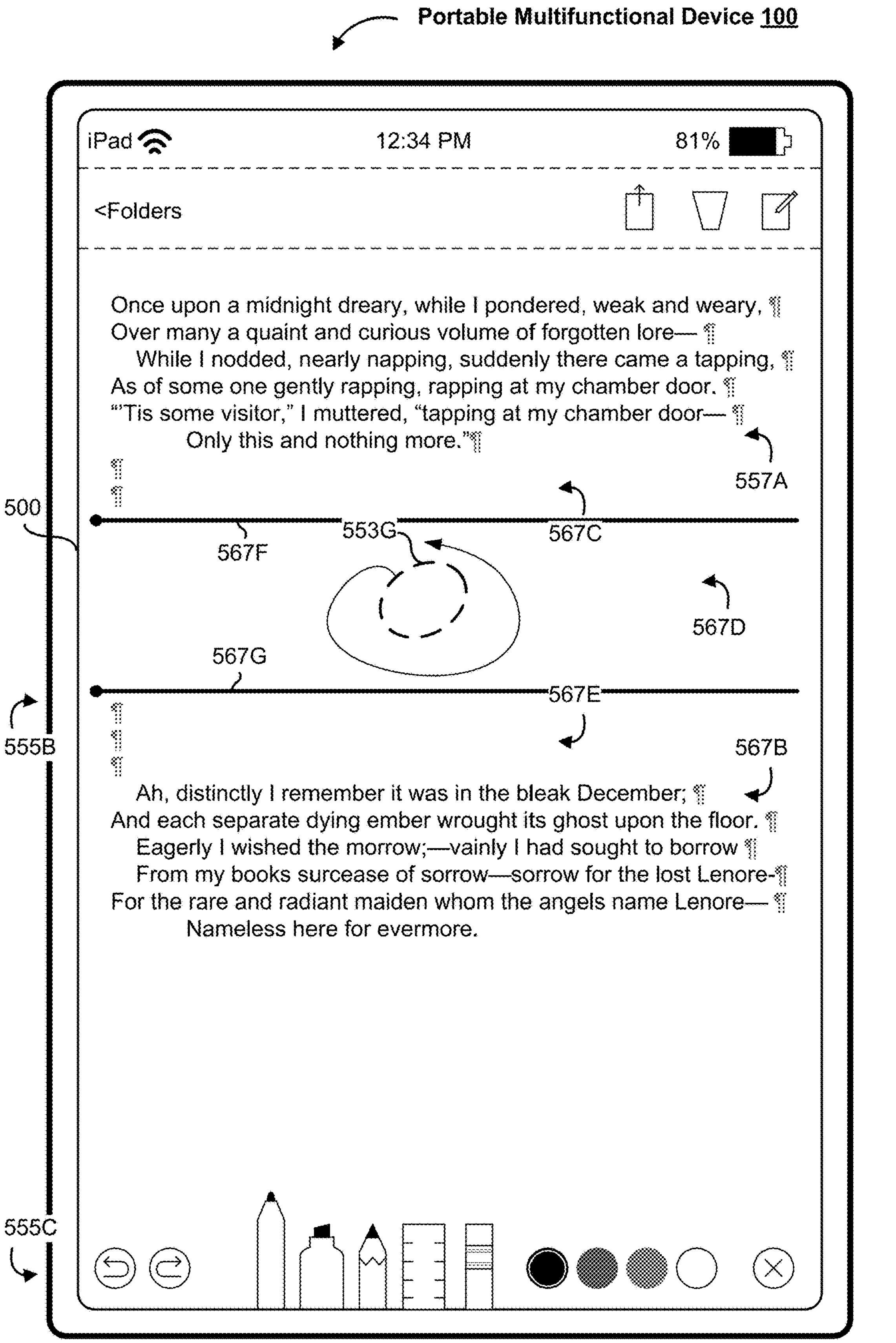
Figure 5C:
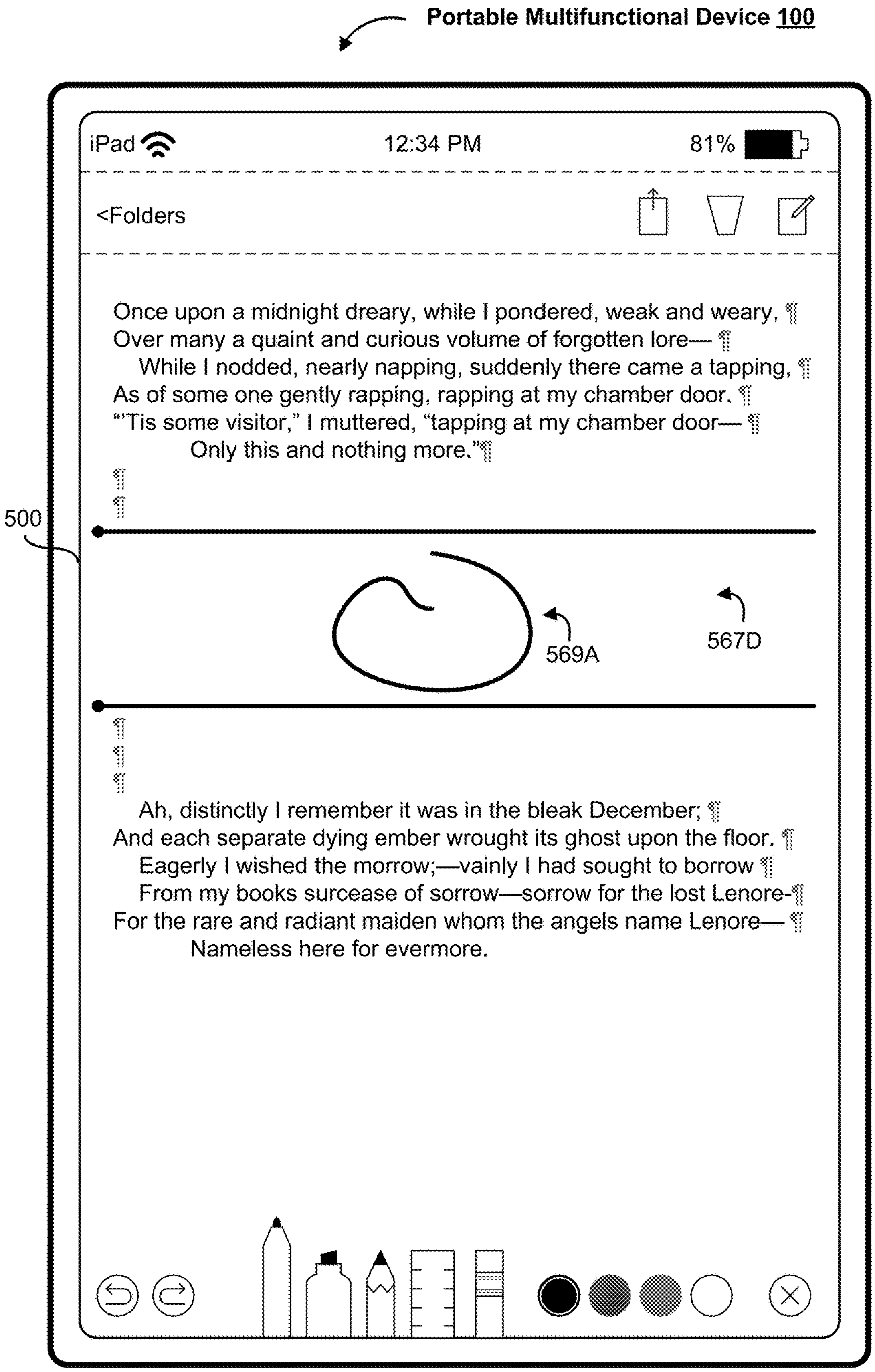
Figure 5C:
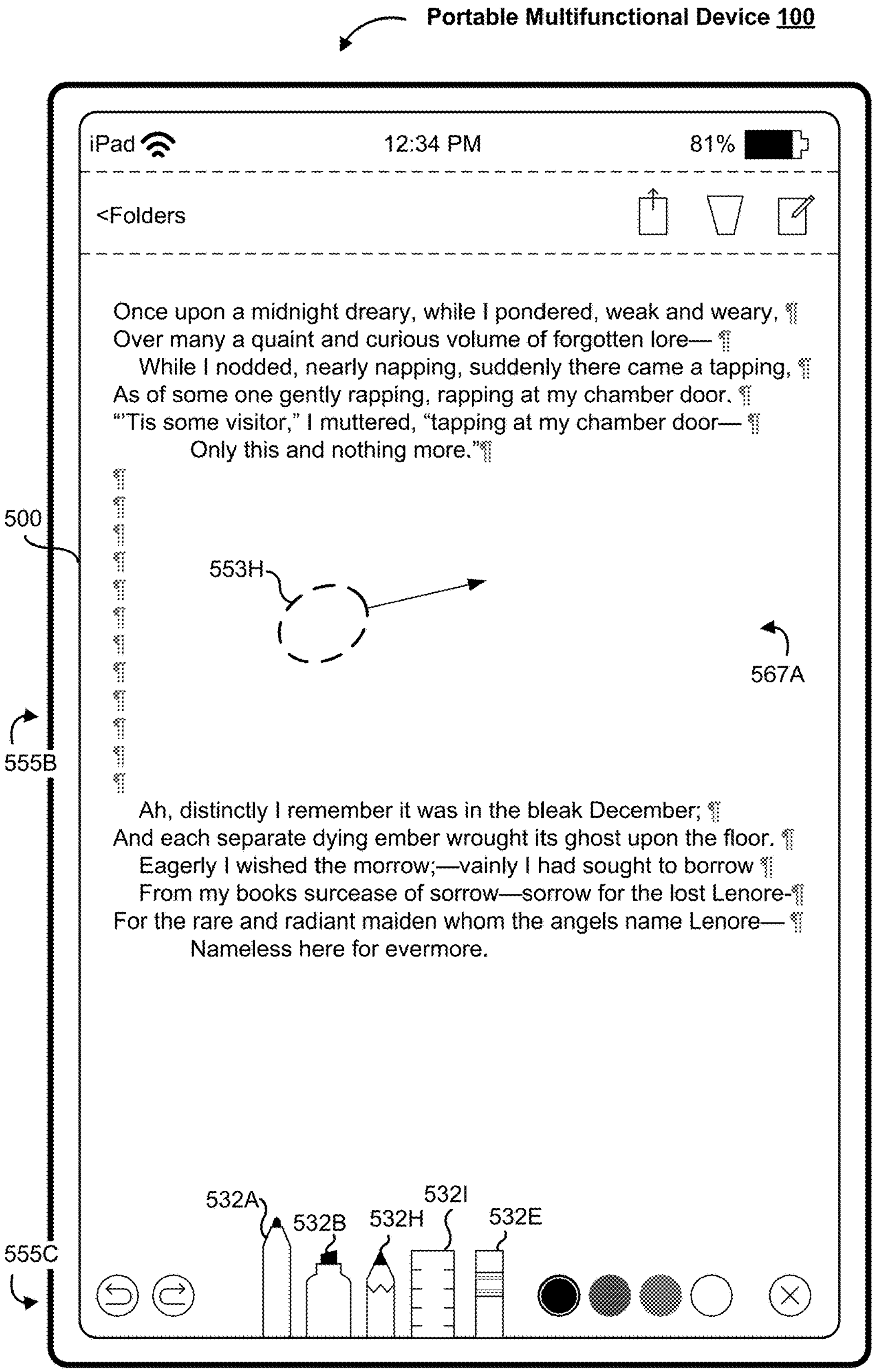
Figure 5C:
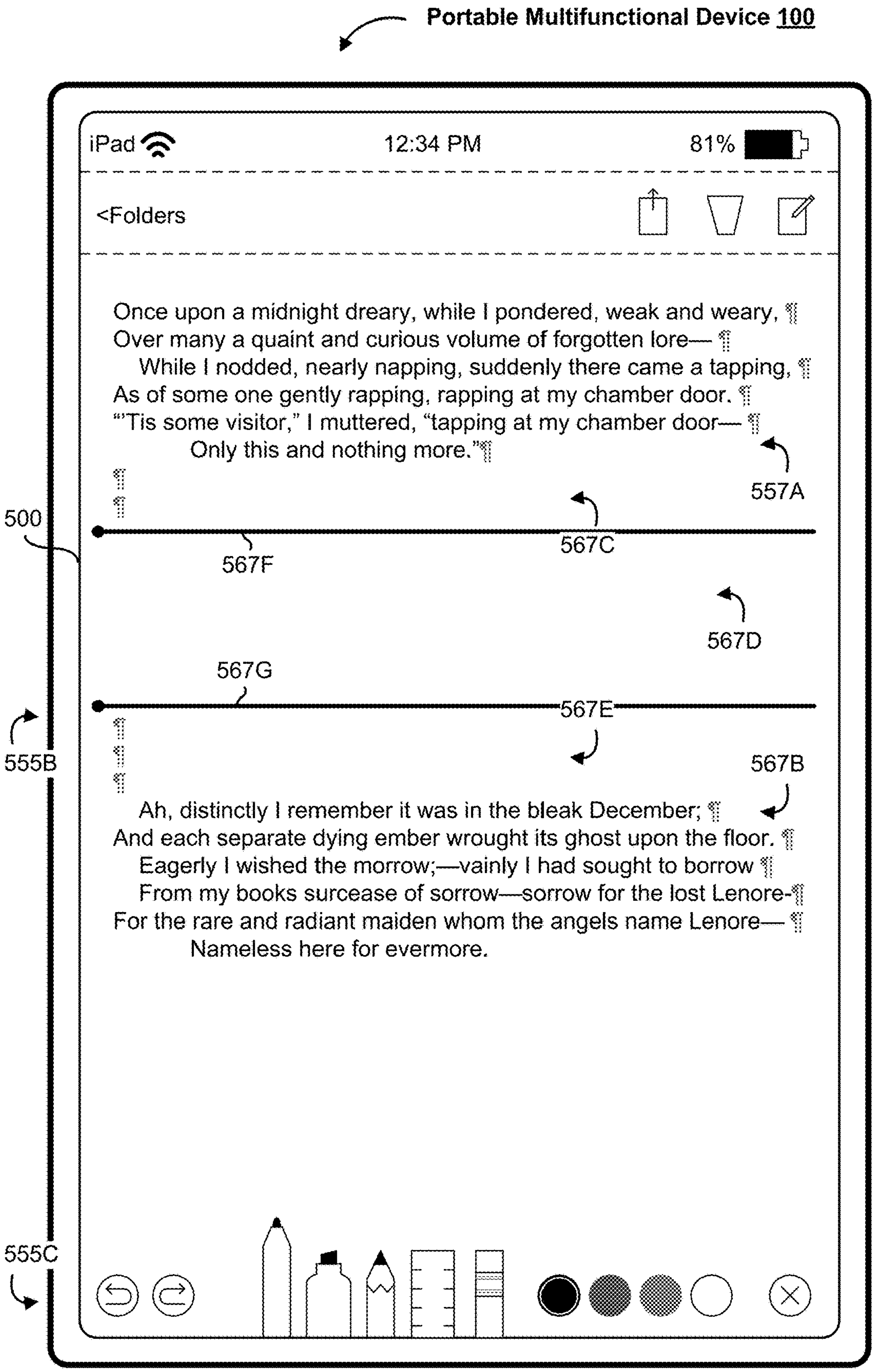
Figure 5C:
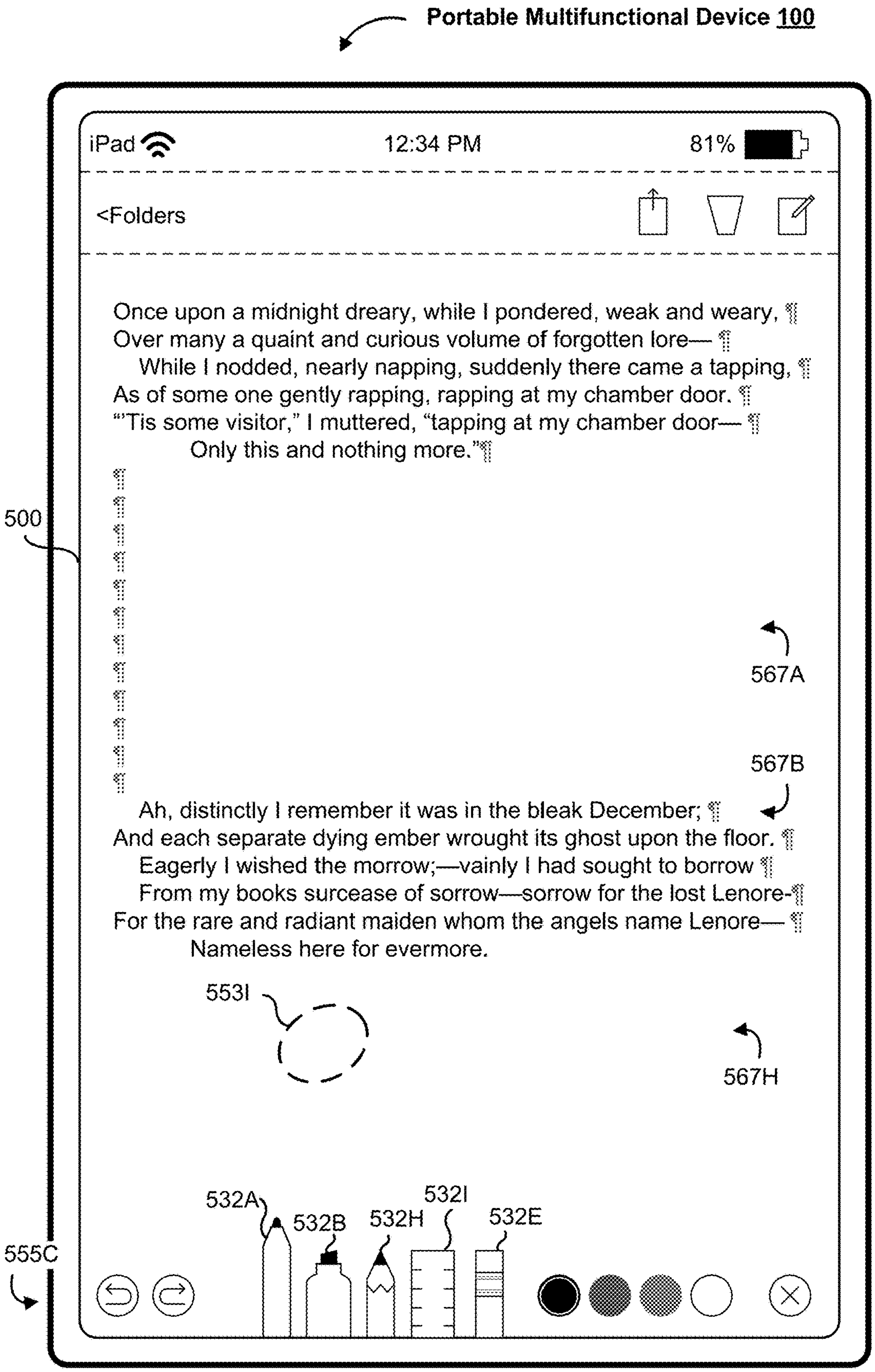
Figure 5D:
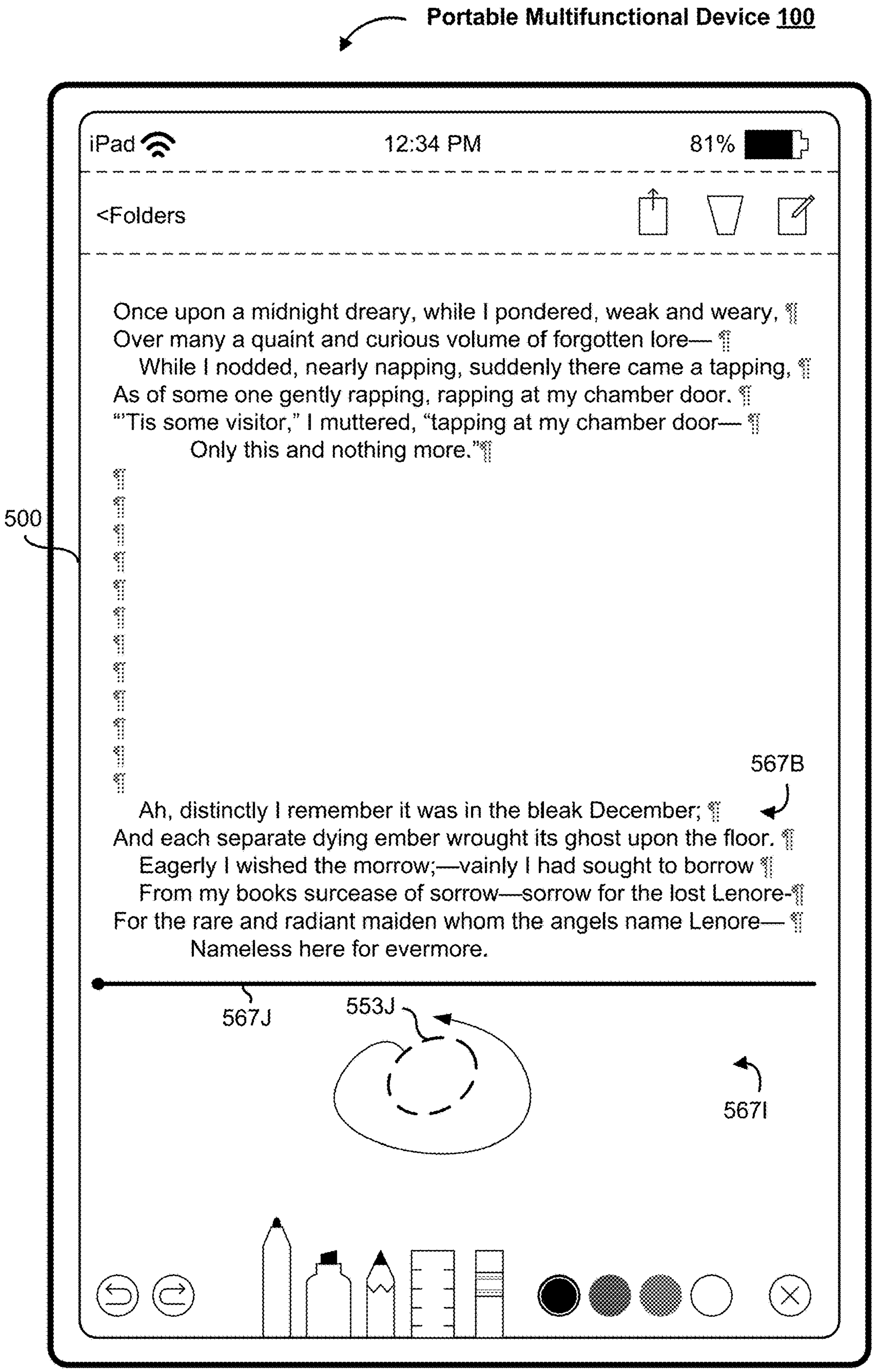
Figure 5D:
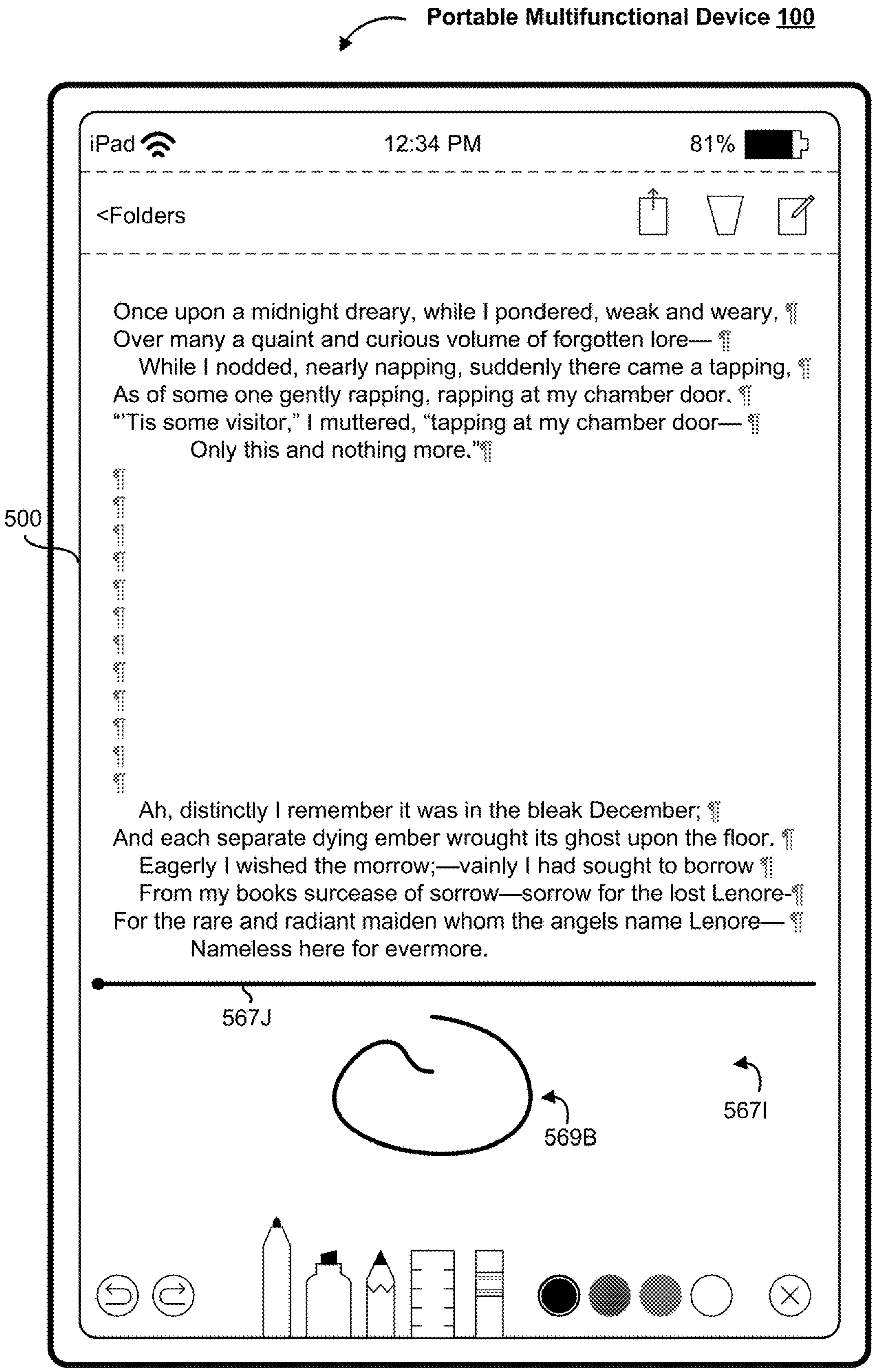
Figure 5D:
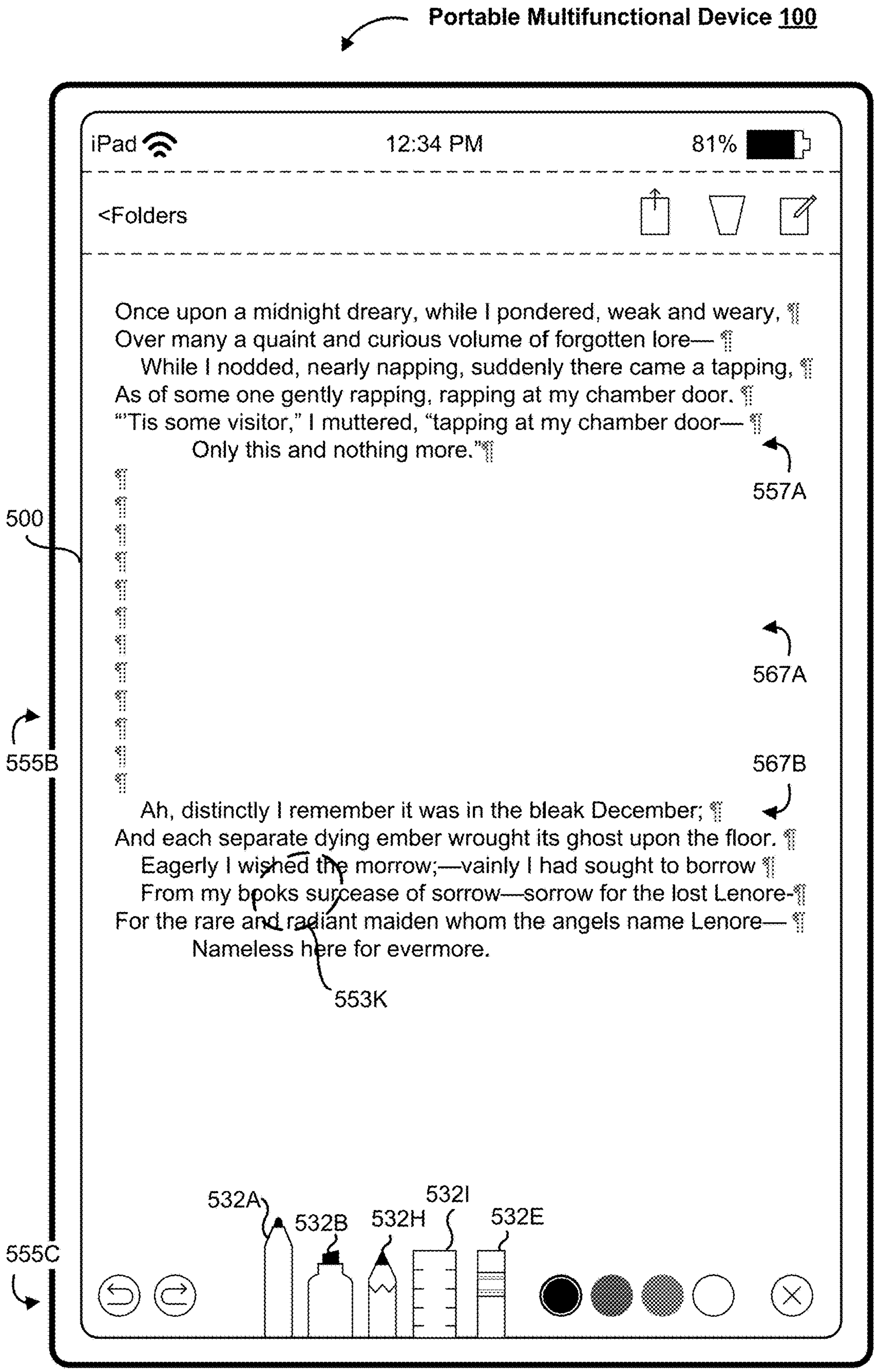
Figure 5D:
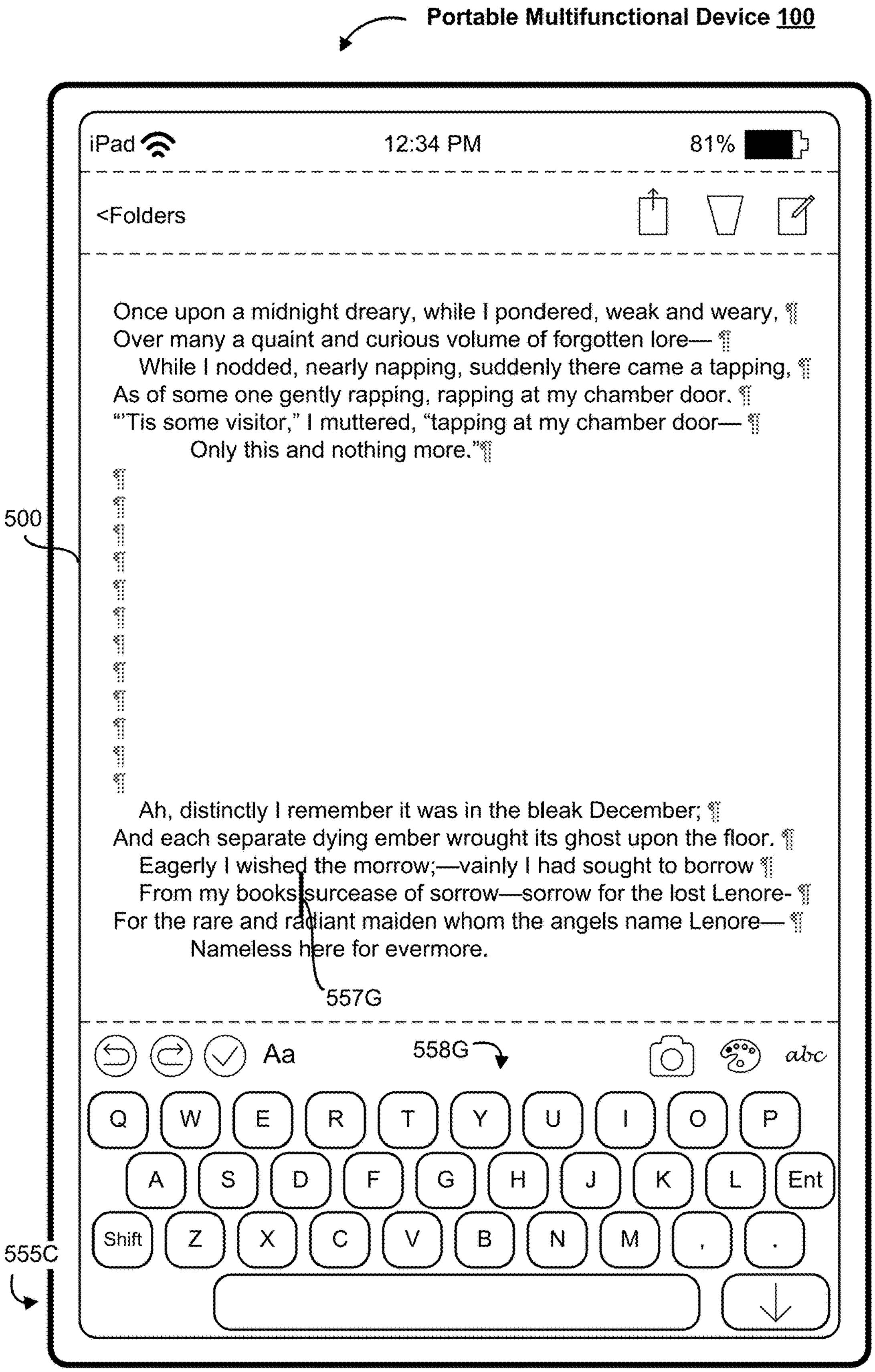
Figure 5D:
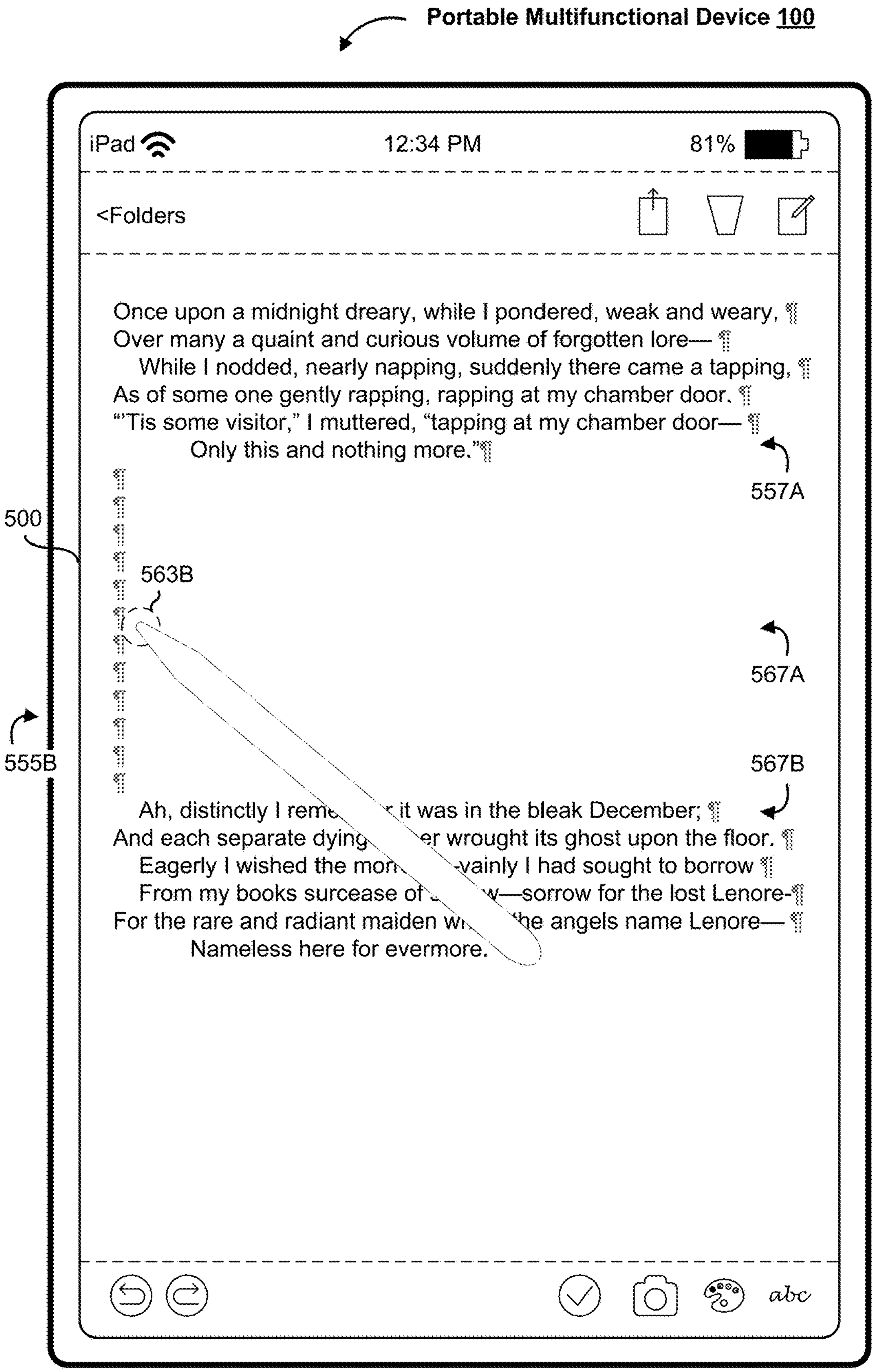
Figure 5D:
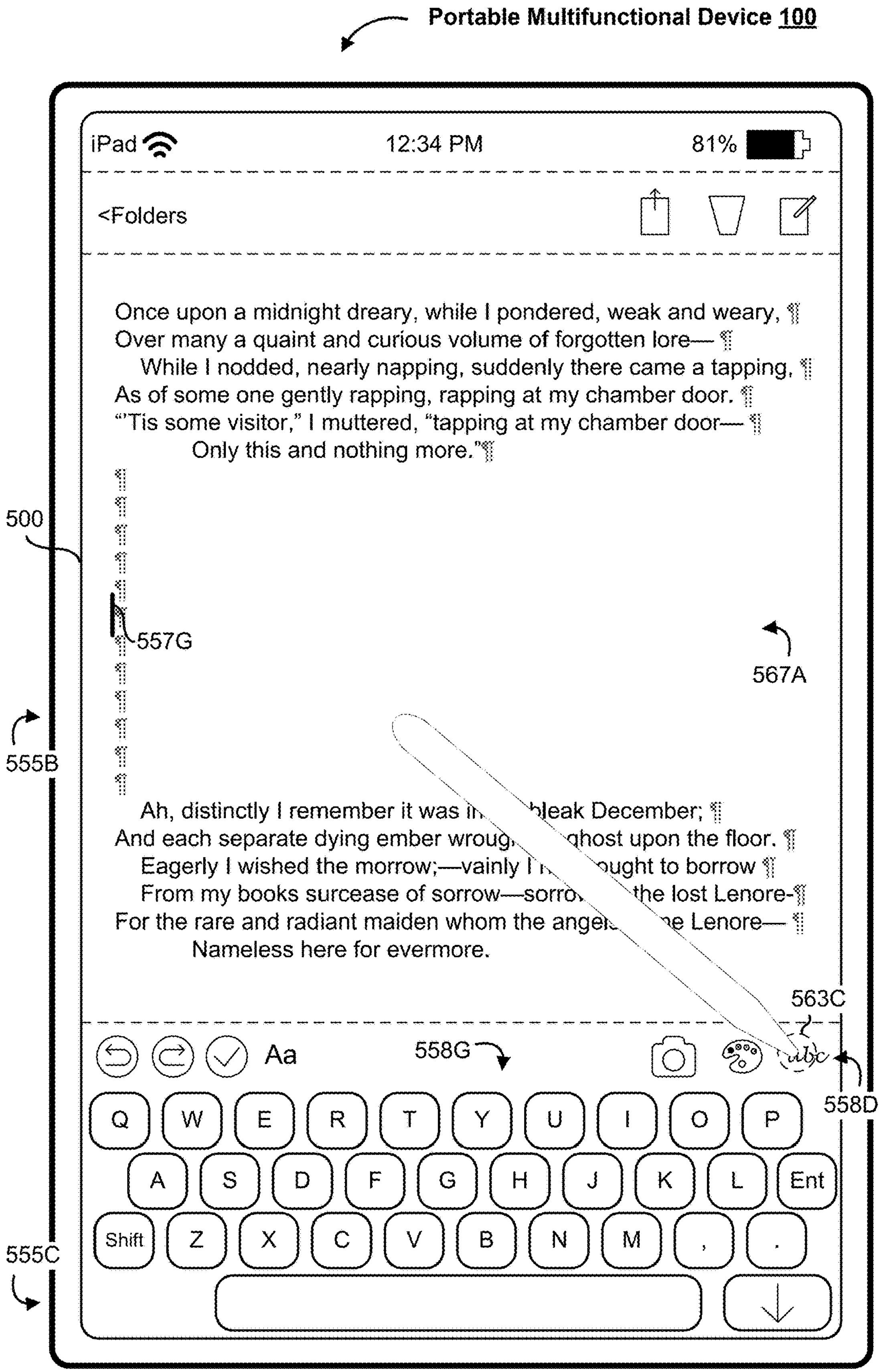
Figure 5D:
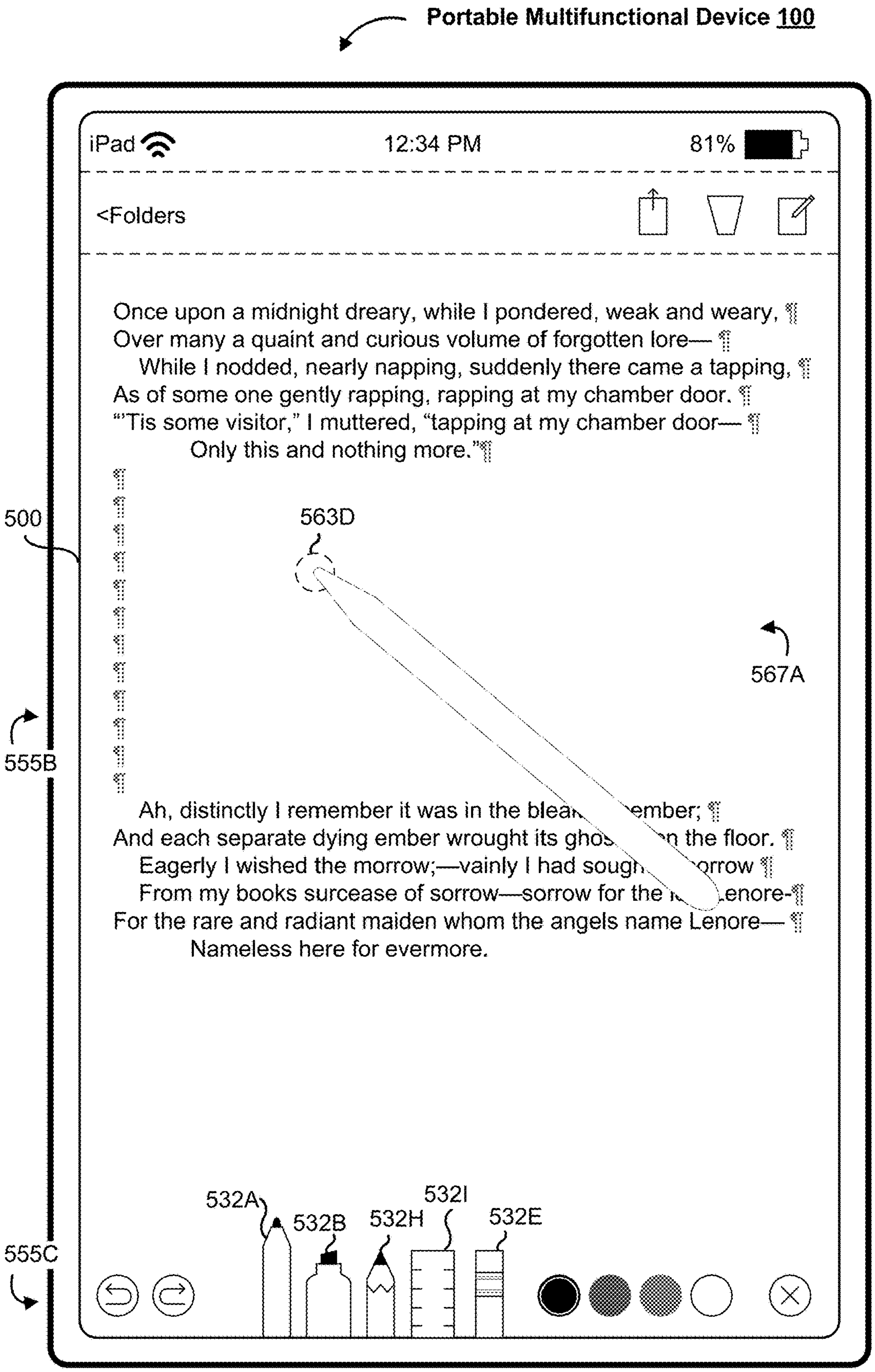
Figure 5D:
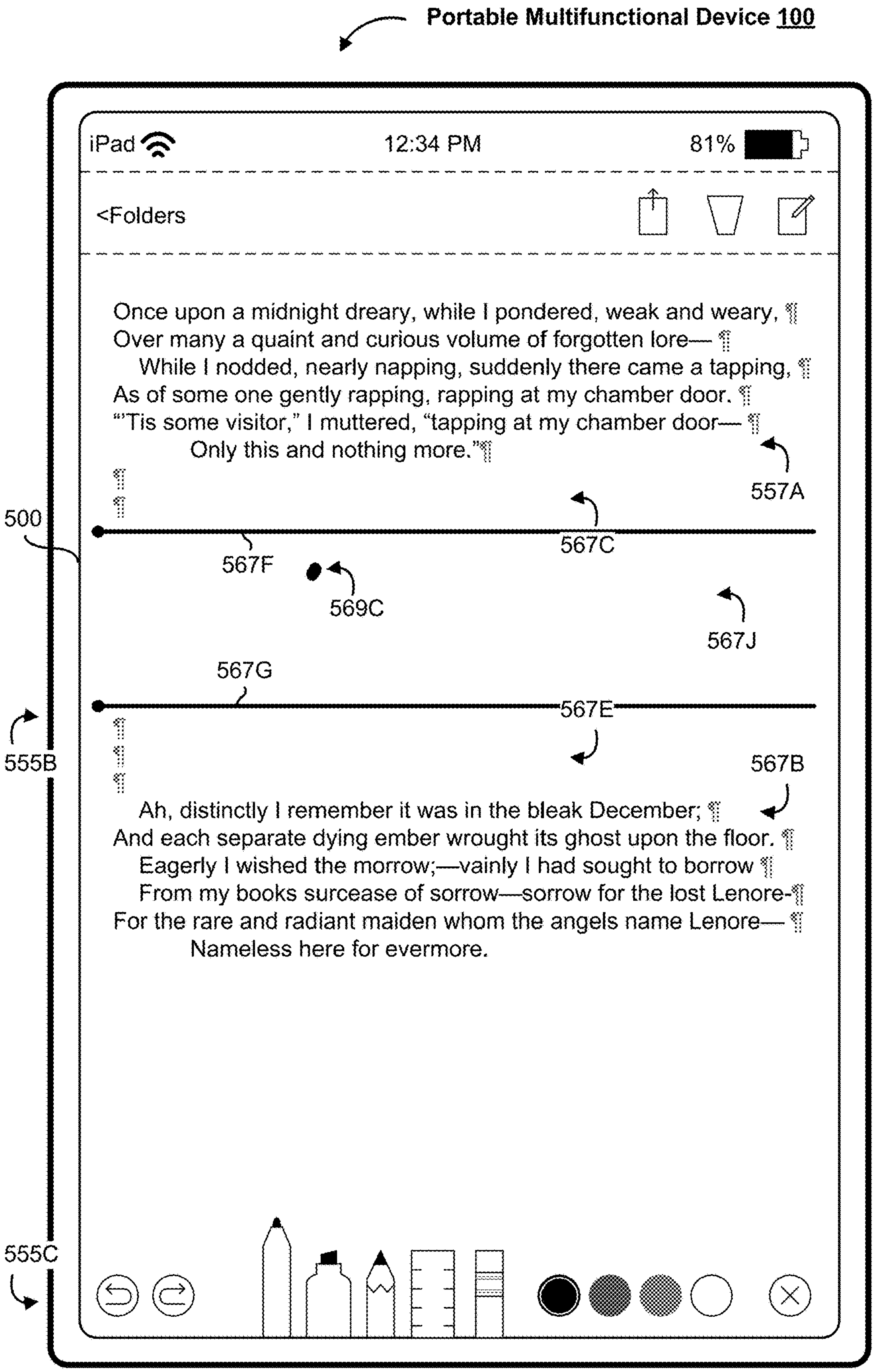
Figure 5D:
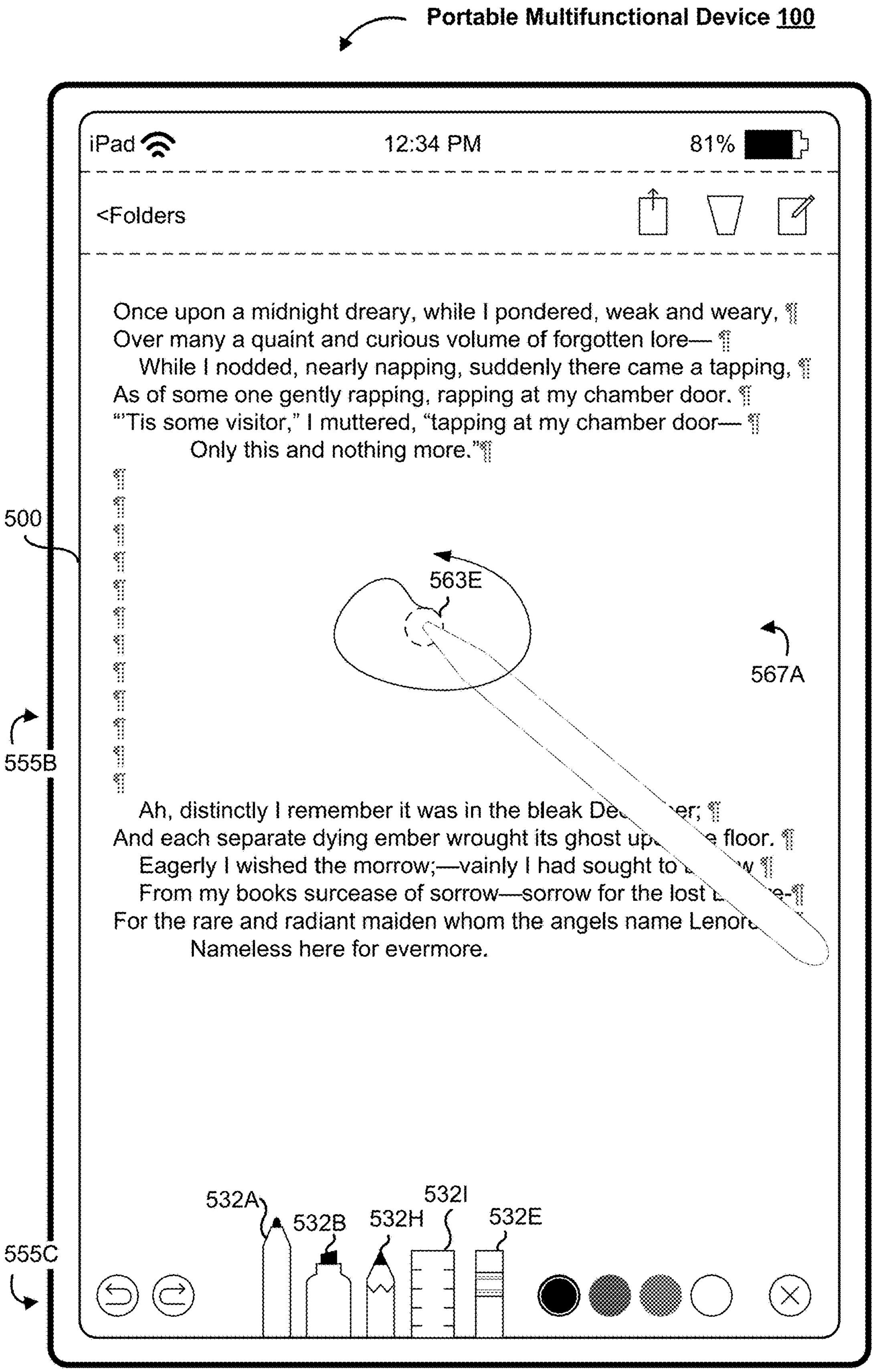
Figure 5D:
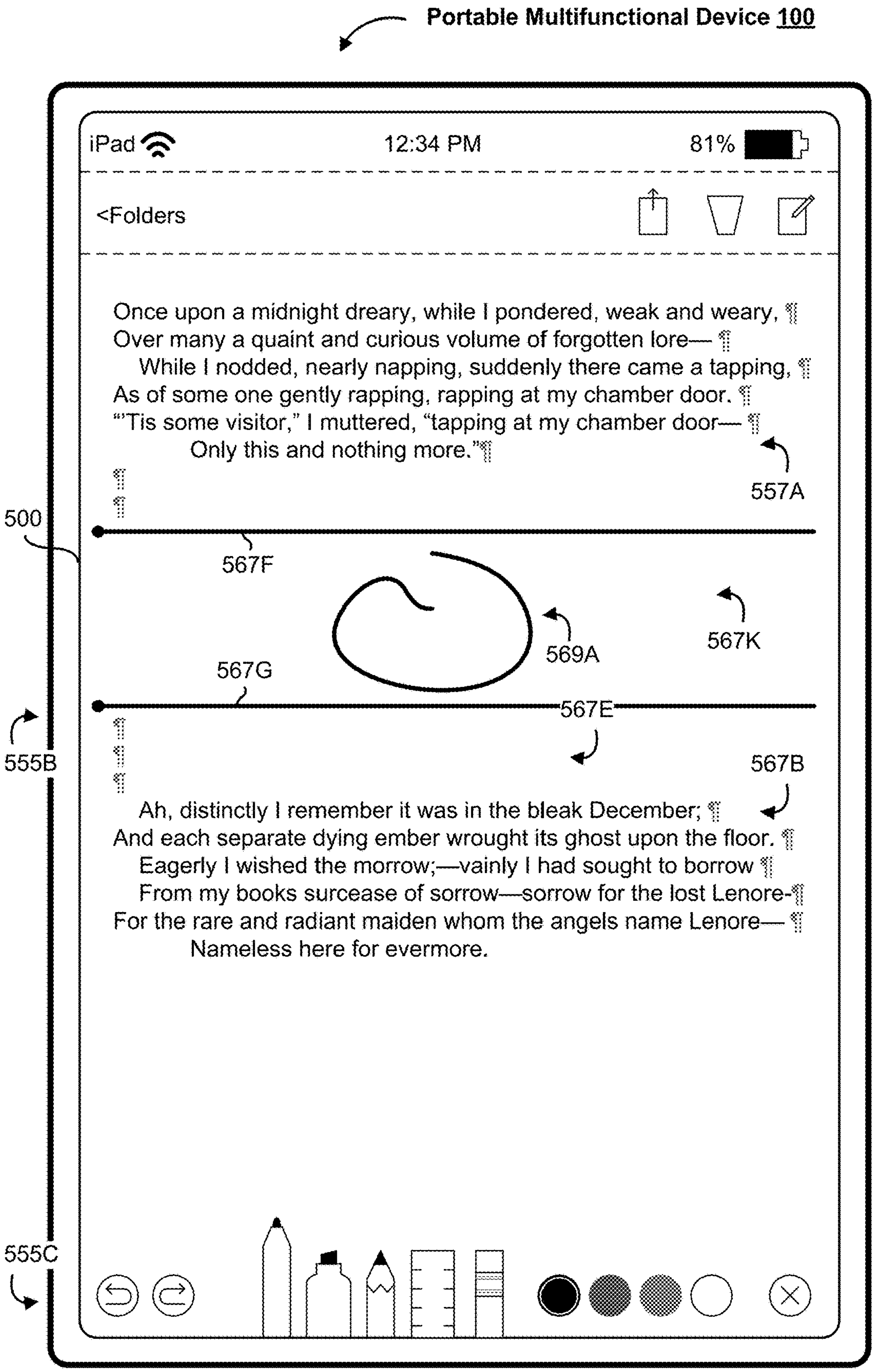
Figure 5D:
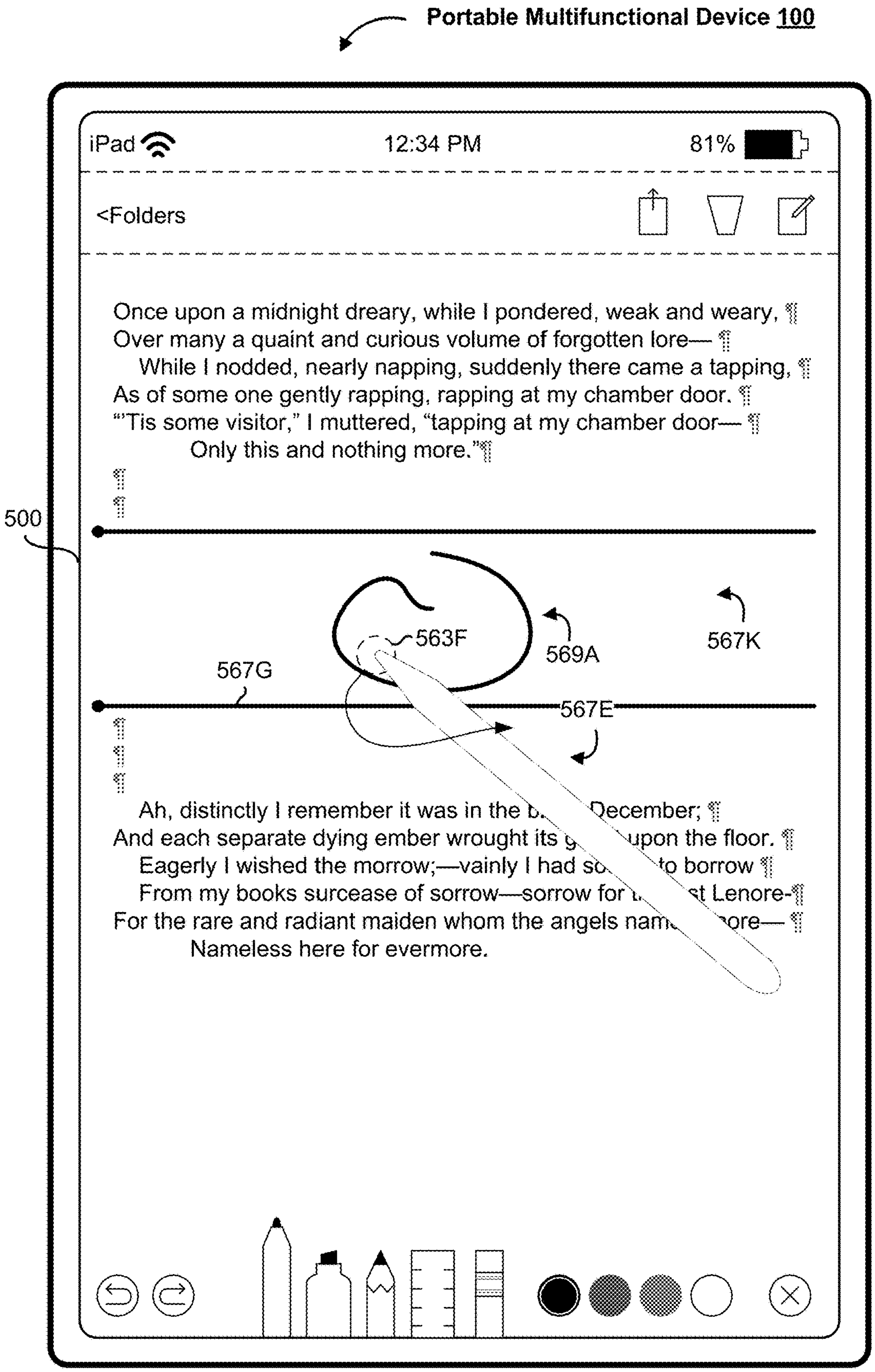
Figure 5D:
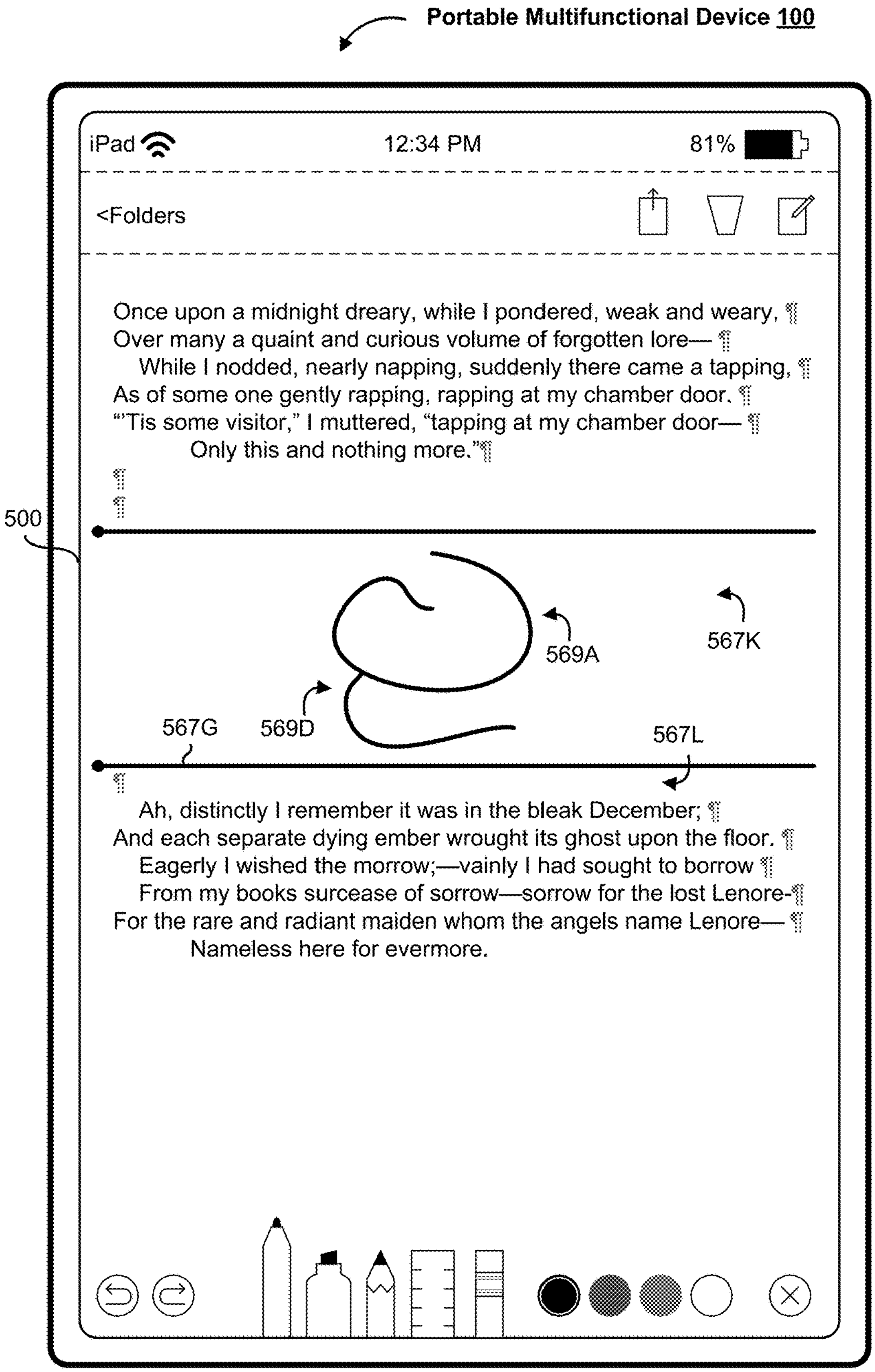
Figure 5D:
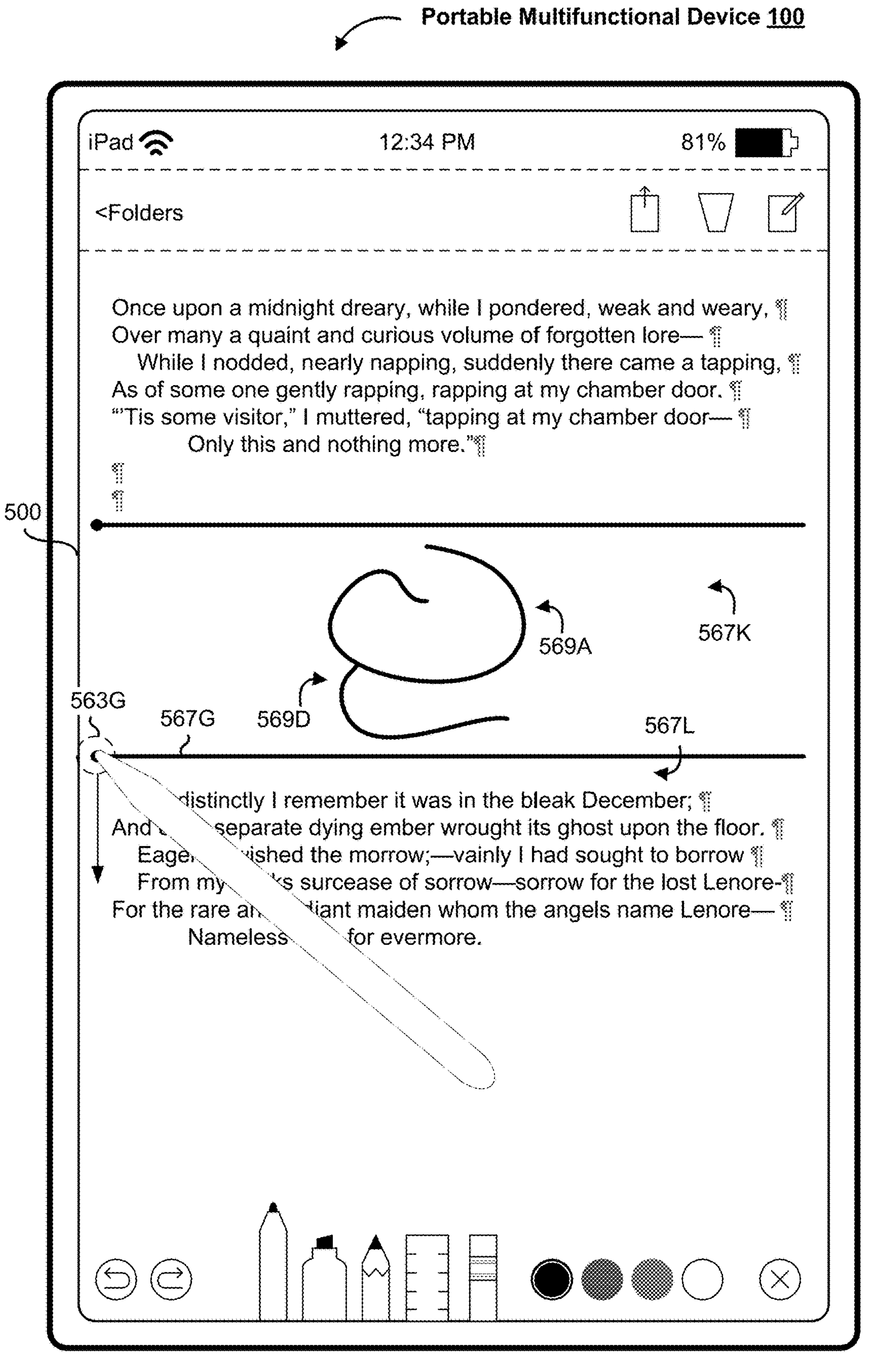
Figure 5D:
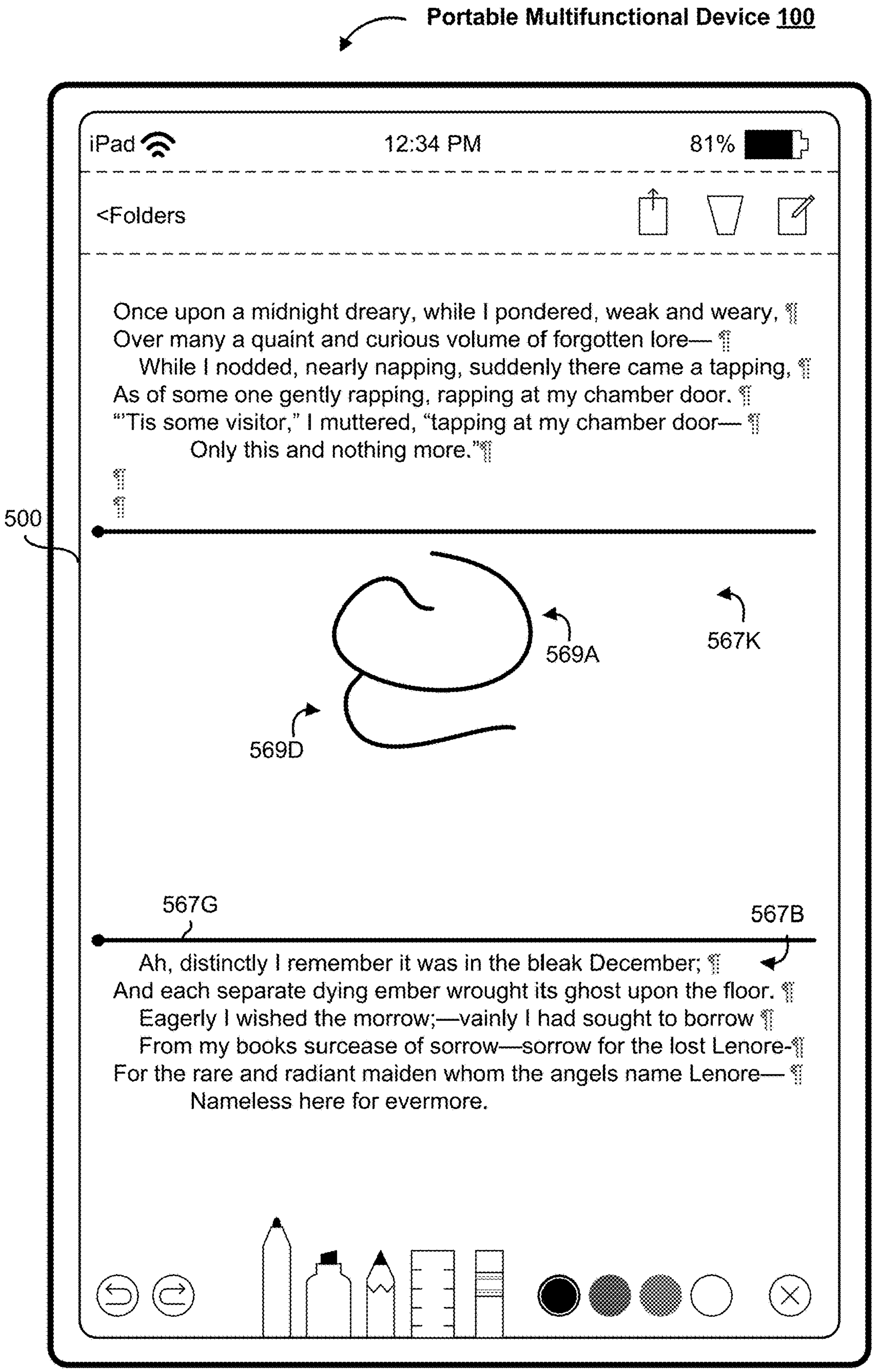
Figure 5D:
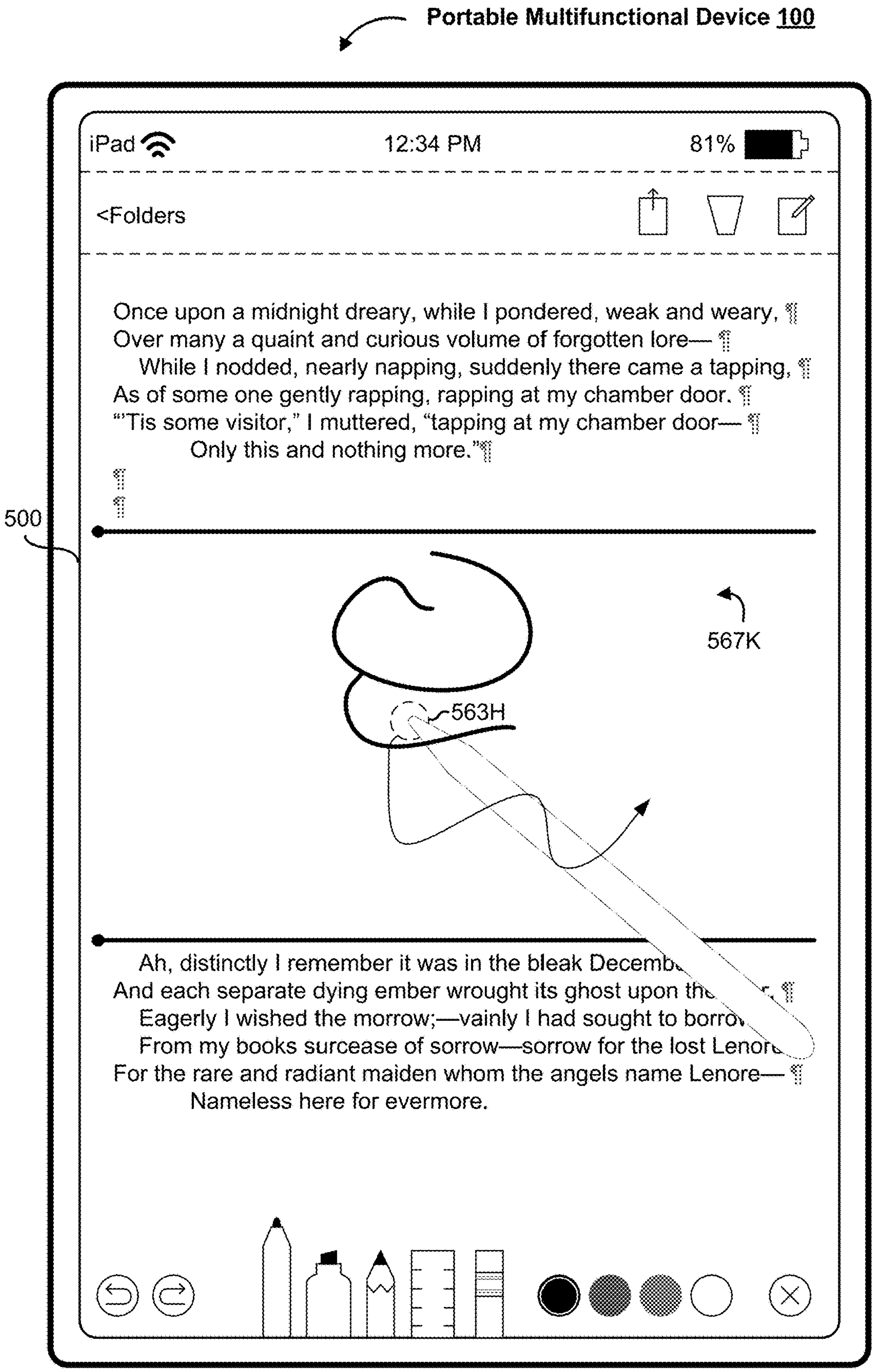
Figure 5D:
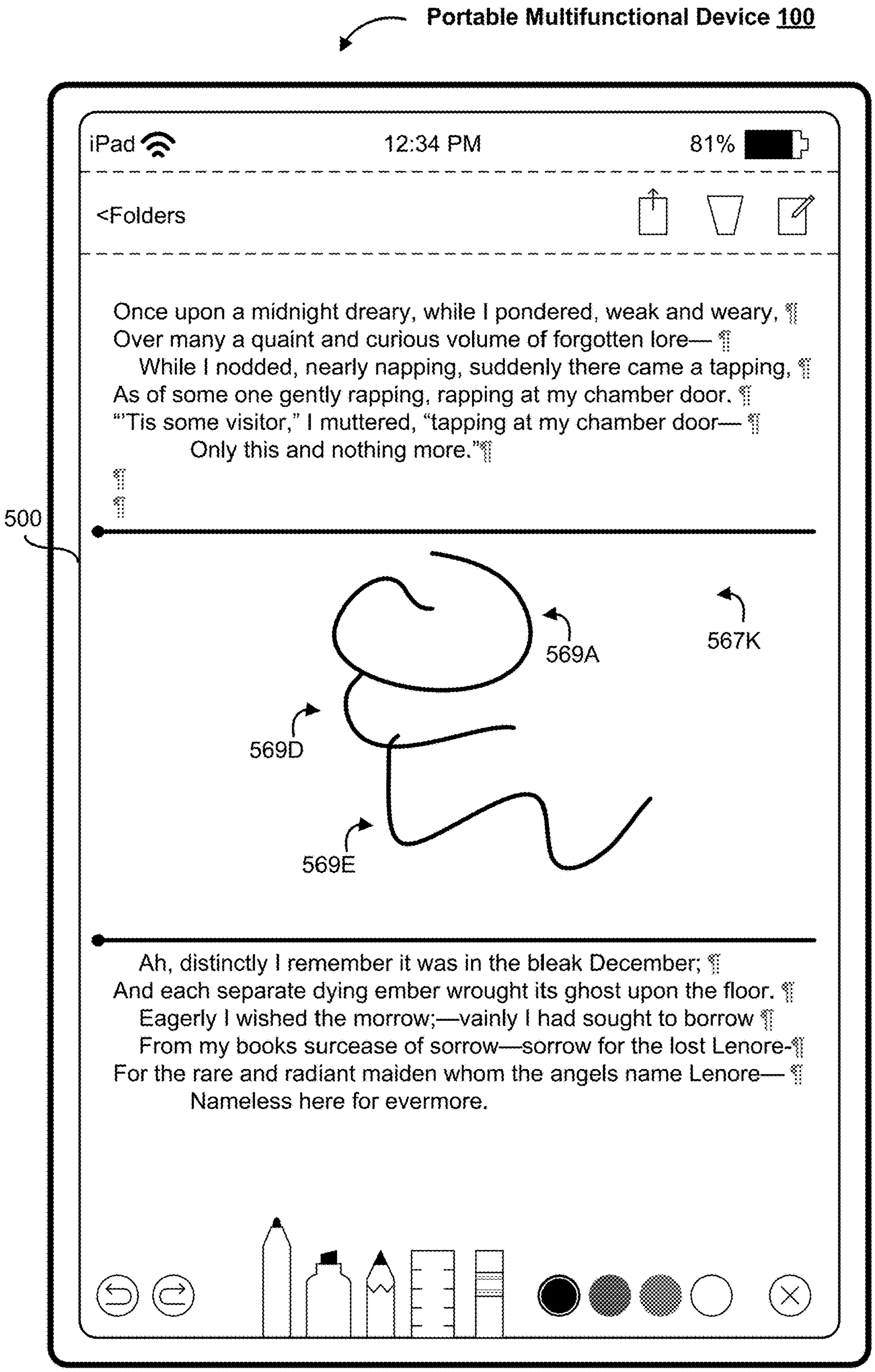
Figure 5D:
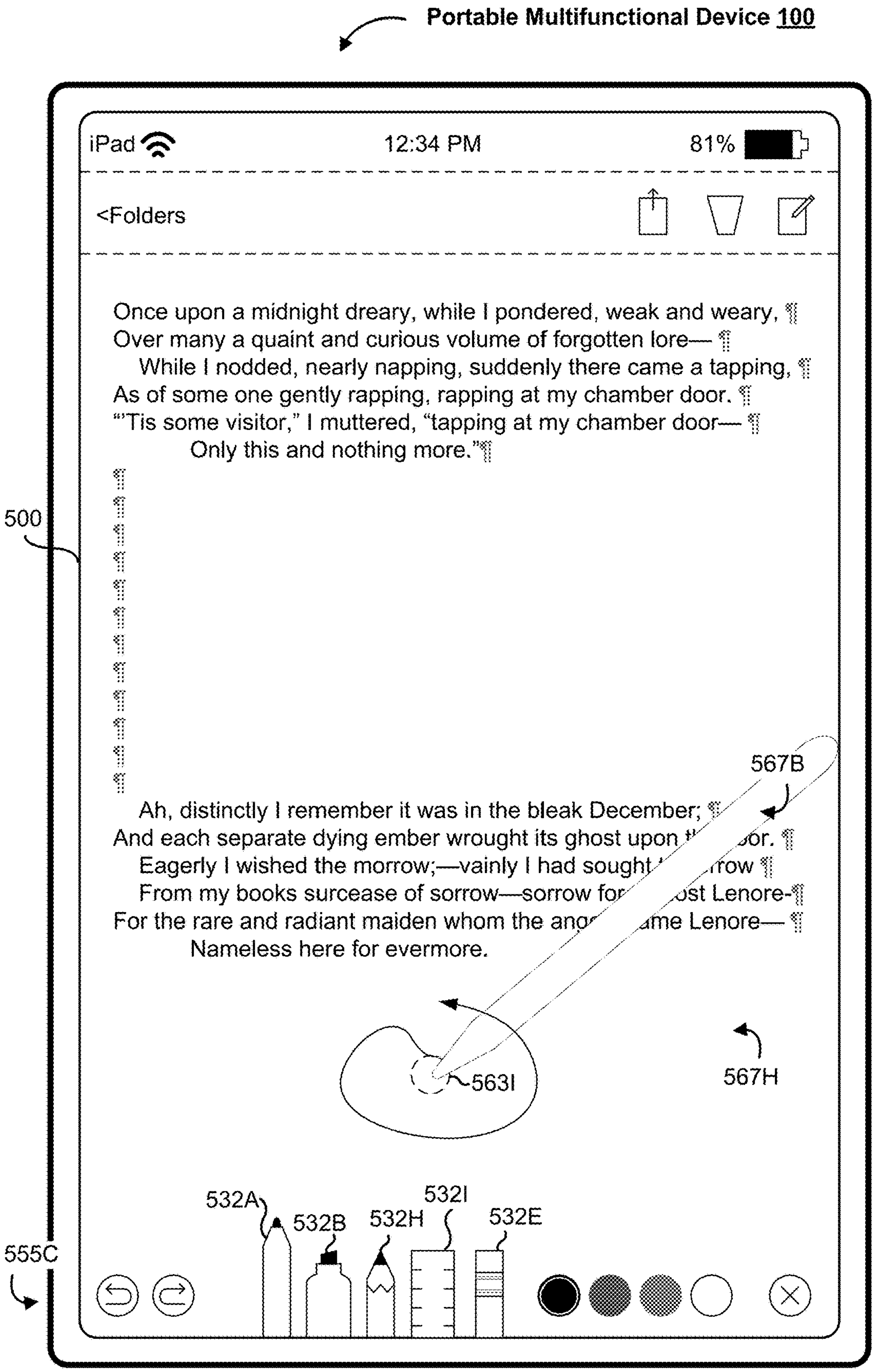
Figure 5D:
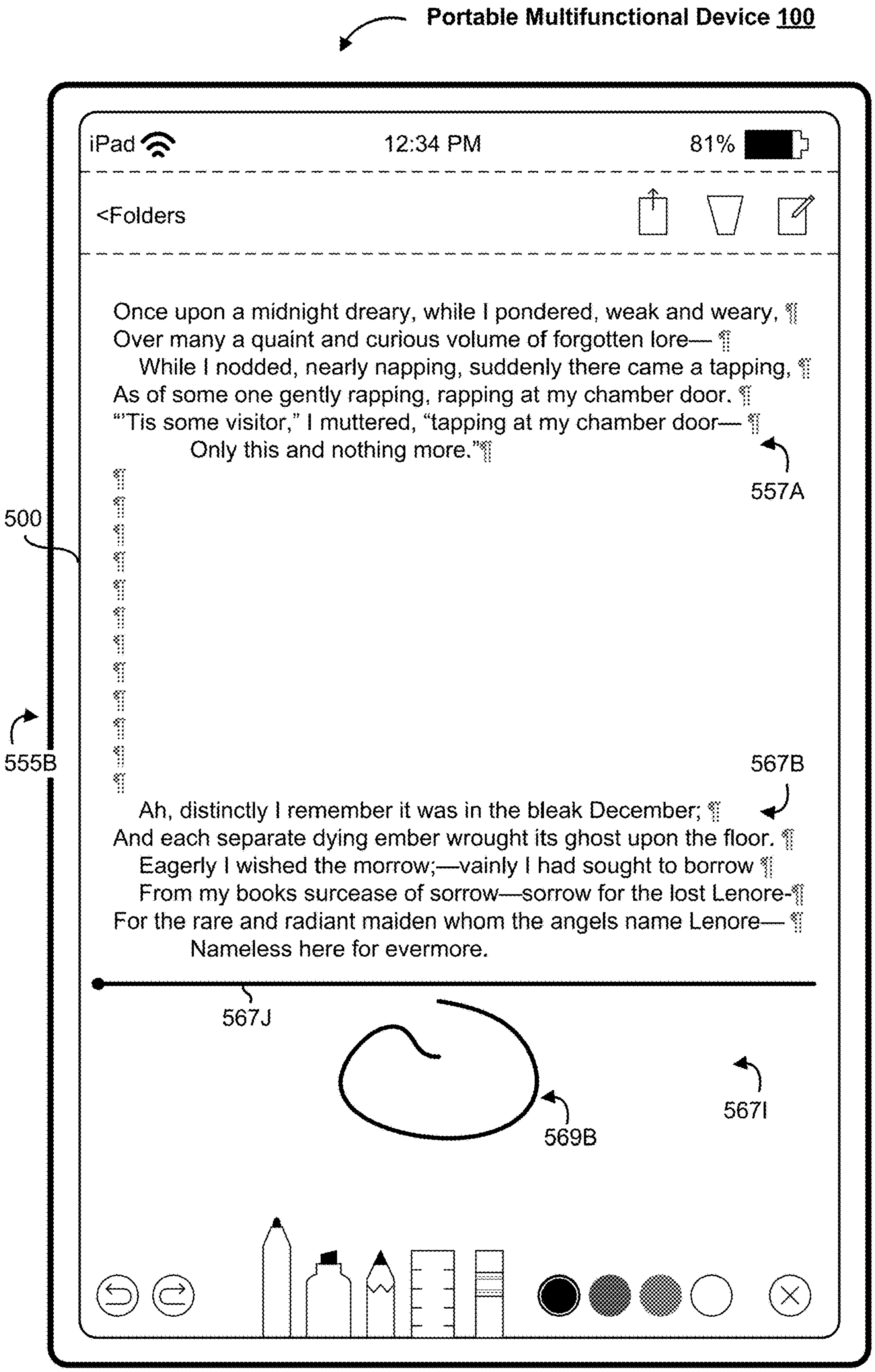

FIG. 5Z illustrates the user interface 500 of FIG. 5Y in response to detecting the finger contact 550N at the location of the shape options affordance 536B. In FIG. 5Z, a shape options menu 537B is displayed including affordances for changing characteristics of the square drawing object 521A. In various implementations, the shape options menu 537B includes affordances for changing a fill characteristic (e.g. to filled on unfilled) of the square drawing object 521A, a line continuity characteristic (e.g., from dashed to solid) of the shape drawing object 521A, and a line width of the shape drawing object 521A.

FIG. 5Z illustrates movement of a finger contact 550O drawing a path intersecting the magnifier drawing object 521B. FIG. 5AA illustrates the user interface 500 of FIG. 5Z in response to detecting movement of the finger contact 550O drawing a path intersecting the magnifier drawing object. In FIG. 5AA, the magnifier drawing object 521B is selected (e.g., by the selection tool). Since a magnifier drawing object is selected, the toolbar region 513 does not include the text options affordance 536A or the shape options affordance 536B. Rather, in their place, a blank space is provided 536C. The blank space 536C is displayed between the plurality of drawing tool selection affordances 521A-531D and the toolbar menu affordance 534. The blank space 536C is displayed next to the toolbar menu affordance 534.

FIG. 5AB illustrates the user interface 500 including an email user interface 502 below a device bar 503. The device bar 503 at the top of the display includes an identifier of the device 100 (e.g., "iPad"), a wireless connection indicator, a current time, and a battery indicator indicating a charge level of the device 100. The user interface 500 includes, below the device bar 501, and spanning the rest of the display, an email user interface 502. The e-mail user interface 502 includes message affordances 541A-541D respectively associated with a plurality of email messages. FIG. 5AB illustrates a finger contact 551A detected at a location of the first message affordance 541A associated with a first email message.

FIG. 5AC illustrates the user interface 500 of FIG. 5AB in response to detecting the finger contact 551A at the location of the first message affordance 541A. In response to detecting the finger contact 551A at the location of the first message affordance 541A, the email user interface 502 displays the first email message. In FIG. 5AC, the email user interface 502 includes an info region 542A that includes information regarding the first email message (e.g., the sender, recipient, subject, and time sent) and a content region 542B that includes the content of the first email message. The content region 542B includes first content 543A in the form of text and a representation of second content 543B in the form of an image. In various implementations, the second content is an attached image and the representation of the second content is a reduced-scale (or thumbnail) image of the attached image. In various implementations, the second content is an attached PDF file and the representation of the second content is an icon (as described further below).

FIG. 5AD illustrates the user interface 500 of FIG. 5AC with a finger contact 551B detected at the location of the representation of the second content 543B.

FIG. 5AE illustrates the user interface 500 of FIG. 5AD in response to detecting the finger contact 551B at the location of the representation of the second content 543B. In response to detecting the finger contact 551B at the location of the representation of the second contact, the user interface 500 includes a photo viewer user interface 504A including the second content 544. The photo viewer user interface 504A, displayed below the device bar 503, includes an options bar 545A and a content region 545B. The options bar 545A includes a photo processing affordance 518 for processing the photograph (e.g., rotating the photo, resizing the photo, cropping the photo, or adjusting brightness or contrast). The options bar 545A includes a markup affordance 516 for toggling between an editing mode in which content in the content region 545B can be edited (e.g., marked up) and a viewing mode in which content in the content region 545B can be viewed, but not edited. In FIG. 5AE, the markup affordance 516 is displayed in a manner (e.g., mostly black) to indicate that the viewing mode (not the editing mode) is active. The options bar 545A includes a share affordance 517 for sharing the content in the content region 545B with other users, e.g., emailing a copy of the content or sending a text message including a copy of the content.

FIG. 5AE illustrates a finger contact 551C detected at the location of the markup affordance 516. FIG. 5AF illustrates the user interface 500 of FIG. 5AE in response to detecting the finger contact 551C at the location of the markup affordance 516, which is displayed in a manner (e.g., mostly white) to indicate that the editing mode (not the viewing mode) is active. In FIG. 5AF, the photo viewer user interface 504A is replaced with the drawing user interface 501. The drawing user interface 501 includes the second content 544 in the content region 512 and includes the toolbar region 513 with a plurality of drawing tool selection affordances 532A-532D.

FIG. 5AG illustrates the user interface 500 of FIG. 5AD with a stylus contact 561A detected rather than the finger contact 551C detected in FIG. 5AD. Thus, the user interface 500 includes the photo viewer user interface 504A including the second content 544. FIG. 5AG illustrates a stylus contact 561A detected at the location of the second content 544.

FIG. 5AH illustrates the user interface 500 of FIG. 5AG in response to detecting the stylus contact 561A at the location of the second content 544. In FIG. 5AH, the photo viewer user interface 504A is replaced with the drawing user interface 501. The drawing user interface 501 includes the second content 544 in the content region 512 and includes the toolbar region 513 with a plurality of drawing tool selection affordances 532A-532D.

FIG. 5AI illustrates the user interface 500 of FIG. 5AD with movement of a stylus contact 561B detected rather than the finger contact 551C in FIG. 5AD. Thus, the user interface 500 includes the photo viewer user interface 504A including the second content 544. FIG. 5AI illustrates movement of a stylus contact 561B detected at the location of the second content 544. FIG. 5AJ illustrates the user interface 500 of FIG. 5AI in response to detecting movement of the stylus contact 561B at the location of the second content 544. In FIG. 5AJ, the photo viewer user interface 504A is replaced with the drawing user interface 501. The drawing user interface 501 includes the second content 544 in the content region 512 and includes the toolbar region 513 with a plurality of drawing tool selection affordances 532A-532D. Whereas the movement of the stylus contact 561B defines a path from a first location within the second content 544 to a second location within the second content 544, the drawing user interface 501 further includes a stroke drawing object 521F corresponding to the path.

FIG. 5AJ illustrates a contact 551Z detected at a location of the share affordance 517. FIG. 5AK illustrates the user interface 500 of FIG. 5AJ in response to detecting the contact 551Z at the location of the share affordance 517. The user interface 500 includes a share menu 519A. The share menu 519A includes a share-via-text-message affordance 519B for sharing the content in the content region 512, including the second content 544 marked up by the stroke drawing object 521F, with another user via a text message. The share menu 519A includes a share-via-reply affordance 519C for replying to the first email message with the content in the content region 512 attached to the reply (being sent to the sender of the first email message). The share menu 519A includes a share-via-new-email affordance 519D for attaching the content in the content region 512 to a new email message to be sent to a receipt of the user's choice. The share menu 519A includes a save-as-new-photo affordance 519E for saving, on the device 100, the content in the content region 512 as a new photo.

FIG. 5AL illustrates the user interface 500 of FIG. 5AE with a finger contact 551D detected at the location of the second content 544 rather than the finger contact 551C detected at the location of the markup affordance 516 in FIG. 5AE. Thus, the user interface 500 includes the photo viewer user interface 504A including the second content 544. FIG. 5AL illustrates a finger contact 551D detected at the location of the second content 544.

FIG. 5AM illustrates the user interface 500 of FIG. 5AL in response to detecting the finger contact 551D at the location of the second content 544. FIG. 5AM illustrates the photo viewer user interface 504A in a full-screen mode in which second content is displayed 544 and the device bar 503 and options bar 545A are not displayed. In various implementations, in the full-screen mode, the user interface 500 includes only the second content 544.

FIG. 5AN illustrates the user interface 500 of FIG. 5AE with movement of a finger contact 551E detected at the location of the second content 544 rather than the finger contact 551C detected at the location of the markup affordance 516 in FIG. 5AE. Thus, the user interface 500 includes the photo viewer user interface 504A including the second content 544. FIG. 5AN illustrates movement of a finger contact 551E detected at the location of the second content 544.

FIG. 5AO illustrates the user interface 500 of FIG. 5AN in response to detecting movement of the finger contact 551E at the location of the second content 544. The user interface 500 includes the photo viewer user interface 504A with the second content 544 moved in accordance with movement of the finger contact 551E. Thus, in response to detecting movement of a finger contact within the second content 544, the content region 545B is scrolled, moving the second content 544.

FIG. 5AP illustrates the user interface 500 of FIG. 5AC with a stylus contact 561C detected at the location of the representation of the second content 543B. FIG. 5AQ illustrates the user interface 500 of FIG. 5AP in response to detecting the stylus contact 561C at the location of the representation of the second content 543B. In FIG. 5AQ, the email user interface 502 is replaced with the drawing user interface 501. The drawing user interface 501 includes the second content 544 in the content region 512 and includes the toolbar region 513 with a plurality of drawing tool selection affordances 532A-532D.

FIG. 5AR illustrates the user interface 500 of FIG. 5AC with movement of a stylus contact 561D detected at the location of the representation of the second content 543B. FIG. 5AS illustrates the user interface 500 of FIG. 5AR in response to detecting movement of the stylus contact 561D at the location of the representation of the second content 543B, in accordance with one embodiment. In FIG. 5AS, the email user interface 502 is replaced with the drawing user interface 501. The drawing user interface 501 includes the second content 544 in the content region 512 and includes the toolbar region 513 with a plurality of drawing tool selection affordances 532A-532D. Whereas the movement of the stylus contact 561D defines a path from a first location within the representation of the second content 543B to a second location within the representation of the second content 543B, the drawing user interface 501 further includes a stroke drawing object 521G corresponding to the path. In various implementations, when the representation of the second content 543B is an image and the second content 544 is an increased-scale version of the image of the second content, the stroke drawing object 521G corresponding to the path is an increased-scale version of the path.

FIG. 5AT illustrates the user interface 500 of FIG. 5AR in response to detecting movement of the stylus contact 561D at the location of the representation of the second content 543B, in accordance with another embodiment. In FIG. 5AT, the email user interface 502 is replaced with the drawing user interface 501. The drawing user interface 501 includes the second content 544 in the content region 512 and includes the toolbar region 513 with a plurality of drawing tool selection affordances 532A-532D. Whereas the movement of the stylus contact 561D defines a path from a first location within the representation of the second content 543B to a second location within the representation of the second content 543B, the drawing user interface 501 further includes a stroke drawing object 521H corresponding to the path. In various implementations, when the representation of the second content 543B is an image and the second content 544 is an increased-scale version of the image of the second content, the stroke drawing object 521H corresponding to the path is not an increased-scale version of the path, but rather, is a version of the path that is the same size as the path defined by the movement of the stylus contact 561D.

FIG. 5AU illustrates the user interface 500 of FIG. 5AC with movement of a finger contact 551F detected at the location of the representation of the second content 543B. FIG. 5AV illustrates the user interface 500 of FIG. 5AU in response to detecting movement of the finger contact 551F at the location of the representation of the second content 543B. The user interface 500 includes the email user interface 502 with the representation of the second content 543B (and the first content 543B) moved in accordance with movement of the finger contact 551F. Thus, in response to detecting movement of a finger contact at the location of the representation of the second content 543B, the content region 542B of the email user interface 502 is scrolled, moving the first content 543A and the representation of the second content 543B.

FIG. 5AW illustrates the user interface 500 of FIG. 5AV with movement of a finger contact 551G detected at a location in the content region 542B, but not at a location of the representation of the second content 543B. FIG. 5AX illustrates the user interface 500 of FIG. 5AW in response to detecting movement of the finger contact 551G at the location in the content region 542B. The user interface 500 includes the email user interface 502 with the representation of the second content 543B (and the first content 543A) moved in accordance with movement of the finger contact 551G. Thus, in response to detecting movement of a finger contact within the content region 542B (either at the location the representation of the second content 543B or not at the location the representation of the second content 543B), the content region 542B of the email user interface 502 is scrolled, moving the first content 543A and the representation of the second content 543B.

FIG. 5AY illustrates the user interface 500 of FIG. 5AB with a finger contact 551H detected at a location of the second message affordance 541B associated with a second email message, rather than the finger contact 551A detected at the location of the first message affordance 541A in FIG. 5AB. FIG. 5AZ illustrates the user interface 500 of FIG. 5AY in response to detecting the finger contact 551H at the location of the second message affordance 541B. In response to detecting the finger contact 551H at the location of the second message affordance 541B, the email user interface 502 displays the second email message. In FIG. 5AZ, the email user interface 502 includes an info region 542A that includes information regarding the second email message (e.g., the sender, recipient, subject, and time sent) and a content region 542B that includes the content of the second email message. The content region 542B includes first content 546A in the form of text and a representation of second content 546B in the form of an icon.

FIG. 5BA illustrates the user interface 500 of FIG. 5AZ with a finger contact 551I detected at a location of the representation of second content 546B. FIG. 5BB illustrates the user interface 500 of FIG. 5BA in response to detecting the finger contact 551I at the location of the representation of second content 546B. In response to detecting the finger contact 551I at the location of the representation of the second contact 546B, the user interface 500 includes a PDF viewer user interface 504B including the second content 547. The PDF viewer user interface 504A, displayed below the device bar 503, includes an options bar 545A and a content region 545B. The options bar 545A includes a markup affordance 516 for toggling between an editing mode in which content in the content region 545B can be edited (e.g., marked up) and a viewing mode in which content in the content region 545B can be viewed, but not edited.

FIG. 5BC illustrates the user interface 500 of FIG. 5AZ with a stylus contact 561E detected at a location of the representation of second content 546B. FIG. 5BD illustrates the user interface 500 of FIG. 5BC in response to detecting the stylus contact 561E at the location of the representation of second contact 546B. In response to detecting the stylus contact 561E at the location of the representation of the second contact 546B, the user interface 500 includes the drawing user interface 501. The drawing user interface 501 includes the second content 547 in the content region 512 and includes the toolbar region 513 with a plurality of drawing tool selection affordances 532A-532D.

FIG. 5BE illustrates the user interface 500 including a notes user interface 505 below the device bar 503. The device bar 503 at the top of the display includes an identifier of the device 100 (e.g., "iPad"), a wireless connection indicator, a current time, and a battery indicator indicating a charge level of the device 100. The user interface 500 includes, below the device bar 501, and spanning the rest of the display, a notes user interface 505.

The notes user interface 505 includes an options bar 555A, a content creation region 555B, and a toolbar region 555C. The options bar 555A includes a share affordance 556A for sharing the content in the content creation region 555B with other users, e.g., emailing a copy of the content or sending a text message including a copy of the content. The options bar 555A includes a delete affordance 556B for deleting the content in the content creation region 555B. The options bar 555A includes a new-note affordance 556C for saving (and clearing) the content in the content creation region 555B.

The content creation region 555B includes first content in the form of typed text 557A. The content creation region 555B includes a blank area 557B beneath the typed text 557A. The toolbar region 555C includes an undo affordance 531A that can be used to reverse the last action taken by the user (e.g., undo insertion of content into the content creation region 555B) and a redo affordance 531B that can be used to retake an undone action (e.g., redo insertion of the drawing object). In various circumstances, the undo affordance 531A and/or the redo affordance 531B are not displayed or a grayed out if there is no action to undo or redo.

The toolbar region 555C includes a plurality of content insertion affordances 558A-558C for inserting content into the content creation region 555B. The plurality of content insertion affordances include a checkbox insertion affordance 558A for inserting a checkbox into the content creation region 555B. The plurality of insertion affordances include an image insertion affordance 558B for inserting an image into the content creation region 555B. In various implementations, upon detecting selection of the image insertion affordance 558B, the device 100 displays an image selection user interface for assisting a user in selecting an image for insertion into the content creation region 555B. The plurality of content insertion affordances include a drawing insertion affordance 558C for inserting a drawing into the content creation region 555B. In various implementations, upon detecting selection of the drawing insertion affordance 558C, the notes user interface 505 is replaced with a drawing user interface for assisting a user in creating a drawing. When the drawing is complete, the drawing user interface is replaced with the notes user interface 505 including the drawing in the content creation region 555B. The toolbar region 555C includes a show drawing tools affordance 558D for displaying drawing tool selection affordances in the toolbar region and allowing insertion of an in-line drawing into the content creation region 555B as described further below.

FIG. 5BF illustrates the user interface 500 of FIG. 5BE with a finger contact 552A detected at the location of the show drawing tools affordance 558D. FIG. 5BG illustrates the user interface 500 of FIG. 5BF in response to detecting the finger contact 558A at the location of the show drawing tools affordance 558D. In FIG. 5BG, at least a portion of the blank area 557B is converted into a drawing insertion region 557C. Further, a visual separator 557D is displayed between the typed text 557A and the drawing insertion region 557C. In FIG. 5BG, the toolbar region 555C is changed from a generic content insertion mode into an in-line drawing mode and includes a plurality of drawing tool selection affordances 532A, 532B, 532E, 532H, 532I. The toolbar region 555C further includes color selection affordances 533 for selecting a color of drawing objects inserted into the drawing insertion region 557C. The toolbar region 555C includes a hide drawing tools affordance 558E that changes the toolbar region 555C from the in-line drawing mode back to the generic content insertion mode.

FIG. 5BG illustrates movement of a finger contact 552B detected at a location within the drawing insertion region 557C. FIG. 5BH illustrates the user interface 500 of FIG. 5BG in response to detecting movement of the finger contact 552B in the drawing insertion region 557C. FIG. 5BH illustrates a stroke drawing object 559A in the drawing insertion region 557C. The stroke drawing object 559A is a mark based on movement of the finger contact 552B. In particular, displaying the stroke drawing object 559A includes displaying a mark at locations at which the finger contact 552B was detected.

FIG. 5BH illustrates a finger contact 552C detected at the location of the hide drawing tools affordance 558E. FIG. 5BI illustrates the user interface 500 of FIG. 5BH in response to detecting the finger contact 552C at the location of the hide drawing tools affordance 558E. In FIG. 5BI, the drawing insertion region 557C is replaced with a drawing region 557E including the stroke drawing object 559A. In FIG. 5BI, the visual separator 557D ceases to be displayed and the toolbar region 555C is changed to a generic content insertion mode.

FIG. 5BJ illustrates the user interface 500 of FIG. 5BE with a stylus contact 562A detected at a location in the blank area 557B. FIG. 5BK illustrates the user interface 500 of FIG. 5BJ in response to detecting the stylus contact 562A at the location in the blank area 557B. The blank area 557B is at least partially replaced with the drawing insertion region 557C and the visual separator is displayed between the typed text 557A and the drawing insertion region 557C. The toolbar region 555C is changed to include the drawing tool selection affordances 532A, 532B, 532E, 532H, and 532I.

FIG. 5BK illustrates movement of a stylus contact 562B detected at a location within the drawing insertion region 557C. FIG. 5BL illustrates the user interface 500 of FIG. 5BK in response to detecting movement of the stylus contact 562B in the drawing insertion region 557C. FIG. 5BL illustrates a stroke drawing object 559A in the drawing insertion region 557C. The stroke drawing object 559A is a mark based on movement of the stylus contact 562B. In particular, displaying the stroke drawing object 559A includes displaying a mark at locations at which the stylus contact 562B was detected.

FIG. 5BL illustrates a stylus contact 562C detected at the location of the hide drawing tools affordance 558E. FIG. 5BM illustrates the user interface 500 of FIG. 5BL in response to detecting the stylus contact 562C at the location of the hide drawing tools affordance 558E. In FIG. 5BM, the drawing insertion region 557C is replaced with a drawing region 557E including the stroke drawing object 559A. In FIG. 5BM, the visual separator 557D ceases to be displayed and the toolbar region 555C is changed to a generic content insertion mode.

FIG. 5BN illustrates the user interface 500 of FIG. 5BE with movement of a stylus contact 562D detected at a location in the blank area 557B. FIG. 5BO illustrates the user interface 500 of FIG. 5BN in response to detecting movement of the stylus contact 562D in the blank area 557B. In FIG. 5BO, at least a portion of the blank area 557B is converted into a drawing insertion region 557C and a visual separator 557D is displayed between the typed text 557A and the drawing insertion region 557C. Further, the toolbar region 555C is changed to an in-line drawing mode and includes a plurality of drawing tool selection affordances 532A, 532B, 532E, 532H, and 532I. In response to detecting movement of the stylus contact 562D, the drawing insertion region 557C includes a stroke drawing object 559A. The stroke drawing object 559A is a mark based on movement of the stylus contact 562D. In particular, displaying the stroke drawing object 559A includes displaying a mark at locations at which the stylus contact 562D was detected.

FIG. 5BO illustrates a stylus contact 562E detected at the location of the hide drawing tools affordance 558E. FIG. 5BP illustrates the user interface 500 of FIG. 5BO in response to detecting the stylus contact 562E at the location of the hide drawing tools affordance 558E. In FIG. 5BP, the drawing insertion region 557C is replaced with a drawing region 557E including the stroke drawing object 559A. In FIG. 5BN, the first visual separator 557D ceases to be displayed and the toolbar region 555C is changed to a generic content insertion mode.

Thus, FIGS. 5BE-5BP illustrate three ways of inserting a drawing object into the content creation region 555B of FIG. 5BE. FIGS. 5BF-5BI illustrate a method of inserting a drawing object using finger contacts, including a finger contact at a show drawing tools affordance 558D followed by movement of a finger contact. FIGS. 5BJ-5BM illustrate a method of inserting a drawing object using stylus contacts, including a stylus contact at a location within the blank area 557B followed by movement of a stylus contact. FIGS. 5BN-5BP illustrate a method of inserting a drawing object using stylus contacts beginning with movement of a stylus contact in the blank area 557B.

FIGS. 5BQ-5BW illustrate two additional ways of inserting a drawing object into the content creation region 555B when a drawing object is already present. FIGS. 5BQ-5BT illustrate a method of inserting a drawing object using finger contacts. FIGS. 5BU-5BW illustrate a method of inserting a drawing object using stylus contacts.

FIG. 5BQ illustrates the user interface 500 of FIG. 5BP with a finger contact 552D detected at a location within the drawing region 557E. FIG. 5BR illustrates the user interface 500 of FIG. 5BQ in response to detecting the finger contact 552D at the location within the drawing region 557E. The drawing region 557E replaced with the drawing insertion region 557C (still including the stroke drawing object 559A) and the visual separator 557D is displayed between the typed text 557A and the drawing insertion region 557C. The toolbar region 555C is changed to include the drawing tool selection affordances 532A, 532B, 532E, 532H, and 532I.

FIG. 5BR illustrates movement of a finger contact 552E detected at a location within the drawing insertion region 557C. FIG. 5BS illustrates the user interface 500 of FIG. 5BR in response to detecting movement of the finger contact 552E in the drawing insertion region 557C. FIG. 5BS illustrates a second stroke drawing object 559B in the drawing insertion region 557C (in addition to the stroke drawing object 559A).

FIG. 5BS illustrates a finger contact 552F detected at the location of the hide drawing tools affordance 558E. FIG. 5BT illustrates the user interface 500 of FIG. 5BS in response to detecting the finger contact 552F at the location of the hide drawing tools affordance 558E. In FIG. 5BT, the drawing insertion region 557C is replaced with a drawing region 557E including the stroke drawing object 559A and the second stroke drawing object 559B. In FIG. 5BT, the visual separator 557D ceases to be displayed and the toolbar region 555C is changed to a generic content insertion mode.

FIG. 5BU illustrates the user interface 500 of FIG. 5BP with movement of a stylus contact 562F detected at a location within the drawing region 557E. FIG. 5BV illustrates the user interface 500 of FIG. 5BU in response to detecting movement of the stylus contact 562F at the location within the drawing region 557E. The drawing region 557E replaced with the drawing insertion region 557C (still including the stroke drawing object 559A) and the visual separator 557D is displayed between the typed text 557A and the drawing insertion region 557C. The toolbar region 555C is changed to include the drawing tool selection affordances 532A, 532B, 532E, 532H, and 532I. In response to detecting movement of the stylus contact 562F, the drawing insertion region 557C includes a second stroke drawing object 559B.

FIG. 5BV illustrates a stylus contact 562G detected at the location of the hide drawing tools affordance 558E. FIG. 5BW illustrates the user interface 500 of FIG. 5BV in response to detecting the stylus contact 562G at the location of the hide drawing tools affordance 558E. In FIG. 5BW, the drawing insertion region 557C is replaced with a drawing region 557E including the stroke drawing object 559A and the second stroke drawing object 559B. In FIG. 5BW, the first visual separator 557D ceases to be displayed and the toolbar region 555C is changed to a generic content insertion mode.

FIGS. 5BU-5BW illustrate that movement of a stylus contact within a drawing region results in a displayed mark in the drawing region. FIGS. 5BX-5BY illustrate that movement of a finger contact within a drawing region results in scrolling of the content creation region.

FIG. 5BX illustrates the user interface 500 of FIG. 5BW with movement of a finger contact 552G detected within the drawing region 557E. FIG. 5BY illustrates the user interface 500 of FIG. 5BX in response to detecting movement of the finger contact 552G within the drawing region 557E. In FIG. 5BY, the content creation region 555B is scrolled upwards (in accordance with the movement of the finger contact 552G). In particular, display of the typed text 557A (and display of the drawing region 557E) is moved upwards (based on movement of the finger contact 552G).

FIGS. 5BN-5BP illustrate that movement of a stylus contact within a blank area results in a displayed mark in the blank area. FIGS. 5BZ-5CA illustrate that movement of a finger contact within a blank area results in scrolling of the content creation region.

FIG. 5BZ illustrates the user interface 500 of FIG. 5BY with movement of a finger contact 552H detected within a blank area 557F of the content creation region 555B below the drawing region 557E. FIG. 5CA illustrates the user interface 500 of FIG. 5BZ in response to detecting movement of the finger contact 552H within the blank area 557F. In FIG. 5CA, the content creation region 555B is scrolled downwards (in accordance with the movement of the finger contact 552H). In particular, display of the typed text 557A (and display of the drawing region 557E) is moved downwards (based on movement of the finger contact 552H).

FIG. 5CB illustrates the user interface 500 of FIG. 5CA with a finger contact 552I detected at a location within the typed text 557A. FIG. 5CC illustrates the user interface 500 of FIG. 5CB in response to detecting the finger contact 552I at the location within the typed text 557A. In response to detecting the finger contact 552I at the location within the typed text 557A, the device 100 displays a cursor 557G at the location within the typed text 557A and the toolbar region 555C is changed into a keyboard mode. In the keyboard mode, the toolbar region 555C an undo affordance 531A that can be used to reverse the last action taken by the user (e.g., undo insertion of text) and a redo affordance 531B that can be used to retake an undone action (e.g., redo insertion of the text). In various circumstances, the undo affordance 531A and/or the redo affordance 531B are not displayed or a grayed out if there is no action to undo or redo. The toolbar region 555C includes the checkbox insertion affordance 558A for inserting a checkbox into the content creation region 555B, the image insertion affordance 558B for inserting an image into the content creation region 555B, and the drawing insertion affordance 558C for inserting a drawing into the content creation region 555B. The toolbar region 555C includes the show drawing tools affordance 558D for displaying drawing tool selection affordances in the toolbar region 555C. The toolbar region 555C includes a keyboard with a plurality of character affordances 558G for inserting text into the content creation region 555B. The toolbar region 555C includes a font options affordance 558F for changing a size or font of the text inserted into the content creation region 555B. The toolbar region 555C includes a hide keyboard affordance 558H for changing the toolbar region 555C into the generic content insertion mode.

FIG. 5CD illustrates the user interface 500 of FIG. 5CC with a finger contact 552J detected at a location in the typed text 557A for at least a predefined threshold amount of time. FIG. 5CE illustrates the user interface 500 of FIG. 5CD in response to detecting the contact 552J at the location in the typed text 557A for at least the predefined threshold amount of time. FIG. 5CE illustrates, at the location in the typed text, a menu including a select affordance 557H for selecting a portion of the typed text 557A, a text manipulation affordance 557I for changing a characteristic (e.g., bolding, italicizing, or underlining) of at least a portion of the typed text 557A, and an in-line drawing affordance 557J for inserting a drawing insertion region at the location of the typed text 557A. FIG. 5CE illustrates a contact 552K detected at the location of the in-line drawing affordance 557J.

FIG. 5CF illustrates the user interface 500 of FIG. 5CE in response to detecting the contact 552K at the location of the in-line drawing affordance 557J. In response to selection of the in-line drawing affordance 557J, a drawing insertion region 557M is inserted into the content creation region 555B at the location of the contact 552K, splitting the typed text 557A into a first portion of typed text 557K and a second portion of typed text 557L. A first visual separator 557N is displayed between the drawing insertion region 557M and the first portion of the typed text 557K and a second visual separator 557O is displayed between the drawing insertion region 557M and the second portion of the typed text 557M. The toolbar region 555C is changed to include the drawing tool selection affordances 532A, 532B, 532E, 532H, and 532I.

FIG. 5CF illustrates movement of a finger contact 552L detected at a location within the drawing insertion region 557M. FIG. 5CG illustrates the user interface 500 of FIG. 5CF in response to detecting movement of the finger contact 552L within the drawing insertion region 557M. FIG. 5CG illustrates a stroke drawing object 559C in the drawing insertion region 557M. The stroke drawing object 559C is a mark based on movement of the finger contact 552L. In particular, displaying the stroke drawing object 559M includes displaying a mark at locations at which the finger contact 552L was detected.

FIG. 5CG illustrates movement of a contact 552Z detected at a location of the second visual separator 557O. FIG. 5CH illustrates the user interface 500 of FIG. 5CG in response to detecting movement of the contact 552Z at the location of the second visual separator 557O. In FIG. 5CH, the second visual separator 557O is moved downward to increase the size of the drawing insertion region 557M. Whereas the second visual separator 557O is moved downward (along with the second portion of the typed text 557L and the drawing region 557E), the stroke drawing object 559C is unmoved.

FIG. 5CH illustrates a finger contact 552M detected at a location of the hide drawing tools affordance 558E. FIG. 5CI illustrates the user interface 500 of FIG. 5CH in response to detecting the finger contact 552M at the location of the hide drawing tools affordance 558E. In FIG. 5CI, the drawing insertion region 557M is replaced with a drawing region 557P including the stroke drawing object 559C. In FIG. 5CI, the first visual separator 557N and the second visual separator 557O cease to be displayed and the toolbar region 555C is changed to a generic content insertion mode.

FIG. 5CJ illustrates the user interface 500 of FIG. 5CI with movement of a finger contact 552N detected at a location of the first portion of the typed text 557K. FIG. 5CK illustrates the user interface 500 of FIG. 5CJ in response to detecting movement of the finger contact 552N within the first portion of the typed text 557K. In FIG. 5CK, typed text covered by the movement of the finger contact 552N is covered with a selection indicia 557Q (e.g., the text is highlighted) indicating that the typed text covered by the movement of the finger contact 552N is selected.

FIG. 5CL illustrates the user interface 500 including the notes user interface 505 below the device bar 503. The notes user interface 505 includes the options bar 555A, the content creation region 555B, and the toolbar region 555C. The content creation region 555B includes the typed text 557A with carriage returns shown in gray. In various implementations, carriage returns are not shown to a user, but for ease of illustration and discussion, carriage returns are shown in various figures below as paragraphs symbols (¶). The content creation region 555B further includes the cursor 557G at the end of the typed text 557A.

The toolbar region 555C is displayed in the keyboard mode. In the keyboard mode, the toolbar region 555C include the undo affordance 531A that can be used to reverse the last action taken by the user (e.g., undo insertion of text) and the redo affordance 531B that can be used to retake an undone action (e.g., redo insertion of the text). In various circumstances, the undo affordance 531A and/or the redo affordance 531B are not displayed or a grayed out if there is no action to undo or redo. The toolbar region 555C includes the checkbox insertion affordance 558A for inserting a checkbox into the content creation region 555B, the image insertion affordance 558B for inserting an image into the content creation region 555B, and the drawing insertion affordance 558C for inserting a drawing into the content creation region 555B. The toolbar region 555C includes the show drawing tools affordance 558D for displaying drawing tool selection affordances in the toolbar region 555C. The toolbar region 555C includes a keyboard with a plurality of character affordances 558G for inserting text into the content creation region 555B. The toolbar region 555C includes the font options affordance 558F for changing a size or font of the text inserted into the content creation region 555B. The toolbar region 555C includes the hide keyboard affordance 558H for changing the toolbar region 555C into the generic content insertion mode.

Among the character affordances 558G for inserting text into the content creation region 555B is an enter affordance 558I for inserting a carriage return into the content creation region 555B. FIG. 5CL illustrates a finger contact 553A at a location of the enter affordance 558I. FIG. 5CM illustrates the user interface 500 of FIG. 5CL in response to detecting the finger contact 553A at the location of the enter affordance 558I (and a plurality of subsequent contacts at the location of the enter affordance 558I). In FIG. 5CL, the content creation region 555B includes the typed text 557A and a number of carriage returns below the typed text 557A creating a blank area that does not include visible content (as the carriage returns are, optionally, not displayed to a user) and is a blank text insertion region 567A. The content creation region 555B includes the cursor 557C below the blank text insertion region 567A and the toolbar region 555C is in the keyboard mode including the plurality of character affordances 558G.

FIG. 5CN illustrates the user interface 500 of FIG. 5CM in response to detecting a number of contacts at locations of the character affordances 558G. The content creation region 555B includes the typed text 557A, the blank text insertion region 567A, additional typed text 567B, and the cursor 557G at the end of the additional typed text 567B. FIG. 5CN illustrates a finger contact 553B at the location of the hide keyboard affordance 558H. FIG. 5CO illustrates the user interface 500 of FIG. 5CN in response to detecting the finger contact 553B at the location of the hide keyboard affordance 558H. In FIG. 5CO, the toolbar region 555C is in the generic content insertion mode. Thus, the toolbar region 555C includes the undo affordance 531A that can be used to reverse the last action taken by the user (e.g., undo insertion of content into the content creation region 555B) and the redo affordance 531B that can be used to retake an undone action (e.g., redo insertion of the drawing object). In various circumstances, the undo affordance 531A and/or the redo affordance 531B are not displayed or a grayed out if there is no action to undo or redo. The toolbar region 555C includes the checkbox insertion affordance 558A, the image insertion affordance 558B, the drawing insertion affordance 558C, and the show drawing tools affordance 558D.

FIG. 5CP illustrates the user interface 500 of FIG. 5CO with movement of a finger contact 553C detected at a location within the blank text insertion region 567A. FIG. 5CQ illustrates the user interface 500 of FIG. 5CP in response to detecting movement of the finger contact 553C at the location within the blank text insertion region 567A. In FIG. 5CQ, the content creation region 555B is scrolled upwards (e.g., in accordance with movement of the finger contact 553C). In particular, display of the typed text 557A, the blank text insertion region 567A, and the additional typed text 567B are moved. FIG. 5CQ illustrates movement of a stylus contact 563A detected at a location of the blank text insertion region 567A.

FIG. 5CR illustrates the user interface 500 of FIG. 5CQ in response to detecting movement of the stylus contact 563A at the location within the blank text insertion region 567A. In FIG. 5CR, the content creation region 555B is scrolled downwards (e.g., in accordance with movement of the stylus contact 563A). In particular, display of the typed text 557A, the blank text insertion region 567A, and the additional typed text 567B are moved. FIG. 5CR illustrates a finger contact 553D at a location in the blank text insertion region 567A.

FIG. 5CS illustrates the user interface 500 of FIG. 5CR in response to detecting the finger contact 553D at the location of the blank text insertion region 567A. In FIG. 5CS, the cursor 557G is displayed at the location of the finger contact 553D and the toolbar region 555C is displayed in the keyboard mode. FIG. 5CS illustrates a finger contact 553E at a location of the show drawing tools affordance 558D.

FIG. 5CT illustrates the user interface 500 of FIG. 5CS in response to detecting the finger contact 553E at the location of the show drawing tools affordance 558D. In FIG. 5CT, the toolbar region 555C is changed to the in-line drawing mode and includes the plurality of drawing tool selection affordances 532A, 532B, 532E, 532H, and 532I.

FIG. 5CU illustrates the user interface 500 of FIG. 5CT with a finger contact 553F detected at a location within a blank text insertion region 567A (while the plurality of drawing tool selection affordances 532A, 532B, 532E, 532H, and 532I are displayed). FIG. 5CV illustrates the user interface 500 of FIG. 5CU in response to detecting the finger contact 553F at the location within the blank text insertion region 567A. In FIG. 5CV, a portion of the blank text insertion region 567A is converted into a blank drawing insertion region 567D, leaving a first blank text insertion region 567C above the drawing insertion region 567D (and below the typed text 557A) and a second blank text insertion region 567E below the drawing insertion region 567D (and above the additional typed text 567B). The first blank text insertion region 567C and the drawing insertion region 567D are separated by a first visual separator 567F. The second blank text insertion region 567E and the drawing insertion region 567D are separated by a second visual separator 567G.

FIG. 5CV illustrates movement of a finger contact 553G detected within the drawing insertion region 567D. FIG. 5CW illustrates the user interface 500 of FIG. 5CV in response to detecting movement of the finger contact 553G within the drawing insertion region 567D. FIG. 5CW illustrates a stroke drawing object 569A in the drawing insertion region 567D. The stroke drawing object 569A is a mark based on movement of the finger contact 553G. In particular, displaying the stroke drawing object 569A includes displaying a mark at locations at which the finger contact 553G was detected.

FIG. 5CX illustrates the user interface 500 of FIG. 5CT with movement of a finger contact 553H detected at a location within a blank text insertion region 567A (while the plurality of drawing tool selection affordances 532A, 532B, 532E, 532H, and 532I are displayed). As shown above (e.g., in FIGS. 5BZ-5CA), in various implementations, movement of a finger contact when the drawing tools are not displayed results in scrolling the content creation region 555B. FIG. 5CY illustrates the user interface 500 of FIG. 5CX in response to detecting movement the finger contact 553H at the location within the blank text insertion region 567A. In FIG. 5CY, a portion of the blank text insertion region 567A is converted into a blank drawing insertion region 567D, leaving a first blank text insertion region 567C above the drawing insertion region 567D (and below the typed text 557A) and a second blank text insertion region 567E below the drawing insertion region 567D (and above the additional typed text 567B). The first blank text insertion region 567C and the drawing insertion region 567D are separated by a first visual separator 567F. The second blank text insertion region 567E and the drawing insertion region 567D are separated by a second visual separator 567G. Thus, in various implementations, movement of a finger contact in a blank text insertion region (when the drawing tool selection affordances are displayed) results in the same user interface as a non-moving finger contact.

FIG. 5CZ illustrates the user interface 500 of FIG. 5CT with a finger contact 553I detected at a location of a blank area 567H of the content creation region 555B below the additional typed text 567B (while the plurality of drawing tool selection affordances 532A, 532B, 532E, 532H, and 532I are displayed). FIG. 5DA illustrates the user interface 500 of FIG. 5CZ in response to detecting the finger contact 553I at the location of the blank area 567H. In FIG. 5DA (similar to the response illustrated in FIG. 5BG), at least a portion of the blank area 567H is converted into a drawing insertion region 567I. Further, a visual separator 557J is displayed between the additional typed text 567B and the drawing insertion region 567I.

FIG. 5DA illustrates movement of a finger contact 553J detected at a location within the drawing insertion region 567I. FIG. 5DB illustrates the user interface 500 of FIG. 5DA in response to detecting movement of the finger contact 553J in the drawing insertion region 567I. FIG. 5DB illustrates a stroke drawing object 559B in the drawing insertion region 567I. The stroke drawing object 569B is a mark based on movement of the finger contact 553J. In particular, displaying the stroke drawing object 569B includes displaying a mark at locations at which the finger contact 553J was detected.

FIG. 5DC illustrates the user interface 500 of FIG. 5CT with a finger contact 553K detected at a location within the additional typed text 567B (while the plurality of drawing tool selection affordances 532A, 532B, 532E, 532H, and 532I are displayed). FIG. 5DD illustrates the user interface 500 of FIG. 5DC in response to detecting the contact 553K at the location within the additional typed text 567B. In response to detecting the finger contact 553K at the location within the additional typed text 567B, the device 100 displays the cursor 557G at the location within the typed text 557A and the toolbar region 555C is changed into a keyboard mode including a plurality of character affordances 558G for inserting additional text.

FIG. 5DE illustrates the user interface 500 of FIG. 5CR with a stylus contact 563B detected at a location in the blank text insertion region 567A (rather than the finger contact 553D of FIG. 5CR). FIG. 5DF illustrates the user interface 500 of FIG. 5CR in response to detecting the stylus contact 563B at the location of the blank text insertion region 567A. In FIG. 5DF, the cursor 557G is displayed at the location of the stylus contact 563B and the toolbar region 555C is displayed in the keyboard mode. FIG. 5DF illustrates a stylus contact 563C at a location of the show drawing tools affordance 558D.

FIG. 5DG illustrates the user interface 500 of FIG. 5DF in response to detecting the stylus contact 563C at the location of the show drawing tools affordance 558D. In FIG. 5DG, the toolbar region 555C is changed to the in-line drawing mode and includes the plurality of drawing tool selection affordances 532A, 532B, 532E, 532H, and 532I. FIG. 5DG illustrates a stylus contact 563D detected at a location within the blank text insertion region 567A (e.g., while the plurality of drawing tool selection affordances 532A, 532B, 532E, 532H, and 532I are displayed).

FIG. 5DH illustrates the user interface 500 of FIG. 5DG in response to detecting the stylus contact 563D at the location within the blank text insertion region 567A. In FIG. 5DH, a portion of the blank text insertion region 567A is converted into a drawing insertion region 567J including a mark 569C at the location of the stylus contact 563D. The conversion leaves a first blank text insertion region 567C above the drawing insertion region 567J (and below the typed text 557A) and a second blank text insertion region 567E below the drawing insertion region 567J (and above the additional typed text 567B). In FIG. 5DH, the first blank text insertion region 567C and the drawing insertion region 567J are separated by a first visual separator 567F. The second blank text insertion region 567E and the drawing insertion region 567J are separated by a second visual separator 567G. In various implementations, the mark 569C is a dot or a stroke drawing object 569C of zero or minimal length.

FIG. 5DI illustrates the user interface 500 of FIG. 5DG with movement of a stylus contact 563E detected at a location within the blank text insertion region 567A (rather than the non-moving stylus contact 563D of FIG. 5DG). FIG. 5DJ illustrates the user interface 500 of FIG. 5DI in response to detecting movement of the stylus contact 563E at the location within the blank text insertion region 567A (while the plurality of drawing tool selection affordances 532A, 532B, 532E, 532H, and 532I are displayed). In FIG. 5DJ, a portion of the blank text insertion region 567A is converted into a drawing insertion region 567K including the stroke drawing object 569A. The conversion leaves a first blank text insertion region 567C above the drawing insertion region 567K (and below the typed text 557A) and a second blank text insertion region 567E below the drawing insertion region 567K (and above the additional typed text 567B). The first blank text insertion region 567C and the drawing insertion region 567K are separated by a first visual separator 567F. The second blank text insertion region 567E and the drawing insertion region 567K are separated by a second visual separator 567G.

FIG. 5DK illustrates the user interface 500 of FIG. 5DJ with movement of a stylus contact 563F originating in the drawing insertion region 567K and crossing the second visual separator 567G into the second blank text insertion region 567E. FIG. 5DL illustrates the user interface 500 of FIG. 5DK in response to detecting movement of the stylus contact 563F. In FIG. 5DL, the second visual separator 567G is moved downward, indicating an increase in the size of the drawing insertion region 567K. The drawing insertion region 567K has increased in size as the second blank text insertion region 567E has been partially converted into a portion of the drawing insertion region 567K (leaving third blank text insertion region 567L). Further, the drawing insertion region 567K includes a second stroke drawing object 569D (in addition to the stroke drawing object 569A). The second stroke drawing object 569D is a mark based on movement of the stylus contact 563F. In particular, displaying the second stroke drawing object 569D includes displaying a mark at locations at which the stylus contact 563F was detected.

FIG. 5DM illustrates the user interface 500 of FIG. 5DL with movement of a stylus contact 563G detected at a location of the second visual separator 567G. FIG. 5DN illustrates the user interface 500 of FIG. 5DM in response to detecting movement of the stylus contact 563G at the location of the second visual separator 567G. In FIG. 5DN, the second visual separator 567G is moved downward to increase the size of the drawing insertion region 567K, converting the third blank text insertion region 567L into a portion of the drawing insertion region 567K. Whereas the second visual separator 567G is moved downward (along with the additional typed text 567B), the stroke drawing object 569A and the second stroke drawing object 569D are unmoved.

FIG. 5DO illustrates movement of a stylus contact 563H detected at a location within the drawing insertion region 567K. FIG. 5DP illustrates the user interface 500 of FIG. 5DO in response to detecting movement of the stylus contact 563H within the drawing insertion region 567K. The drawing insertion region 567K includes the stroke drawing object 569A and the second stroke drawing object 569D. Further, the drawing insertion region 567K includes a third stroke drawing object 569E. The third stroke drawing object 569E is a mark based on movement of the stylus contact 563H. In particular, displaying the third stroke drawing object 569E includes displaying a mark at locations at which the stylus contact 563H was detected.

FIG. 5DQ illustrates the user interface 500 of FIG. 5DG with movement of a stylus contact 563I detected at a location of the blank area 567H beneath the additional typed text 567B (rather than the stylus contact 563D in the blank text insertion region 567A in FIG. 5DG). FIG. 5DR illustrates the user interface 500 of FIG. 5DQ in response to detecting movement of the stylus contact 563I in the blank area 567H (while the plurality of drawing tool selection affordances 532A, 532B, 532E, 532H, and 532I are displayed). FIG. 5DR illustrates the stroke drawing object 559B in the drawing insertion region 567I. Thus, the blank area 567H has been at least partially converted into a drawing insertion region 567I. The stroke drawing object 569B is a mark based on movement of the stylus contact 563I. In particular, displaying the stroke drawing object 569B includes displaying a mark at locations at which the stylus contact 563I was detected.

FIGS. 6A-6C illustrate a flow diagram of a method 600 of manipulating drawing objects in accordance with some embodiments. The method 600 is performed at an electronic device (e.g., the portable multifunction device 100 in FIG. 1A, or the device 300 in FIG. 3) with a display and one or more input devices. In some embodiments, the display is a touch-screen display and the one or more input devices are on or integrated with the display. In some embodiments, the display is separate from the one or more input devices. Some operations in method 600 are, optionally, combined and/or the order of some operations is, optionally, changed.

As described below, the method 600 provides an intuitive way to manipulate drawing objects. The method reduces the cognitive burden on a user when manipulating drawing objects, thereby creating a more efficient human-machine interface. For battery-operated electronic devices, enabling a user to manipulate drawing objects faster and more efficiently conserves power and increases the time between battery charges.

The device displays (602), on the display, a drawing user interface including a plurality of drawing objects. For example, in FIG. 5C, the device 100 displays a drawing user interface 501 including a plurality of drawing objects, including a square drawing object 521A (approximately surrounding a grape of the bowl of fruit), a magnifier drawing object 521B (magnifying part of leaf of an apple of the bowl of fruit), a text drawing object 521C (stating "LEMON" over a lemon of the bowl of fruit), a set of three stroke drawing objects 521D (affecting a smiley face on the apple), and a set of six stroke drawing objects 521E (affecting a flower on the bowl).

In some embodiments, the drawing user interface includes (604) a toolbar region including a plurality of drawing tool selection affordances respectively associated with a plurality of drawing tools. For example, in FIG. 5A, the drawing user interface 501 includes a toolbar region 503 that includes a plurality of drawing tool selection affordances, including a pen tool selection affordance 532A associated with a pen tool that can be used to create opaque strokes, a highlighter tool selection affordance 532B associated with a highlighter tool that can be used to create semi-transparent strokes, a deletion tool selection affordance 532C associated with a deletion tool that can be used to delete drawing objects, and a selection tool selection affordance 532D associated with a selection tool that can be used to select drawing objects. By displaying a plurality of drawing tool selection affordances, the user interface provides an efficient mechanism for a user to select a drawing tool, thus reducing the amount of user interaction to perform various different predefined operations upon drawing objects. The reduction in user interaction reduces wear-and-tear of the device. The reduction in user interaction also results in faster initiation of the performance of the predefined operations and, thus, reduces power drain to perform the predefined operations, increasing battery life of the device.

In some embodiments, the device detects (606), via the one or more input devices, a selection user input at a location of one of the plurality of drawing tool selection affordances associated with one of the plurality of drawing tools that is associated with a predefined operation. For example, in FIG. 5C, the device 100 detects a contact 550B at the location of the deletion tool selection affordance 532C associated with the deletion tool.

In some embodiments, the drawing user interface includes (608) content marked up the plurality of drawing objects. For example, in FIG. 5C, the drawing user interface 501 includes a photograph that is marked up by the plurality of drawing objects 521A-521E.

In some embodiments, the plurality of drawing objects includes (610) a stroke drawing object defined by a continuous user input within the drawing user interface while a drawing tool that is associated with a stroke operation is selected. For example, in FIG. 5C, the plurality of drawing objects includes a set of three stroke drawing objects 521D (affecting a smiley face on the apple) and a set of six stroke drawing objects 521E (affecting a flower on the bowl). Further, in FIG. 5C, the drawing user interface 501 includes a pen tool selection affordance 532A associated with a pen tool that can be used to create opaque stroke and a highlighter tool selection affordance 532B associated with a highlighter tool that can be used to create semi-transparent strokes.

In some embodiments, the plurality of drawing objects includes (612) at least one of a shape drawing object, a stroke drawing object, a magnifier drawing object, or a text drawing object. For example, in FIG. 5C, the plurality of drawing objects includes a shape drawing object in the form of a square drawing object 521A, a stroke drawing object in the form of any of the stroke drawing objects 521D and 521E, a magnifier drawing object 521B, and text drawing object 521C. Presenting a variety of different drawing objects, and the ability to insert such drawing objects provides an efficient mechanism for a user to annotate connect in a variety of different ways, thus reducing the amount of user interaction to annotate content. The reduction in user interaction reduces wear-and-tear of the device and reduces power drain to annotate content, increasing battery life of the device.

While a drawing tool that is associated with a predefined operation is selected, the device detects (614), via the one or more input devices, a user input moving to define a path within the drawing user interface. For example, in FIG. 5D, while the deletion tool is selected, the device 100 detects the contact 550C moving to define a path within the drawing user interface 501. As another example, in FIG. 5I, while the deletion tool is selected, the device 100 detects the contact 550E moving to define a path within the drawing user interface. As another example, in FIG. 5K, while the selection tool is selected, the device 100 detects the contact 550G moving to define a path (illustrated by the selection path graphic 522B in FIG. 5M) within the drawing user interface. Allowing a user to manipulate drawing objects using a moving user input provides an efficient mechanism for a user to manipulate multiple drawing objects with a single gesture, thus reducing the amount of user interaction to manipulate multiple drawing objects. The reduction in user interaction reduces wear-and-tear of the device. The reduction in user interaction also results in faster manipulation of the drawing objects and, thus, reduces power drain to perform the manipulation, increasing battery life of the device.

In response to detecting the user input moving to define the path within the drawing user interface, the device performs (616) the predefined operation with respect to two or more of the plurality of drawing objects that intersect the path. For example, in FIG. 5E, in response to detecting the contact 550C moving to define the path, the device 100 ceases to display three of the set of six stroke drawing objects 521E. As another example, in FIG. 5M, in response to detecting the contact 550G moving to define the path, the device 100 selects the set of three stroke drawing objects 521D.

In some embodiments, in performing the predefined operation, the device ceases (618) to display the two or more of the plurality of drawing objects that intersect the path. For example, in FIG. 5E, in response to detecting the contact 550C, the device 100 ceases to display three of the set of six stroke drawing objects 521E. In some embodiments, in ceasing to display the two or more of the plurality of drawing objects that intersect the path, the device ceases (620) to display an additional one of the plurality of objects that intersects one or more of the two of more of the plurality of drawing objects that intersect the path. For example, in FIG. 5F, in response to detecting the contact 550C, the device 100 ceases to display all of the set of six stroke drawing objects 521E. Allowing a user to delete multiple drawing objects with a single gesture reduces the amount of user interaction to perform such an operation. The reduction in user interaction reduces wear-and-tear of the device and results in faster initiation of the operation, thereby reducing power drain and increasing battery life of the device.

In some embodiments, in performing the predefined operation, the device, in accordance with a determination that a speed of the user input moving to define the path within the drawing user interface exceeds a speed threshold, ceases (622) to display the two or more of the plurality of drawing objects that intersect the path and, in accordance with a determination that the speed does not exceed the speed threshold, continues to display the two or more of the plurality of drawing objects that intersect the path. For example, in FIG. 5E, the device 100 ceases to display three of the set of six stroke drawing objects 521E. However, in FIG. 5I, the device 100 continues to display the square drawing object 521A. Selectively deleting drawing objects based on a speed of the user input prevents inadvertent deletion of drawing objects caused by an accidental quick swipe through the drawing objects, requiring further user input to undo the deletion, wasting time and battery charge of the device.

In some embodiments, in performing the predefined operation, the device selects (624) the two or more of the plurality of drawing objects that intersect the path. For example, in FIG. 5M, the device 100 selects at least the left two stroke drawing objects of the set of three stroke drawing objects 521D. Allowing a user to select multiple drawing objects with a single gesture reduces the amount of user interaction to perform such an operation. The reduction in user interaction reduces wear-and-tear of the device and results in faster initiation of the operation, thereby reducing power drain and increasing battery life of the device.

In some embodiments, in selecting the two or more of the plurality of drawing objects that intersect the path, the device selects (626) an additional one of the plurality of objects that intersects one or more of the two of more of the plurality of drawing objects that intersect the path. In some embodiments, in selecting the two or more of the plurality of drawing objects that intersect the path, the device selects (628) an additional one of the plurality of objects that is encompassed by the path. For example, in FIG. 5M, the device selects all of the set of three stroke drawing objects 521D. Selecting drawing object in addition to those intersecting the path provides an efficient mechanism for a user to select (and subsequently manipulate) multiple drawings objects with a single gesture. This reduction in user interaction reduces wear-and-tear of the device and results in faster initiation of manipulation of the drawing objects, thereby reducing power drain and increasing battery life of the device.

In some embodiments, after selecting the two or more of the plurality of drawing objects that intersect the path, the device detects (630) a relocation user input moving with the drawing user interface. For example, in FIG. 5N, the device 100 detects a contact 550H moving within the drawing user interface 501. In response to detecting the relocation user input, the device moves (632) the two or more of the plurality of drawing objects in accordance with the relocation user input. For example, in FIG. 5O, the device 100 moves the set of three stroke drawing objects 521D downward in accordance with movement of the contact 550H. Allowing a user to move multiple drawing objects with a single gesture reduces the amount of user interaction to perform such an operation. Further, moving the multiple drawing objects as a whole provides an efficient mechanism to move the drawing objects while maintaining the relative positions of the drawing objects. The reduction in user interaction reduces wear-and-tear of the device and results in faster initiation of the operation, thereby reducing power drain and increasing battery life of the device.

In some embodiments, in selecting the two or more of the plurality of drawing objects that intersect the path, the device displays (634) a selection path graphic corresponding to the path. For example, in FIG. 5M, the device 100 displays the selection path graphic 522B corresponding to the path defined by movement of the contact 550G. In some embodiments, the selection path graphic includes (636) partially transparent alternating shaded and white dashes. In some embodiments, displaying the selection path graphic includes animating (638) the selection path graphic. In some embodiments, while displaying the selection path graphic, the device detects a relocation user input moving with the drawing user interface. For example, in FIG. 5N, the device 100 detects (640) a contact 550H moving within the drawing user interface 501. In response to detecting the relocation user input, the device ceases (642) display of the selection path graphic and moves the two or more of the plurality of drawing objects in accordance with the relocation user input. For example, in FIG. 5O, the device 100 ceases to display the selection path graphic 522B and moves the set of three stroke drawing objects 521D downward in accordance with movement of the contact 550H. Displaying the selection path graphic provides visual feedback to user indicating the drawing objects that are selected, preventing the unintended manipulation of drawing objects (resulting in further user interaction to undo the manipulation) and preventing manipulation of some, but not all, of the drawings objects the user desires to manipulation (resulting in further user interaction to manipulate the remaining drawing objects). Preventing unnecessary user interaction reduces wear-and-tear of the device and, for battery powered devices, increases battery life of the device.

In some embodiments, in performing the predefined operation with respect to two or more of the plurality of drawing objects that intersect the path, the device erases (644), from the two or more of the plurality of drawing objects that intersect the path, portions that intersect the path without erasing one or more portions that do not intersect the path. For example, in FIG. 5H, the device erases portions of the set of six stroke drawing objects 521E that intersect the path without erasing portions that do not intersect the path.

In some embodiments, in performing the predefined operation with respect to two or more of the plurality of drawing objects that intersect the path, the device changes (646) a color of the two or more of the plurality of drawing objects that intersect the path, changes a size of the two or more of the plurality of drawing objects that intersect the path, or changes an opacity of the two or more of the plurality of drawing objects that intersect the path. For example, in FIG. 5R, the device 100 changes the color of two of the set of three stroke drawing objects 521D and changes the color of the text drawing object 521C. As another example, in FIG. 5T, the device 100 changes a size (e.g., a line width) of two of the set of three stroke drawing objects 521D and changes a size (e.g., a line width) of the square drawing object 521A.

It should be understood that the particular order in which the operations in FIGS. 6A-6C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 600 described above with respect to FIGS. 6A-6C. For example, the user interfaces, user inputs (including finger contacts and stylus contacts), drawing objects, drawing tool selection affordances described above with reference to method 600 optionally have one or more of the characteristics of the user interfaces, user inputs (including finger contacts and stylus contacts), drawing objects, drawing tool selection affordances described herein with reference to other methods described herein (e.g., methods 700, 800, and 900). For brevity, these details are not repeated here.

FIGS. 7A-7B illustrate a flow diagram of a method 700 of marking up content in accordance with some embodiments. The method 700 is performed at an electronic device (e.g., the portable multifunction device 100 in FIG. 1A, or the device 300 in FIG. 3) with a display and one or more input devices. In some embodiments, the display is a touch-screen display and the one or more input devices are on or integrated with the display. In some embodiments, the display is separate from the one or more input devices. Some operations in method 700 are, optionally, combined and/or the order of some operations is, optionally, changed.

As described below, the method 700 provides an intuitive way to markup content. The method reduces the cognitive burden on a user when marking up content, thereby creating a more efficient human-machine interface. For battery-operated electronic devices, enabling a user to markup content faster and more efficiently conserves power and increases the time between battery charges.

The device displays (702), on the display, first content and a representation of second content associated with the first content. For example, in FIG. 5AC, the device 100 displays an email user interface 502 including a content region 542B with first content 543A in the form of text of an email message and a representation of second content 543B in the form of an image, representing an image attached to the email message. As another example, in FIG. 5AZ, the device 100 displays an email user interface 502 including a content region 542B with first content 546A in the form of text of an email message and a representation of second content 546B in the form of an icon, representing a PDF file attached to the email message.

In some embodiments, the representation of the second content includes (704) an image. For example, in FIG. 5AC, the representation of second content 543B includes an image. In some embodiments, the second content includes (706) an increased-scale version of the image. For example, in FIG. 5AE, the second content 544 includes an increased-scale version of the representation of the second content 543B of FIG. 5AC.

In some embodiments, the representation of the second content includes an icon. For example, in FIG. 5BA, the representation of second content 546B includes an icon. In some embodiments, the second content includes an attached file. For example, in FIG. 5BB, the second content 547 includes a PDF file.

The device detects (708), via the one or more input devices, a user input at a location of the representation of the second content. For example, in FIG. 5AD, the device 100 detects a finger contact 551B at the location of the representation of the second content 543B. As another example, in FIG. 5AP, the device detects a stylus contact 561C at the location of the representation of the second content 543B. As noted above, in some embodiments, the representation of the second content includes an image. Further, in some embodiments, the user input defines (710) a path from a first location within the image to a second location within the image. For example, in FIG. 5AR, the device 100 detects movement of a stylus contact 561D from a first location within the representation of the second contact 543B to a second location within the representation of the second content 543B.

In response to detecting the user at the location of the representation of the second content and in accordance with a determination that the user input includes a stylus contact, the device displays (712), on the display, a drawing user interface including the second content and a toolbar region with a plurality of drawing tool selection affordances. For example, in FIG. 5AQ, in response to detecting the stylus contact 561C at the location of the representation of the second content 543B, the device 100 displays the drawing user interface 501 including the second content 544 and a toolbar region 513 with a plurality of drawing tool selection affordances 532A-532D. Accelerating display of the drawing user interface in response to detecting a stylus contact that is more likely to be used to mark up the content reduces the amount of user interaction to mark up the content. The reduction in user interaction reduces wear-and-tear of the device. The reduction in user interaction also results in faster initiation of the performance of markup operations and, thus, reduces power drain to perform the markup operations, increasing battery life of the device.

In some embodiments, when the user input defines a path from a first location within an image to a second location within an image, the device displays (714), in the drawing user interface, a drawing object corresponding to the path. For example, in FIG. 5AS, the device 100 displays a stroke drawing object 521G corresponding to the path of the stylus contact 561D in FIG. 5AP. As another example, in FIG. 5AT, the device 100 displays a stroke drawing object 521H corresponding to the path of the stylus contact 561D in FIG. 5AR. In some embodiments, the drawing object corresponding to the path includes (716) an increased-scale version of the path. For example, in FIG. 5AS, the device 100 displays a stroke drawing object 521G that is an increased-scale version of the path of the stylus contact 561D in FIG. 5AR. In some embodiments, the drawing object corresponding to the path includes (718) a version of the path that is the same size as the path defined by the user input. For example, in FIG. 5AT, the device 100 displays a stroke drawing object 521H that is the same size as the path of the stylus contact 561D in FIG. 5AR. Allowing a user to directly markup content from the embedded representation provides an efficient mechanism for a user to markup the content, thus reducing the amount of user interaction with the device. The reduction in user interaction reduces wear-and-tear of the device. The reduction in user interaction also results in faster initiation of the performance of markup operations and, thus, reduces power drain to perform the markup operations, increasing battery life of the device.

In response to detecting the user at the location of the representation of the second content and in accordance with a determination that the user input does not include a stylus contact, the device forgoes (720) display of the drawing user interface. For example, in FIG. 5AE, in response to detecting the finger contact 551B at the location of the representation of the second content 543B, the device 100 displays the photo viewer user interface 504B. As another example, in FIG. 5AV, in response to detecting movement of the finger contact 551F at the location of the representation of the second content 543B, the device 100 scrolls the content region 542B of the email user interface 502.

In some embodiments, in forgoing to display the drawing user interface, the device displays (722) a viewer user interface including the second content without the plurality of drawing tool selection affordances. For example, in FIG. 5AE, the photo viewer user interface 504B includes the second content 544 without the plurality of drawing tool affordances. By displaying the viewer user interface in response to detecting, e.g., a finger contact that is more likely to be used to view the content (e.g., scroll and/or zoom) reduces the amount of user interaction to view the content. The reduction in user interaction reduces wear-and-tear of the device. The reduction in user interaction also results in faster initiation of the performance of viewing operations and, thus, reduces power drain to perform the viewing operations, increasing battery life of the device.

In some embodiments, while displaying the viewer user interface, the device detects (724), via the one or more input devices, a user input selecting a drawing affordance of the viewer user interface. For example, in FIG. 5AE, the device 100 detects a finger contact 551C at the location of the drawing affordance 516 in the photo viewer user interface 504A. In some embodiments, in response to detecting the user input selecting the drawing affordance, the device displays (726), on the display, the drawing user interface including the second content and the toolbar region with the plurality of drawing tool selection affordances. For example, in FIG. 5AF, the device 100 displays the drawing user interface 501 including the second content 544 and the toolbar region 513 with the plurality of drawing tool selection affordances 532A-532D. Allowing a user to switch from a viewer user interface to a drawing user interface via the drawing affordance provides an efficient mechanism for a user to markup content. The reduction in user interaction reduces wear-and-tear of the device. The reduction in user interaction also results in faster initiation of the performance of markup operations and, thus, reduces power drain to perform the markup operations, increasing battery life of the device.

In some embodiments, while displaying the viewer user interface, the device detects (728), via the one or more inputs devices, a user input at a location of the second content. For example, in FIG. 5AG, the device 100 detects a stylus contact 561A at the location of the second content 544. As another example, in FIG. 5AL, the device 100 detects a finger contact 551D at the location of the second content 544.

In some embodiments, in accordance with a determination that the user input at the location of the second content includes a stylus contact, the device displays (730), on the display, the drawing user interface including the second content and the toolbar region with the plurality of drawing tool affordances. For example, in FIG. 5AH, in response to detecting the stylus contact 561A, the device 100 displays the drawing user interface 501 including the second content 544 with the plurality of drawing tool selection affordances 532A-532D. Accelerating display of the drawing user interface in response to detecting a stylus contact that is more likely to be used to mark up the content reduces the amount of user interaction to mark up the content. The reduction in user interaction reduces wear-and-tear of the device. The reduction in user interaction also results in faster initiation of the performance of markup operations and, thus, reduces power drain to perform the markup operations, increasing battery life of the device.

In some embodiments, in accordance with a determination that the user input at the location of the second content does not include a stylus contact, the device forgoes (732) display of the drawing user interface. For example, in FIG. 5AM, in response to detecting the finger contact 551D, the device 100 displays the second content 544 in a full screen mode. In some embodiments, in forgoing display of the drawing user interface, the device moves (734) display of the second content in accordance with movement of the user input at the location of the second content. For example, in FIG. 5AO, the device 100 moves display of the second content 544 in accordance with movement of the finger contact 551E at the location of the second content.

In some embodiments, while displaying the first content and the representation of the second content, in forgoing display of the drawing user interface, the device moves (736) display of the first content and the representation of the second content in accordance with movement of the user input at the location of the representation of the second content. For example, in FIG. 5AV, the device 100 moves display of the first content 543A and the representation of the second content 543B in accordance with movement of the finger contact 551F at the location of the representation of the second content.

It should be understood that the particular order in which the operations in FIGS. 7A-7B have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, and 900) are also applicable in an analogous manner to method 700 described above with respect to FIGS. 7A-7B. For example, the user interfaces, user inputs (including finger contacts and stylus contacts), drawing objects, drawing tool selection affordances described above with reference to method 700 optionally have one or more of the characteristics of the user interfaces, user inputs (including finger contacts and stylus contacts), drawing objects, drawing tool selection affordances described herein with reference to other methods described herein (e.g., methods 600, 800, and 900). For brevity, these details are not repeated here.

FIGS. 8A-8C illustrate a flow diagram of a method 800 of manipulating a content creation region in accordance with some embodiments. The method 800 is performed at an electronic device (e.g., the portable multifunction device 100 in FIG. 1A, or the device 300 in FIG. 3) with a display and a touch-sensitive surface. In some embodiments, the display is a touch-sensitive display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to manipulate a content creation region. The method reduces the cognitive burden on a user when manipulating a content creation region, thereby creating a more efficient human-machine interface. For battery-operated electronic devices, enabling a user to manipulate a content creation region faster and more efficiently conserves power and increases the time between battery charges.

The device displays (802), on the touch-sensitive display, a content creation region that includes typed text and one or more blank areas that do not include content. For example, in FIG. 5BE, the device 100 displays a notes user interface 505 including a content creation region 555B with typed text 557A and a blank area 557B that does not include content. As another example, in FIG. 5BZ, the device 100 displays a content creation region 555B with typed text 557A and a blank area 557F that does not include content.

The device detects (804) a user input on the touch-sensitive display that includes movement of a contact in the content creation region. For example, in FIG. 5BN, the device 100 detects movement of a stylus contact 562D in the content creation region 555B. As another example, in FIG. 5BZ, the device 100 detects movement of a finger contact 552H in the content creation region 555B.

In response to detecting the user input and in accordance with a determination that the user input includes movement of a stylus contact in a respective blank area, the device draws (806) a mark based on movement of the stylus contact during the user input. For example, in FIG. 5BO, the device 100 draws a mark (in the form of a stroke drawing object 559A) based on movement of a stylus contact 562D in a blank area 557B during a user input (shown in FIG. 5BN). In some embodiments, in drawing a mark, the device displays (808), on the touch-sensitive display, the mark at locations at which the stylus contact was detected during the user input. For example, in FIG. 5BO, the device displays the stroke drawing object 559A at locations at which the stylus contact 562D was detected (in FIG. 5BN). Allowing a user to directly markup content using a stylus provides an efficient mechanism for a user to markup the content, thus reducing the amount of user interaction with the device. The reduction in user interaction reduces wear-and-tear of the device. The reduction in user interaction also results in faster initiation of the performance of markup operations and, thus, reduces power drain to perform the markup operations, increasing battery life of the device.

In some embodiments, in drawing the mark, the device displays (810), on the touch-sensitive display, a toolbar region including a plurality of drawing tool selection affordances for selecting respective drawing tools. For example, in FIG. 5BO, the device 100 displays the toolbar region 555C including the plurality of drawing tool selection affordances 532A, 532B, 532E, 532H, and 532I for selecting respective drawing tools. In some embodiments, in drawing the mark, the device displays (812), on the touch-sensitive display, an undo affordance for removing the mark. For example, in FIG. 5BO, the device 100 displays the undo affordance 531A. The undo affordance provides an efficient mechanism for a user to undo operations, thus reducing the amount of user interaction to undo unintended or unsatisfactory operations. The reduction in user interaction reduces wear-and-tear of the device. The reduction in user interaction also results in faster undoing of operations and, thus, reduces power drain to perform the storage management operations, increasing battery life of the device.

In some embodiments, in drawing the mark, the device displays (814), on the touch-sensitive display between the respective blank area and the typed text, a visual separator. For example, in FIG. 5BO, the device 100 displays a visual separator 557D between the black area 557C and the typed text 557A. Displaying the visual separator provides visual feedback to user indicating the position of a drawing insertion region, preventing unintended manipulation of text or other content outside the drawing insertion region (resulting in further user interaction to undo the manipulation). Preventing unnecessary user interaction reduces wear-and-tear of the device and, for battery powered devices, increases battery life of the device.

In accordance with a determination that the user input includes movement of a finger contact in a respective blank area, the device scrolls (816) the content creation region based on movement of the finger contact during the user input. For example, in FIG. 5CA, the content creation region 555B is scrolled based on the movement of the finger contact 552H in FIG. 5BZ. In some embodiments, in scrolling the content creation region, the device moves (818) display of the typed text. For example, as between FIG. 5BZ and FIG. 5CA, the typed text 557A is moved in accordance with the movement of the finger contact 552H. Performing two different operations in response to the same gesture (movement of a contact) based on whether the gesture was performed with a stylus or a finger provides an efficient mechanism to perform either of the operations, thus reducing the amount of user interaction with the device to perform at least one of the operations. Reducing the amount of user interaction with the device reduces wear-and-tear of the device and, for battery powered devices, increases battery life of the device.

In some embodiments, the device detects (820) a contact at a location in the typed text. For example, in FIG. 5CB, the device detects a finger contact 552I at a location in the typed text 557A. In some embodiments, in response to detecting the contact at the location in the typed text, the device displays (822), on the touch-sensitive display, a cursor at the location in the typed text and a keyboard for insertion of additional typed text. For example, in FIG. 5CC, the device 100 displays a cursor 557G at the location of the finger contact 552I and a keyboard 558G for insertion of addition typed text.

In some embodiments, the device detects (824) movement of a contact at a location within the typed text. For example, in FIG. 5CJ, the device 100 detects movement of a contact 552N within the first portion of the typed text 557K. In some embodiments, in response to detecting movement of the contact within the typed text, the device selects (826) typed text covered by the movement. For example, in FIG. 5CK, typed text covered by the movement of the finger contact 552N is covered with a selection indicia 557Q (e.g., the text is highlighted) indicating that the typed text covered by the movement of the finger contact 552N is selected. Selecting text in response to movement of a contact over the text provides an efficient mechanism for a user to select text, thus reducing the amount of user interaction to select the text (and perform operations on the selected text). Reducing the amount of user interaction with the device reduces wear-and-tear of the device and, for battery powered devices, increases battery life of the device.

In some embodiments, the device detects (828) a contact at a location in the typed text for at least a predefined threshold amount of time. For example, in FIG. 5CD, the device 100 detects the contact 552J at a location in the typed text 557A for at least a predefined threshold amount of time. In some embodiments, in response to detecting a contact at the location in the typed text for at least a predefined threshold amount of time, the device displays (830), on the touch-sensitive display, a menu at the location in the typed text, the menu including an affordance for inserting a drawing insertion region at the location in the typed text. For example, in FIG. 5CE, the device 100 displays a menu at the location in the typed text 557A. The menu includes an in-line drawing affordance 557J for inserting a drawing insertion region at the location in the typed text. The in-line drawing affordance provides an efficient mechanism for a user to insert a drawing insertion region (and markup content), thus reducing the amount of user interaction to perform markup operations. Reducing the amount of user interaction with the device reduces wear-and-tear of the device and, for battery powered devices, increases battery life of the device.

In some embodiments, the device detects (832) at contact at a location of the affordance for inserting a drawing insertion region. For example, in FIG. 5CE, the device detects the contact 552K at the location on the in-line drawing affordance 557J. In some embodiments, in response to detecting a contact at a location of the affordance for inserting a drawing insertion region, the device moves (834) at least one of a first portion of the typed text or a second portion of the typed text to introduce a blank drawing insertion region between the first portion and the second portion. For example, in FIG. 5CF, the device 100 moves the second portion of the typed text 557M to introduce a blank drawing insertion region 557M between the first portion of the typed text 557K and the second portion of the typed text 557L. In some embodiments, in response to detecting a contact at a location of the affordance for inserting a drawing insertion region, the device displays (836), on the touch-sensitive display, a first visual separator between the drawing insertion region and the first portion and a second visual separator between the drawing insertion region and the second portion. For example, in FIG. 5CF, the device 100 displays a first visual separator 557N between the drawing insertion region 557M and the first portion of the typed text 55K and a second visual separator 557O between the drawing insertion region 557O and the second portion of the typed text 557L. In some embodiments, in response to detecting a contact at a location of the affordance for inserting a drawing insertion region, the device displays (838), on the touch-sensitive display, a toolbar region including a plurality of drawing tool selection affordances for selecting respective drawing tools. For example, in FIG. 5CF, the device 100 displays the toolbar region 555C including a plurality of drawing tool selection affordances 532A, 532B, 532E, 532H, and 532I.

In some embodiments, the device detects (840) movement of a contact in the drawing insertion region. For example, in FIG. 5CF, the device 100 detects movement of the contact 552L in the drawing insertion region 557M. In some embodiments, in response to detecting movement of a contact in the drawing insertion region, the device draws (842) a mark in the drawing insertion region based on the movement. For example, in FIG. 5CG, the device displays a stroke drawing object 559C in the drawing insertion region 557M based on movement of the contact 552L in FIG. 5CF.

In some embodiments, the device detects (844) movement of a contact from a location of the second visual separator. For example, in FIG. 5CG, the device 100 detects movement of the contact 552Z from a location of the second visual separator 557O. In some embodiments, in response to detecting movement of a contact from a location of the second visual separator, the device moves (846) the second visual separator to change a size of the drawing insertion region. For example, in FIG. 5CH, the device 100 moves the second visual separator 557O to change a size of the drawing insertion region 557M. Thus, the visual separator provides an efficient mechanism for a user to resize the drawing insertion region, reducing the amount of user interaction to resize the drawing insertion region. Reducing the amount of user interaction with the device reduces wear-and-tear of the device and, for battery powered devices, increases battery life of the device.

It should be understood that the particular order in which the operations in FIGS. 8A-8C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 900) are also applicable in an analogous manner to method 800 described above with respect to FIGS. 8A-8C. For example, the user interfaces, user inputs (including finger contacts and stylus contacts), marks, content creation regions, drawing insertion regions, and drawing tool selection affordances described above with reference to method 800 optionally have one or more of the characteristics of the user interfaces, user inputs (including finger contacts and stylus contacts), marks, content creation regions, drawing insertion regions, and drawing tool selection affordances described herein with reference to other methods described herein (e.g., methods 600, 700, and 900). For brevity, these details are not repeated here.

FIGS. 9A-9C illustrate a flow diagram of a method 900 of inserting a drawing insertion region in accordance with some embodiments. The method 900 is performed at an electronic device (e.g., the portable multifunction device 100 in FIG. 1A, or the device 300 in FIG. 3) with a display and a touch-sensitive surface. In some embodiments, the display is a touch-sensitive display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to insert a drawing insertion region. The method reduces the cognitive burden on a user when inserting a drawing insertion region, thereby creating a more efficient human-machine interface. For battery-operated electronic devices, enabling a user to insert a drawing insertion region faster and more efficiently conserves power and increases the time between battery charges.

The device displays (902), on the touch-sensitive display, a content creation region. For example, in Figure CL, the device 100 displays a content creation region 555B as part of a notes user interface 505.

The device detects (904) on or more typed inputs. For example, in FIG. 5CL, the device 100 detects one or more typed inputs in the form of contacts at the location of the enter affordance 558I. As another example, between FIGS. 5CM and 5CN, the device 100 detects one or more typed inputs in the form of contacts at locations of character affordances 558G.

In response to detecting the one or more typed inputs, the device edits (906) content in the content creation region to create a blank area that does not include visible content and is a text insertion region. For example, in FIG. 5CN, the content in the content creation region 555B includes the blank text insertion region 567A.

In some embodiments, the device detects (908) a contact at a location of the text insertion region. For example, in FIG. 5CR, the device 100 detects the finger contact 553D at a location of the blank text insertion region 567A. As another example, in FIG. 5DE, the device 100 detects the stylus contact 563B at a location of the blank text insertion region 567A.

In some embodiments, in response to detecting the contact at the location of the text insertion region, the device displays (910), on the touch-sensitive display, a keyboard including a plurality of character affordances for inserting text into the text insertion region and including a show drawing tools affordance. For example, in FIG. 5CS, the device 100 displays the toolbar region 555C in a keyboard mode including the character affordances 558G and the show drawing tools affordance 558D. As another example, in FIG. 5DF, the device 100 displays the toolbar region 555C in a keyboard mode including the character affordances 558G and the show drawing tools affordance 558D.

In some embodiments, the device detects (912) a user input requesting insertion of a drawing insertion region. In some embodiments, the device detects (914) a contact at a location of the show drawing tools affordance. For example, in FIG. 5CS, the device 100 detects the finger contact 553E at a location of the show drawing tools affordance 558D. As another example, in FIG. 5DF, the device 100 detects a stylus contact 563C at a location of the show drawing tools affordance 558D. The show drawing tools affordance provides an efficient mechanism for a user to enter an in-line drawing mode, thus reducing the amount of user interaction to markup content. The reduction in user interaction reduces wear-and-tear of the device. The reduction in user interaction also results in faster initiation of the performance of the markup operations and, thus, reduces power drain to perform the markup operations, increasing battery life of the device.

In some embodiments, in response to detecting the contact at the location of the show drawing tools affordance, the device displays (916) a toolbar region including a plurality of drawing tool selection affordances for selecting respective drawing tools. For example, in FIG. 5CT, the device 100 displays the toolbar region 555C in an in-line drawing mode including a plurality of drawing tool selection affordances 532A, 532B, 532E, 532H, and 532I. As another example, in FIG. 5DG, the device 100 displays the toolbar region 555C in an in-line drawing mode including a plurality of drawing tool selection affordances 532A, 532B, 532E, 532H, and 532I.

While displaying the content creation region with the text insertion region, the device detects (918) a contact on the touch-sensitive display in the text insertion region. For example, in FIG. 5CU, the device 100 detects a finger contact 553F in the blank text insertion region 567A. As another example, in FIG. 5DG, the device 100 detects a stylus contact 563D in the blank text insertion region 567A.

In response to detecting the contact in the text insertion region and in accordance with a determination that the contact is a stylus contact, the device converts (920) at least a portion of the text insertion region into a drawing insertion region including a mark based on the stylus contact. For example, in FIG. 5DH, the device 100 converts a portion of the blank text insertion region 567A into the drawing insertion region 567J including the mark 569C based on the stylus contact 563D of FIG. 5DG. In some embodiments, the device converts (922) at least a portion of the text insertion region into a drawing insertion region including a mark based on movement of the stylus contact. For example, in FIG. 5DJ, the device 100 converts a portion of the blank text insertion region 567A into the drawing insertion region 567K including the stroke drawing object 569A based on movement of the stylus contact 563E in FIG. 5DI. Accelerating display of the mark in response to detecting a stylus contact that is more likely to be used to mark up the content reduces the amount of user interaction to mark up the content. The reduction in user interaction reduces wear-and-tear of the device. The reduction in user interaction also results in faster initiation of the performance of markup operations and, thus, reduces power drain to perform the markup operations, increasing battery life of the device.

In response to detecting the contact in the text insertion region and in accordance with a determination that the contact is a finger contact, the device converts (924) at least a portion of the text insertion region into a blank drawing insertion region. For example, in FIG. 5CV, the device 100 converts a portion of the blank text insertion region 567A into a blank drawing insertion region 567D. In some embodiments, the device converts (926) at least a portion of the text insertion region into a blank drawing insertion region ignoring movement of the finger contact. For example, in FIG. 5CY, the device 100 converts at portion of the blank text insertion region 567A into a blank drawing insertion region 567D ignoring movement of the finger contact 553H of FIG. 5CX. Providing a blank drawing region in response to detecting a finger contact allows a user to provide a more accurate indication of the location at which a mark is desired, preventing unnecessary user interaction to replace the mark where desired if placed in error. Preventing unnecessary user interaction with the device reduces wear-and-tear of the device and, for battery powered devices, increases battery life of the device.

In some embodiments, the device detects (928) movement of a contact on the touch-sensitive display in the content creation region. For example, in FIG. 5CJ, the device 100 detects movement of the finger contact 552N in the content creation region 555B. As another example, in FIG. 5CP, the device 100 detects movement of the finger contact 553C in the content creation region 553C. As another example, in FIG. 5CQ, the device 100 detects movement of the stylus contact 563A in the content creation region 553C.

In some embodiments, in response to detecting movement of the contact on the touch-sensitive display in the content creation region and in accordance with a determination that the movement of the contact is in typed text, the device selects (930) text covered by the movement. For example, in FIG. 5CK, typed text covered by the movement of the finger contact 552N is covered with a selection indicia 557Q (e.g., the text is highlighted) indicating that the typed text covered by the movement of the finger contact 552N is selected. In some embodiments, in response to detecting movement of the contact on the touch-sensitive display in the content creation region and in accordance with a determination that the movement of the contact is in a blank area that is a text insertion region, the device scrolls (932) the content creation region. For example, in FIG. 5CQ, the device 100 scrolls the content creation region 555B in response to movement of the finger contact 553C in the blank text insertion region 567A in FIG. 5CP. As another example, in FIG. 5CR, the device 100 scrolls the content creation region 555B in response to movement of the stylus contact 563A in the blank text insertion region 567A in FIG. 5CQ. Performing two different operations in response to the same gesture (movement of a contact) based on whether the gesture was performed within typed text or a blank text insertion region provides an efficient mechanism to perform either of the operations, thus reducing the amount of user interaction with the device to perform at least one of the operations. Reducing the amount of user interaction with the device reduces wear-and-tear of the device and, for battery powered devices, increases battery life of the device.

In some embodiments, the device displays (934), on the touch-sensitive display, a first visual separator between the drawing insertion region and typed text in the content creation region. For example, in FIG. 5DJ, the device 100 displays the first visual separator 567F between the drawing insertion region 567K and the typed text 557A. Displaying the visual separator provides visual feedback to user indicating the position of a drawing insertion region, preventing unintended manipulation of text or other content outside the drawing insertion region (resulting in further user interaction to undo the manipulation). Preventing unnecessary user interaction reduces wear-and-tear of the device and, for battery powered devices, increases battery life of the device.

In some embodiments, in accordance with a determination that the drawing insertion region is between first typed text in the content creation region and second typed text in the content creation region, the device displays (936) the first visual separator between the drawing insertion region and the first typed text and displays a second visual separator between the drawing insertion region and the second typed text. For example, in FIG. 5DJ, the device 100 displays the first visual separator 567F between the drawing insertion region 567K and the typed text 557A and displays the second visual separator 567G between the drawing insertion region 567K and the additional typed text 567B. In some embodiments, in accordance with a determination that the drawing insertion region is below all typed text in the content creation region, the device displays (938) the first visual separator between the drawing insertion region and the typed text and forgoes display of a second visual separator. For example, in FIG. 5DR, the device 100 displays the first visual separator 567J between the drawing insertion region 567I and all typed text in the content creation region 555B, the typed text 557A and the additional typed text 567B. Displaying only a single visual separator uses the space on the screen more efficiently, resulting in a more efficient human-machine interface. For battery-operated electronic devices, a more efficient human-machine user interface conserves power and increases the time between battery charges. Further, a more efficient human-machine user interface reduces the amount of user interaction with the device and reduces wear-and-tear of the device. By using less space on the screen, a smaller (and less expensive) screen can provide the same usability.

In some embodiments, the device detects (940) movement of a contact from a location of the first visual separator. For example, in FIG. 5DM, the device 100 detect movement of the stylus contact 563G from a location of the second visual separator 567G.

In some embodiments, in response to detecting movement of a contact from a location of the first visual separator, the device converts (942) at least an additional portion of the text insertion region into an additional portion of the drawing insertion region. For example, in FIG. 5DN, the device 100 converts the third blank text insertion region 567L into a portion of the drawing insertion region 567K. Thus, the visual separator provides an efficient mechanism for a user to resize the drawing insertion region, reducing the amount of user interaction to resize the drawing insertion region. Reducing the amount of user interaction with the device reduces wear-and-tear of the device and, for battery powered devices, increases battery life of the device.

In some embodiments, the device detects (944) movement of a contact from a first location within the drawing insertion region to a second location within an additional portion of the text insertion region. For example, in FIG. 5DK, the device 100 detects movement of the stylus contact 563F from a first location within the drawing insertion region 567K to a second location within the second blank text insertion region 567E.

In some embodiments, in response to detecting movement of the contact from the first location within the drawing insertion region to the second location within an additional portion of the text insertion region, the device converts (946) at least an additional portion of the text insertion region into an additional portion of the drawing insertion region. For example, in FIG. 5DL, the device 100 converts a portion of the second blank text insertion region 567E into an additional portion of the drawing insertion region 567K. Thus, in some circumstances, the drawing insertion region is automatically resized to accommodate a desired mark, reducing user interaction with the device to manually resize the drawing insertion region (e.g., using a visual separator). Reducing the amount of user interaction with the device reduces wear-and-tear of the device and, for battery powered devices, increases battery life of the device.

In some embodiments, in response to detecting movement of the contact from the first location within the drawing insertion region to the second location within an additional portion of the text insertion region, the device draws (948) a mark in the additional portion of the drawing insertion region based on the movement of the contact from the first location to the second location. For example, in FIG. 5DL, the device 100 displays the second stroke drawing object 569D in the drawing insertion region 567K.

It should be understood that the particular order in which the operations in FIGS. 9A-9C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 800) are also applicable in an analogous manner to method 900 described above with respect to FIGS. 9A-9C. For example, the user interfaces, user inputs (including finger contacts and stylus contacts), marks, content creation regions, drawing insertion regions, and drawing tool selection affordances described above with reference to method 900 optionally have one or more of the characteristics of the user interfaces, user inputs (including finger contacts and stylus contacts), marks, content creation regions, drawing insertion regions, and drawing tool selection affordances described herein with reference to other methods described herein (e.g., methods 600, 700, and 800). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at an electronic device with one or more processors, non-transitory memory, a display, and one or more input devices:

displaying, on the display, first content and a representation of second content associated with the first content;

while displaying the first content and the representation of the second content, detecting, via the one or more input devices, a first user input at a location of the representation of the second content;

in response to detecting the first user input at the location of the representation of the second content, displaying, on the display, a first user interface including the second content;

while displaying the first user interface including the second content, detecting, via the one or more input devices, a second user input at a location of the second content;

in response to detecting the second user input at the location of the second content:

in accordance with a determination that the second user input includes a stylus contact, displaying, on the display, a drawing user interface including the second content and a toolbar region with a plurality of drawing tool selection affordances; and in accordance with a determination that the second user input does not include a stylus contact, forgoing display of the drawing user interface, wherein forgoing display of the drawing user interface includes displaying a third user interface including the second content without the plurality of drawing tool selection affordances.

2. The method of claim 1, wherein the second content includes an image, wherein the second user input defines a path from a first location within the image to a second location within the image, and wherein displaying the drawing user interface including the second content further includes displaying a drawing object corresponding to the path.

3. The method of claim 2, wherein the second content includes an increased-scale version of the image, wherein the drawing object corresponding to the path includes an increased-scale version of the path.

4. The method of claim 2, wherein the second content includes an increased-scale version of the image, wherein the drawing object corresponding to the path includes a version of the path that is the same size as the path defined by the second user input.

5. The method of claim 1, further comprising:

detecting, via the one or more input devices, a third user input selecting a drawing affordance of the third user interface; and in response to detecting the third user input selecting the drawing affordance, displaying the drawing user interface including the second content and the toolbar region with the plurality of drawing tool selection affordances.

6. The method of claim 1, wherein forgoing display of the drawing user interface includes moving display of the second content in accordance with movement of the second user input at the location of the second content.

7. An electronic device comprising:

a display;

one or more input devices; and one or more processors configured to:

display, on the display, first content and a representation of second content associated with the first content;

while displaying the first content and the representation of the second content, detect, via the one or more input devices, a first user input at a location of the representation of the second content;

in response to detecting the first user input at the location of the representation of the second content, display, on the display, a first user interface including the second content;

while displaying the first user interface including the second content, detect, via the one or more input devices, a second user input at a location of the second content;

in response to detecting the second user input at the location of the second content:

in accordance with a determination that the second user input includes a stylus contact, display, on the display, a drawing user interface including the second content and a toolbar region with a plurality of drawing tool selection affordances; and in accordance with a determination that the second user input does not include a stylus contact, forgo display of the drawing user interface, wherein forgoing display of the drawing user interface includes displaying a third user interface including the second content without the plurality of drawing tool selection affordances.

8. The electronic device of claim 7, wherein the second content includes an image, wherein the second user input defines a path from a first location within the image to a second location within the image, and wherein the one or more processors are further configured to display the drawing user interface including the second content by displaying a drawing object corresponding to the path.

9. The electronic device of claim 8, wherein the second content includes an increased-scale version of the image, wherein the drawing object corresponding to the path includes an increased-scale version of the path.

10. The electronic device of claim 8, wherein the second content includes an increased-scale version of the image, wherein the drawing object corresponding to the path includes a version of the path that is the same size as the path defined by the second user input.

11. The electronic device of claim 7, wherein the one or more processors are further configured to:

detect, via the one or more input devices, a third user input selecting a drawing affordance of the third user interface; and in response to detecting the third user input selecting the drawing affordance, display the drawing user interface including the second content and the toolbar region with the plurality of drawing tool selection affordances.

12. The electronic device of claim 7, wherein the one or more processors are configured to forgo display of the drawing user interface by moving display of the second content in accordance with movement of the second user input at the location of the second content.

13. A non-transitory computer-readable storage medium storing one or more programs, the one or more programs comprising instructions, which, when executed by an electronic device with a display and one or more input devices, cause the electronic device to:

display, on the display, first content and a representation of second content associated with the first content;

while displaying the first content and the representation of the second content, detect, via the one or more input devices, a first user input at a location of the representation of the second content;

in response to detecting the first user input at the location of the representation of the second content, display, on the display, a first user interface including the second content;

while displaying the first user interface including the second content, detect, via the one or more input devices, a second user input at a location of the second content;

in response to detecting the second user input at the location of the second content:

in accordance with a determination that the second user input includes a stylus contact, display, on the display, a drawing user interface including the second content and a toolbar region with a plurality of drawing tool selection affordances; and in accordance with a determination that the second user input does not include a stylus contact, forgo display of the drawing user interface, wherein forgoing display of the drawing user interface includes displaying a third user interface including the second content without the plurality of drawing tool selection affordances.

14. The non-transitory computer-readable storage medium of claim 13, wherein the second content includes an image, wherein the second user input defines a path from a first location within the image to a second location within the image, and wherein display of the drawing user interface including the second content further includes display of a drawing object corresponding to the path.

15. The method of claim 1, wherein displaying the first user interface includes ceasing displaying the first content.

16. The non-transitory computer-readable storage medium of claim 14, wherein the second content includes an increased-scale version of the image, wherein the drawing object corresponding to the path includes an increased-scale version of the path.

17. The non-transitory computer-readable storage medium of claim 14, wherein the second content includes an increased-scale version of the image, wherein the drawing object corresponding to the path includes a version of the path that is the same size as the path defined by the second user input.

18. The non-transitory computer-readable storage medium of claim 13, wherein the instructions further cause the electronic device to:

detect, via the one or more input devices, a third user input selecting a drawing affordance of the third user interface; and in response to detecting the third user input selecting the drawing affordance, display the drawing user interface including the second content and the toolbar region with the plurality of drawing tool selection affordances.

19. The non-transitory computer-readable storage medium of claim 13, wherein forgoing display of the drawing user interface includes moving display of the second content in accordance with movement of the second user input at the location of the second content.

20. The electronic device of claim 7, wherein displaying the first user interface includes ceasing displaying the first content.

21. The non-transitory computer-readable storage medium of claim 13, wherein displaying the first user interface includes ceasing displaying the first content.

* * * * *